US009151465B2

(12) United States Patent
Fujiuchi et al.

(10) Patent No.: US 9,151,465 B2
(45) Date of Patent: Oct. 6, 2015

(54) LIGHT-SOURCE DEVICE AND REFLECTOR-SUPPORT STRUCTURE

(71) Applicants: Akiko Fujiuchi, Tokyo (JP); Daisuke Ohama, Tokyo (JP); Hiroyuki Asano, Tokyo (JP)

(72) Inventors: Akiko Fujiuchi, Tokyo (JP); Daisuke Ohama, Tokyo (JP); Hiroyuki Asano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/367,044

(22) PCT Filed: Dec. 25, 2012

(86) PCT No.: PCT/JP2012/083524

§ 371 (c)(1),
(2) Date: Jun. 19, 2014

(87) PCT Pub. No.: WO2013/118414

PCT Pub. Date: Aug. 15, 2013

(65) Prior Publication Data

US 2014/0347884 A1 Nov. 27, 2014

(30) Foreign Application Priority Data

Feb. 7, 2012 (JP) ................................ 2012-024229
Jun. 21, 2012 (JP) ................................ 2012-140061
Jun. 21, 2012 (JP) ................................ 2012-140062

(51) Int. Cl.
*F21V 1/00* (2006.01)
*F21V 5/00* (2015.01)
(Continued)

(52) U.S. Cl.
CPC ................ *F21V 7/005* (2013.01); *F21S 4/008* (2013.01); *F21V 21/00* (2013.01); *G02B 6/0013* (2013.01);
(Continued)

(58) Field of Classification Search
CPC ....... F21V 7/005; F21V 21/00; G02B 6/0073; G02B 6/0071; G02B 6/0031; G02B 6/0068; G02B 6/0013; G02B 6/0085; F21S 4/008; H04N 1/0285; H04N 1/02865
USPC ............................... 362/217.01, 217.05, 306
See application file for complete search history.

(56) References Cited

U.S. PATENT DOCUMENTS

2006/0098247 A1 5/2006 Sawada
2009/0237747 A1 9/2009 Sawada et al.
(Continued)

FOREIGN PATENT DOCUMENTS

JP 63 157737 6/1988
JP 3 274855 12/1991
(Continued)

OTHER PUBLICATIONS

International Search Report Issued Apr. 2, 2013 in PCT/JP12/083524 Filed Dec. 25, 2012.
(Continued)

*Primary Examiner* — Donald Raleigh
(74) *Attorney, Agent, or Firm* — Oblon, McClelland, Maier & Neustadt, L.L.P.

(57) ABSTRACT

A light source device includes: a rod-shaped light source or an array light source extending in a main scanning direction; a reflector that is placed opposite the rod-shaped light source or the array light source, extends in the main scanning direction, and reflects light output from a side face of the rod-shaped light source or the array light source; and a plurality of reflector supports that are arranged at an interval along the main scanning direction and support the reflector.

17 Claims, 121 Drawing Sheets

(51) Int. Cl.

| | |
|---|---|
| ***F21V 7/00*** | (2006.01) |
| ***F21V 7/04*** | (2006.01) |
| ***H04N 1/028*** | (2006.01) |
| ***F21S 4/00*** | (2006.01) |
| ***F21V 21/00*** | (2006.01) |
| ***F21V 8/00*** | (2006.01) |

(52) U.S. Cl.
CPC ............ *G02B 6/0031* (2013.01); *G02B 6/0068* (2013.01); *G02B 6/0071* (2013.01); *G02B 6/0073* (2013.01); *H04N 1/0285* (2013.01); *H04N 1/02865* (2013.01); *G02B 6/0085* (2013.01)

(56) References Cited

U.S. PATENT DOCUMENTS

| | | | |
|---|---|---|---|
| 2011/0013234 | A1 | 1/2011 | Takahashi et al. |
| 2012/0133994 | A1 | 5/2012 | Yamasaki et al. |
| 2012/0140296 | A1 | 6/2012 | Sawada et al. |

FOREIGN PATENT DOCUMENTS

| | | |
|---|---|---|
| JP | 10-133026 A | 5/1998 |
| JP | 11 55476 | 2/1999 |
| JP | 2002 135533 | 5/2002 |
| JP | 2004 266313 | 9/2004 |
| JP | 2004 279663 | 10/2004 |
| JP | 2006 85975 | 3/2006 |
| JP | 2007 201845 | 8/2007 |
| JP | 2007 318406 | 12/2007 |
| JP | 2008 28617 | 2/2008 |
| JP | 2008 205843 | 9/2008 |
| JP | 2008 227815 | 9/2008 |
| JP | 2010 21983 | 1/2010 |
| JP | 2010 103742 | 5/2010 |
| JP | 2010 147592 | 7/2010 |
| JP | 2011 14976 | 1/2011 |
| JP | 2011 49808 | 3/2011 |
| JP | 2011 61411 | 3/2011 |
| JP | 2011 211464 | 10/2011 |
| JP | 2012 129974 | 7/2012 |

OTHER PUBLICATIONS

Extended European Search Report issued Jul. 24, 2015 in Patent Application No. 15162476.4.

Extended European Search Report issued Jul. 24, 2015 in Patent Application No. 12867829.9.

LIGHT-SOURCE DEVICE AND REFLECTOR-SUPPORT STRUCTURE

TECHNICAL FIELD

The present invention relates to a light source device and a reflector support structure.

BACKGROUND ART

With light source devices used in image scanning devices and the like, as light sources increase in output, there is demand for an efficient light source heatsink structure. In the past, light source devices like the following have been proposed.

For example, Patent Literature 1 describes a heatsink structure for an image sensor using a linear light source device, having an LED chip 10 as a light source mounted on a metal plate 11, that dissipates heat from the light source by attaching a curved heatsink 13 to a flat part on the reflecting face side of the LED chip 10.

For example, Patent Literatures 2 to 4 describe a sidelight-type light source device used to illuminate an image scanning device. In a sidelight-type light source device, an LED or other light source is placed on an end of a transparent light guide extending in the main scanning direction of the image scanning device. Light is incident from the end of the light guide, and the incident light is emitted from a side face of the light guide.

Patent Literatures 2 and 3 describe a light source device that places light sources on both end faces of the light guide. Patent Literature 4 describes a light source device that places a light source on one end face of the light guide. In addition, with the light source device described in Patent Literature 2, an optical filter is placed opposite on an end face of the light guide. With the light source device described in Patent Literatures 3 and 4, countermeasures are provided against expansion and contraction due to temperature changes near the light guide.

The light source devices described in Patent Literatures 5 to 9 are an example of a light source device that places a light source on one end face of a light guide. Patent Literature 5 describes a light guide that is tapered at the ends, whereas Patent Literatures 6 to 9 describe a light guide with curved ends. FIG. 10 of Patent Literature 9 illustrates a light source device in which both ends of the light guide are curved, and light sources are placed on both end faces of the curved light guide.

The LED array-type light source devices such as in Patent Literatures 10 to 12 are another example of a light source device used to illuminate an image scanning device. With an LED array-type light source device, light sources such as multiple LEDs are placed in the main scanning direction of the image scanning device. With the light source devices described in Patent Literatures 10 and 11, light emitted from LEDs is guided by a light guide member, and radiated onto a reflector. With the light source device described in Patent Literature 12, light emitted from LEDs is radiated onto a reflector.

Patent Literatures 10 to 12 also describe a reflector (a first reflecting mirror) constituting an image-forming optical system of an image scanning device. FIG. 5 of Patent Literature 11 illustrates a reflector (first reflecting mirror) supported by a carriage of an image scanning device.

Patent Literatures 13 and 14 also describe a reflector (first mirror) supported by a carriage of an image scanning device, and the reflector (first mirror) described in these Patent Literature is supported by a carriage on both ends.

CITATION LIST

Patent Literature

Patent Literature 1: Unexamined Japanese Patent Application Kokai Publication No. 2008-227815

Patent Literature 2: Unexamined Japanese Patent Application Kokai Publication No. 2008-28617

Patent Literature 3: Unexamined Japanese Patent Application Kokai Publication No. 2010-103742

Patent Literature 4: Unexamined Japanese Patent Application Kokai Publication No. 2011-61411

Patent Literature 5: Unexamined Japanese Patent Application Kokai Publication No. 2006-85975

Patent Literature 6: Unexamined Japanese Patent Application Kokai Publication No. 2010-21983

Patent Literature 7: Unexamined Japanese Patent Application Kokai Publication No. 2007-201845

Patent Literature 8: Unexamined Japanese Patent Application Kokai Publication No. 2004-266313

Patent Literature 9: Unexamined Japanese Patent Application Kokai Publication No. H11-55476

Patent Literature 10: Unexamined Japanese Patent Application Kokai Publication No. 2011-211464

Patent Literature 11: Unexamined Japanese Patent Application Kokai Publication No. 2011-49808

Patent Literature 12: Unexamined Japanese Patent Application Kokai Publication No. 2007-318406

Patent Literature 13: Unexamined Japanese Patent Application Kokai Publication No. 2002-135533

Patent Literature 14: Unexamined Japanese Patent Application Kokai Publication No. 2004-279663

SUMMARY OF INVENTION

Technical Problem

However, with the linear light source device described in Patent Literature 1, the metal plate 11 and the heatsink 13 are fixed in place by a flat spring in order to obtain an efficient heatsink structure. For this reason, there is a problem in that the structure becomes complicated.

With light source devices for image scanning devices, as the image scanning devices become faster and higher in resolution, there is demand for brighter light sources and a supply of light that is uniform in both the lengthwise direction and the height direction. Also, when the object to be scanned by the image scanning device is a thick book placed on the receptacle (platen) of the image scanning device with a gap in between, shadow portions occur in the scanned image data. For this reason, conventionally, a reflector and a light guide are used to illuminate the object to be scanned from two light paths, as described in Patent Literatures 10 to 12.

However, with the reflector described in Patent Literatures 10 to 12, most of the back face of the reflector is supported, or the edges of the reflector are supported. For this reason, in the former case, there is a possibility that flexing or warping of the member that supports the reflector may have an effect on the reflector. In the latter case, there is a possibility that sagging due to the reflector's own weight or bowing of the reflector due to deformation of the supporting member may occur.

For example, in Patent Literature 10, a reflector 54 is held by a reflector bracket 59, the reflector bracket 59 and a light guide 53 are separately installed on a first frame 58, and the reflector (mirror) attachment face extends over the entire length. For this reason, there is a possibility of plate bending precision becoming worse. Furthermore, the structure becomes complicated.

A similar problem likewise exists for a reflector (first mirror) supported by a carriage of an image scanning device, as described in Patent Literatures 11, 13, and 14.

The present invention has been devised in light of the above circumstances, and takes as an objective to obtain a light source device having a simple structure and good precision.

Solution to Problem

In order to achieve the above objective, a light source device according to the present invention is provided with:

a rod-shaped light source or an array light source extending in a main scanning direction;

a reflector that is placed opposite the rod-shaped light source or array light source, extends in the main scanning direction, and reflects light output from a side face of the rod-shaped light source or array light source; and a plurality of reflector supports that are arranged at an interval along the main scanning direction and support the reflector.

Advantageous Effects of Invention

According to the invention, it becomes possible to obtain a light source device having a simple structure and good precision.

BRIEF DESCRIPTION OF DRAWINGS

FIG. 66 is a side view near a holder of a light source device according to Embodiment 5 of the present invention; and FIG. 67 is a plan view (pre-bending) of a planar member that forms the housing of a light source device according to Embodiment 5 of the present invention, and virtually illustrates a state of placing a light guide, a light guide holder, and a holder.

DESCRIPTION OF EMBODIMENTS

In this specification, the main scanning direction and the sub scanning direction (transport direction) of an image scanning device (image forming device) that incorporates a light source device and a reflector support structure according to the present specification are respectively designated the lengthwise direction and the widthwise direction of the light source device and reflector support structure.

Note that the long-edge direction of the housing of the light source device and reflector support structure corresponds to the lengthwise direction, and the short-edge direction of the housing of the light source device and reflector support structure corresponds to the widthwise direction. Worded differently, the main scanning direction is the direction in which a light source device according to this specification extends as a linear light source. That is, there is the main scanning direction (lengthwise direction, long-edge direction) and the sub scanning direction (widthwise direction, short-edge direction). This is in order to account for the case in which the housing of the light source device and reflector support structure is a square.

Note that in FIGS. 21 to 67 of this specification, the arrow X indicates the main scanning direction (lengthwise direction, long-edge direction), the arrow Y indicates the sub scanning direction (widthwise direction, short-edge direction), and the arrow Z indicates the thickness direction (height direction) of the light source device and reflector support structure. However, in FIGS. 37A to 37C, the arrows X, Y, and Z are given as an example of the installation position of a reflector support structure.

Also, in FIGS. 50A to 50D and FIGS. 51A to 51D, the arrows X, Y, and Z corresponding to Embodiment 5 are given in parentheses. In other words, the arrows X, Y, and Z outside of the parentheses correspond to Embodiment 4.

Embodiment 1

Figure 1:
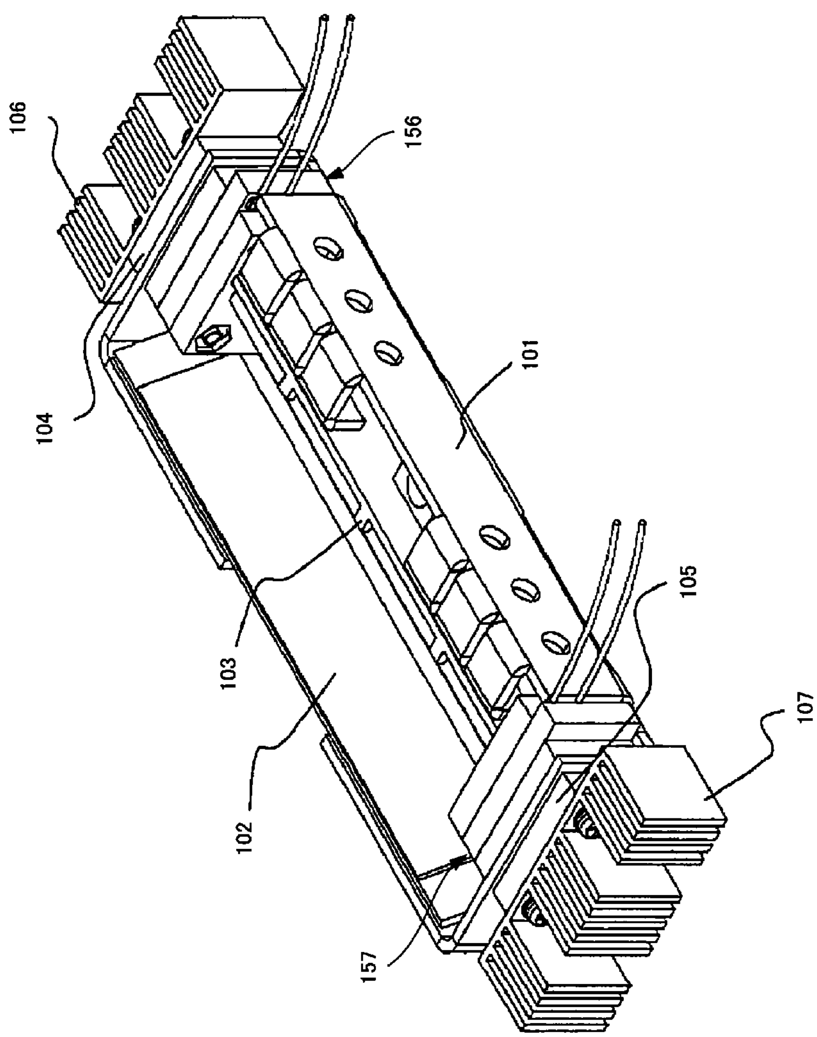
FIG. 1 is a perspective view of a light source device according to Embodiment 1 of the present invention.
Figure 2:
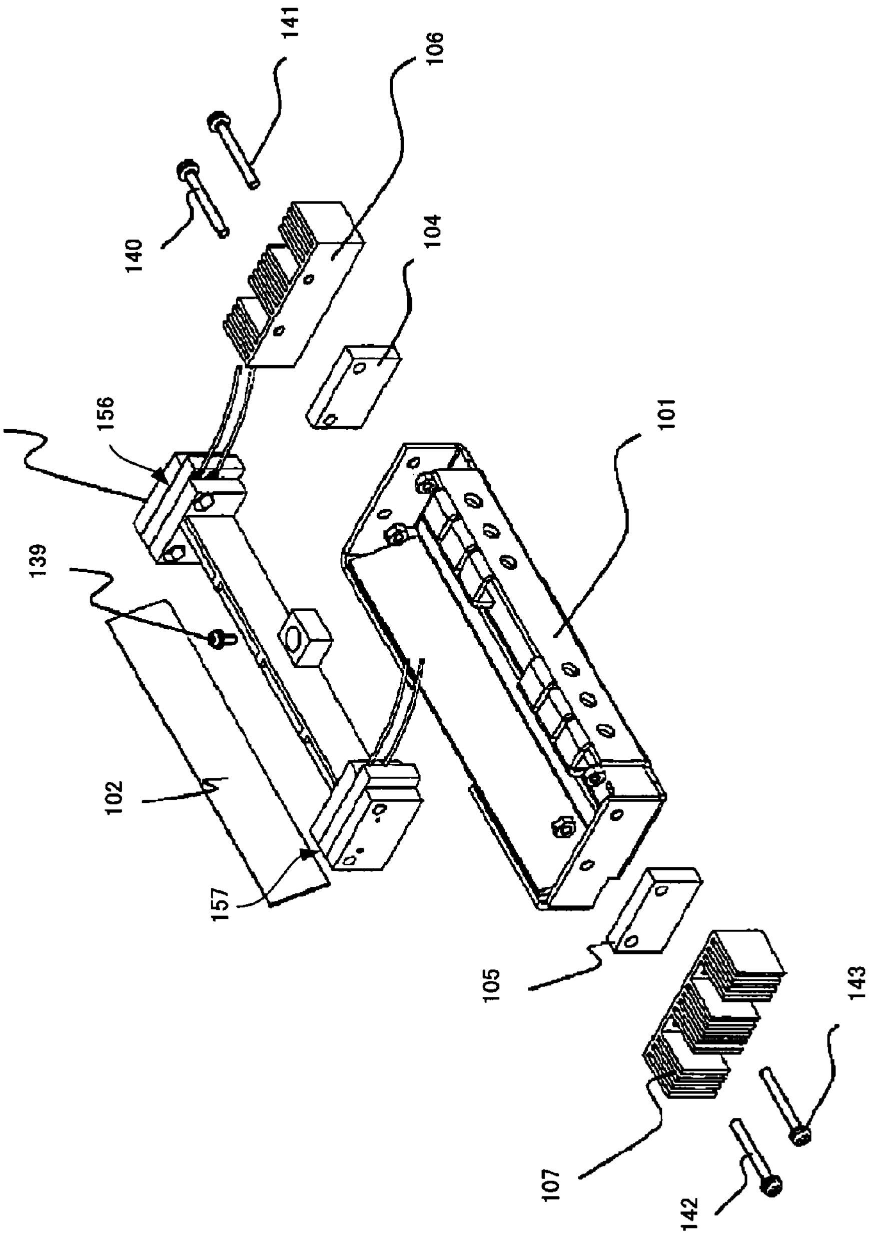
FIG. 2 is an exploded view illustrating a configuration of a light source device according to Embodiment 1 of the present invention.
Figure 3:
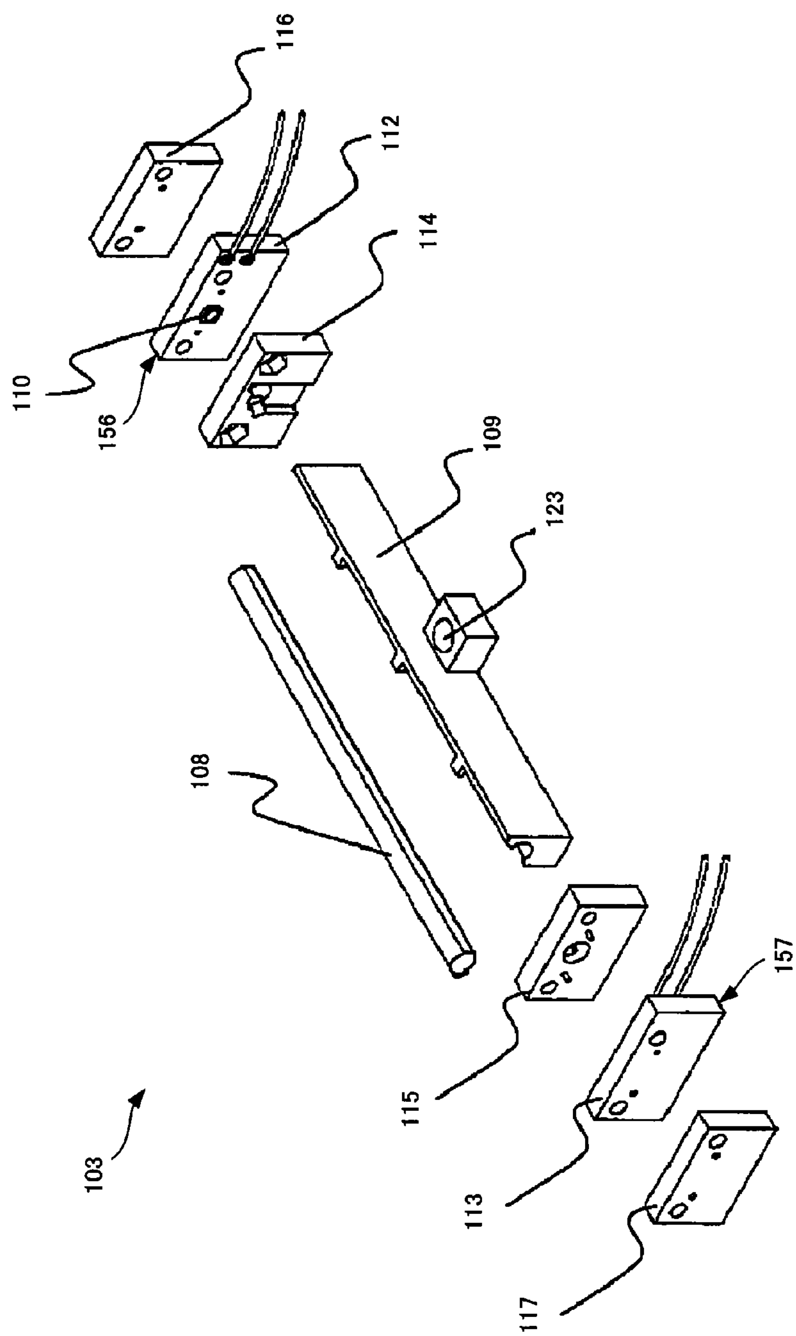
FIG. 3 is an exploded view illustrating a light source of a light source device according to Embodiment 1 of the present invention.
Figure 4:
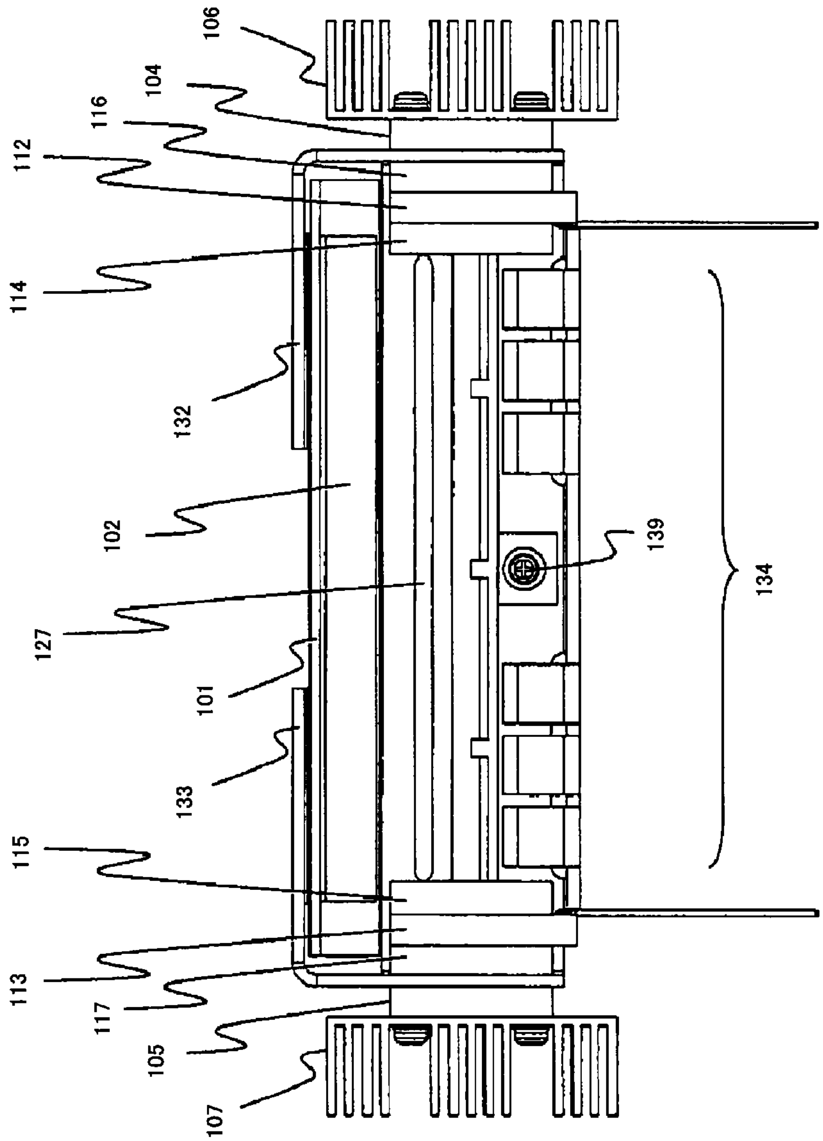
FIG. 4 is a top view as seen from the light output direction of a light source device according to Embodiment 1 of the present invention.
Figure 5:
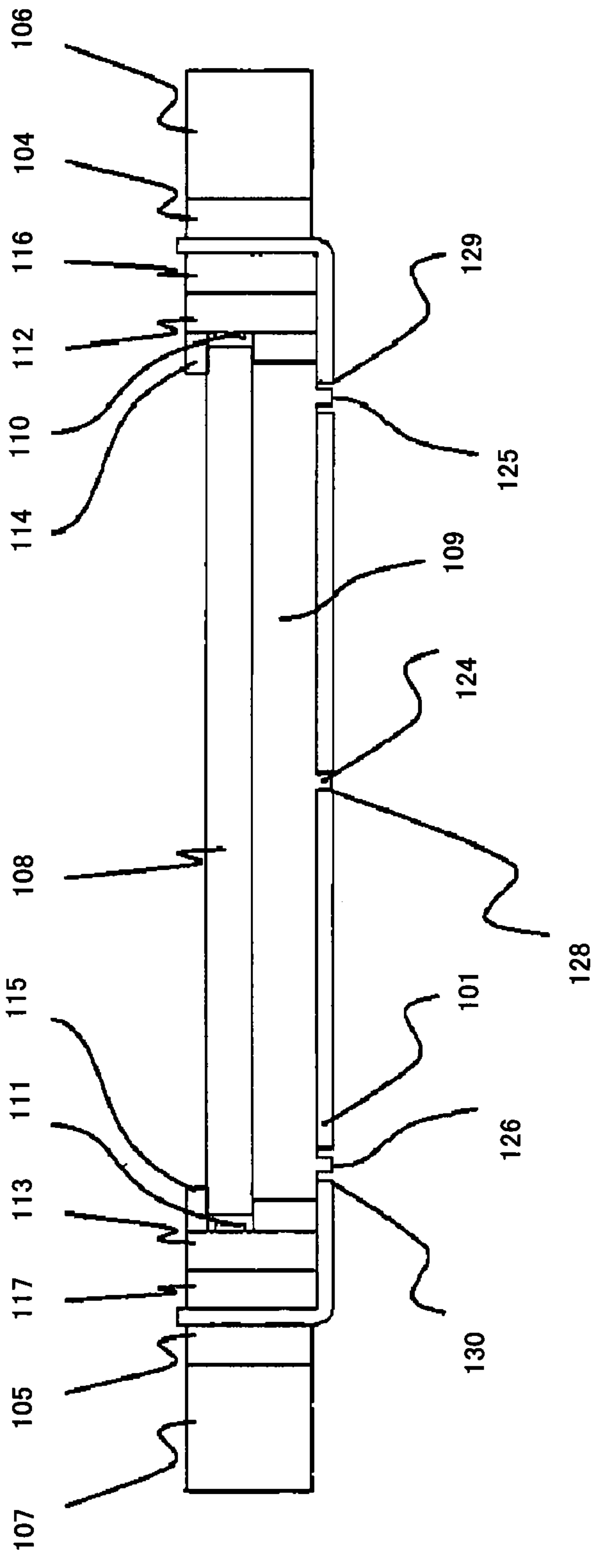
FIG. 5 is a cross-section view in the lengthwise direction of a light source device according to Embodiment 1 of the present invention.
Figure 6A:
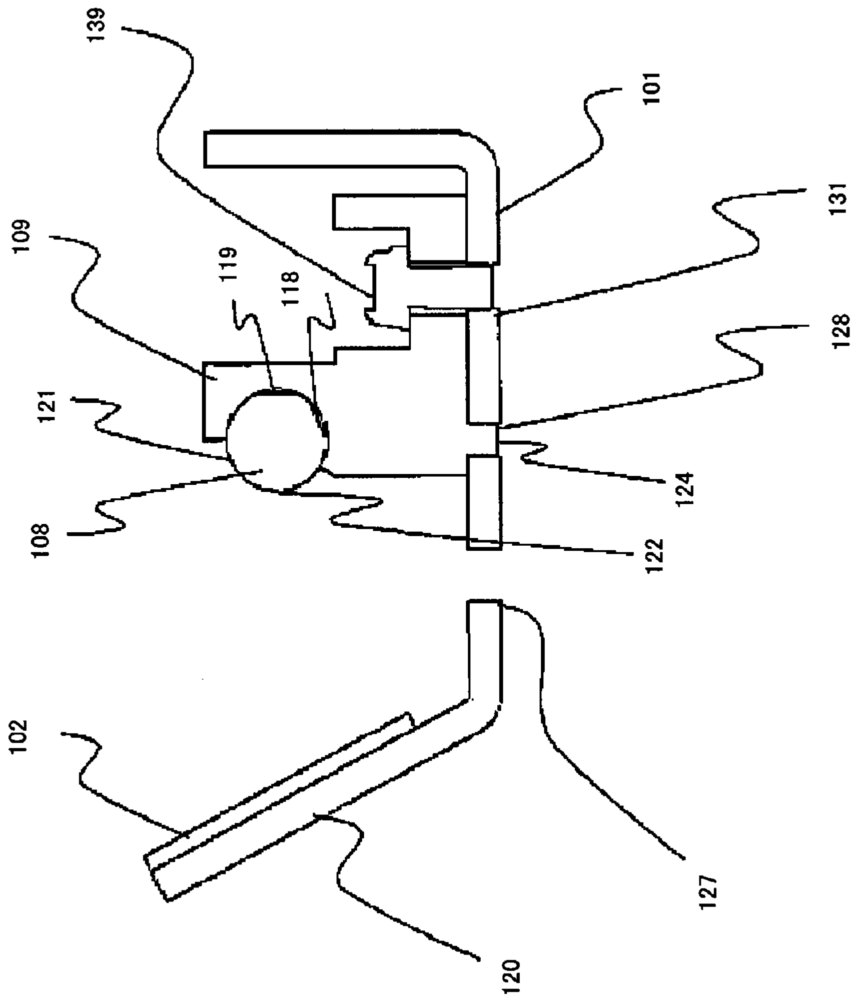
FIG. 6A is a cross-section view in the widthwise direction of a light source device according to Embodiment 1 of the present invention.
Figure 6B:
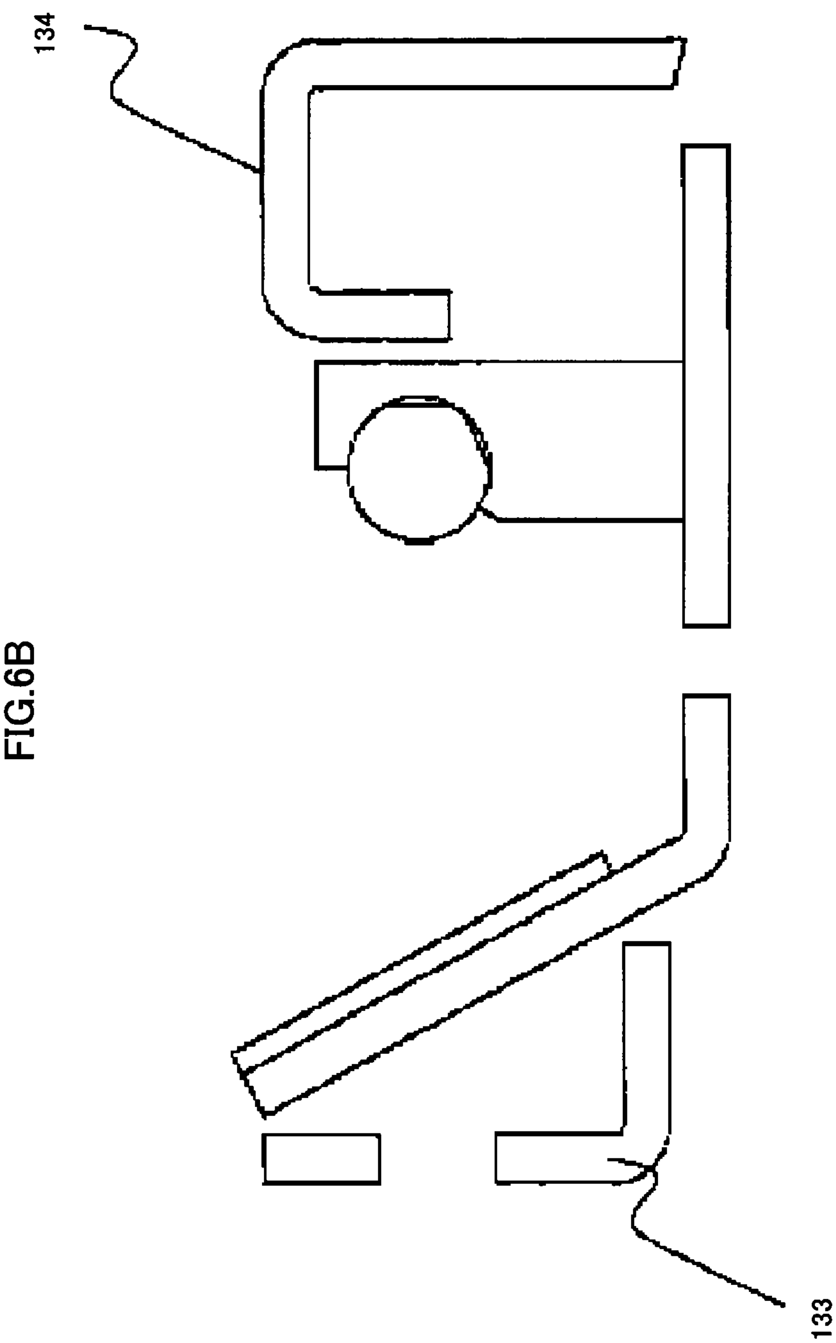
FIG. 6B is a cross-section view in the widthwise direction of a light source device according to Embodiment 1 of the present invention.
Figure 7:
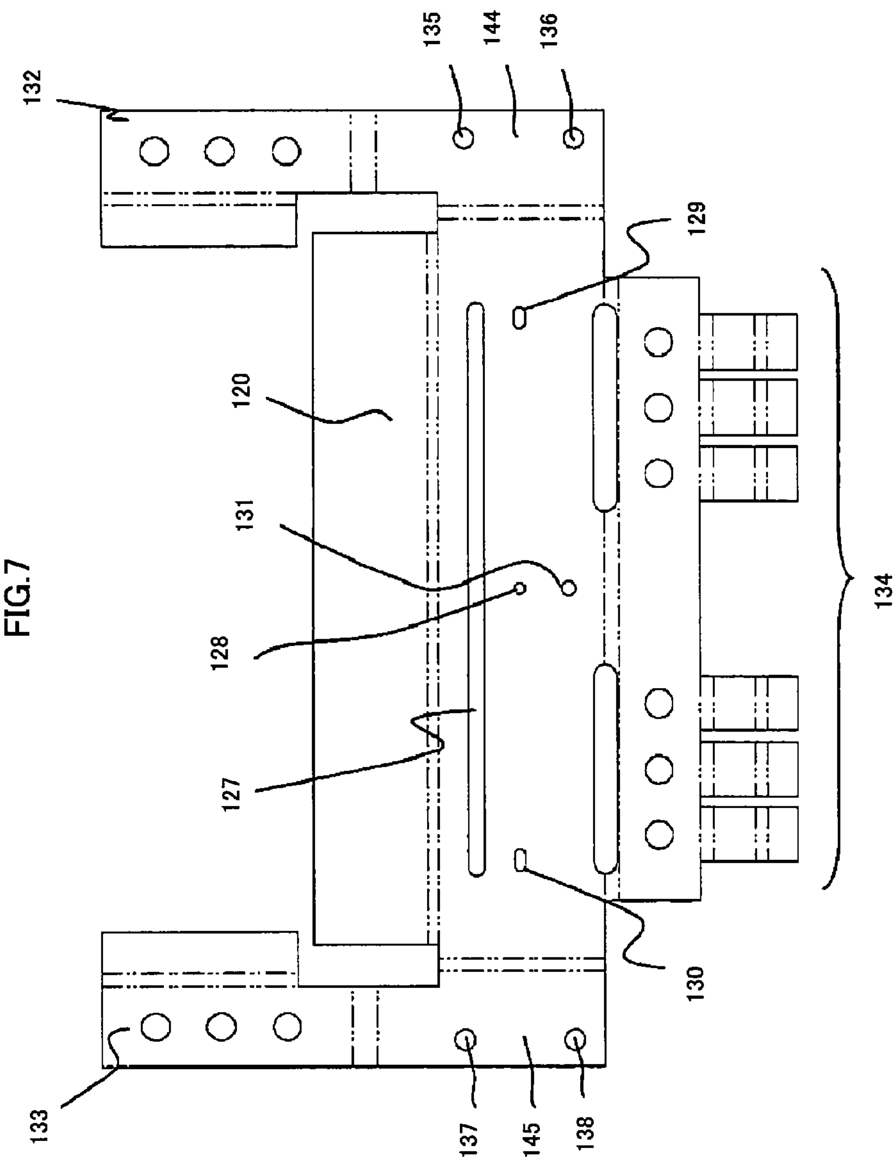
FIG. 7 is a development view of a housing according to Embodiment 1 of the present invention.

Embodiment 1 of the present invention will be described using the drawings. FIG. 1 is a perspective view of a light source device according to Embodiment 1 of the present invention. FIG. 2 is an exploded view illustrating a configuration of a light source device according to Embodiment 1 of the present invention. FIG. 3 is an exploded view illustrating a light source of a light source device according to Embodiment 1 of the present invention. FIG. 4 is a top view as seen from the light radiation direction of a light source device according to Embodiment 1 of the present invention. FIG. 5 is a cross-section view in the lengthwise direction of a light source device according to Embodiment 1 of the present invention. FIGS. 6A and 6B are cross-section views in the widthwise direction of a light source device according to Embodiment 1 of the present invention, in which FIG. 6A is a cross-section view at the center part in the lengthwise direction, and FIG. 6B is a cross-section view that includes wings. FIG. 7 is a development view of a housing according to Embodiment 1 of the present invention.

Configuration and operation of Embodiment 1 of the present invention will be described using FIGS. 1 to 7. As illustrated in FIGS. 1 and 2, a light source device of Embodiment 1 of the present invention mainly comprises a housing 101, a reflector (mirror) 102 and light source 103 housed inside the housing 101, and heat transfer bodies 104 and 105 as well as heatsink fins 106 and 107 attached to the outside of the housing 101.

As illustrated in FIG. 3, the light source 103 comprises a light guide 108, a light guide holder 109 that houses the light guide 108, a light-emitting element 110 (111), substrates 112 and 113, holders 114 and 115, and heat transfer bodies 116 and 117. Note that a light emitter 156 comprises the light-emitting element 110 and the substrate 112, while a light emitter 157 comprises the light-emitting element 111 and the substrate 113.

Figure 9:
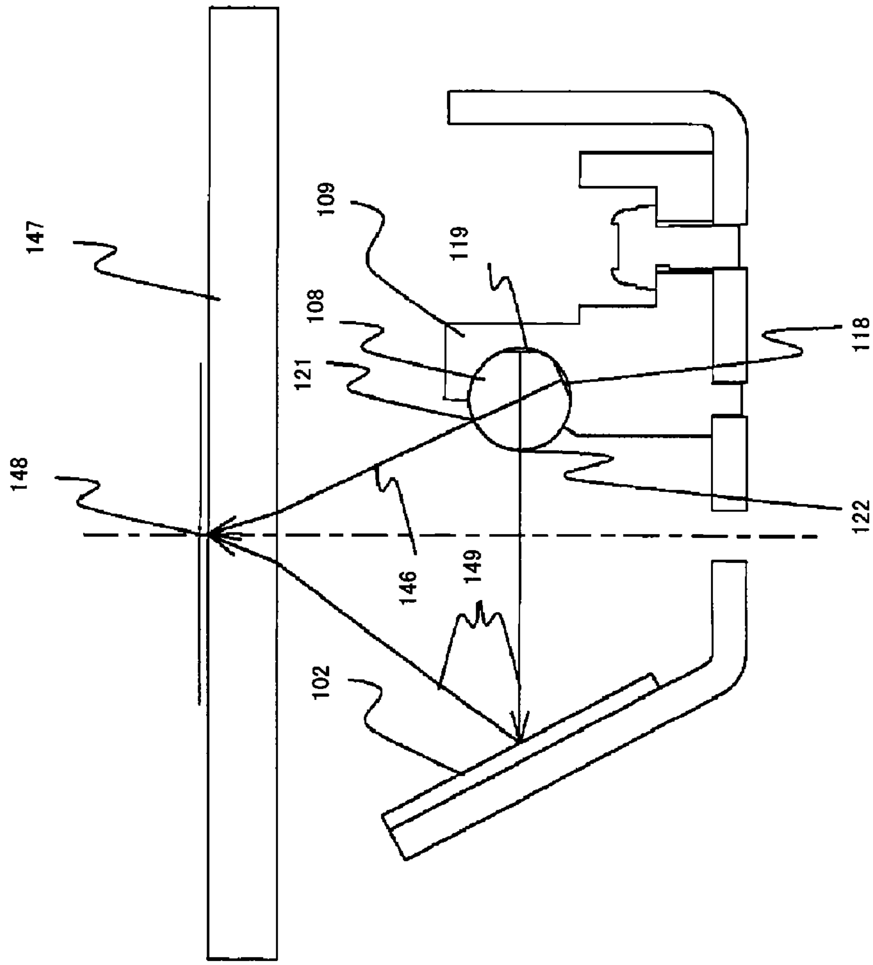
FIG. 9 is a diagram illustrating a light path in a widthwise cross-section of a light source device according to Embodiment 1 of the present invention.

The light guide 108 is formed with a transparent resin, and is a columnar member extending in the lengthwise direction whose side-face shape forms a cylindrical shape. As illustrated in FIG. 9, the side faces of the light guide 108 include light scattering parts 118 and 119 in two places extending over the entire lengthwise direction. The side-face shape of the light guide 108 is not limited to a cylinder, and the end face of the light guide 108 is not limited to a circle.

A reflector 102, laid parallel to the light guide 108 in the lengthwise direction, reflects secondary light output from the light guide 108, and irradiates in the direction of a document receptacle. The reflector 102 comprises a vapor-deposited metal face or the like, and is a thin plate or sheet member extending in the lengthwise direction. The reflector 102 is kept at a suitable distance and angle with respect to the light guide 108 and the document receptacle by being affixed to a reflector support 120 of the housing 101 by adhesive bonding or the like.

The light-emitting element 110 is a light source element such as an LED light source that emits light incident on the end face (light inputter) on one side of the light guide 108. The light-emitting element 111 is a light source element such as an LED light source that emits light incident on the end face (light inputter) on the other side of the light guide 108. The light-emitting element 110 is affixed by soldering or the like to a substrate 112, such as an LED substrate, for example, and is current-driven by the substrate 112 to emit light. The light-emitting element 111 is affixed by soldering or the like to a substrate 113, such as an LED substrate, for example, and is current-driven by the substrate 113 to emit light.

The holder 114 holds the substrate 112 and the light guide 108, and suppresses unintentional light from the light-emitting element 110 and the light guide 108. An end that includes the end face on one side of the light guide 108 is inserted into the end face on one side of the holder 114, and the substrate 112 affixed with the light-emitting element 110 is placed on the end face on the opposite side of the holder 114 so that the light-emitting element 110 and the light guide 108 are opposite each other. Wavelength characteristics may also be adjusted by inserting a thin optical device with wavelength-converting properties, such as a filter, between the light-emitting element 110 and the light guide 108.

The holder 115 holds the substrate 113 and the light guide 108, and suppresses unintentional light from the light-emitting element 111 and the light guide 108. An end that includes the end face opposite the side of the light guide 108 held by the holder 114 is inserted into the end face on one side of the holder 115, and the substrate 113 affixed with the light-emitting element 111 is placed on the end face on the opposite side of the holder 115 so that the light-emitting element 111 and the light guide 108 are opposite each other.

The holders 114 and 115 form a shape in which a portion corresponding to the open side of a groove in a light guide holder 109 discussed later projects farther outward towards the light guide 108 compared to other portions.

The light guide holder 109 is formed with a highly reflective resin, metal, or the like, and is a member that holds the light guide 108 in the lengthwise direction. The light guide holder 109 includes a groove configured as a long groove in the lengthwise direction, and holds the light guide 108 in the lengthwise direction as a result of the light guide 108 being placed into this groove. The open side of this groove forms a light outputter that outputs light from the light guide 108.

The light guide holder 109 holds the light guide 108 at a suitable position with respect to the reflector 102 and the housing 101. In addition, the light guide holder 109 fulfills a role of returning bleeding light from the side faces or from the rear face of the light scattering part 118 and the light scattering part 119 back inside the light guide 108, and suppressing the output of unintentional light from other than the light outputter 121 and the light outputter 122.

The light guide holder 109 holds the light guide 108, is equipped with a screw hole 123 in the center of the lengthwise direction and on the opposite side of the reflector 102 in the widthwise direction (the outer side of the housing), and is equipped with a pin 124, a pin 125, and a pin 126 in the center of the lengthwise direction and on the side of the housing bottom face.

The housing 101 is formed by sheet metal (a planar member) with good heat dissipation, such as aluminum, and is formed into a box shape by being bent inwards along the two-dot chain lines in FIG. 7.

In other words, by being bent, there is formed a housing 101 that includes a floor having a rectangular shape, a long-edge wall bent inwards from the floor along the long edge on one side of the floor, a sloped face forming a slope bent inwards at a designated angle from the floor in the short-edge direction of the floor along the long edge on the other side of the floor, short-edge walls bent inwards from the floor along the short edges of the floor, and heatsinks, continuous with the short-edge walls, bent in the long-edge direction, and extending in the long-edge direction facing in the opposite direction of the long-edge wall with respect to the sloped face.

Note that the heatsinks may also be continuous with the short-edge walls, bent in the long-edge direction, and extending in the long-edge direction facing in the opposite direction of the sloped face with respect to the long-edge wall.

The housing 101 is equipped with an aperture 127 formed in the bottom face along the lengthwise direction, an interlocking hole 128, a long hole 129, a long hole 130, a screw hole 131, a wing 132 and a wing 133 that act as heatsinks, fins 134, a holder holding hole 135, a holder holding hole 136, a holder holding hole 137, a holder holding hole 138, and a reflector support 120.

The light guide holder 109 is affixed to the housing 101 in the lengthwise direction, the widthwise direction, and the height direction by passing a screw 139 through the screw hole 123, and affixing the screw 139 to the screw hole 131 of the housing 101. The holder 114, the substrate 112, the heat transfer body 116, the heat transfer body 104, and the heatsink fins 106 are affixed to the short-edge wall 144 of the housing 101 using screws 140 and 141 to form a heatsink face. The holder 115, the substrate 113, the heat transfer body 117, the heat transfer body 105, and the heatsink fins 107 are affixed to the short-edge wall 145 on the side of the housing 101 opposite the short-edge wall 144 using screws 142 and 143 to form a heatsink face. The reflector 102 is affixed to the reflector support 120 by adhesive bonding or the like.

The aperture 127 is a hole (reflected light passage hole) formed along the lengthwise direction and positioned in the widthwise center part of the bottom face of the housing 101. The aperture 127 conveys image information about the object to be scanned (light among the radiated light that was scattered and reflected by the object to be scanned) to the imager (a lens and image sensor), and suppresses all other unwanted light.

The interlocking hole 128 is a round hole provided on the bottom face of the housing 101. The interlocking hole 128 is positioned in the center of the lengthwise direction, and in addition, in the center of the bottom face of the light guide holder 109 between the aperture 127 and the fins 134 in the widthwise direction. The pin 124 of the light guide holder 109 is inserted into the interlocking hole 128, thereby affixing the position of the light guide holder 109 in the lengthwise direction and the widthwise direction.

The long hole 129 is a hole elongated in the lengthwise direction and provided in the bottom face of the housing 101. The long hole 129 is positioned at one end in the lengthwise direction, and in addition, in the center of the bottom face of the light guide holder 109 between the aperture 127 and the fins 134 in the widthwise direction. The pin 125 of the light guide holder 109 is inserted into the long hole 129, thereby affixing the position of the light guide holder 109 in the widthwise direction.

The long hole 130 is a hole elongated in the lengthwise direction and provided in the bottom face of the housing 101. The long hole 130 is positioned at the end on the side opposite the long hole 129 in the lengthwise direction, and in addition, in the center of the bottom face of the light guide holder 109 between the aperture 127 and the fins 134 in the widthwise direction. The pin 126 of the light guide holder 109 is inserted into the long hole 130, thereby affixing the position of the light guide holder 109 in the widthwise direction.

The screw hole 131 is a round hole provided in the bottom face of the housing 101. The screw hole 131 is positioned in the center of the lengthwise direction, and in addition, between the interlocking hole 128 and the fins 134 in the widthwise direction. The screw hole 131 is positioned below the screw hole 123 of the light guide holder 109, and the screw 139 transfixes the screw hole 123 and the screw hole 131.

The wing 132 extends along a housing side face, is positioned on the outer side of the reflector 102 with respect to the aperture 127, and dissipates heat from the light-emitting element 110. The wing 133 extends along a housing side face, is positioned on the outer side of the reflector 102 with respect to the aperture 127, and dissipates heat from the light-emitting element 111.

The fins 134 extend along a housing side face, are positioned on the opposite side of the reflector 102 with respect to the aperture 127, and dissipate heat from the light-emitting element 110 and the light-emitting element 111.

The holder holding hole 135 and the holder holding hole 136 are holes for affixing the substrate 112, the holder 114, the heat transfer body 116, the heat transfer body 104, and the heatsink fins 106 to the housing 101 with the screw 140 and the screw 141. The holder holding hole 137 and the holder holding 138 are holes for affixing the substrate 113, the holder 115, the heat transfer body 117, the heat transfer body 105, and the heatsink fins 107 to the housing 101 with the screw 142 and the screw 143.

The light guide holder 109 takes a suitable position with the housing at the following four points on the housing 101. Namely, the pin 124 is inserted into the interlocking hole 128, the pin 125 is inserted into the long hole 129, the pin 126 is inserted into the long hole 130, and the screw hole 123 and screw hole 131 are affixed by the screw 139.

The light guide holder 109 is shorter than the total length of the light guide 108. The end faces of the light guide holder 109 face the end faces of the holder 114 and the holder 115, and the gap length thereof is longer than the amount of expansion due to the temperature characteristics of the light guide holder 109. As discussed earlier, since the long hole 129 and the long hole 130 are long holes, and the pin 125 and pin 126 are not affixed in the lengthwise direction, the light guide 108 may be held in the widthwise direction without bowing, even in the case in which the light guide holder 109 stretches due to temperature.

The heat transfer body 104, the heat transfer body 105, the heat transfer body 116, and the heat transfer body 117 are members with good adhesion and thermal conductivity, and comprise a sheet-like silicon sheet or the like that works to transfer heat, for example.

The heatsink fins 106 and the heatsink fins 107 are formed by a metal with good thermal conductivity such as aluminum, and are fabricated by extrusion molding or the like. Heat from the light-emitting element 110 and the light-emitting element 111 is dissipated via a path in which heat passes from the housing 101 through the heat transfer body 104 and the heat transfer body 105, and is dissipated from the heatsink fins 106 and the heatsink fins 107.

The housing 101 has a role of allowing heat from the light-emitting element 110 and the light-emitting element 111 to escape.

Heat from the light-emitting element 110 is transferred to the substrate 112 from the junction plane of the light-emitting element 110 and the substrate 112, transferred to the heat transfer body 116 from the junction plane of the substrate 112 and the heat transfer body 116, and transferred inside the housing 101 from the short-edge wall 144 that acts as the junction plane of the heat transfer body 116 and the housing 101. Subsequently, heat transferred to the housing 101 is dissipated via any of a path in which heat is dissipated from the wing 132, wing 133, and fins 134 of the housing 101, a path in which heat passes from the housing 101 to the heat transfer body 104 and is dissipated via the heat transfer body 104 and the heatsink fins 106, and a path in which heat passes from the housing 101 to the heat transfer body 105 and is dissipated via the heat transfer body 105 and the heatsink fins 107.

Heat from the light-emitting element 111 is transferred to the substrate 113 from the junction plane of the light-emitting element 110 and the substrate 113, transferred to the heat transfer body 117 from the junction plane of the substrate 113 and the heat transfer body 117, and transferred inside the housing 101 from the short-edge wall 145 that acts as the junction plane of the heat transfer body 117 and the housing 101. Subsequently, heat transferred to the housing 101 is dissipated via any of a path in which heat is dissipated from the wing 132, wing 133, and fins 134 of the housing 101, a path in which heat passes from the housing 101 to the heat transfer body 104 and is dissipated via the heat transfer body 104 and the heatsink fins 106, and a path in which heat passes from the housing 101 to the heat transfer body 105 and is dissipated via the heat transfer body 105 and the heatsink fins 107.

Figure 8A:
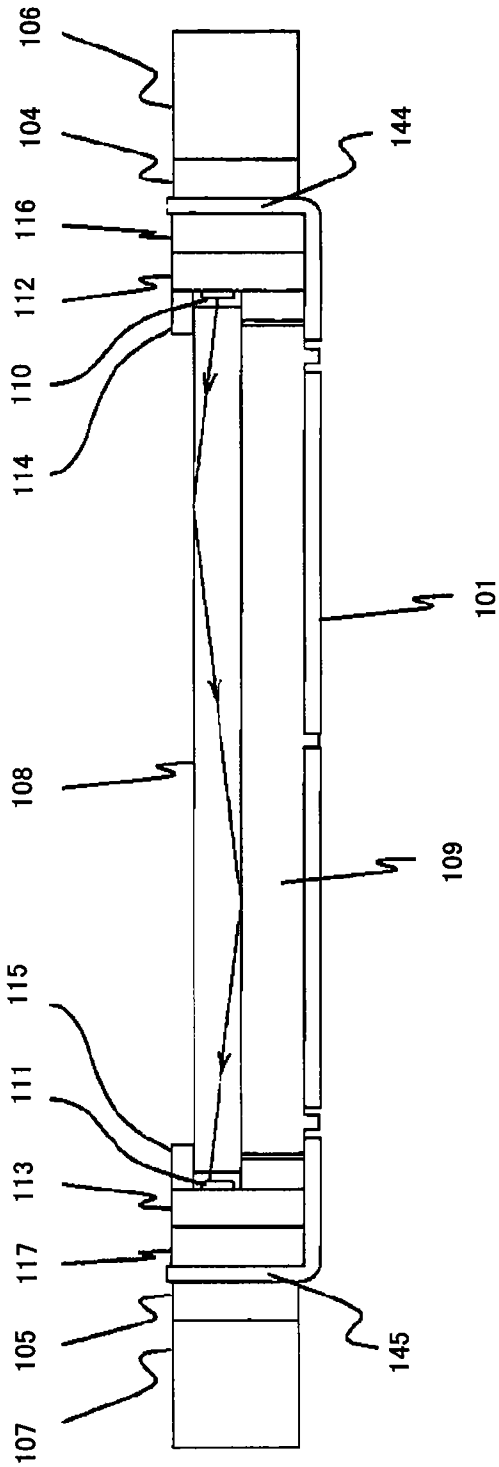
FIG. 8A is a diagram illustrating a light path in a lengthwise cross-section of a light source device according to Embodiment 1 of the present invention.
Figure 8B:
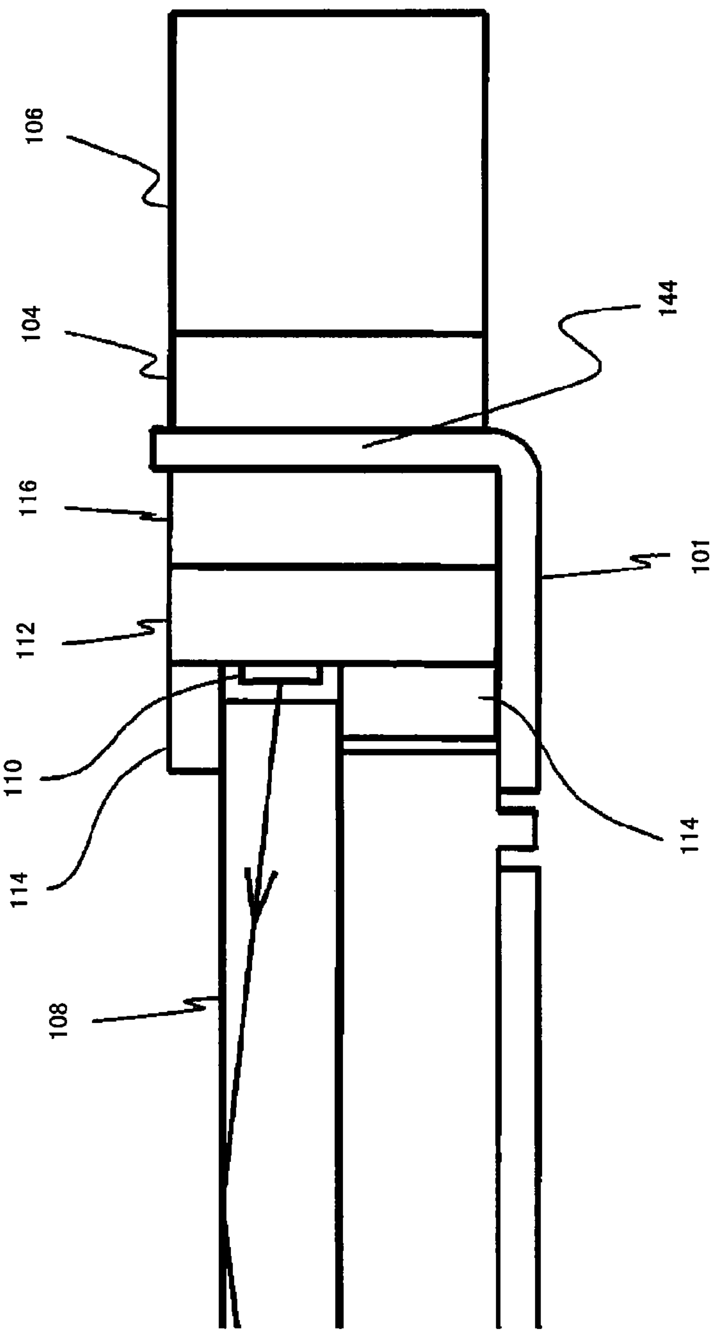
FIG. 8B is a diagram illustrating a light path in a lengthwise cross-section of a light source device according to Embodiment 1 of the present invention.

FIGS. 8A and 8B are diagrams illustrating a light path as seen from a cross-section in the lengthwise direction of a light source device according to Embodiment 1 of the present invention. FIG. 8A is an overall view, while FIG. 8B is an enlarged view near the light-emitting element. FIG. 9 is a diagram illustrating a light path in a widthwise cross-section view of a light source device according to Embodiment 1 of the present invention. As indicated by the arrow in FIG. 8, light input into the light guide 108 from the light-emitting element 110 and the light-emitting element 111 proceeds while being repeatedly reflected off the wall face of the light guide 108, and part of the light is incident on the light scattering part 118 and the light scattering part 119 having a white printed pattern or uneven shape formed along the lengthwise direction of the light guide 108. As illustrated in FIG. 9, light incident on the light scattering part 118 is radiated by reflection in the direction of an irradiated part 148 of a document receptacle 147 as a line of primary light 146 extending in the lengthwise direction from the light outputter 121 (the part on the surface of the light guide 108) facing opposite the light scattering part 118.

Since the holders 114 and 115 form a shape in which a portion corresponding to the open side of the groove in the light guide holder 109 projects farther outward towards the light guide 108 compared to other portions, non-uniform light at the ends of the light guide 108 is not output from the light guide 108.

Meanwhile, as illustrated in FIG. 9, light incident on the light scattering part 119 is output by reflection towards the reflector 102 as a line of secondary light 149 extending in the lengthwise direction from the light outputter 121 (the surface of the light guide 108 on the reflector 102 side) facing opposite the light scattering part 119. The secondary light 149 output towards the reflector 102 is reflected by the reflector 102, and output in the direction of the irradiated part 148 of the document receptacle 147 as a line of secondary light 149 extending in the lengthwise direction. The arrows proceeding from the light scattering part 118 and the light scattering part 119 of the light guide 108 to the document receptacle 147 depicted in the central cross-section respectively indicate the primary light paths along which light reflected by the light scattering part 118 and the light scattering part 119 irradiates the object to be scanned.

Figure 10A:
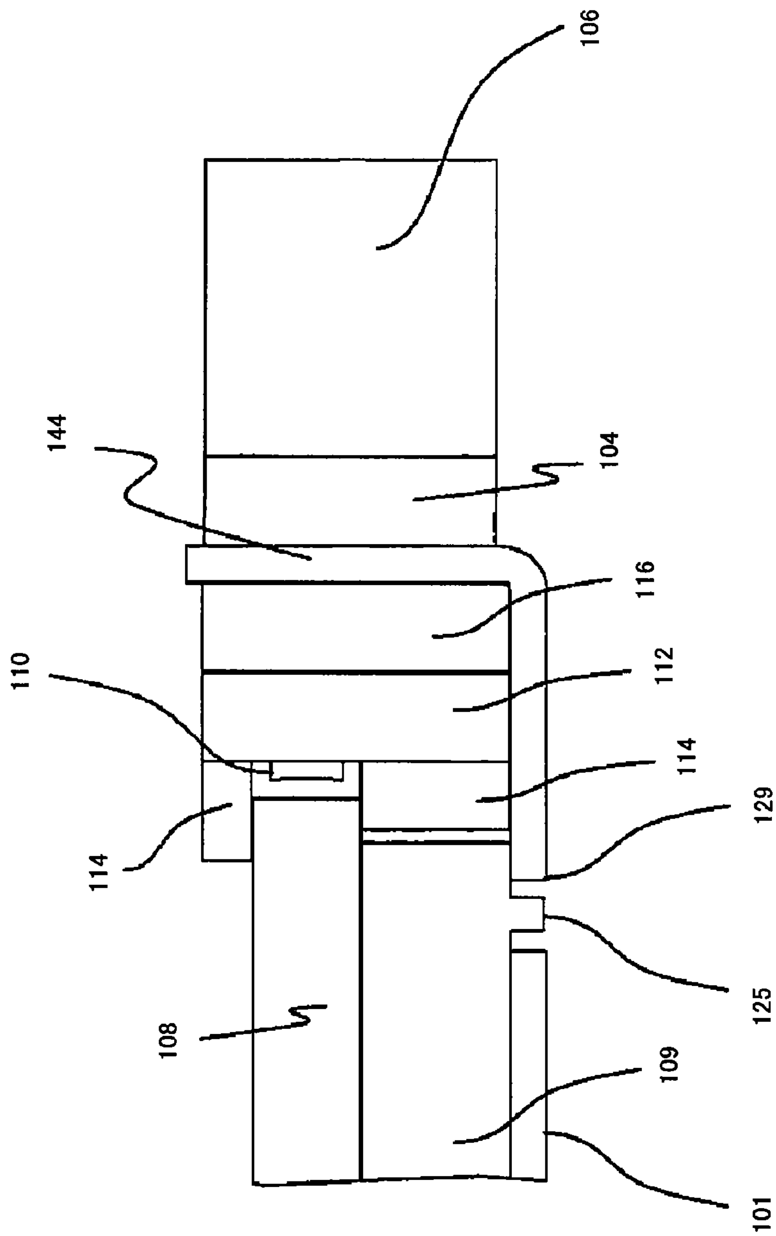
FIG. 10A is a cross-section view in the lengthwise direction near a light-emitting element of a light source device according to Embodiment 1 of the present invention.
Figure 10B:
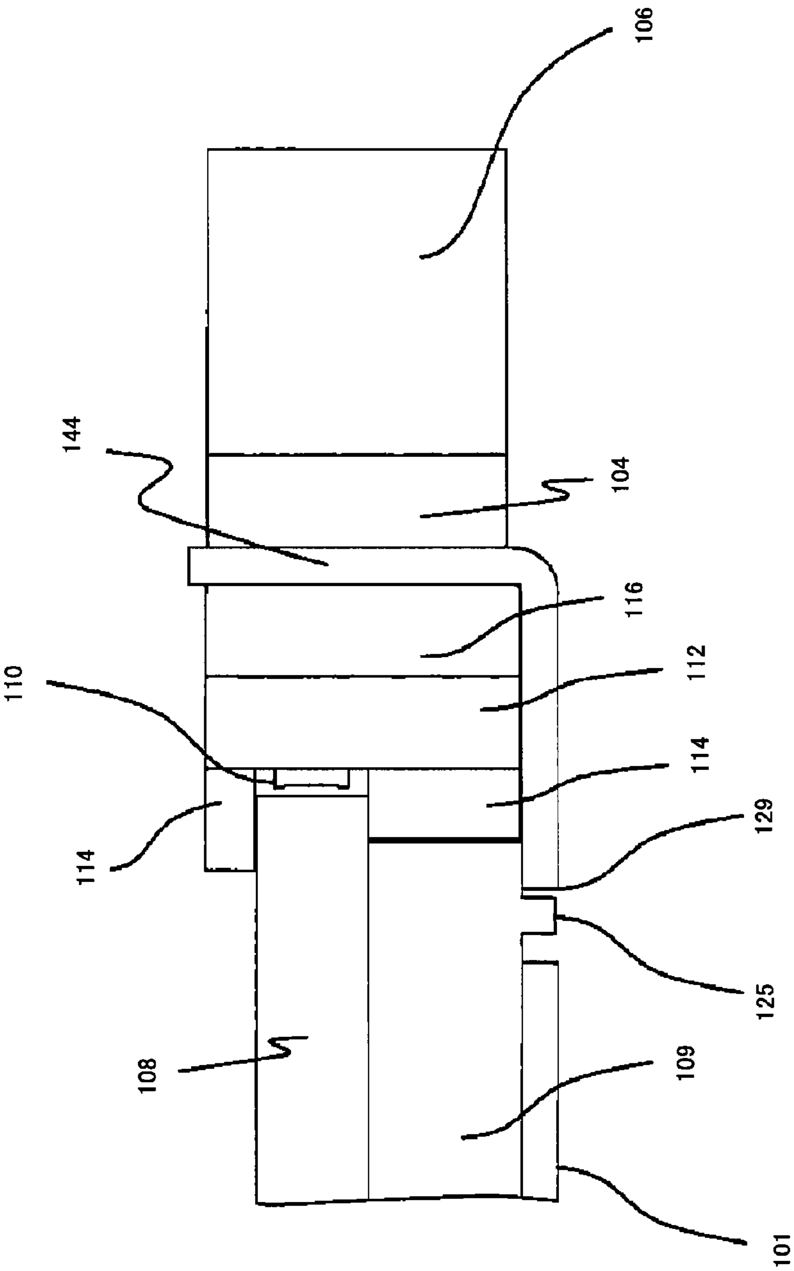
FIG. 10B is a cross-section view in the lengthwise direction near a light-emitting element of a light source device according to Embodiment 1 of the present invention.

FIGS. 10A and 10B are cross-section diagrams in the lengthwise direction near a light-emitting element of a light source device according to Embodiment 1 of the present invention. FIG. 10A is a cross-section view at normal temperature, while FIG. 10B is a cross-section view at high temperature. At both normal temperature and high temperature, the distances of the housing 101, the heat transfer body 116, the substrate 112, the light-emitting element 110, and the holder 114 are constant, whereas the degree of interlocking between the light guide 108 and the holder 114 varies while the relative positions of the light guide holder 109 and the holder 114 also vary. At high temperature, the spacing between the light guide 108 and the light-emitting element 110, and the spacing between the light guide holder 109 and the holder 114, narrow compared to normal temperature.

Since the long hole 129 of the housing 101 has a gap corresponding to the temperature-related stretching of the light guide holder 109 in the lengthwise direction as discussed earlier, the pin 125 of the light guide holder 109 slides in the lengthwise direction of the long hole 129. Consequently, even if the light guide 108 stretches in the lengthwise direction, the positions of the light guide 108 and the light guide holder 109 in the height direction and the widthwise direction do not vary, and as a result, the illumination characteristics do not change.

Also, since the position of the holder 114 in the lengthwise direction with respect to the housing 101 is fixed by the screw 140 and the screw 141, the heat dissipation effects also do not change. In other words, there is obtained a light source device whose illumination characteristics and heat dissipation characteristics do not change according to stretching of the light guide 108 due to temperature changes. Note that although the holder 114 is described with reference to FIGS. 10A and 10B, the operational advantages of the holder 115 are similar.

In this way, according to Embodiment 1 of the present invention, heat from the light-emitting elements 110 and 111 is transferred to the short-edge walls 144 and 145 of the housing via the heat transfer bodies 116 and 117. Since the housing 101 is integrally formed by bending sheet metal, heat transferred to the short-edge walls 144 and 145 is transferred to the housing 101 overall, including the heatsinks (wings) 132 and 133, with little thermal resistance. As a result, it becomes possible to efficiently exhaust heat from the light-emitting elements 110 and 111.

In addition, since the holders 114 and 115 are affixed to the short-edge walls 144 and 145 of the housing 101, it becomes possible to maintain the illumination characteristics and heat dissipation characteristics without change, even in the case in which the light guide 108 stretches due to temperature changes.

Embodiment 2

Figure 11:
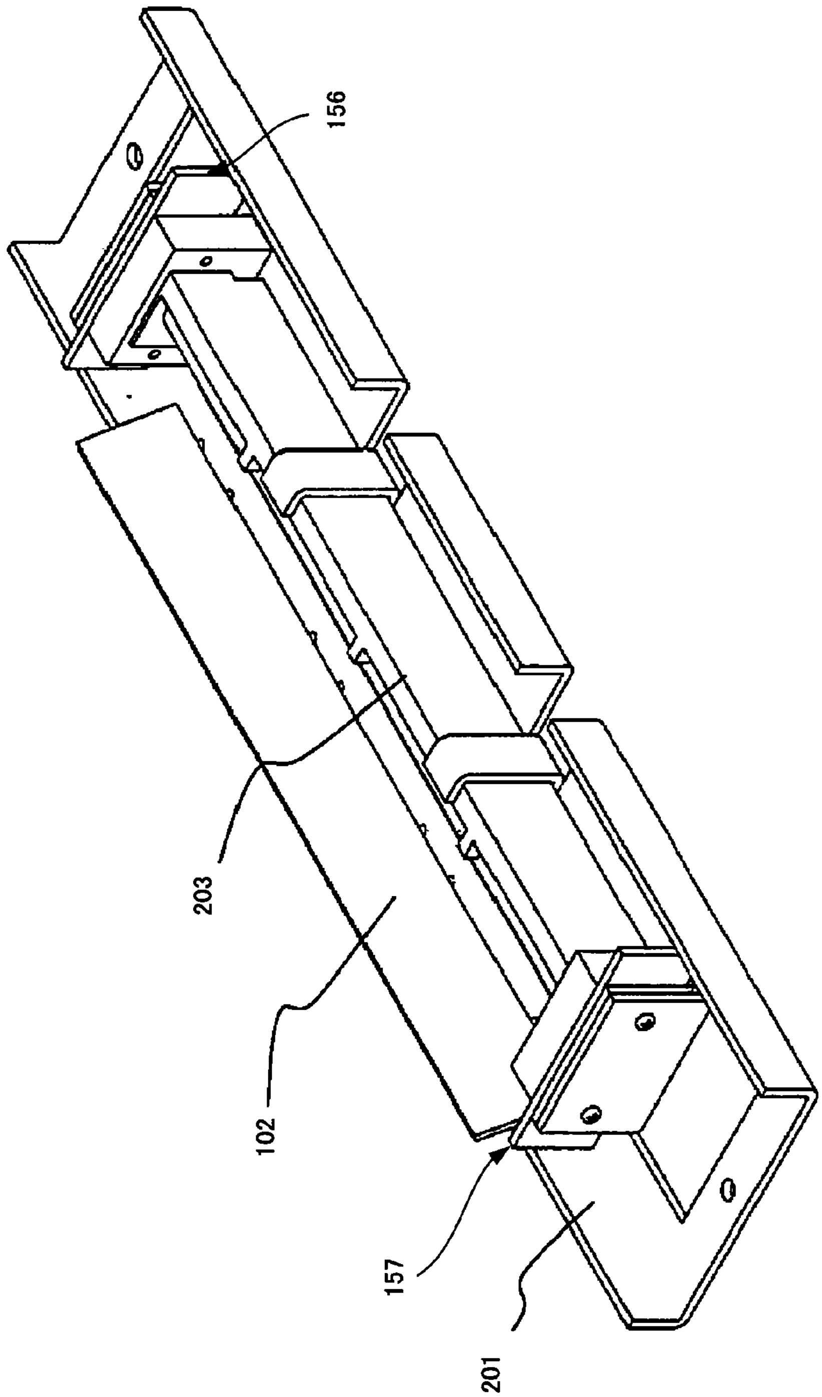
FIG. 11 is a perspective view of a light source device according to Embodiment 2 of the present invention.
Figure 12:
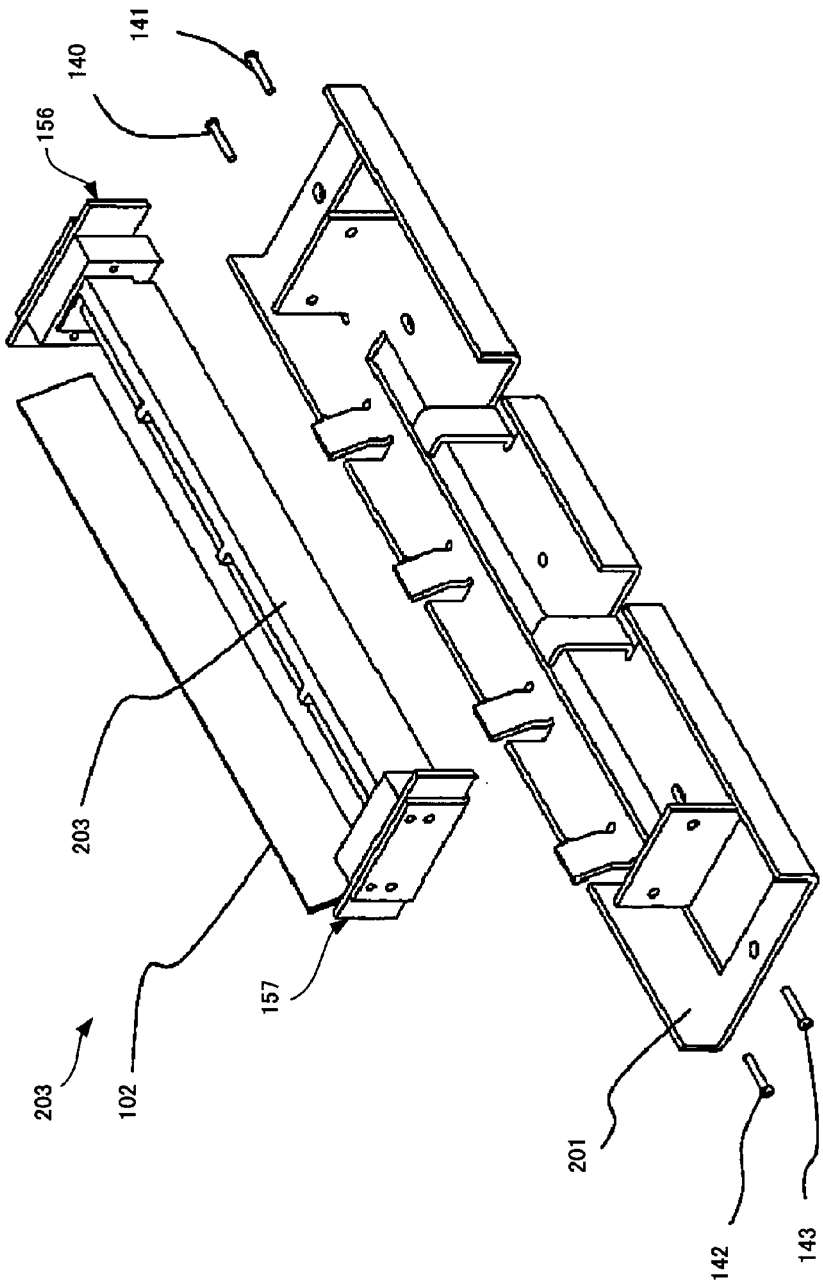
FIG. 12 is an exploded view illustrating a configuration of a light source device according to Embodiment 2 of the present invention.
Figure 13:
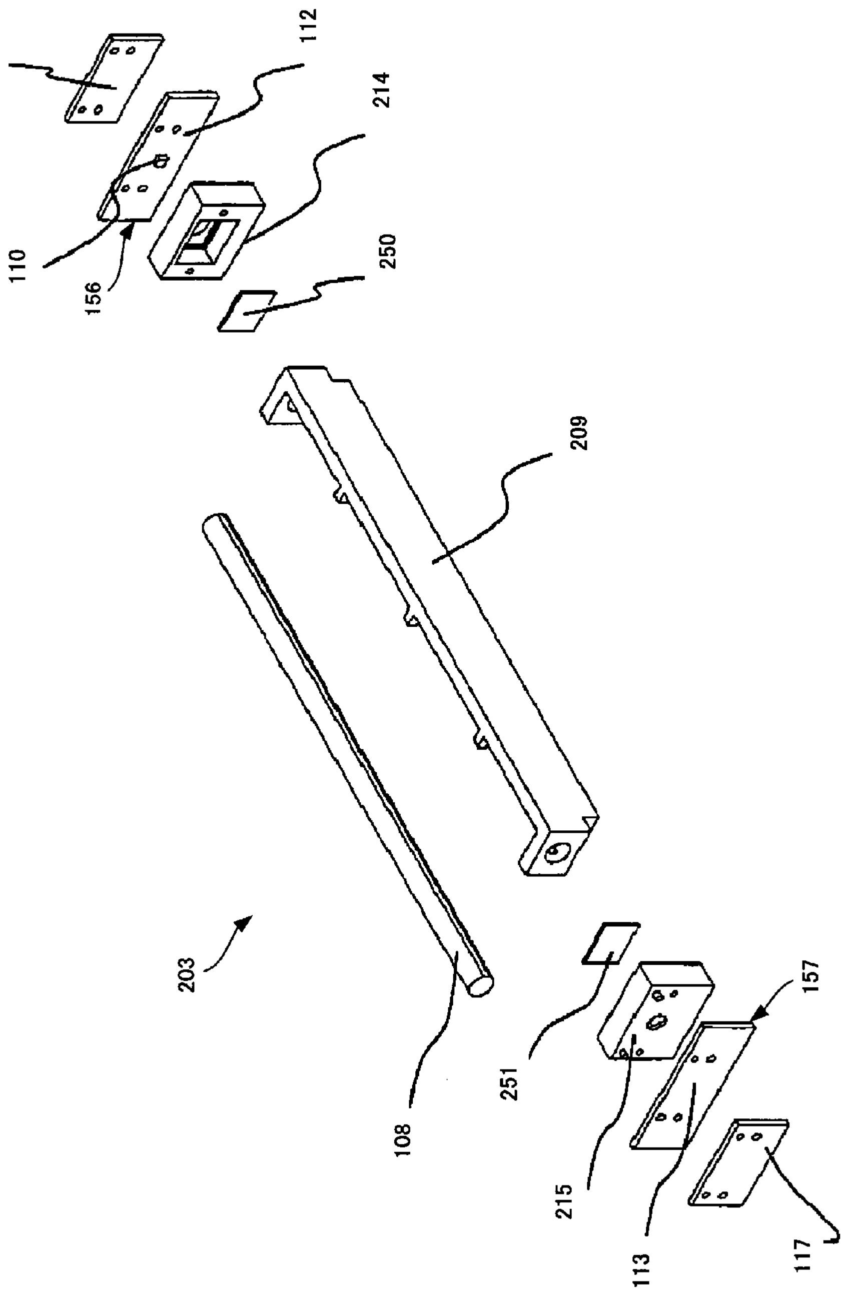
FIG. 13 is an exploded view illustrating a light source of a light source device according to Embodiment 2 of the present invention.
Figure 14:
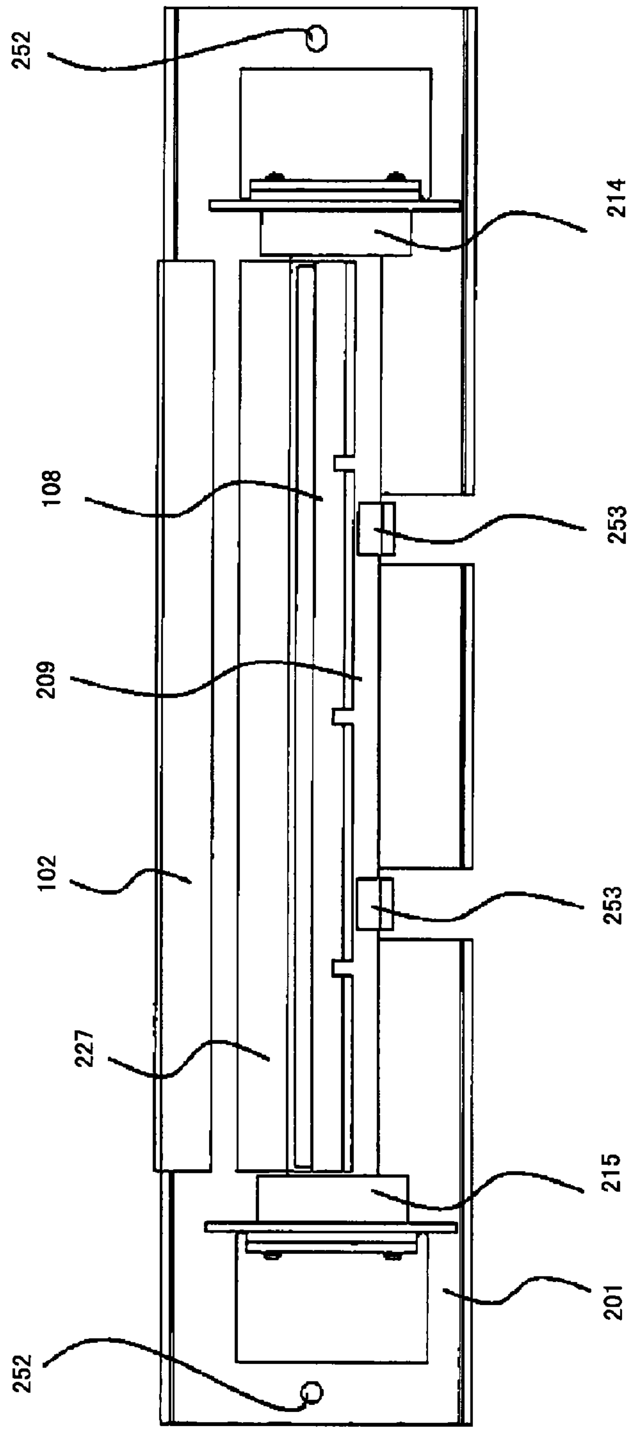
FIG. 14 is a top view as seen from the light radiation direction of a light source device according to Embodiment 2 of the present invention.
Figure 15A:
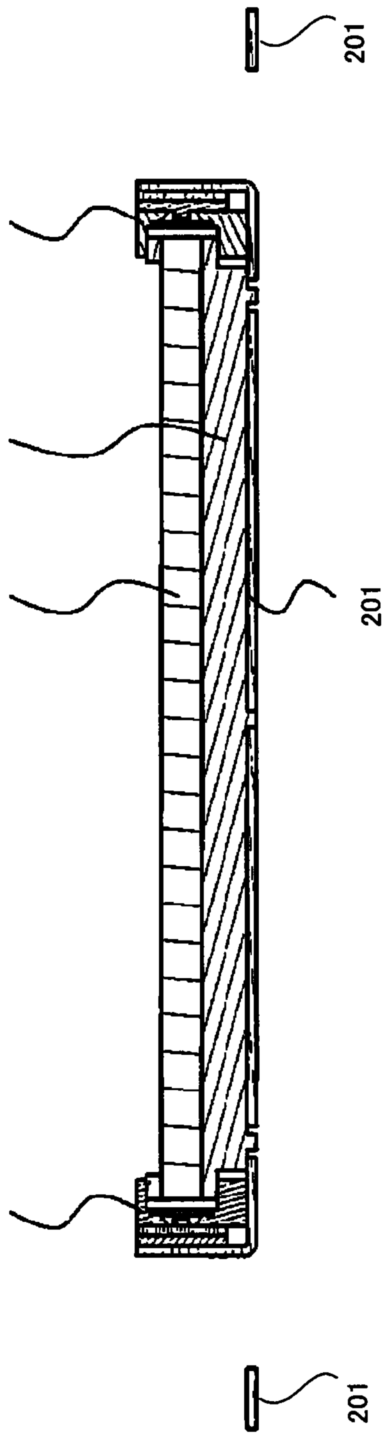
FIG. 15A is a cross-section view in the lengthwise direction of a light source device according to Embodiment 2 of the present invention.
Figure 15B:
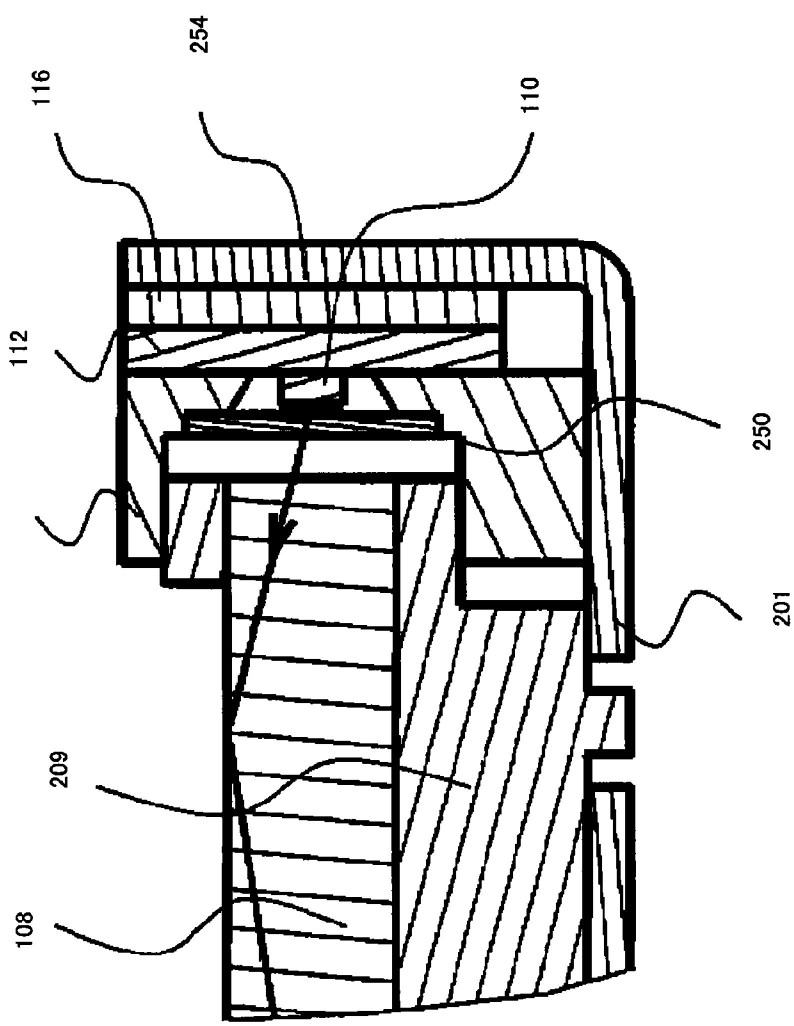
FIG. 15B is a cross-section view in the lengthwise direction of a light source device according to Embodiment 2 of the present invention.
Figure 15C:
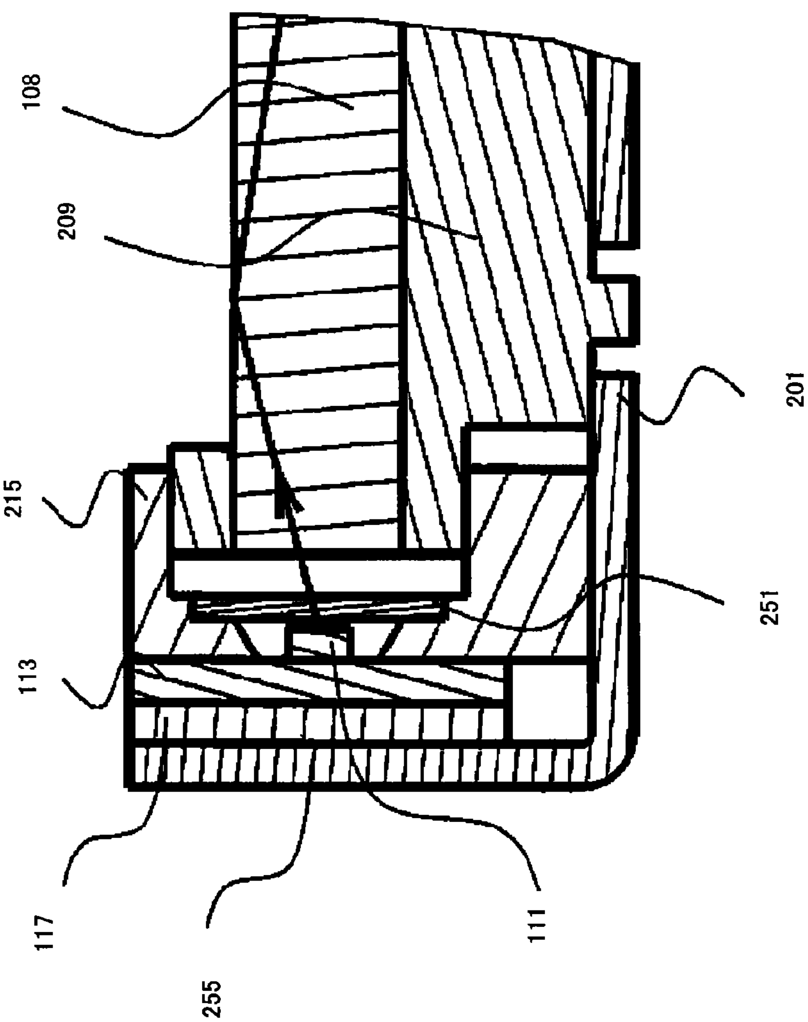
FIG. 15C is a cross-section view in the lengthwise direction of a light source device according to Embodiment 2 of the present invention.
Figure 16A:
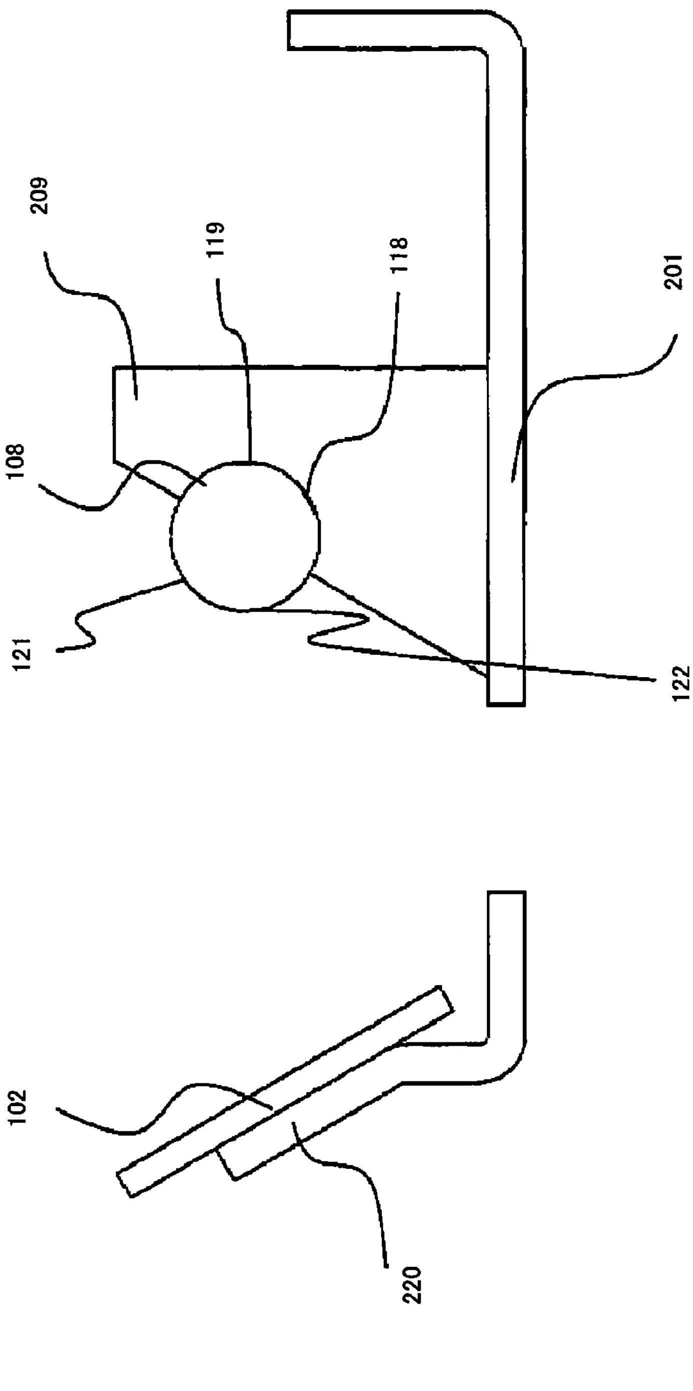
FIG. 16A is a cross-section view in the widthwise direction of a light source device according to Embodiment 2 of the present invention.
Figure 16B:
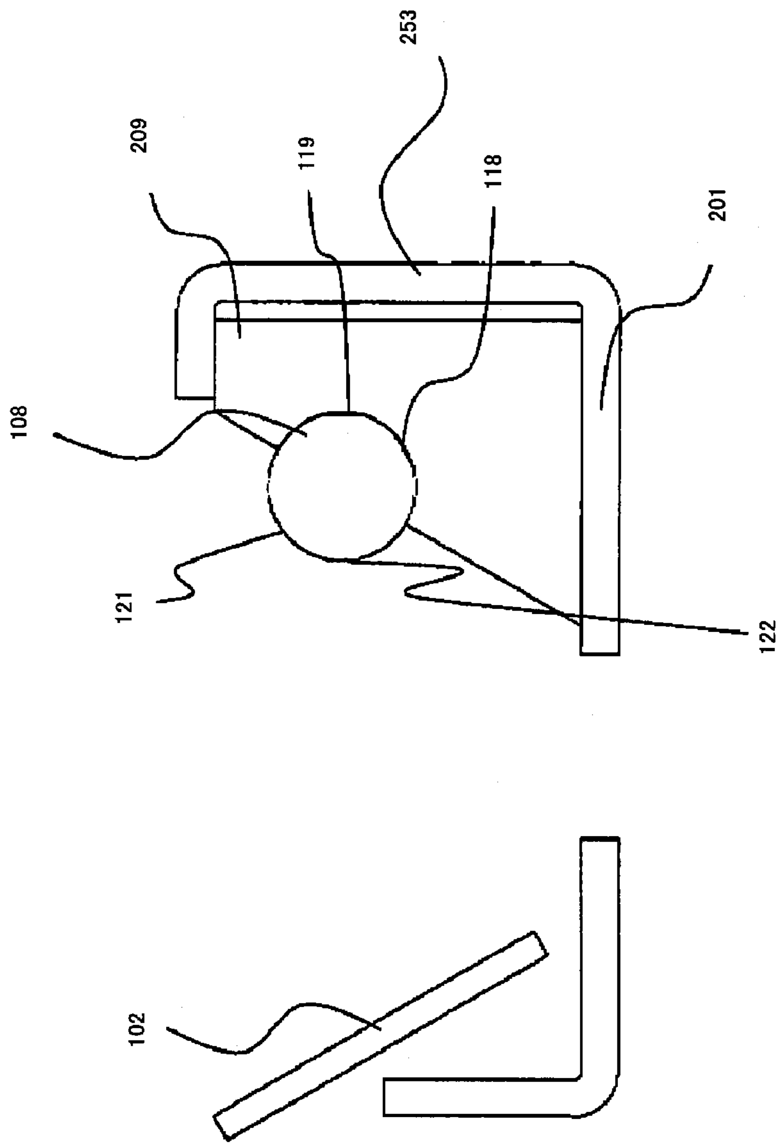
FIG. 16B is a cross-section view in the widthwise direction of a light source device according to Embodiment 2 of the present invention.
Figure 17:
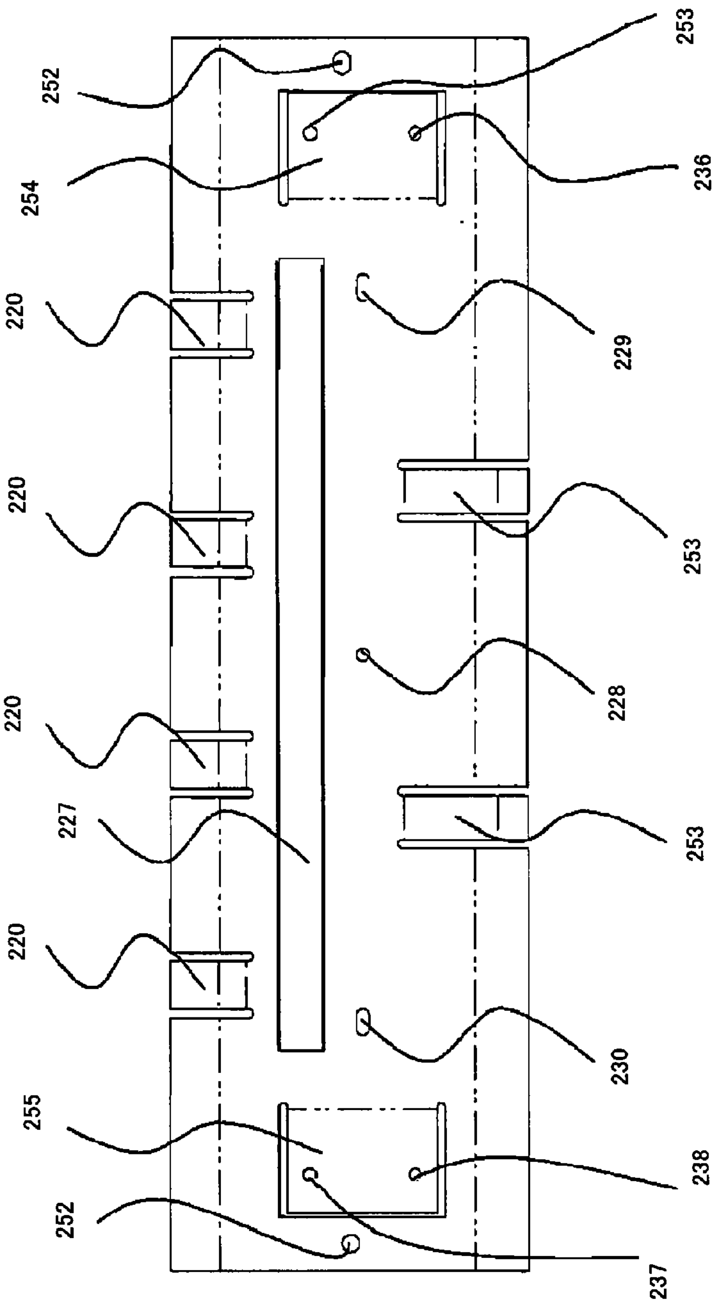
FIG. 17 is a development view of a housing according to Embodiment 2 of the present invention.

Embodiment 2 of the present invention will be described using the drawings. FIG. 11 is a perspective view of a light source device according to Embodiment 2 of the present invention. FIG. 12 is an exploded view illustrating a configuration of a light source device according to Embodiment 2 of the present invention. FIG. 13 is an exploded view illustrating a light source of a light source device according to Embodiment 2 of the present invention. FIG. 14 is a top view as seen from the light radiation direction of a light source device according to Embodiment 2 of the present invention. FIGS. 15A to 15C are cross-section views in the lengthwise direction of a light source device according to Embodiment 2 of the present invention. FIGS. 16A and 16B are cross-section views in the widthwise direction of a light source device according to Embodiment 2 of the present invention. FIG. 17 is a development view of a housing according to Embodiment 2 of the present invention. In FIGS. 11 to 17, structural elements that are the same as or correspond to FIGS. 1 to 7 are labeled with the same signs, and description thereof will be reduced or omitted.

Configuration and operation of Embodiment 2 of the present invention will be described using FIGS. 11 to 17. As illustrated in FIGS. 11 and 12, a light source device of Embodiment 2 of the present invention mainly comprises a housing 201, and a reflector 102 and light source 203 housed inside the housing 201.

As illustrated in FIG. 13, the light source 203 comprises a light guide 108, a light guide holder 209 that houses the light guide 108, light emitters 156 and 157 (light-emitting elements 110 (111) and substrates 112 and 113), holders 214 and 215, optical filters 250 and 251, and heat transfer bodies 116 and 117.

The reflector 102, laid parallel to the light guide 108 in the lengthwise direction, reflects secondary light output from the light guide 108, and irradiates in the direction of the document receptacle 147. The reflector 102 comprises a vapor-deposited metal face or the like, and is a thin plate or sheet member extending in the lengthwise direction. The reflector 102 is kept at a suitable distance and angle with respect to the light guide 108 and the document receptacle 147 by being affixed to a reflector support 220 of the housing 201 by adhesive bonding or the like.

The optical filter 250 is a filter that converts optical characteristics using glass, a PET resin sheet, or the like as a base material, and has an effect of obtaining excitation light using a phosphor or the like, or an effect of removing unwanted wavelengths like a band-pass filter, for example. The optical filter 250 is affixed to the holder 214 by adhesive bonding or the like, and is disposed facing the light-emitting element 110 between the light-emitting element 110 mounted on the substrate 112 and the light guide 108.

The optical filter 251 is a filter that converts optical characteristics using glass, a PET resin sheet, or the like as a base material, and has an effect of obtaining excitation light using a phosphor or the like, or an effect of removing unwanted wavelengths like a band-pass filter, for example. The optical filter 251 is affixed to the holder 215 by adhesive bonding or the like, and is disposed facing the light-emitting element 111 between the light-emitting element 111 mounted on the substrate 113 and the light guide 108.

The holder 214 holds the substrate 112, the light guide holder 209, and the optical filter 250, and suppresses unintentional light from the light-emitting element 110 and the light guide 108. An end that includes the end face on one side of the light guide holder 209 is inserted into the end face on one side of the holder 214, and the substrate 112 affixed with the light-emitting element 110 is placed on the end face on the opposite side of the holder 214 so that the light-emitting element 110 and the light guide 108 are opposite each other.

The holder 214 has a face that holds the optical filter 250 on the side into which an end of the light guide holder 209 is inserted, and a face that secures the substrate 113 on the opposing face. The face of the holder 214 that secures the substrate 112 has an opening equal in size to the light-emitting element 110, and the face that holds the optical filter 250 has an opening equal in size to the light guide 108. In other words, in the case in which the surface area of the light-emitting element 110 is sufficiently smaller than the end face of the light guide 108, the holder 214 has a tapered structure, forming a shape in which a portion corresponding to the open side of a groove in the light guide holder 209 discussed later projects farther outward towards the light guide 108 compared to other portions.

The holder 215 holds the substrate 113, the light guide holder 209, and the optical filter 251, and suppresses unintentional light from the light-emitting element 111 and the light guide 108. An end that includes the end face opposite the side of the light guide holder 209 held by the holder 214 is inserted into the end face on one side of the holder 215. The substrate 113 affixed with the light-emitting element 111 is placed on the end face on the opposite side of the holder 215 so that the light-emitting element 111 and the light guide 108 are opposite each other.

The holder 215 has a face that holds the optical filter 251 on the side into which is inserted the end of the light guide holder 209 opposite the end that is inserted into the holder 214, and a face that secures the substrate 113 on the opposing face. The face of the holder 215 that secures the substrate 113 has an opening equal in size to the light-emitting element 111, and the face that holds the optical filter 251 has an opening equal in size to the light guide 108. In other words, in the case in which the surface area of the light-emitting element 111 is sufficiently smaller than the end face of the light guide 108, the holder 215 has a tapered structure, forming a shape in which a portion corresponding to the open side of a groove in the light guide holder 209 discussed later projects farther outward towards the light guide 108 compared to other portions.

The light guide holder 209 is formed with a highly reflective resin, metal, or the like, and is a member that holds the light guide 108 in the lengthwise direction. The light guide holder 209 includes a groove configured as a long groove in the lengthwise direction, and holds the light guide 108 in the lengthwise direction as a result of the light guide 108 being placed into this groove. The open side of this groove forms a light outputter that outputs light from the light guide 108.

The light guide holder 209 holds the light guide 108 at a suitable position with respect to the reflector 102 and the housing 201. In addition, the light guide holder 209 fulfills a role of returning bleeding light from the side faces or from the rear face of the light scattering part 118 and the light scattering part 119 back inside the light guide 108, and suppressing the output of unintentional light from other than the light outputter 121 and the light outputter 122. The light guide holder 209 is provided with a pin 224, a pin 225, and a pin 226 in the center of the widthwise direction and on the housing bottom face.

The housing 201 is formed by a sheet metal with good heat dissipation, such as aluminum, and is formed into a box shape by being bent inwards along the two-dot chain lines in FIG. 17.

In other words, by being bent, there is formed a housing 201 that includes a floor, standing walls bent inwards from the floor and standing off the floor, and a sloped face provided in a direction orthogonal to the standing walls, bent inwards at a designated angle from the floor, on which a reflecting member is laid.

The housing 201 is equipped with an interlocking hole 228 formed in the bottom face in the center part of the lengthwise direction, a long hole 229 formed on the bottom face between the interlocking hole 228 and an end, a long hole 230 formed on the bottom face between the interlocking hole 228 and the end on the side opposite the long hole 229, an aperture 227 formed in the bottom face along the lengthwise direction, a screw hole 252, light guide holder fixtures 253, reflector supports 220, standing walls 254 and 255 that act as heat dissipating faces, and holder holding holes 235, 236, 237, and 238. Consequently, the housing 201 affixes the light guide holder 209 and the reflector 102 in the lengthwise direction, the widthwise direction, and the height direction, and in addition, affixes the holder 214, the holder 215, the heat transfer body 116, and the heat transfer body 117 in the lengthwise direction, the widthwise direction, and the height direction.

The interlocking hole 228 is a round hole provided on the bottom face of the housing 201. The interlocking hole 228 is positioned in the center of the lengthwise direction, and in addition, in the center of the bottom face of the light guide holder 209 between the aperture 227 and the light guide holder fixtures 253 in the widthwise direction. The pin 224 of the light guide holder 209 is inserted into the interlocking hole 228, thereby affixing the position of the light guide holder 209 in the lengthwise direction and the widthwise direction.

The long hole 229 is a hole elongated in the lengthwise direction and provided in the bottom face of the housing 201. The long hole 229 is positioned at one end in the lengthwise direction, and in addition, in the center of the bottom face of the light guide holder 209 between the aperture 227 and the light guide holder fixtures 253 in the widthwise direction. The pin 225 of the light guide holder 209 is inserted into the long hole 229, thereby affixing the position of the light guide holder 209 in the widthwise direction.

The long hole 230 is a hole elongated in the lengthwise direction and provided in the bottom face of the housing 201. The long hole 230 is positioned at the end on the side opposite the long hole 229 in the lengthwise direction, and in addition, in the center of the bottom face of the light guide holder 209 between the aperture 227 and the light guide holder fixtures 253 in the widthwise direction. The pin 226 of the light guide holder 209 is inserted into the long hole 230, thereby affixing the position of the light guide holder 209 in the widthwise direction.

The aperture 227 is a hole formed along the lengthwise direction in the bottom face of the housing 201. The aperture 227 conveys image information about the object to be scanned (light among the radiated light that was scattered and reflected by the object to be scanned) to the imager (a lens and image sensor), and suppresses all other unwanted light.

The screw hole 252 is a hole provided in the bottom face of the housing 201 at both ends in the lengthwise direction, and is a hole provided with screw threads for affixing the light source device to a scanning device (illumination device installation hole).

The light guide holder fixtures 253 extend along the side face on the side of the housing, are positioned on the side opposite the reflector 102 with respect to the aperture 227, and affix the light guide holder 209 in the height direction.

The reflector support 220 is multiply provided in the lengthwise direction, positioned farther outward than the aperture 227 in the widthwise direction, and holds the reflector 102 with good precision. The reflector support 220 is connected to portions that are vertically raised from the bottom face of the housing, and support the reflector 102 at an arbitrary angle. If the reflector support 220 was hypothetically connected to the housing bottom face directly without being connected to portions that are vertically raised from the bottom face of the housing 201, the reflector support 220 would be too close to the aperture 227 in order to keep the installation angle of the reflector 102, making processing with sufficient precision difficult.

The reflector support 220 does not extend over the entire length. For this reason, the housing strength may be increased by vertically bending, with respect to the bottom face of the housing 201, the faces on the side of the reflector support 220 with respect to the aperture 227 from among the faces connected to the bottom face of the housing 201 that are not provided with the reflector support 220. Additionally, portions formed by bending in a direction that faces the bottom face may also be treated as installation faces for the light source device. The surface area of the reflector support 220 has enough surface area so that the reflector 102 does not sag.

The standing wall 254 is positioned between the aperture 227 and the screw hole 252 in the lengthwise direction of the housing 201. The standing wall 254 is provided with holder holding holes 235 and 236, and by respectively tightening the screws 140 and 141 thereinto, the substrate 112, the holder 214, and the heat transfer body 116 are affixed to the housing 201. In addition, the substrate 112 may be affixed by being pasted onto the standing wall 254 using an adhesive heat transfer body 116.

The standing wall 255 is positioned between the aperture 227 and the screw hole 252 on the side opposite the standing wall 254 in the lengthwise direction of the housing 201. The standing wall 255 is provided with holder holding holes 237 and 238, and by respectively tightening the screws 142 and 143 thereinto, the substrate 113, the holder 215, and the heat transfer body 117 are affixed to the housing 201. In addition, the substrate 113 may be affixed by being pasted onto the standing wall 255 using an adhesive heat transfer body 117.

The light guide holder 209 holds the light guide 108, and additionally suppresses unintentional light from the light-emitting element 110 and the light guide 108. The light guide holder 209 is affixed at a suitable position with respect to the housing at the following three points on the housing 201.

Namely, the pin 224 is inserted into the interlocking hole 228, the pin 225 is inserted into the long hole 229, and the pin 226 is inserted into the long hole 230. The light guide holder 209 is shorter than the total length of the housing 201. The lengthwise end faces of the light guide holder 209 face opposite the end faces of the holder 214 and the holder 215. The gap length between the lengthwise end faces of the light guide holder 209 and the end faces of the holder 214 and the holder 215 is longer than the amount of expansion due to the temperature characteristics of the light guide holder 209.

As discussed earlier, the long hole 229 and the long hole 230 are long holes, and the pin 225 and pin 226 are not affixed in the lengthwise direction. For this reason, the light guide holder 209 is able to hold the light guide 108 in the widthwise direction without bowing, even in the case in which the light guide holder 209 stretches due to temperature. The light guide holder 209 holds the entire circumference of the light guide 108 at the ends, and has an opening that exposes the light outputter 121 and the light outputter 122 in the center part. The portions that hold the entire circumference of the light guide 108 at the ends are inserted into the holder 214 and the holder 215.

The heat transfer body 116 and the heat transfer body 117 are members with good adhesion and thermal conductivity, and comprise a sheet-like silicon sheet or the like that works to transfer heat, for example. The heat transfer body 116 is positioned between the substrate 112 and the standing wall 254. The heat transfer body 117 is positioned between the substrate 113 and the standing wall 255.

The housing 201 has a role of allowing heat from the light-emitting element 110 and the light-emitting element 111 to escape. Heat produced from the light-emitting element 110 passes through the substrate 112 and is transferred to the standing wall 254 via the heat transfer body 116. From the standing wall 254, heat is distributed throughout the entire housing 201. Heat produced from the light-emitting element 111 passes through the substrate 113 and is transferred to the standing wall 255 via the heat transfer body 117. From the standing wall 255, heat is distributed throughout the entire housing 201.

Figure 18A:
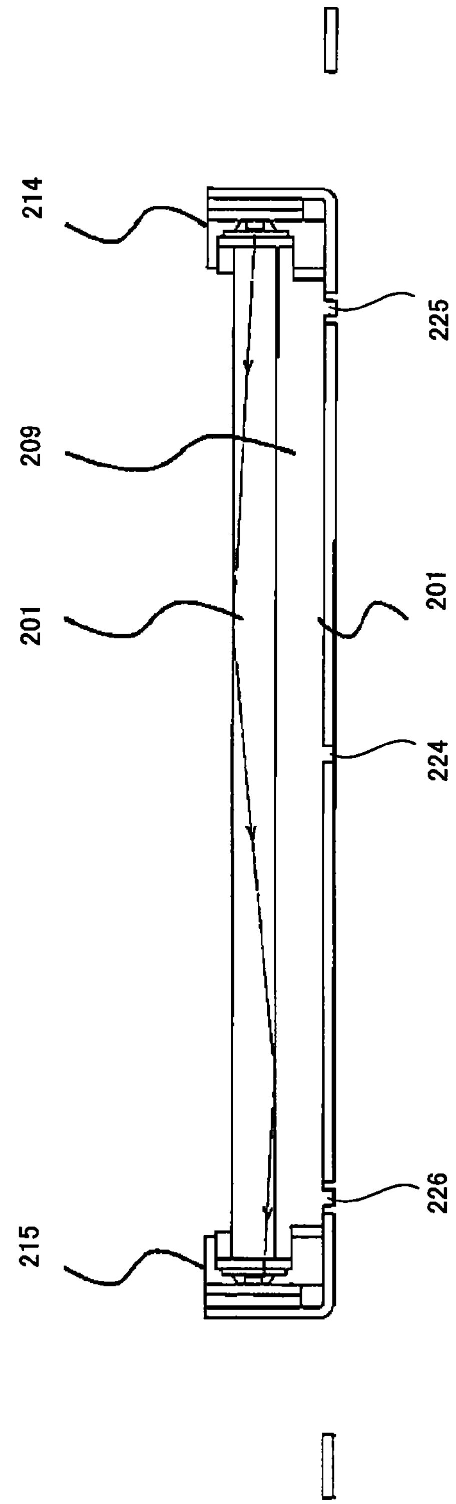
FIG. 18A is a diagram illustrating a light path in a lengthwise cross-section of a light source device according to Embodiment 2 of the present invention.
Figure 18B:
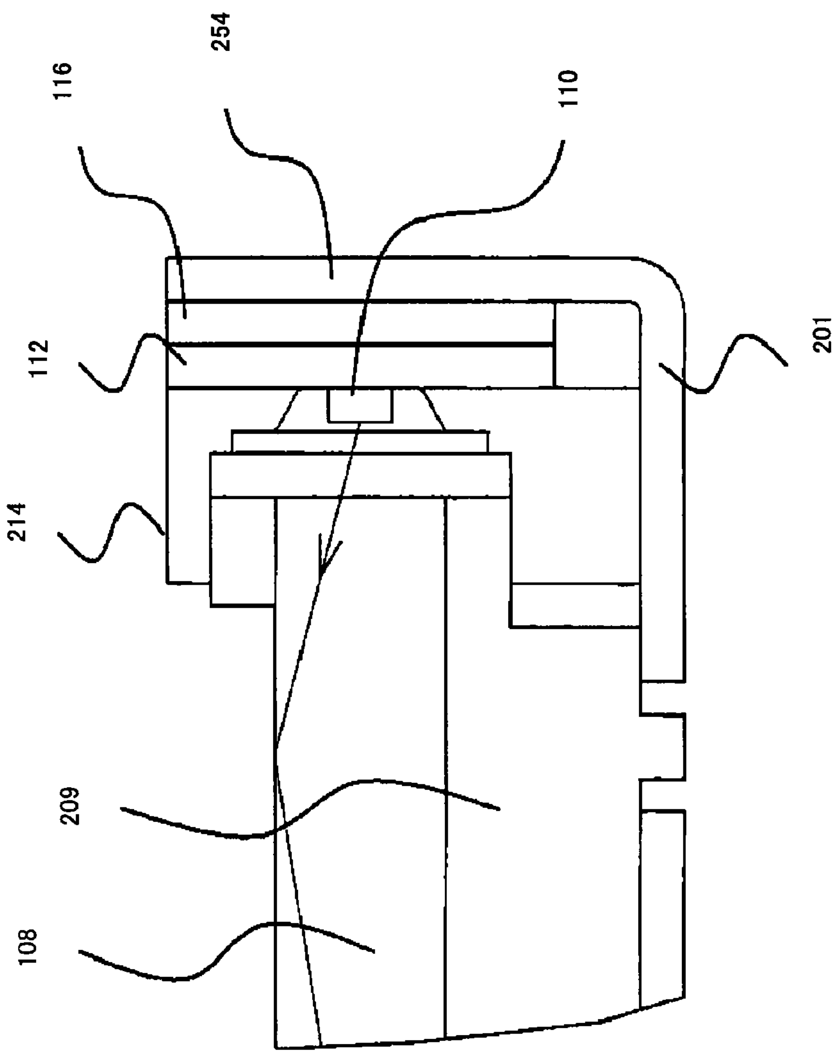
FIG. 18B is a diagram illustrating a light path in a lengthwise cross-section of a light source device according to Embodiment 2 of the present invention.
Figure 19:
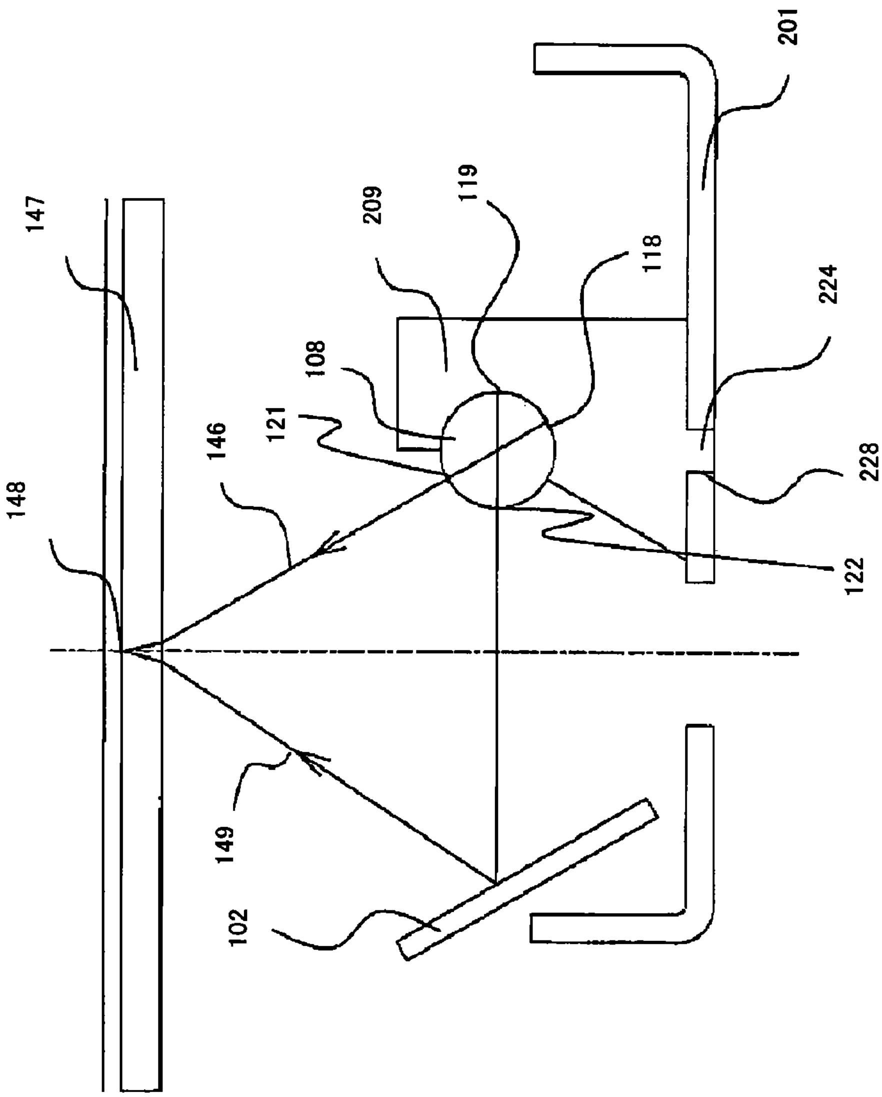
FIG. 19 is a diagram illustrating a light path in a widthwise cross-section of a light source device according to Embodiment 2 of the present invention.

FIGS. 18A and 18B are diagrams illustrating a light path as seen from a cross-section in the lengthwise direction of a light source device according to Embodiment 2 of the present invention. FIG. 18A is an overall view, while FIG. 18B is an enlarged view near the light-emitting element 110. FIG. 19 is a diagram illustrating a light path in a widthwise cross-section of a light source device according to Embodiment 2 of the present invention.

As indicated by the arrows in FIGS. 18A and 18B, of the light input into the light guide 108 from the light-emitting element 110 and the light-emitting element 111, part of the light is input into the light guide 108 directly, while other light is input into the light guide 108 while being scattered by the tapered part of the holder inner walls. The light proceeds while being repeatedly reflected off the wall face of the light guide 108, and part of the light is incident on the light scattering part 118 and the light scattering part 119 having a white printed pattern or uneven shape formed along the lengthwise direction of the light guide 108.

Light not incident on the light scattering part 118 and the light scattering part 119 passes through the light guide 108, and is output from the end face on the opposite side of the incident face. Light output from the end faces of the light guide 108 is scattered by the tapered part of the holders 214 and 215, and re-enters the light guide 108. As illustrated in FIG. 19, light incident on the light scattering part 118 is radiated by reflection in the direction of the irradiated part 148 of the document receptacle 147 as a line of primary light 146 extending in the lengthwise direction from the light outputter 121 (the part on the surface of the light guide 108) facing opposite the light scattering part 118.

Since the holder 214 and the holder 215 form a shape in which a portion corresponding to the open side of the groove in the light guide holder 209 projects farther outward towards the light guide 108 compared to other portions, non-uniform light at the ends of the light guide 108 is not output from the light guide 108.

Meanwhile, as illustrated in FIG. 19, light incident on the light scattering part 119 is output by reflection towards the reflector 102 as a line of secondary light 149 extending in the lengthwise direction from the light outputter 122 (the surface of the light guide 108 on the connection interface member side) facing opposite the light scattering part 119. The secondary light 149 output towards the reflector 102 is reflected by the reflector 102, and output in the direction of the irradiated part 148 of the document receptacle 147 as a line of secondary light 149 extending in the lengthwise direction. The arrows proceeding from the light scattering part 118 and the light scattering part 119 of the light guide 108 to the document receptacle 147 depicted in the central cross-section view respectively indicate the primary light paths along which light reflected by the light scattering part 118 and the light scattering part 119 irradiates the object to be scanned.

Figure 20A:
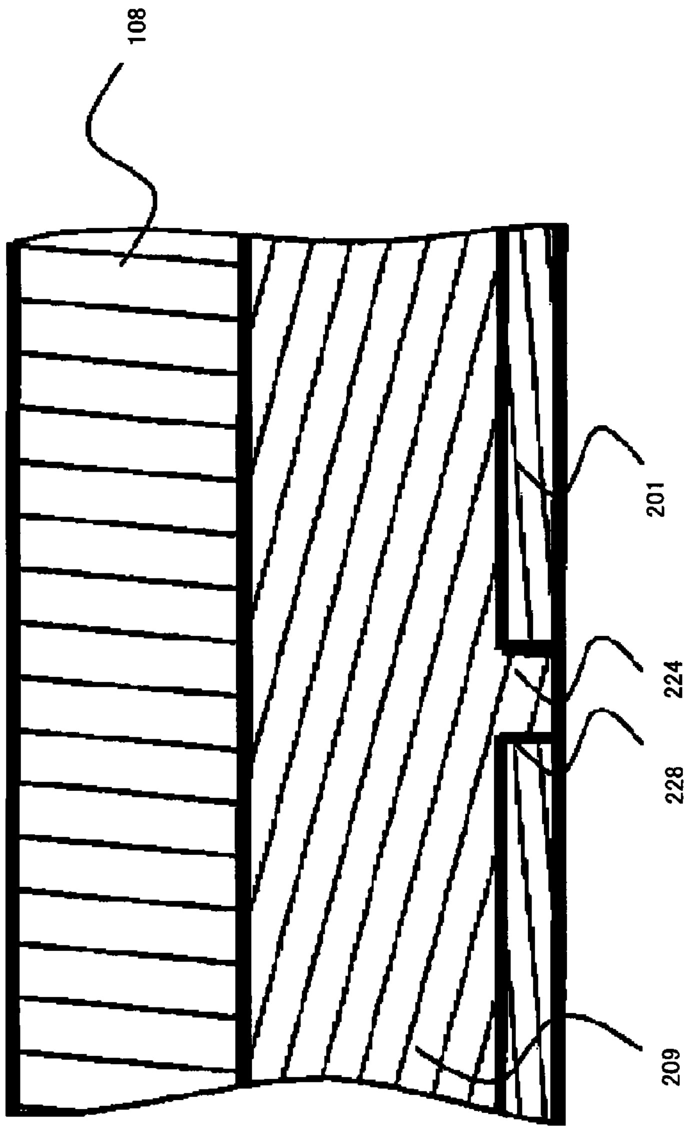
FIG. 20A is a cross-section view in the lengthwise direction near a light-emitting element of a light source device according to Embodiment 2 of the present invention.
Figure 20B:
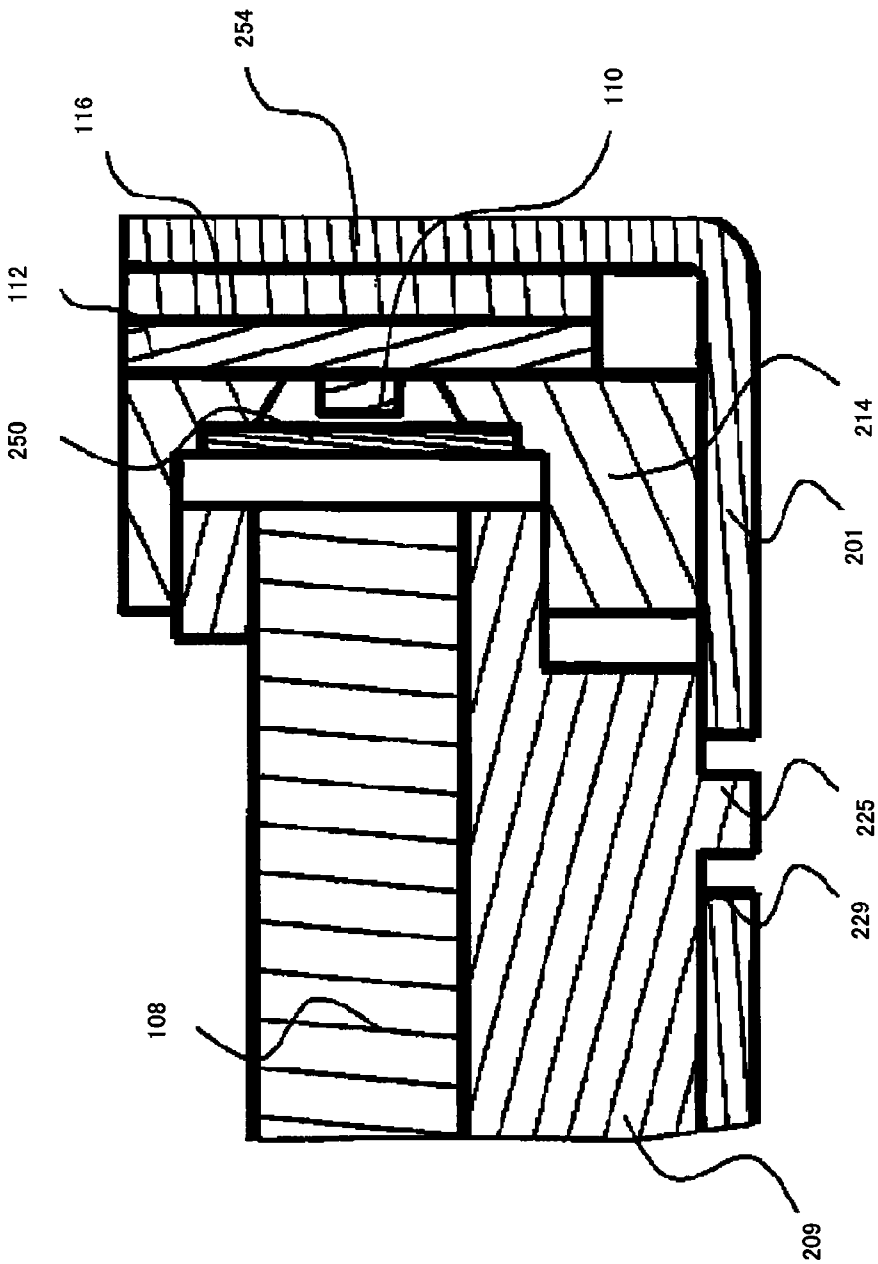
FIG. 20B is a cross-section view in the lengthwise direction near a light-emitting element of a light source device according to Embodiment 2 of the present invention.
Figure 20C:
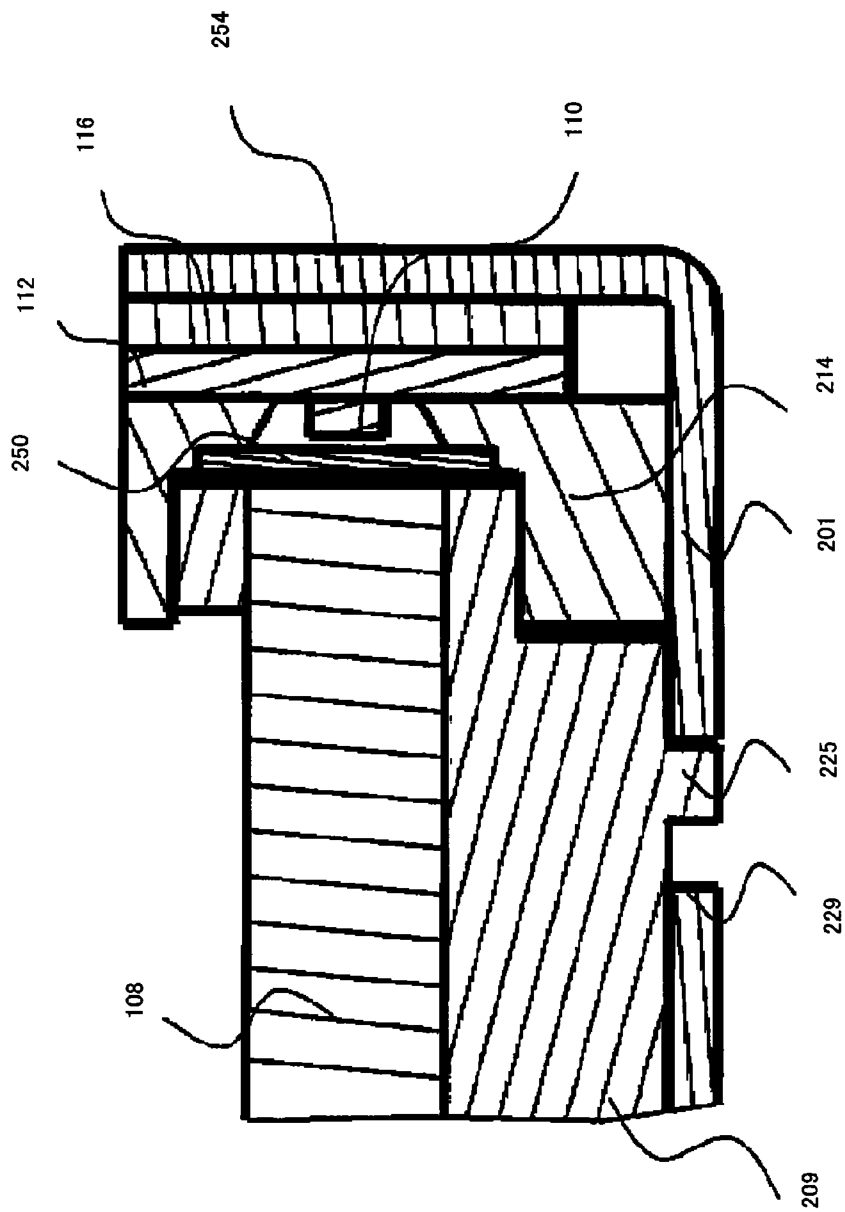
FIG. 20C is a cross-section view in the lengthwise direction near a light-emitting element of a light source device according to Embodiment 2 of the present invention.

FIGS. 20B and 20C are cross-section diagrams in the lengthwise direction near the light-emitting element 110 of a light source device according to Embodiment 2 of the present invention. FIG. 20B is a cross-section view at normal temperature, while FIG. 20C is a cross-section view at high temperature. As illustrated in FIG. 20A, since the light guide holder 209 is positioned in the housing 201 by inserting the pin 224 into the interlocking hole 228 of the housing 201, the degree of interlocking between the light guide 108 and the holder 214 as well as the relative positions of the light guide holder 209 and the holder 214 vary. Since the long hole 229 of the housing 201 has a gap corresponding to the temperature-related stretching of the light guide holder 209 in the lengthwise direction as discussed earlier, the pin 225 of the light guide holder 209 slides in the lengthwise direction of the long hole 229. For this reason, the light guide holder 209 is able to stretch in the lengthwise direction. On the other hand, the positions of the light guide 108 and the light guide holder 209 in the height direction and the widthwise direction do not vary. As a result, the illumination characteristics may be maintained without change.

Also, since the holder 214 is affixed to the standing wall 254 on the housing 201 in the lengthwise direction by the screws 140 and 141, the heat dissipation effects also do not change. At both normal temperature and high temperature, the distances of the housing 201, the heat transfer body 116, the substrate 112, the light-emitting element 110, the holder 214, and the optical filter 250 are fixed, and the distance between the light guide 108 and the light guide holder 209 is fixed. In other words, the portion of light blocked by the light guide holder 209 is fixed, and the effect of suppressing unwanted stray light produced at the ends of the light guide 108 is kept constant. Meanwhile, the relative distance of the light-emitting element 110 and the optical filter 250 is also kept constant. Consequently, the function of converting light from the light-emitting element 110 is kept constant. With this structure, it becomes possible to obtain a light source device that maintains illumination characteristics and heat dissipation characteristics without change, even in the case in which the light guide 108 stretches due to temperature changes. Note that although the standing wall 254 side is described by referencing FIGS. 20A to 20C, the operational advantages of the standing wall 255 side are similar.

In this way, according to Embodiment 2 of the present invention, heat from the light-emitting elements 110 and 111 is conducted to the standing walls 254 and 255 of the housing 201 via the heat transfer bodies 116 and 117, and the housing 201 is integrally formed by bending sheet metal. For this reason, heat conducted to the standing walls 254 and 255 is conducted throughout the housing 201 overall with little thermal resistance, making it possible to efficiently exhaust heat from the light-emitting elements 110 and 111.

In addition, since the holders 214 and 215 are affixed to the standing walls 254 and 255 of the housing 201, it becomes possible to maintain the illumination characteristics and heat dissipation characteristics without change, even in the case in which the light guide 108 stretches due to temperature changes.

Embodiment 3

Figure 26A:
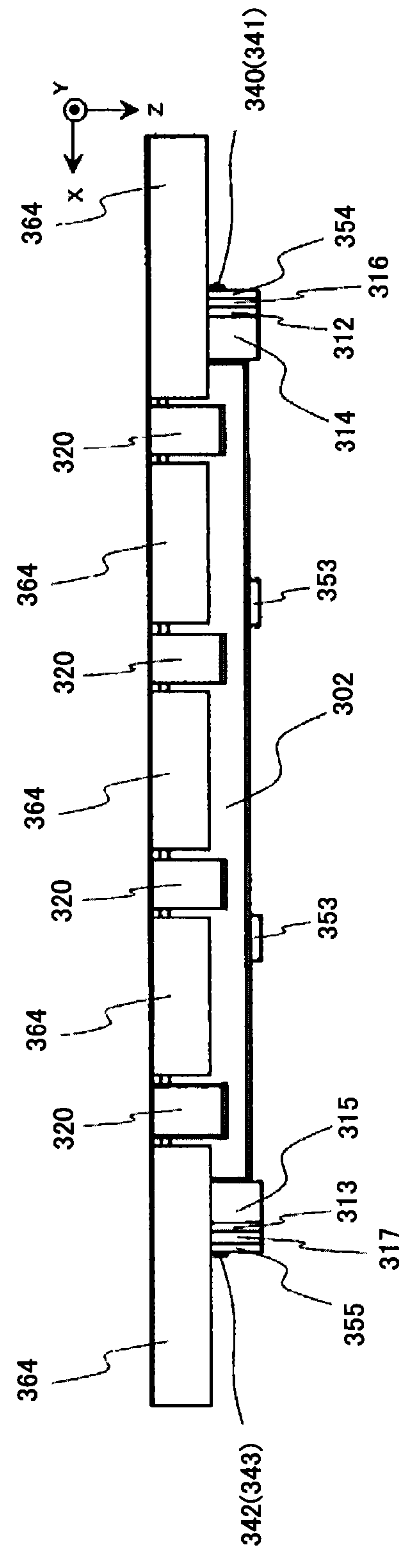
FIG. 26A is a side view (lengthwise direction) of a light source device according to Embodiment 3 of the present invention.
Figure 26B:
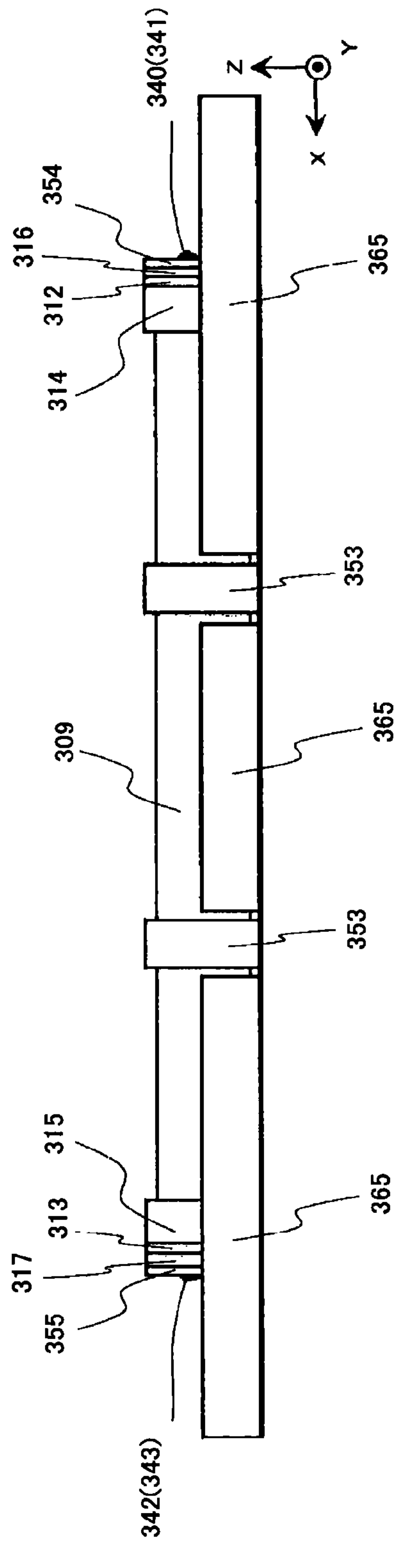
FIG. 26B is a side view (lengthwise direction) of a light source device according to Embodiment 3 of the present invention.
Figure 27A:
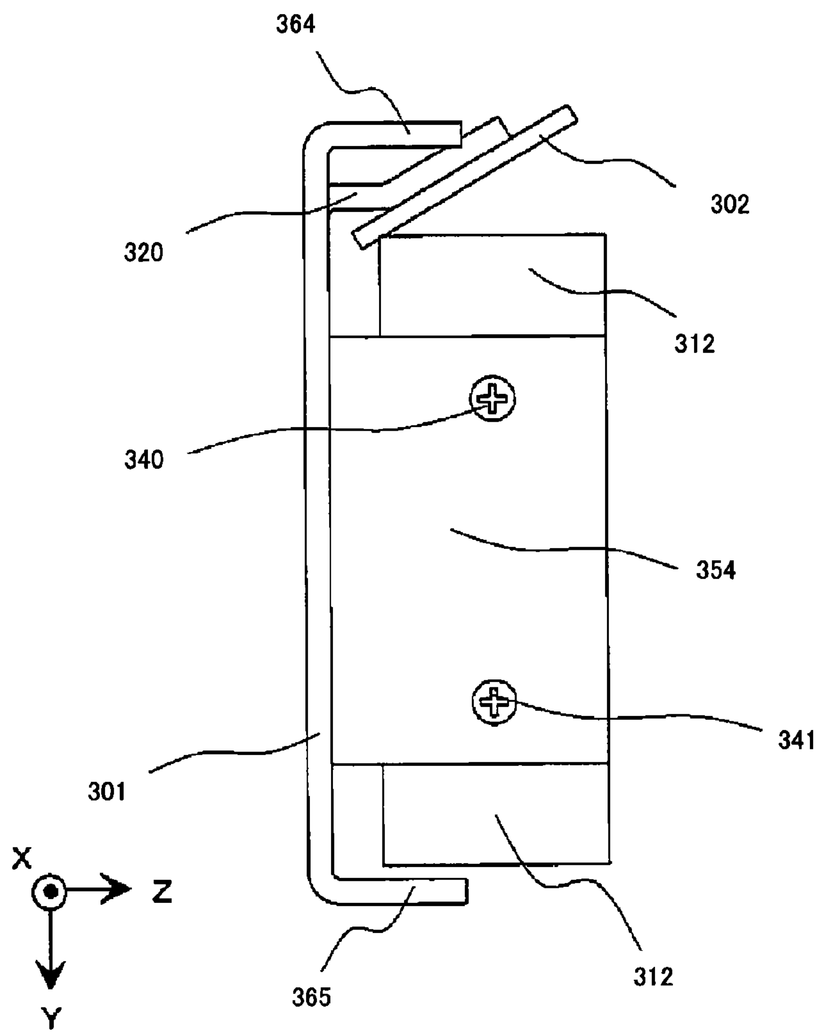
FIG. 27A is a side view (widthwise direction) of a light source device according to Embodiment 3 of the present invention.
Figure 27B:
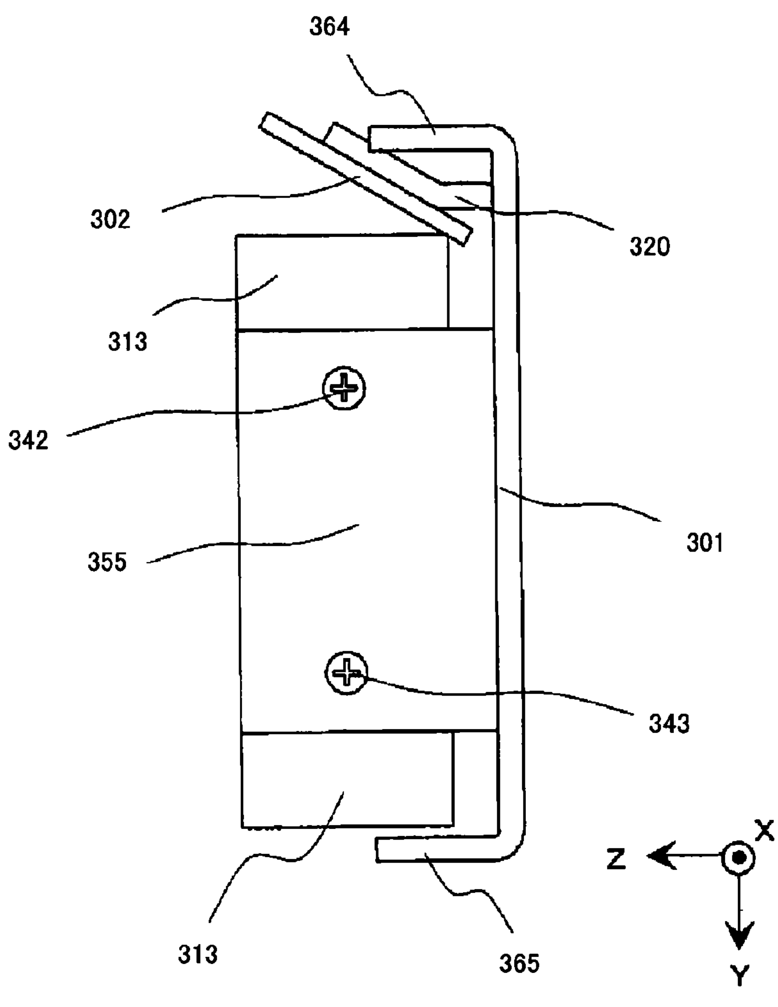
FIG. 27B is a side view (widthwise direction) of a light source device according to Embodiment 3 of the present invention.
Figure 28:
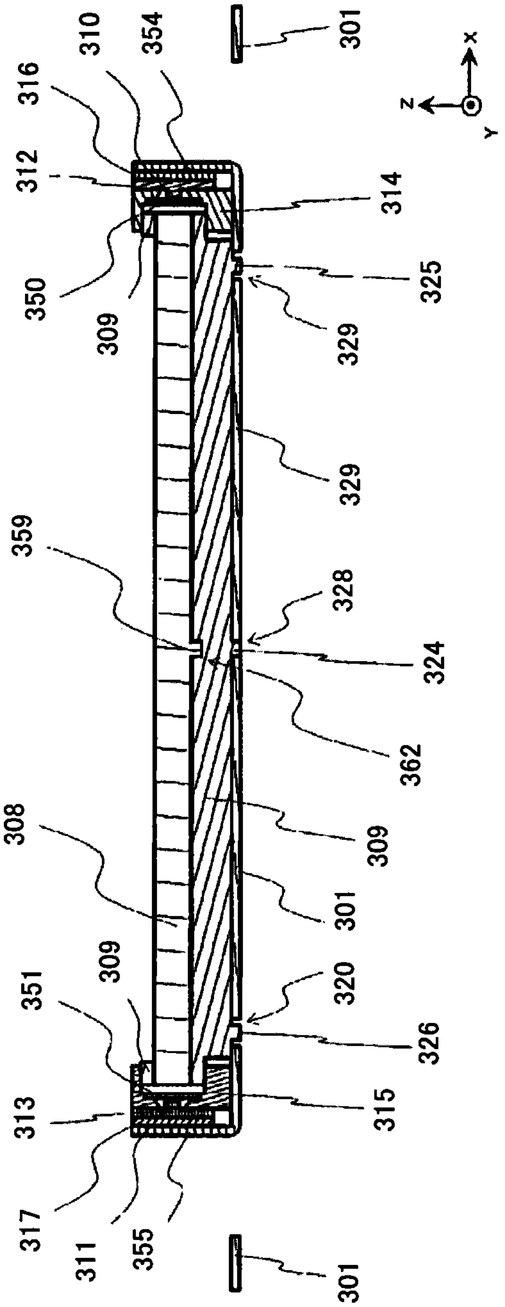
FIG. 28 is a cross-section view in the lengthwise direction of a light source device according to Embodiment 3 of the present invention.
Figure 29:
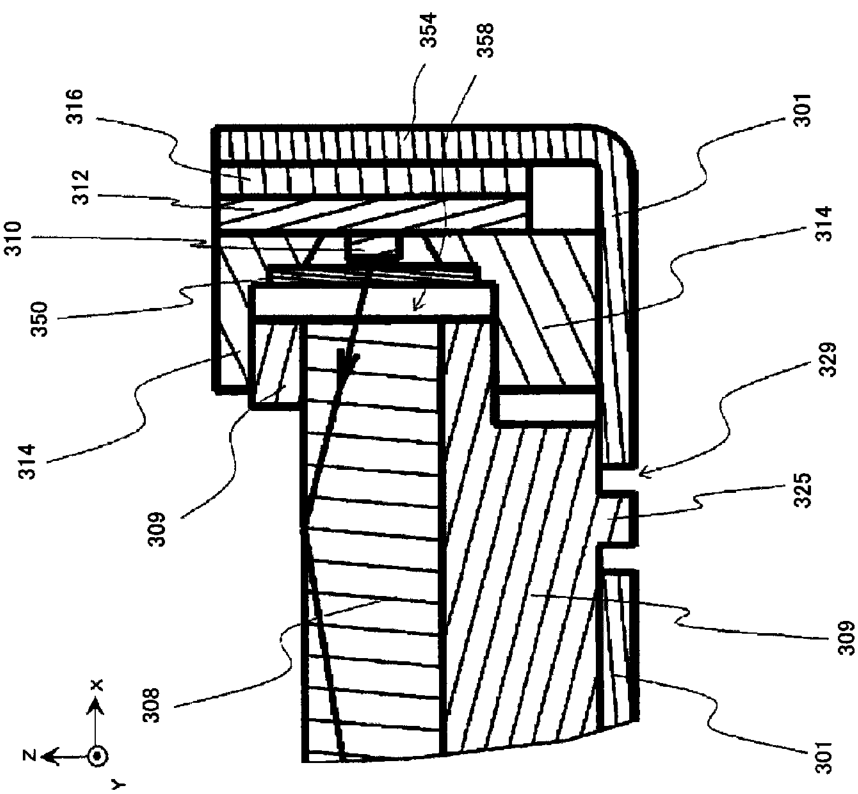
FIG. 29 is a cross-section view in the lengthwise direction of a light source device according to Embodiment 3 of the present invention, and illustrates the optical axis (primary light path) near a light emitter.
Figure 30:
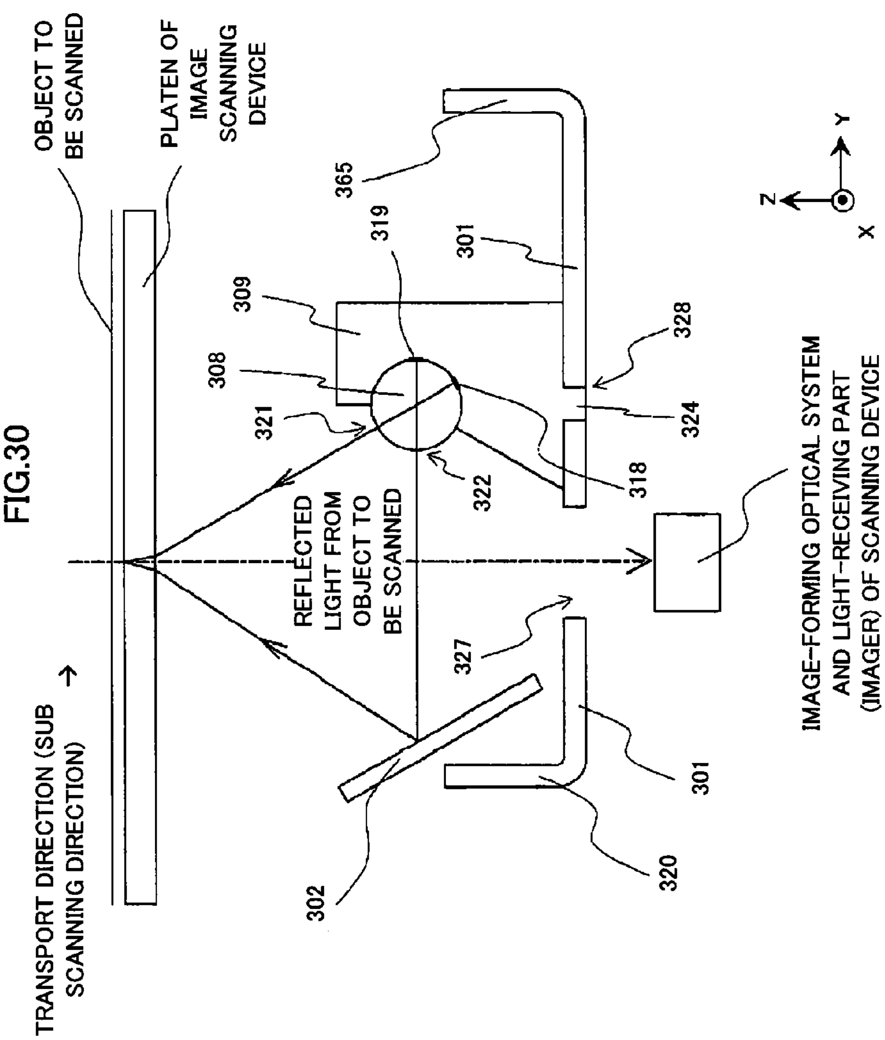
FIG. 30 is a diagram illustrating the optical axis (primary light path) in a cross-section in the widthwise direction of a light source device according to Embodiment 3 of the present invention.
Figure 31A:
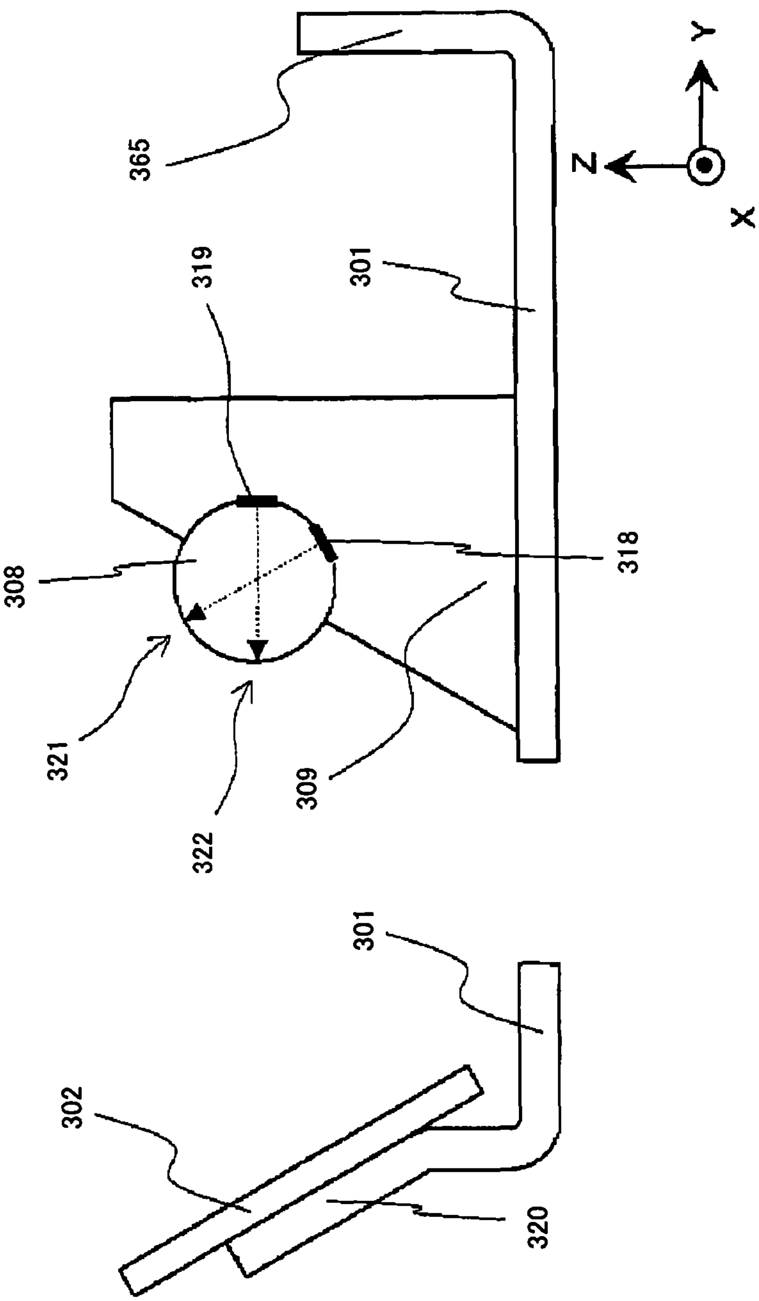
FIG. 31A is a cross-section view in the widthwise direction of a light source device according to Embodiment 3 of the present invention.
Figure 31B:
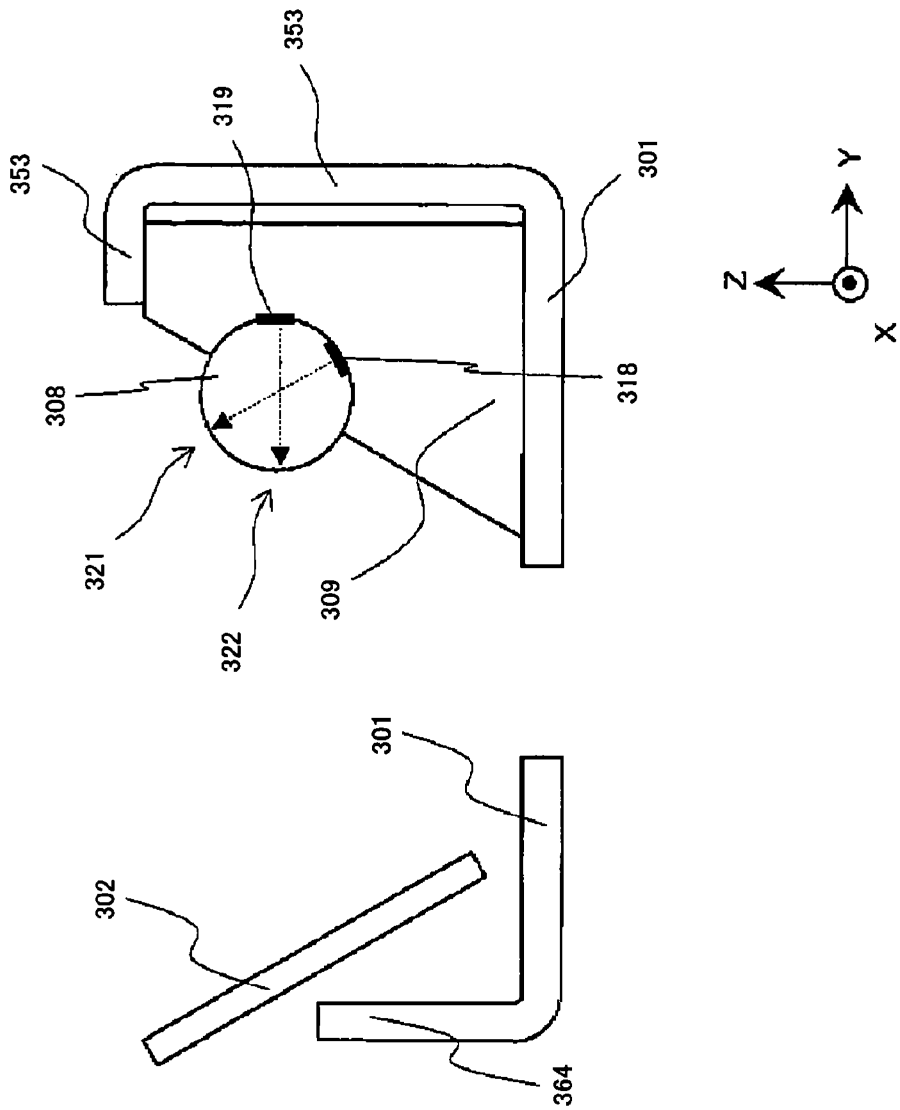
FIG. 31B is a cross-section view in the widthwise direction of a light source device according to Embodiment 3 of the present invention.

Embodiment 3 of the present invention will be described using FIGS. 21 to 41. FIG. 26A is a side view of a light source device as seen from the dotted arrow A in FIG. 25. FIG. 26B is a side view of a light source device as seen from the dotted arrow B in FIG. 25. FIG. 27A is a side view of a light source device as seen from the dotted arrow C in FIG. 25. FIG. 27B is a side view of a light source device as seen from the dotted arrow D in FIG. 25. FIG. 28 is a cross-section view of a light source device along the one-dot chain line EF in FIG. 25. FIG. 29 is a cross-section view near a light emitter of a light source device along the one-dot chain line EF in FIG. 25. FIG. 30 is a cross-section view of a light source device along the one-dot chain line GH in FIG. 25. FIG. 31A is a cross-section view of a light source device along the one-dot chain line GH in FIG. 25. FIG. 31B is a cross-section view of a light source device along the one-dot chain line IJ in FIG. 25. In the drawings, the same signs denote the same or corresponding portions, and detailed description of these will be reduced or omitted.

A light guide 308 is a columnar light guide that guides light input from the end faces (light inputters) 358 from the light emitters 356 and 357 (light-emitting elements 310 and 311) in the lengthwise direction (the main scanning direction of the image scanning device, simply designated the main scanning direction), and outputs the light from side faces (light outputters) 321 and 322. The light guide 308 is preferably made of a transparent resin.

At least one column of light scattering parts is formed in the light guide 308 along the main scanning direction, either continuously or spaced by a designated interval. In this specification, the case in which two columns of light scattering parts 318 and 319 are formed will be used for description. Note that the light outputters 321 and 322 respectively indicate positions facing opposite the light scattering parts 318 and 319 in the light guide 308. Consequently, in the case in which the light scattering parts 318 and 319 are formed in two columns, the light outputters 321 and 322 are also arranged in two columns in the main scanning direction, but depending on the positional relationship between the light scattering parts 318 and 319, some or all of the area of the two columns of the light outputters 321 and 322 may overlap.

This specification includes drawings that omit labeling the light outputters 321 and 322 with signs, and drawings that omit illustration of the light scattering parts 318 and 319. The light scattering parts 318 and 319 are at least formed in a portion that at least corresponds to an effective scanning area in the main scanning direction of the image scanning device.

A projection 359 is a projection formed on the lower part in the center of the light guide 308.

A light guide holder 309 is a member that covers the ends of the light guide 308, including the end faces 358, except for at least one part of the end faces 358 (a portion necessary to input light from the light-emitting elements 310 and 311) and a side face of a portion that outputs light. The portion of the light guide holder 309 that faces opposite the light guide 308 preferably has a color with good reflectivity, such as white, but is not limited thereto.

The light guide holder 309 locks the light guide 308 with a light guide locker 361. Pins (first projections) 325 and 326 are projections respectively formed at both ends of the light guide holder 309 in the lengthwise direction. A pin (second projection) 324 is a projection formed near the lengthwise center of the light guide holder 309. An interlocking hole 362 is an interlocking hole for the light guide 308, into which the projection 359 is inserted.

Optical filters 350 and 351 are filters that filter light from the light emitters 356 and 357 (light-emitting elements 310 and 311), or generate excitation light (which may also be complex light that also includes light with unconverted wavelengths) from the light from the light emitters 356 and 357 (light-emitting elements 310 and 311).

The optical filters 350 and 351 are filters that convert optical characteristics using glass, a PET resin sheet, or the like as a base material. For example, the optical filters 350 and 351 obtain excitation light using a phosphor or the like, or remove unwanted wavelengths like a band-pass filter. The optical filters 350 and 351 are affixed to holders 314 and 315 by adhesive bonding or the like. In the case in which the light-emitting elements 310 and 311 include secondary optical wavelengths other than the target wavelengths, it is necessary to insert the optical filters 350 and 351 into the light path to block the unwanted wavelength band. In the drawings, the same signs denote the same or corresponding portions, and detailed description thereof will be reduced or omitted.

The housing (planar member) 301 is a planar member that supports the light guide holder 309 and the holders 314 and 315, and is preferably made by sheet metal processing. The housing 301 indirectly supports the light guide 308 and the optical filters 350 and 351 (in the case in which the substrates 312 and 313 do not contact the housing 301, the substrates 312 and 313 are also indirectly supported by the housing 301).

A planar member 363 is a flat member before the housing 301 is formed by bending, and is made of metal. Long holes 329 and 330 are long holes (holes elongated in the lengthwise direction) into which the pins 325 and 326 are inserted. An interlocking hole 328 is a hole for the light guide holder 309, into which the pin 324 is inserted.

Heat transfer bodies 316 and 317 are sheet members that transfer heat from the substrates 312 and 313 to the housing 301. Note that the heat transfer bodies 316 and 317 may be formed by a grease-like material other than a sheet, such as a thermally conducting compound, for example.

Screws 340 and 341 as well as screws 342 and 343 are inserted between and join the housing 301 to the holders 314 and 315, and the substrates 312 and 313 to the heat transfer bodies 316 and 317. FIGS. 21 to 41 omit illustration of the screws 340 to 343. Screw holes for the screws 340 to 343 are drilled into the holders 314 and 315, the substrates 312 and 313, and the heat transfer bodies 316 and 317 (in the case of sheets). The screw holes in the substrates 312 and 313 and the heat transfer bodies 316 and 317 may also be simple, unthreaded through-holes. The heat transfer bodies 316 and 317 may also be omitted.

A reflector (mirror) 302, laid parallel to the light guide 308 in the lengthwise direction, reflects secondary light (details discussed later) output from the light guide 308, and irradiates in the direction of a document receptacle of the image scanning device (the direction in which exists the object to be scanned by the image scanning device, such as a document or banknote). The reflector 302 comprises a vapor-deposited metal face or the like, and is a thin plate or sheet member extending in the lengthwise direction.

A reflector support 320 is a site on which the planar member 363 that supports the reflector 302 is bent and formed. The reflector support 320 is multiply disposed along the main scanning direction spaced by a designated interval, and supports the reflector 302. The reflector support 320 is sloped, and thus may also be called a sloped face.

The reflector 302 is affixed to the reflector support 320 by adhesion or the like, and is kept at a suitable distance and angle with respect to the light guide 308 and the document receptacle 147 (the position at which exists the object to be scanned by the image scanning device, such as a document or banknote).

The light guide holder fixtures 353 are sites formed by bending the planar member 363 that holds down the light guide holder 309. The light guide holder fixtures 353 are multiply (or singularly) disposed along the main scanning direction (lengthwise direction) spaced by a designated interval. With the light guide holder fixtures 353 and the bottom face of the housing 301 (the floor having a rectangular shape), the housing 301 holds the light guide holder 309 therebetween. In the drawings, the same signs denote the same or corresponding portions, and detailed description of these will be reduced or omitted.

A plurality of planar ends (reflector 302 side) 364 are the portions other than the plurality of reflector supports 320 on one end along the main scanning direction (lengthwise direction) of the housing 301, and are respectively continuous with the housing 301 (planar member 363).

A plurality of planar ends (light guide holder 309 side) 365 are the portions other than the light guide holder fixtures 353 on one end along the main scanning direction (lengthwise direction) of the housing 301, and are respectively continuous with the housing 301 (planar member 363).

The screw holes 352 are a connection interface member for attaching the housing 301 (planar member 363) of the light source device to the image scanning device body (or alternatively, a carriage of the image scanning device).

Fasteners 354 and 355 include screw holes that allow passage of the screws 340 to 343, and are formed on the housing 301. The light guide holder 309, the light emitters 356 and 357, and the heat transfer bodies 316 and 317 are fastened by the screws 340 to 343.

Illustration of the carriage is omitted. Note that the planar member 363 (housing 301) near the screw holes 352 and the screw holes 352 may be eliminated, and the fasteners 354 and 355 may be formed as the ends of the planar member 363 (the side faces in the widthwise direction of the housing 301).

An aperture (reflected light transmission hole) 327 is a hole formed in the housing 301 allowing passage of reflected light from light radiated onto the object to be scanned by the image scanning device (such as a document or banknote). Note that the transport direction of the object to be scanned is the widthwise direction of the light source device (the sub scanning direction of the image scanning device, simply designated the sub scanning direction). The main scanning direction and the sub scanning direction intersect each other, and most typically are orthogonal.

The integral end 366 is a site integrated with the tip of the planar end 364. In the drawings, the same signs denote the same or corresponding portions, and detailed description of these will be reduced or omitted.

The shape of the end faces 358 of the light guide 308 or the lengthwise cross-sectional shape of the light guide 308 in a light source device according to Embodiment 3 may also not be cylindrical as illustrated in FIGS. 21 to 41. These shapes may also be polygonal, gourd-shaped, irregular, or a combination thereof, for example.

Similarly, the outer shape of the portion of the light guide holder 309 inserted into the holders 314 and 315, or the inner shape of the portion of the holders 314 and 315 that accept the insertion of the light guide holder 309 may also not be cylindrical. These shapes may also be polygonal, gourd-shaped, irregular, or a combination thereof, for example.

It is sufficient for the relationship between the light guide holder 309 and the holders 314 and 315 to be such that either the portion of the light guide holder 309 that is inserted into the holders 314 and 315 contacts the holders 314 and 315 and allows the light guide holder 309 to slide, or the portion of the light guide holder 309 that is inserted into the holders 314 and 315 does not contact the holders 314 and 315 and allows the light guide holder 309 to stretch. Although discussed in detail later, even in the case in which the portion of the light guide holder 309 that is inserted into the holders 314 and 315 does not contact the holders 314 and 315, it is necessary to make the majority of light emitted from the light emitters 356 and 357 not bleed from the gap between the holders 314 and 315 and the light guide holder 309.

The light guide holder 309 does not only hold the light guide 308, but also suppresses unintentional light from the light emitters 356 and 357 as well as the light guide 308. The light guide holder 309 takes a suitable position with the housing 301 (planar member 363) at the following three points on the housing 301.

Namely, the three points are the two pins 325 and 326 and the two long holes 329 and 330, and the pin 324 and the interlocking hole 328. The light guide holder 309 is shorter than the entire length of the planar member 363. The end faces of the light guide holder 309 face opposite the end faces of the holders 314 and 315, and the gap length therebetween is longer than the amount of expansion due to the temperature characteristics of the light guide holder 309. As discussed earlier, since the light guide 308 is not completely affixed in the lengthwise direction, the light guide 308 is held in the widthwise direction without bowing, even in the case in which the light guide holder 309 stretches due to temperature changes.

The light guide holder 309 holds the entire circumference of the light guide 308 at the ends, and has an opening (the light guide holder 309) that exposes the light outputters 321 and 322 in the center part. The portions of the light guide holder 309 that hold the entire circumference of the light guide 108 at the ends are inserted into the holders 314 and 315.

Figure 21:
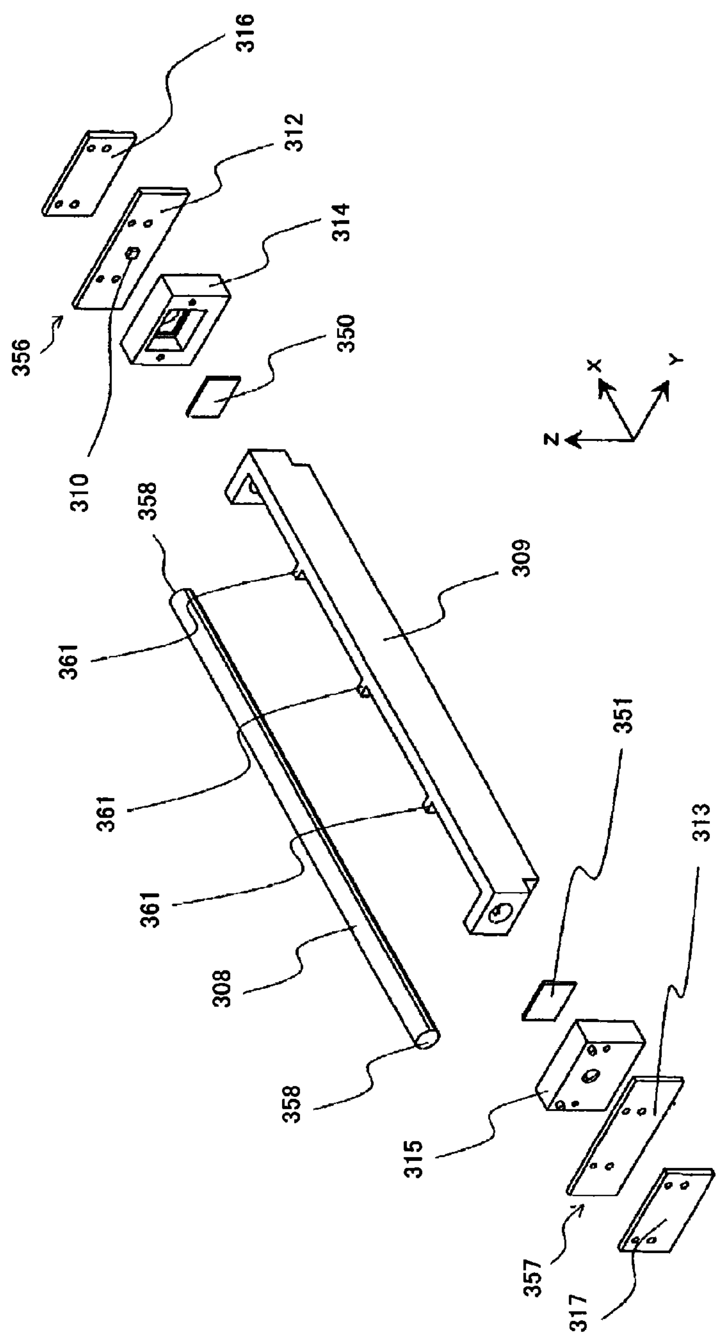
FIG. 21 is an exploded perspective view of a light guide and nearby in a light source device according to Embodiment 3 of the present invention.

FIG. 21 illustrates a light source device before placing the light guide holder 309 into the planar member 363 that forms the housing of the light source device in a light source device according to Embodiment 3. As illustrated in FIG. 21, holes that cover the circumference of the end faces 358 of the light guide 308 are formed in both lengthwise ends of the light guide holder 309. The portion of the light guide holder 309 with the holes that cover the end faces 358 may be inserted into the holders 314 and 315 (in the case of Embodiment 3).

The holders 314 and 315 include a communicating first opening and second opening, and may be referred to as that which slidably holds the ends of the light guide holder 309 and the light guide 308 supported by the light guide holder 309 in the lengthwise direction on the first opening side. Note that in this specification, the light guide 308 and the light guide holder 309 are described under presumption of the case of using resin with the same or approximately the same expansion ratio.

With the light guide 308 of a light source device according to Embodiment 3, the projection 359 is inserted into and interlocked with the interlocking hole 362 of the light guide holder 309, and both ends are respectively disposed inside the holes at both ends of the light guide holder 309. In addition, the light guide locker 361 is a member that does not affix lengthwise stretching of the light guide 308, but restricts lengthwise bowing and sagging of the light guide 308, and is a member that keeps the light guide 308 from disengaging from the light guide holder 309. Since it is sufficient for the light guide 308 and the light guide holder 309 to have a mutually interlocking mechanism, the relationship between the projection 359 and the interlocking hole 362 may be reversed, such that an interlocking hole is formed in the light guide 308, and a projection is formed on the light guide holder 309.

As illustrated in FIG. 21, two pins for holding the substrates 312 and 313 as well as the heat transfer bodies 316 and 317 are formed in the holders 314 and 315 on the reverse face (second opening side) of the face into which the light guide holder 309 is inserted (first opening side). In correspondence with these pins, pin holes are formed in each of the substrates 312 and 313 as well as the heat transfer bodies 316 and 317. By aligning the substrates 312 and 313 with the heat transfer bodies 316 and 317, passing the pins of the holders 314 and 315 through the pin holes, and fastening the screws 340 to 343 to the fasteners 354 and 355 of the housing 301 (planar member 363), the substrates 312 and 313, the heat transfer bodies 316 and 317, and the holders 314 and 315 are affixed.

Consequently, a light source device according to Embodiment 3 enters a state in which the light-emitting elements 310 and 311 (light emitters 356 and 357) are disposed in the second opening of the holders 314 and 315, and the optical filters 350 and 351 are supported between the first opening and the second opening of the holders 314 and 315 while maintaining a designated interval with the light-emitting elements 310 and 311 (light emitters 356 and 357). Details will be given in the description using FIG. 3 discussed later.

In this specification, although the light emitters 356 and 357 as well as the holders 314 and 315 are described as being formed on both end face sides of the light guide 308, the light emitters 356 and 357 as well as the holders 314 and 315 may also be formed on only one end face side of the light guide 308. In this case, the second opening may be sealed on the end of the light guide 308 without a light emitter 356 or 357, and a holder 314 or 315 lacking a light emitter 356 or 357 may be placed. Also, a reflecting member may be provided instead of an optical filter 350 or 351 inside a holder 314 or 315 (including the end face of the light guide 308) in this state.

Figure 22:
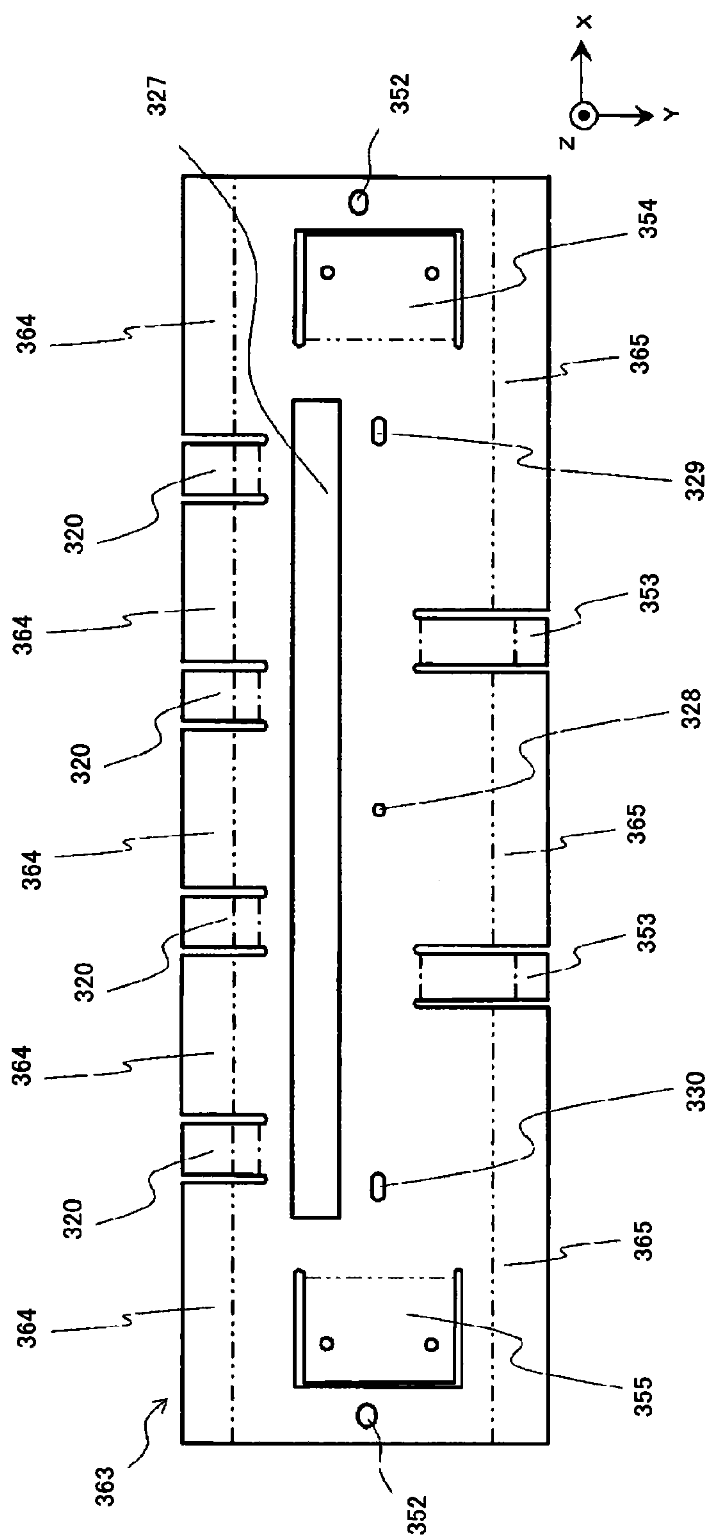
FIG. 22 is a plan view (pre-bending) of a planar member that forms the housing of a light source device according to Embodiment 3 of the present invention.

FIG. 22 illustrates a pre-bending planar member 363 that will become a housing 301 of a light source device according to Embodiment 3. The planar member 363 is formed by sheet metal with good heat dissipation, such as aluminum. The planar member 363 is provided with cut-outs or openings (holes) for forming the long holes 329 and 330, the interlocking hole 328, the reflector supports 320 (planar ends 363), the light guide holder fixtures 353 (planar ends 363), the screw holes 352, the fasteners 354 and 355, and the aperture 327.

Bending the planar member 363 along the one-dot chain lines and two-dot chain lines illustrated in FIG. 22 yields the housing 301 of a light source device according to Embodiment 3. Specifically, the planar member 363 illustrated in FIG. 22 is bent in valley folds along the two-dot chain lines. Similarly, the planar member 363 illustrated in FIG. 22 is bent in valley folds along the one-dot chain lines, but in the portions corresponding to the reflector support 320, the one-dot chain lines on the outermost periphery of the planar member 363 are bent in mountain folds in order to support the reflector 302. Since the expressions "valley folds" and "mountain folds" are relative expressions with respect to the face (front face) of the planar member 363 illustrated in FIG. 22, the folding directions of the valley folds and mountain folds are reversed in the case of viewing the reverse face (back face) of the face (front face) of the planar member 363 illustrated in FIG. 22.

To describe in further detail, by bending the planar member 363 inwards (in the direction coming out of the page of the drawing) along the two-dot chain lines illustrated in FIG. 22, there is formed a box-shaped housing 301 (planar member 363) whose cross-section in the sub scanning direction (short-edge direction) is U-shaped.

Namely, by bending, there is formed a floor (bottom face) having a rectangular shape. On the long edge on one side of the this floor, there is a long-edge wall bent inwards (planar ends 364, planar ends 365, integral end 366), and on the other long edge of the floor, bent inwards at a designated angle from the widthwise direction of the floor, there are short-edge walls (fasteners 354 and 355) bent inwards on the short edge of the floor. Note that heatsinks continuous with the short-edge walls, bent in the lengthwise direction, and extending in the lengthwise direction facing in the direction opposite the long-edge wall with respect to the reflector support 320 (sloped face) may also be formed (although not illustrated in the drawings, heatsinks are formed on the side of the reverse face of the reflecting face of the reflector 302). Also, as discussed earlier, the housing 301 (planar member 363) near the screw holes 352 and the screw holes 352 may be eliminated, and the short-edge walls (fasteners 354 and 355) may be formed as the ends of the planar member 363 (the side faces in the widthwise direction of the housing 301) (omitted from illustration).

Figure 23:
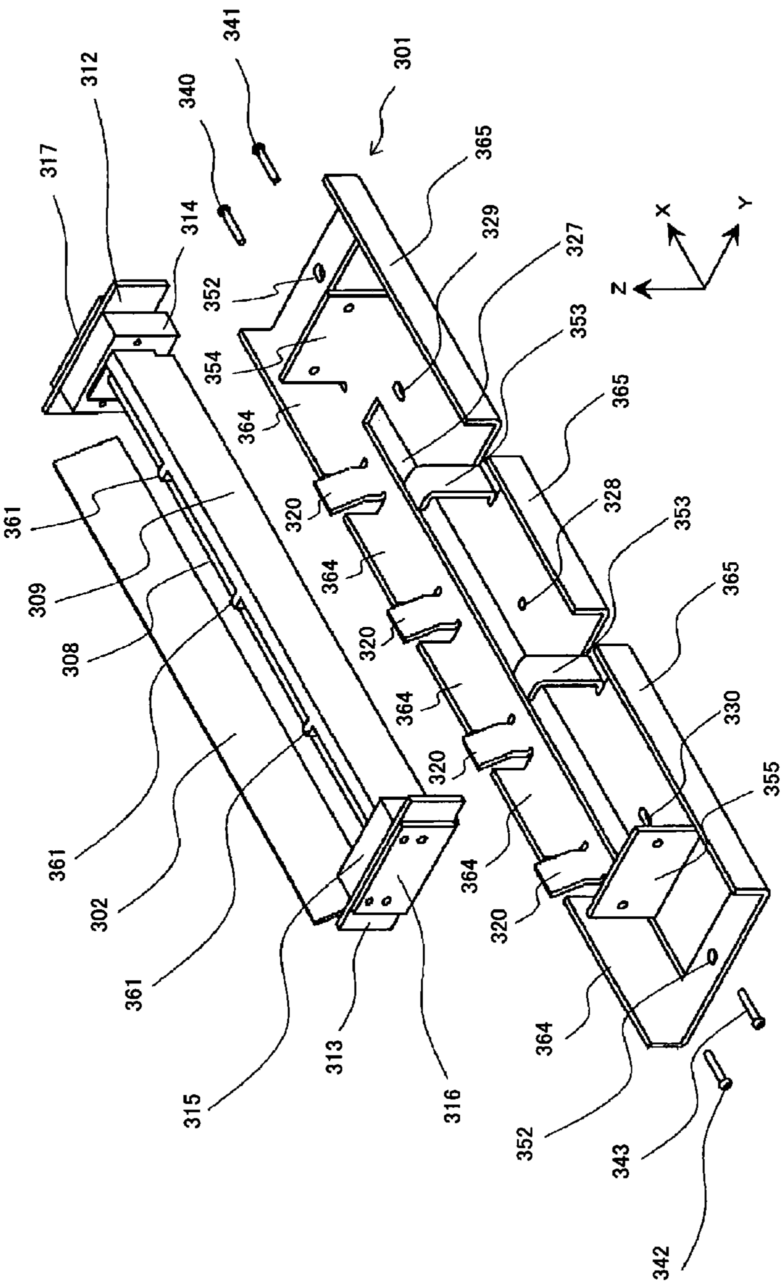
FIG. 23 is an exploded perspective view of a light source device according to Embodiment 3 of the present invention.
Figure 24:
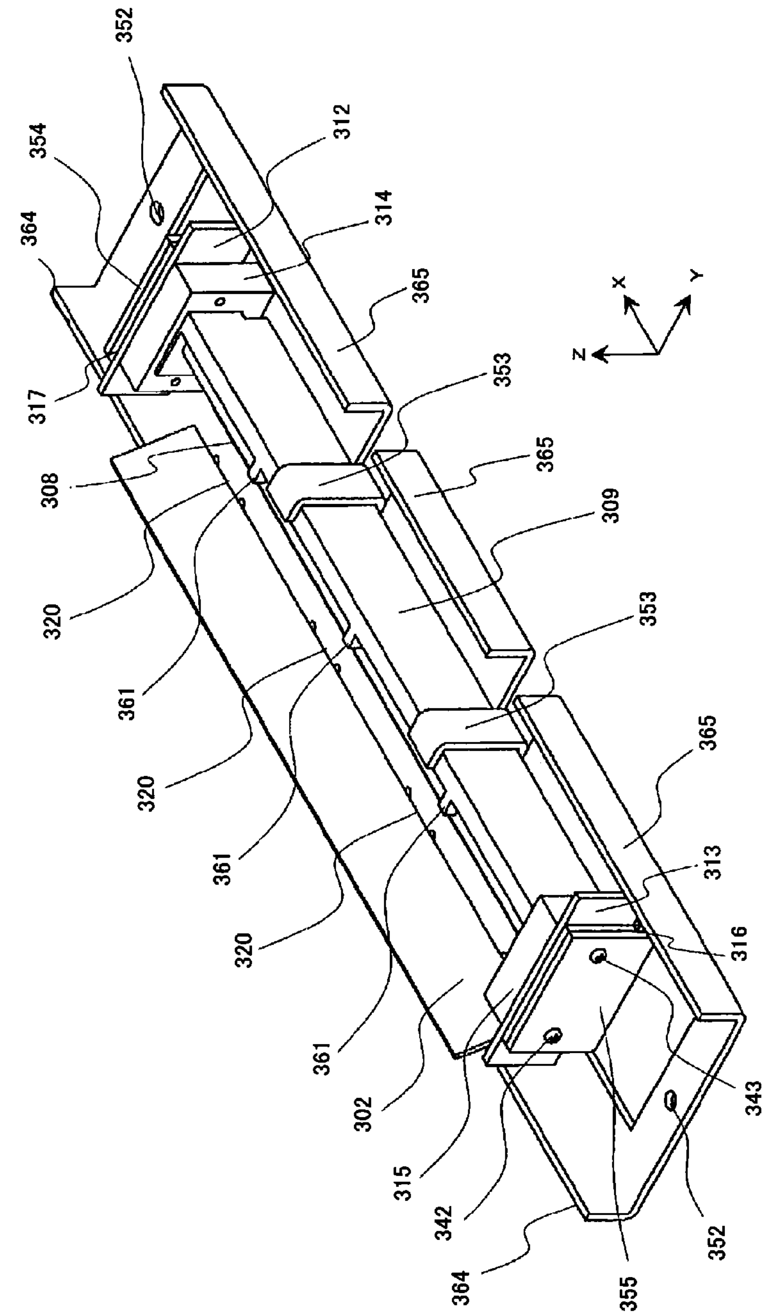
FIG. 24 is a perspective view of a light source device according to Embodiment 3 of the present invention.

FIG. 23 will be used to describe affixing the light guide holder 309 and the holders 314 and 315 to the post-bending housing 301. First, the pin 324 of the light guide holder 309, which is obscured by the light guide holder 309 and is not directly illustrated in FIG. 23, is inserted into and interlocked with the interlocking hole 328 of the housing 301. At this point, the pins 325 and 326 of the light guide holder 309 are simultaneously inserted into the long holes 329 and 330 of the housing 301.

Note that the pins 325 and 326 are inserted into long holes 329 and 330 so as to allow moving in the lengthwise direction. Consequently, the position of the light guide holder 309 in the lengthwise direction may be kept in a state along the main scanning direction of the light source device. Since it is sufficient for the light guide holder 309 and the housing 301 to have a mutually interlocking mechanism, the relationship between the pin 324 and the interlocking hole 328 may be reversed, such that an interlocking hole is formed in the light guide holder 309, and a pin (second projection) is formed on the housing 301. This applies in the same way to the relationship between the pins 325 and 326 and the long holes 329 and 330.

Subsequently, the holders 314 and 315 are affixed to the fasteners 354 and 355 of the housing 301 using the screws 340 to 343. At this point, the substrates 312 and 313 as well as the heat transfer bodies 316 and 317 are fastened together with the holders 314 and 315 by the screws 340 to 343. Consequently, heat produced at the substrates 312 and 313 is efficiently transferred to the housing 301 (fasteners 354 and 355) via the heat transfer bodies 316 and 317, and the heat produced at the substrates 312 and 313 is exhausted.

For example, the heat transfer bodies 316 and 117 are members with good adhesion and thermal conductivity, and comprise a sheet-like silicon sheet or the like that works to transfer heat. As discussed earlier, the heat transfer bodies 316 and 317 are positioned between the substrates 312 and 313 and the fasteners 354 and 355. The housing 301 has a role of allowing heat from the light emitters 356 and 357 (the light-emitting elements 310 and 311 and the substrates 312 and 313) to escape. Heat produced from the light emitters 356 and 357 passes through the substrates 312 and 313 and is transferred to the fasteners 354 and 355 via the heat transfer bodies 316 and 317. From the fasteners 354 and 355, heat is distributed throughout the entire housing 301.

FIGS. 24 to 27 illustrate a light source device according to Embodiment 3 of the present invention. Namely, FIGS. 24 to 27 illustrate the state after affixing the light guide holder 309 and the holders 314 and 315 to the post-bending housing 301. Note that the fasteners 354 and 355 fastening the light emitters 356 and 357 (substrates 312 and 313) may be referred to as that which fastens, either directly or via the heat transfer bodies 316 and 317, to the portion of the housing 301 (planar member 363) that is bent in the lengthwise direction. In FIGS. 24 to 27, the planar ends 364 and the planar ends 365 are lower than the light guide holder 309, the holders 314 and 315, and the reflector 302 in the thickness direction (height direction), but the dimensions of the housing 301 (planar member 363) may also be modified to make the planar ends 364 and the planar ends 365 higher than the light guide holder 309, the holders 314 and 315, and the reflector 302.

FIG. 28 is a cross-section view near the center of the light guide 308 in the lengthwise direction in a light source device according to Embodiment 3. As illustrated in FIG. 28, for the light guide 308, although the near-center of the light guide 308 is affixed to the light guide holder 309 (interlocking hole 362) by the projection 359, both ends of the light guide 308 are inserted into the holes of the light guide holder 309, and thus stretching of the light guide 308 in the lengthwise direction due to temperature changes are not restricted by the light guide holder 309. For the light guide holder 309, although the near-center of the light guide holder 309 is affixed to the housing 301 (interlocking hole 328) via the pin 324, since the pins 325 and 326 are inserted into the long holes 329 and 330, stretching of the light guide holder 309 in the lengthwise direction due to temperature changes are not restricted by the housing 301.

As illustrated in FIGS. 24 to 28, the light guide holder 309 covers the light guide 308 throughout the lengthwise direction, except for at least the side faces (light outputters) 321 and 322 from which the light guide 308 outputs light.

Particularly, as illustrated in FIG. 28, the light guide holder 309 includes two pins 325 and 326, and is placed onto the housing 301 extending in the lengthwise direction. The housing 301 includes two long holes 329 and 330 formed in the lengthwise direction. The pins 325 and 326 are inserted into the long holes 329 and 330.

Similarly, the light guide holder 309 includes a pin 324. The housing 301 includes an interlocking hole 328 formed on the reverse side of the side light emitters 356 and 357 along the lengthwise direction with respect to the long holes 329 and 330. The pin 324 is inserted into the interlocking hole 328. Since the pin 324 is formed in the center part of the light guide 308 in the lengthwise direction, the light guide 308 expands and contracts from the center part of the light guide 308 as a point of origin, even in the case of expanding or contracting due to surrounding temperature changes. Particularly, the pin 324 and the interlocking hole 362 of the light guide holder 309 may be placed so as to be included in the same cross-section in the sub scanning direction (widthwise direction).

Consequently, in the case of using materials with close expansion ratios for the light guide 308 and the light guide holder 309 as assumed above, by forming the pin 324 in the center part of the light guide 308 in the lengthwise direction, the light guide 308 does not project out from the light guide holder 309.

Even in the case in which the expansion ratio of the light guide 308 is greater than the expansion ratio of the light guide holder 309, by forming the pin 324 in the center part of the light guide 308 in the lengthwise direction, it is easy to adjust the length in the lengthwise direction so that the light guide 308 does not project out from the light guide holder 309. In this case, it is necessary to set the thickness of the holes covering the circumference of the end faces 358 of the light guide 308 on the light guide holder 309 formed at both ends in the lengthwise direction so that the light guide 308 does not slip out of the holes (light guide holder 309). Even in the case of slipping out of the holes (light guide holder 309), there is no problem if the orientation of the light guide 308 may be maintained by the interlocking state between the light guide 308 and the light guide holder 309 or the light guide locker 361.

Also, even in the case of setting the light guide 308 to dimensions such that the light guide 308 (the end faces 358 of the light guide 308) project out from the light guide holder 309 due to expansion of the light guide 308, the pin 324 is formed in the center part of the light guide 308 in the lengthwise direction, and thus the length of the light guide 308 projecting out from the light guide holder 309 becomes the same length at both ends of the light guide holder 309. Accordingly, taking the length of a projecting light guide 308 into account, the positional relationship between the light guide holder 309 and the holders 314 and 315 (the positions of the optical filters 350 and 351 inside the holders 314 and 315) may be set so that the light guide 308 and the holders 314 and 315 (optical filters 350 and 351) do not contact.

Next, illumination operation of a light source device according to Embodiment 3 will be described with FIGS. 29 and 30. The light source device is used as lighting for an image scanning device, and FIG. 30 illustrates a scanning device platen (document receptacle) and an object to be scanned by the image scanning device. As illustrated in FIG. 29, of the light emitted from the light-emitting elements 310 and 311 (light emitters 356 and 357), light at a specific wavelength is selected (or light at a specific wavelength is blocked) by the optical filters 350 and 351, and light is input into the light guide 308 from light inputters (end faces 358). Alternatively, excitation light produced by the optical filters 350 and 351 (which may also be complex light that also includes light with unconverted wavelengths) is input into the light guide 308 from the end faces 358 that act as light inputters. Light from the light-emitting elements 310 and 311 input via the optical filters 350 and 351 is guided in the lengthwise direction while reflecting off the wall face inside the light guide 308.

The solid arrow in FIG. 29 illustrates an example of a light path of light emitted from a light-emitting element 310 or 311. Note that the light emitters 356 and 357 are light source elements (light-emitting elements 310 and 311) such as LED light sources that input light from the end faces 358 of the light guide 308, are affixed to the substrates 312 and 313 by soldering or the like, and emit light as a result of being current-driven by the substrates 312 and 313. In this specification, the illustration of traces or wiring inside and outside the substrates 312 and 313 is omitted from the drawings.

In this way, when light guided while reflecting off the interior of the light guide 308 hits the light scattering parts

318 and 319 formed in the light guide 308, the light is output from the side faces (light outputters) 321 and 322 that face opposite the light scattering parts 318 and 319.

Note that the light scattering parts 318 and 319 may be printed onto the light guide 308, or be prism patterns that make the surface of the light guide 308 uneven. In addition, the shape of the light scattering parts 318 and 319 obviously may be varied in the main scanning direction. In other words, the light guide 308 is formed with a transparent resin, and is a columnar member extending in the lengthwise direction whose side-face shape is a cylindrical shape and which includes the light scattering parts 318 and 319 at two locations extending over the entire lengthwise direction. As discussed earlier, the side-face shape of the light guide 308 is not limited to a cylinder, and the end face of the light guide 308 is not limited to a circle.

In FIG. 30, light (primary light) output from one of the light outputters 321 and 322 proceeds diagonally with respect to the sub scanning direction, and irradiates the object to be scanned via the platen (transparent plate) of the scanning device. Light (secondary light) output from the other of the light outputters 321 and 322 proceeds approximately parallel to, or at a shallow angle with respect to the light output from the one of the light outputters 321 and 322, with respect to the sub scanning direction, is reflected by the reflector 302, and irradiates the object to be scanned via the platen (transparent plate) of the scanning device.

In other words, the reflector 302 is a member that is laid parallel to the light guide 308 in the lengthwise direction, reflects secondary light output from the light guide 308, and radiates that light in the direction of the object to be scanned. The reflector 302 comprises a vapor-deposited metal face or the like, and is a thin plate or sheet member extending in the lengthwise direction. The reflector 302 keeps a suitable distance and angle with respect to the light guide 308, the platen (transparent plate) of the scanning device, and the object to be scanned. Although light is differentiated into "primary light" and "secondary light" depending on the light path, this does not denote a superiority or inferiority in various parameters of the light, such as intensity or brightness.

Light output from the light guide 308 and radiated onto the object to be scanned reflects off the object to be scanned, and via the aperture 327, is formed into an image through the image-forming optical system of the scanning device (such as a reducing optical system, an erecting life-size optical system, an off-axial optical system, or a telecentric (bi-telecentric) optical system), and converted into data by a light-sensing part.

Note that although the platen of the scanning device is not a required component, in the case in which a platen exists, it is necessary to decide on the placement of the light outputters 321 and 322 and the light scattering parts 318 and 319 of the light source device while accounting for the refractive index of the platen. Additionally, for the transport of the object to be scanned, a method of transporting the object to be scanned itself (movement in the sub scanning direction) may be adopted, or a method of transporting a carriage (image scanning device) mounted with the light source device (movement in the sub scanning direction) may be adopted.

Although omitted from illustration in the drawings, in the case in which the image-forming optical system implemented in a light source device according to Embodiment 3 (this specification) is an erecting life-size optical system, the aperture 327 extending in the main scanning direction may also be a rod lens holding part that holds a rod lens (rod lens array). In this case, the one-dot chain line illustrated in FIG. 30 becomes the optical axis of the rod lens. Furthermore, a substrate (sensor substrate) with a light-sensing part (sensor) formed thereon may be placed on the bottom of the rod lens holding part (in the case in which the aperture 327 does not hold a rod lens, one of the focal points of the rod lens), and this sensor substrate may be directly or indirectly held by the planar member 363. In this case, the planar member 363 also doubles as the housing 301 of the image scanning device.

A detailed configuration and exemplary modifications of the planar member of a light source device (reflector support structure) according to Embodiment 3 will now be described with FIGS. 31A to 37C. FIG. 33A is a diagram that corresponds to a cross-section of a light source device along the one-dot chain line GH in FIG. 25. FIG. 33B is a diagram that corresponds to a cross-section of a light source device along the one-dot chain line IJ in FIG. 25.

Figure 25:
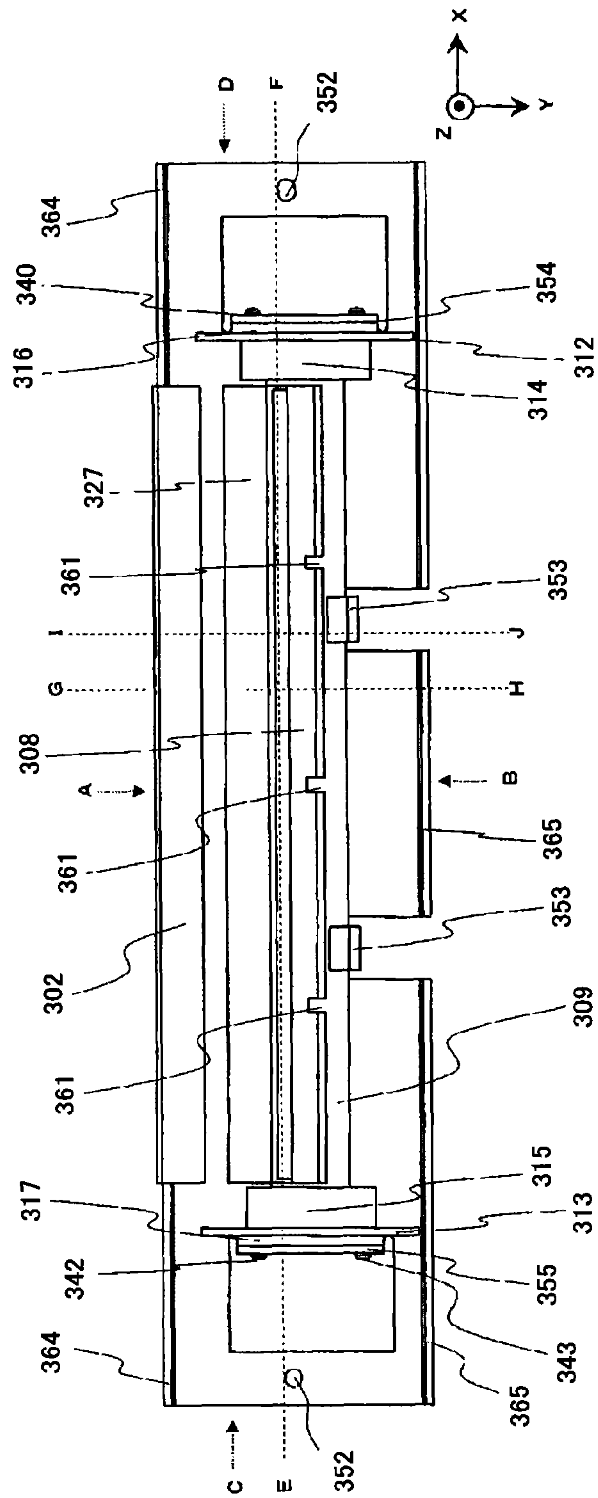
FIG. 25 is a plan view (top view) of a light source device according to Embodiment 3 of the present invention.
Figure 34A:
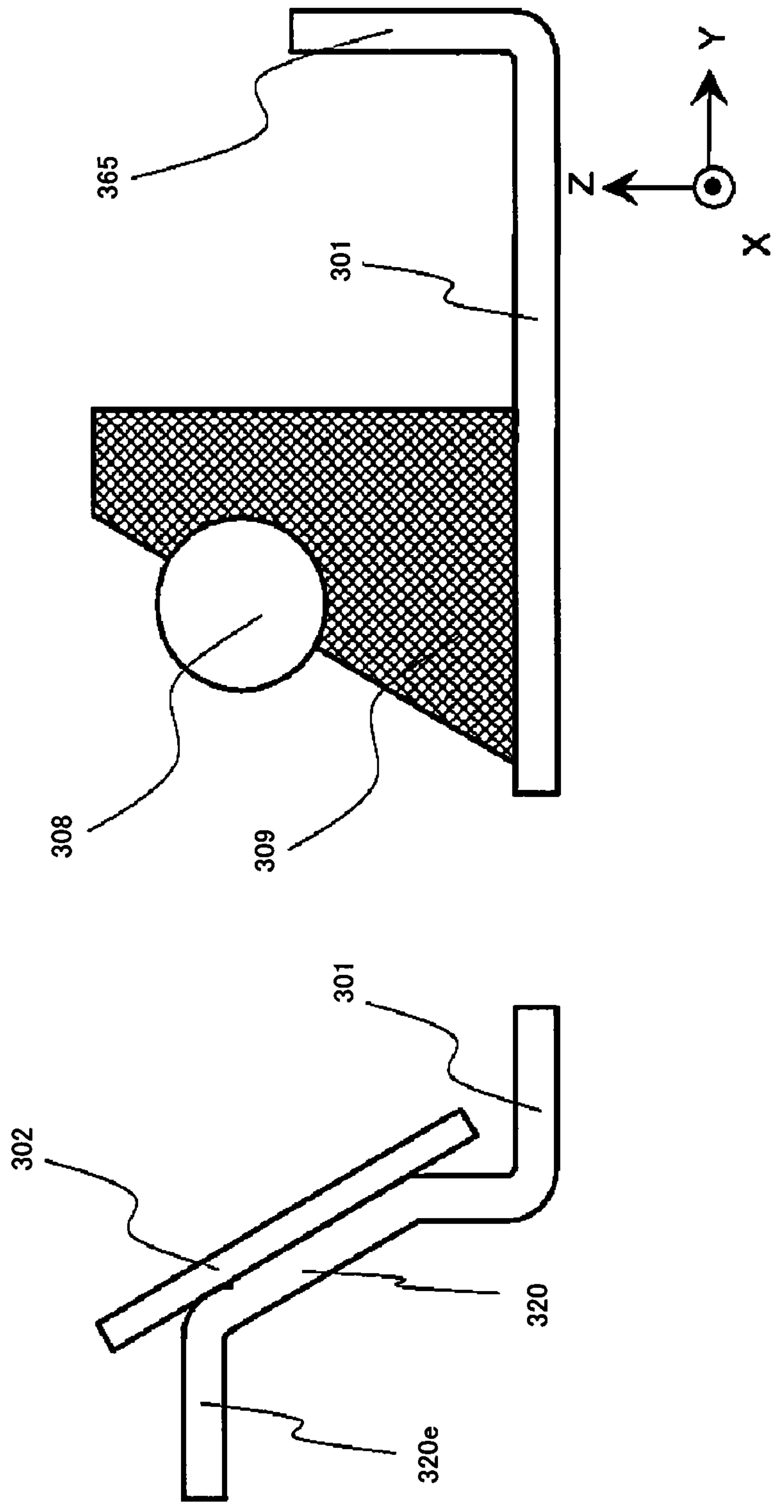
FIG. 34A is a cross-section view in the widthwise direction of a light source device according to Embodiment 3 of the present invention.
Figure 34B:
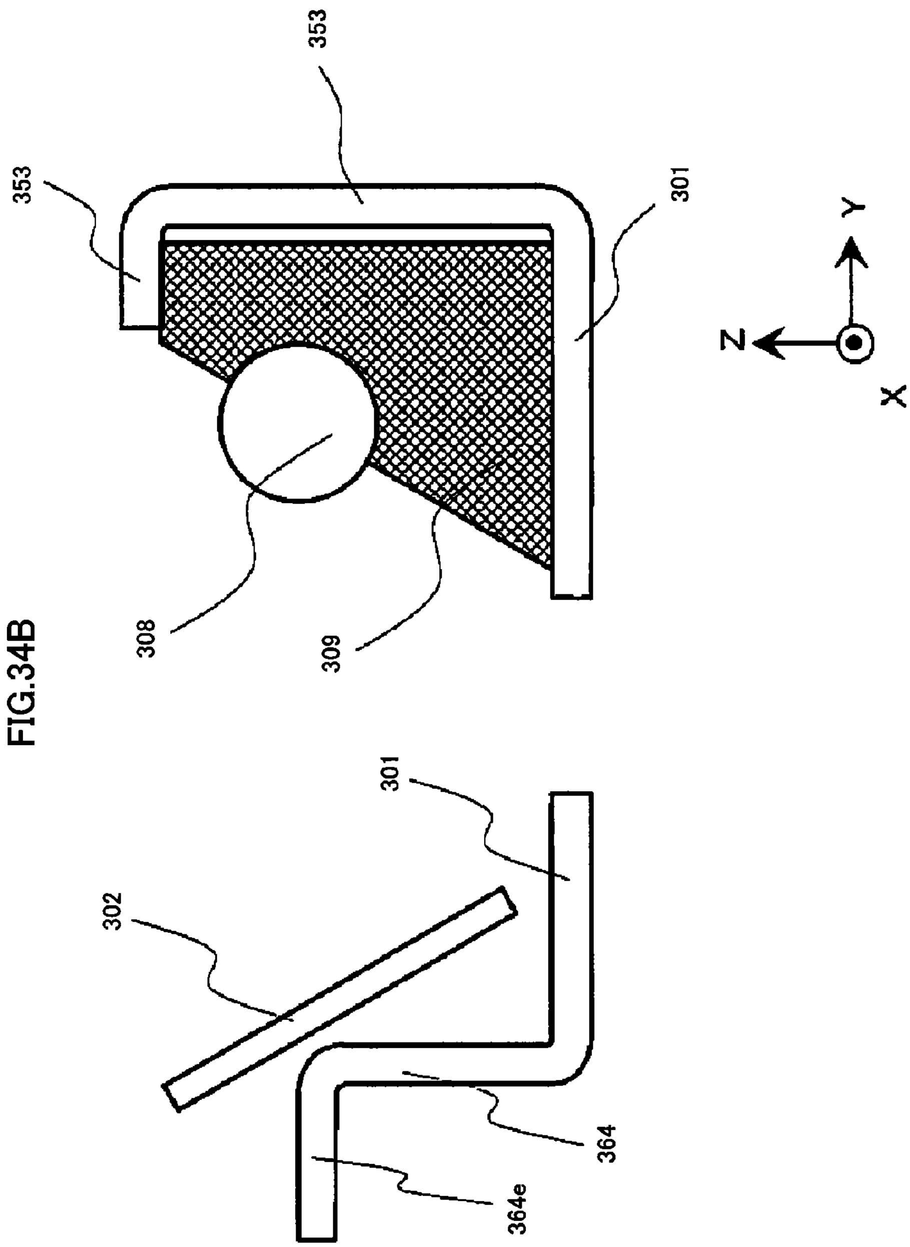
FIG. 34B is a cross-section view in the widthwise direction of a light source device according to Embodiment 3 of the present invention.

FIG. 34A is a diagram that corresponds to a cross-section of a light source device along the one-dot chain line GH in FIG. 25. FIG. 34B is a diagram that corresponds to a cross-section of a light source device along the one-dot chain line IJ in FIG. 25.

Figure 35A:
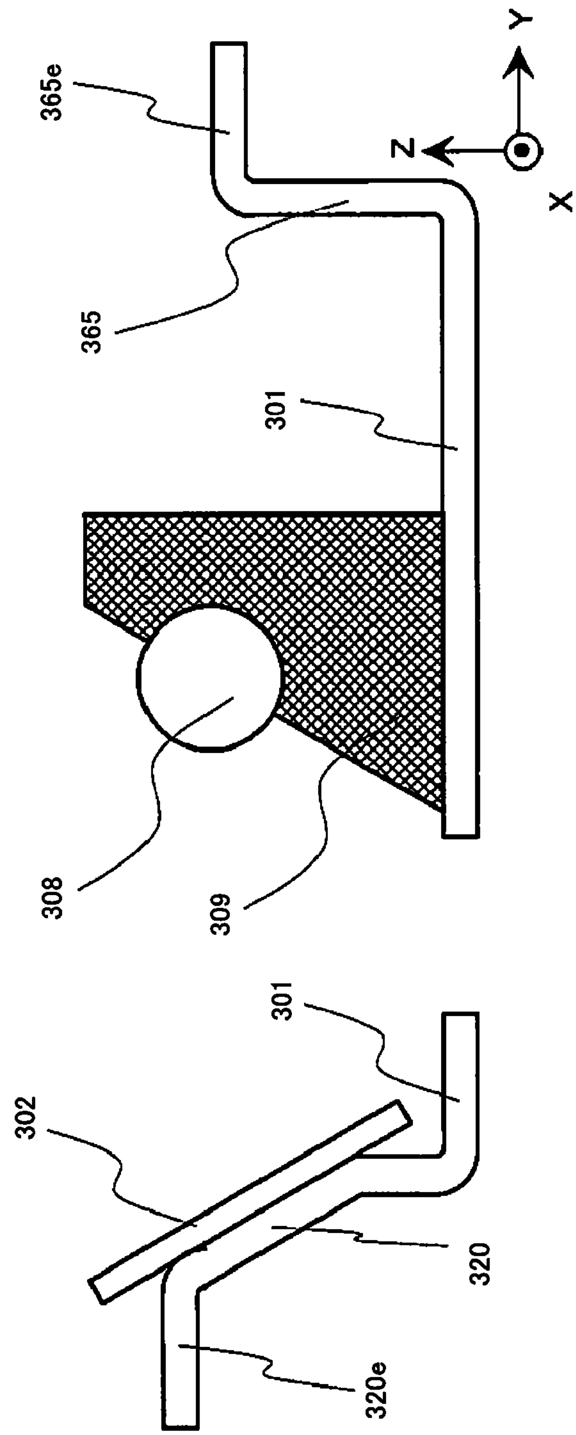
FIG. 35A is a cross-section view in the widthwise direction of a light source device according to Embodiment 3 of the present invention.
Figure 35B:
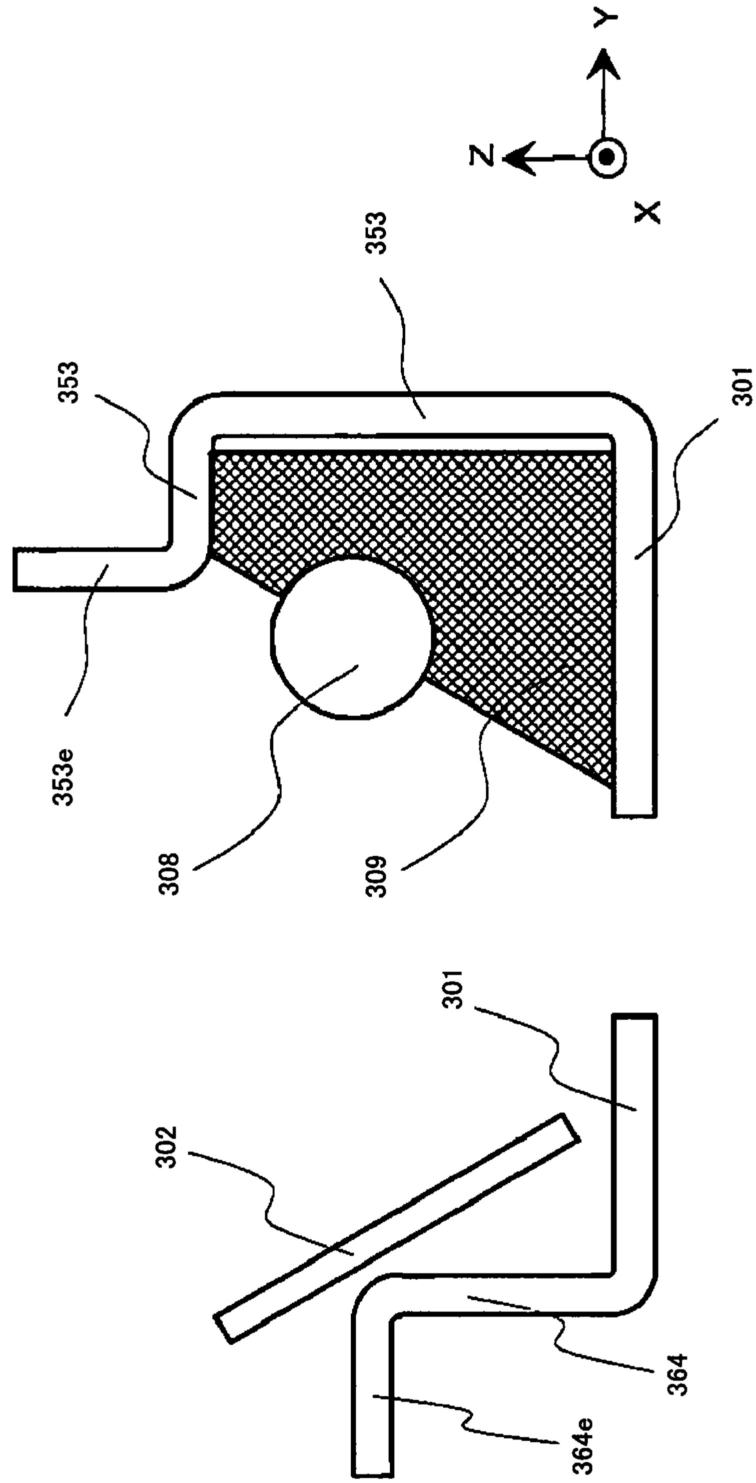
FIG. 35B is a cross-section view in the widthwise direction of a light source device according to Embodiment 3 of the present invention.
Figure 35C:
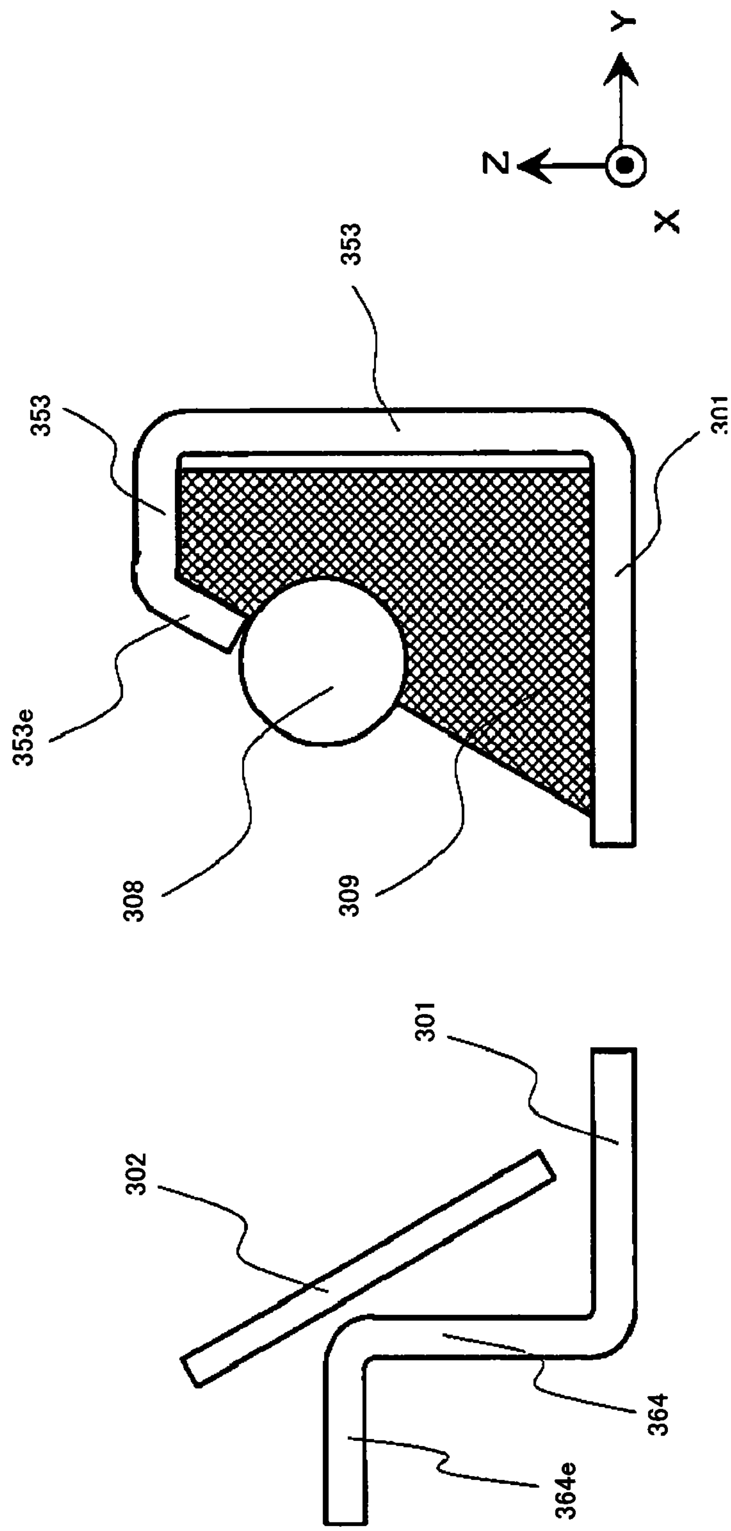
FIG. 35C is a cross-section view in the widthwise direction of a light source device according to Embodiment 3 of the present invention.

FIG. 35A is a diagram that corresponds to a cross-section of a light source device along the one-dot chain line GH in FIG. 25. FIG. 35B is a diagram that corresponds to a cross-section of a light source device along the one-dot chain line IJ in FIG. 25. FIG. 35C is a diagram that corresponds to a cross-section of a light source device along the one-dot chain line IJ in FIG. 25.

Figure 36A:
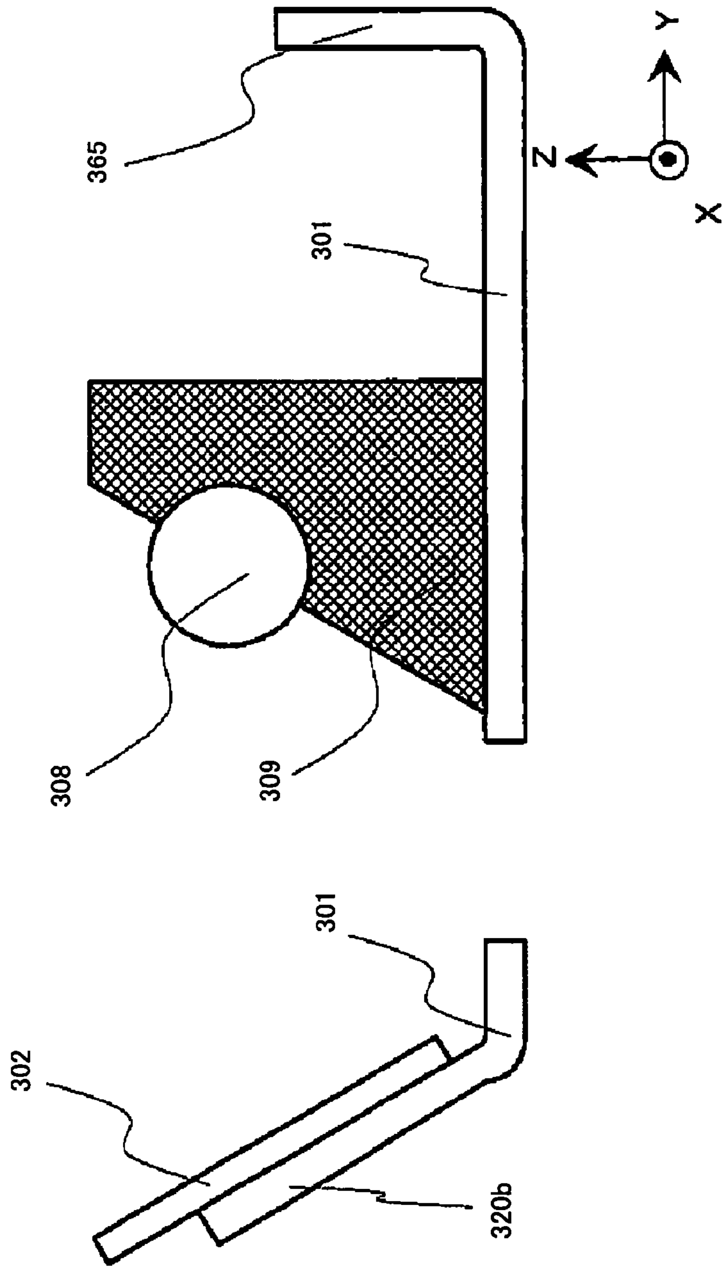
FIG. 36A is a cross-section view in the widthwise direction of a light source device according to Embodiment 3 of the present invention.
Figure 36B:
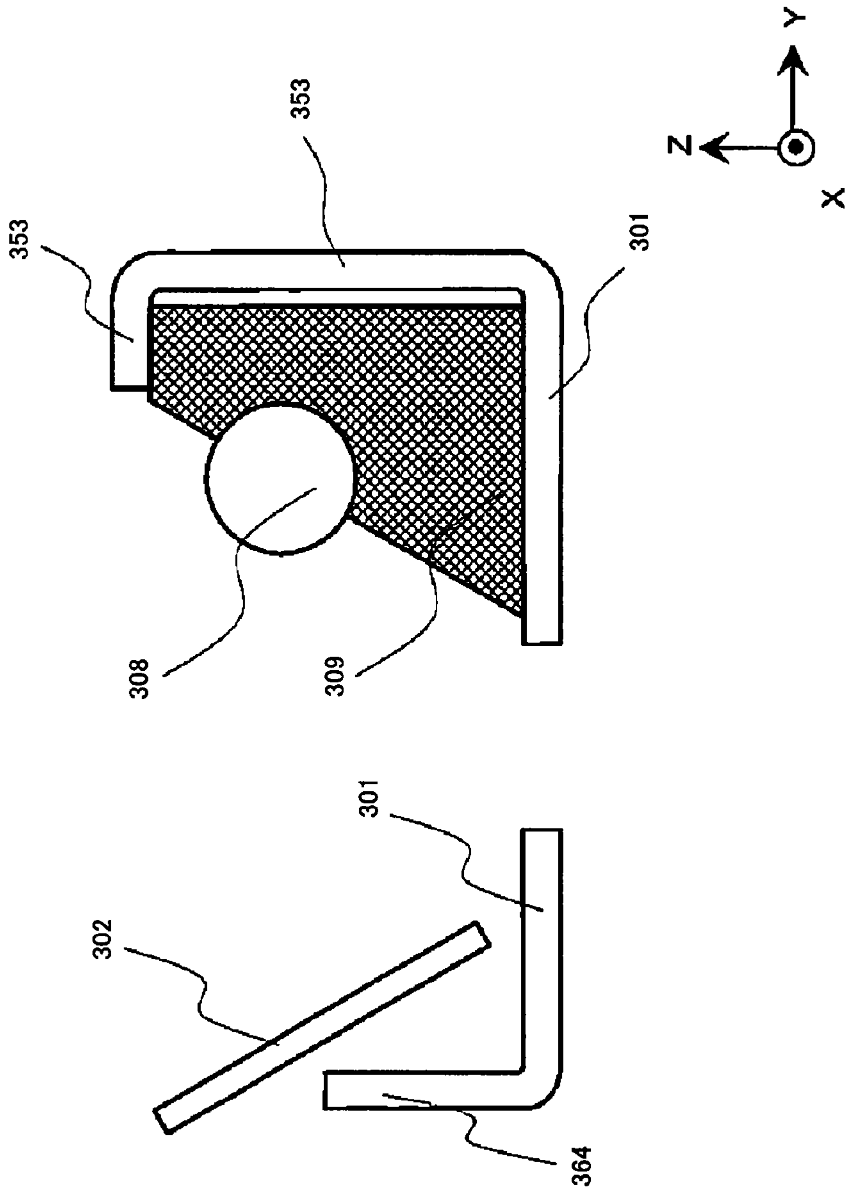
FIG. 36B is a cross-section view in the widthwise direction of a light source device according to Embodiment 3 of the present invention.

FIG. 36A is a diagram that corresponds to a cross-section of a light source device along the one-dot chain line GH in FIG. 25. FIG. 36B is a diagram that corresponds to a cross-section of a light source device along the one-dot chain line IJ in FIG. 25.

Figure 37A:
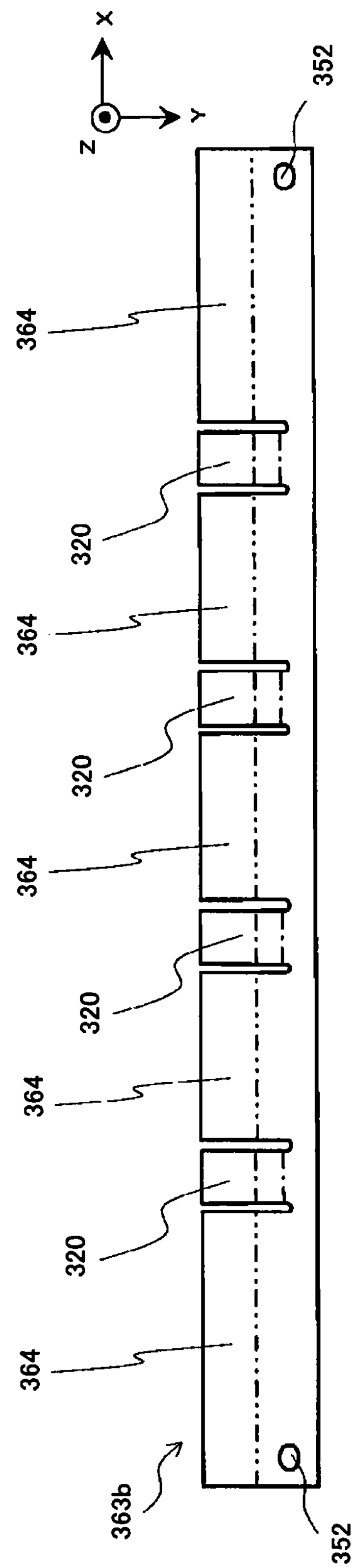
FIG. 37A is a plan view (pre-bending) of a planar member that forms the housing of a light source device (reflector support structure) according to Embodiment 3 of the present invention.
Figure 37B:
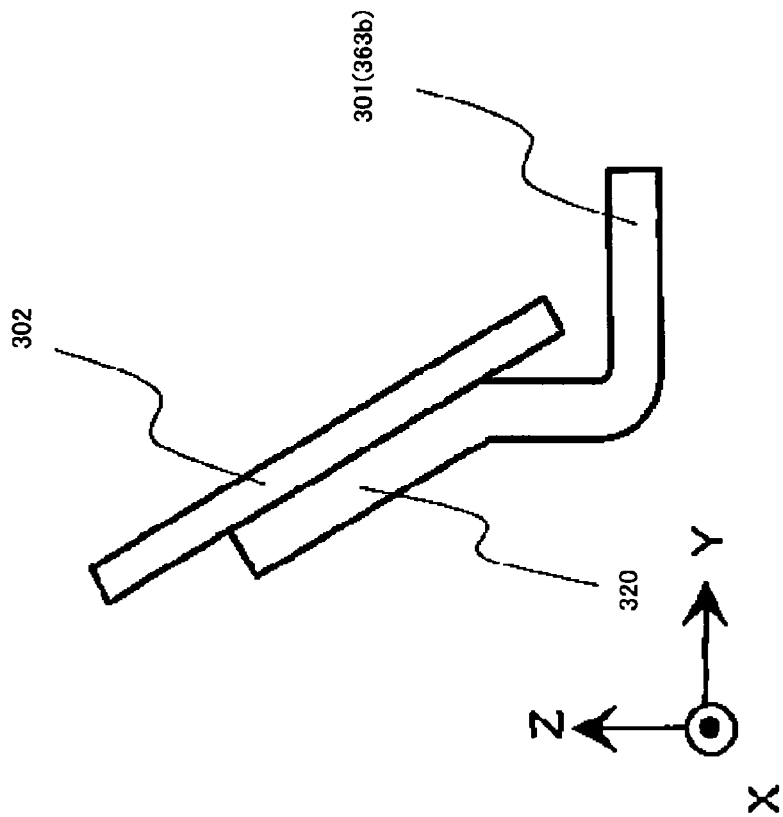
FIG. 37B is a cross-section view in the widthwise direction of a light source device (reflector support structure) according to Embodiment 3 of the present invention.
Figure 37C:
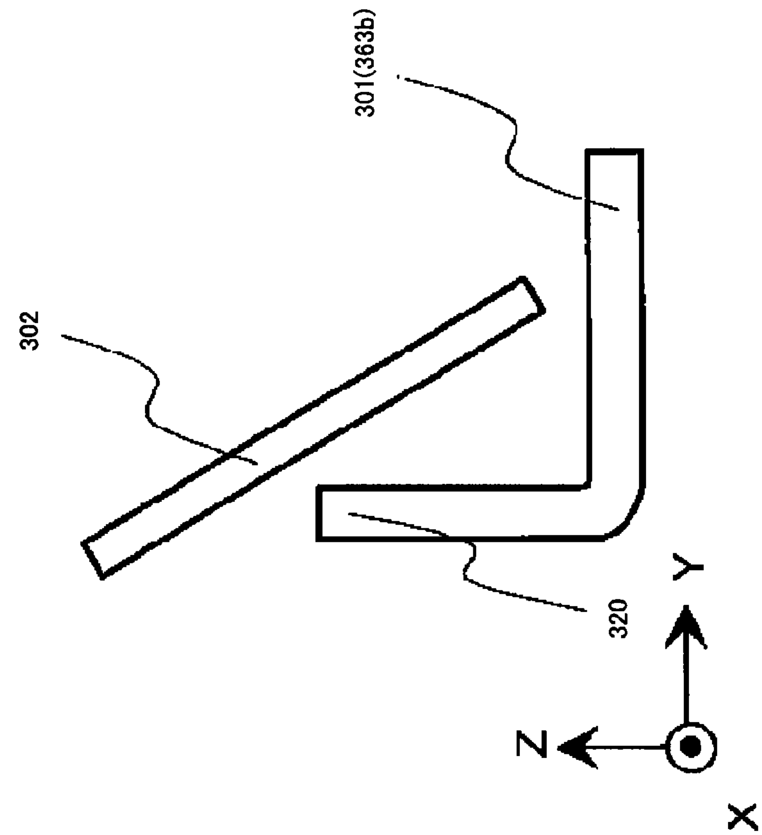
FIG. 37C is a cross-section view in the widthwise direction of a light source device (reflector support structure) according to Embodiment 3 of the present invention.

FIG. 37A is a plan view (pre-bending) of a planar member that forms the housing of a light source device (reflector support structure). FIG. 37B is a diagram that corresponds to a cross-section of a light source device (reflector support structure) along the one-dot chain line GH in FIG. 25. FIG. 37C is a diagram that corresponds to a cross-section of a light source device (reflector support structure) along the one-dot chain line IJ in FIG. 25.

In FIGS. 34A and 35A, the extended reflector support **320*e* is a connected site in which the tip part of the reflector support 320 is extended and curved with respect to the sub scanning direction. In FIGS. 35B and 35C, the extended light guide holder fixture 353*e* is a connected site in which the tip part of the light guide holder fixture 353 is extended and curved with respect to the sub scanning direction. In FIGS. 34B, 35B, and 35C, the extended planar end (reflector 302 side) 364*e* is a connected site in which the tip part of an extended planar end 364 (reflector 302 side) is extended and curved with respect to the sub scanning direction versus the main scanning direction. In FIG. 35A, the extended planar end (light guide holder 309 side) 365*e* is a connected site in which the tip part of an extended planar end 365 (light guide holder 309 side) is extended and curved with respect to the sub scanning direction versus the main scanning direction. In FIG. 36A, a reflector support (sloped face) 320*b* includes a portion curved in one location with respect to the sub scanning direction versus the main scanning direction. With respect to this reflector support (sloped face) 320*b*, the reflector support (sloped face) 320 discussed earlier includes a portion curved in two places with respect to the sub scanning direction. The planar member 363*b* illustrated in FIG. 37**A is in a flat state before being bent. In the drawings, the same signs denote the same or corresponding portions, and detailed description thereof will be reduced or omitted.

As illustrated in FIG. 31A, the reflector support 320 is a plural member that is placed on the side of the reflector 302 opposite the face that reflects light output from the side faces (light outputters) 321 and 322 of the light guide 308, disposed along the main scanning direction with a designated interval spaced therebetween, and supports the reflector 302.

In addition, the multiple reflector supports 320 are sites formed by respectively bending one end of the planar member 363 along the main scanning direction. Accordingly, the multiple reflector supports 320 are obtained by bending the planar member 363 that supports the reflector supports 320, and are thus integral with the planar member 363, and may be referred to as members that stand off the planar member 363 at an angle with respect to the sub scanning direction.

Furthermore, the reflector supports 320 may be referred to as members that include a portion curved with respect to the sub scanning direction.

Since multiple reflector supports 320 are formed on a light source device (reflector support structure) according to Embodiment 3, by simply setting the placement and sloping angle of each reflector support 320 individually, it is possible to install the reflector 302 easily and with good precision in the main scanning direction and the sub scanning direction. In other words, it becomes possible to prevent worsened installation precision of the reflector 302 due to bowing or sagging of a single plate in the main scanning direction and the sub scanning direction that is produced in the case of using a single plate as the support for the reflector 302.

Additionally, the multiple reflector supports 320 are disposed along the main scanning direction spaced by a designated interval, and support the reflector 302. For this reason, there is a lesser likelihood of sagging of the reflector 302 due to the weight of the reflector 302 itself, which may occur in the case of supporting the reflector 302 only at the ends of the reflector 302.

Note that the multiple reflector supports 320 include a portion curved with respect to the sub scanning direction besides the base end portion having an angle with respect to the planar member 363. In other words, the planar member 363 is bent in two locations.

In the housing 301 illustrated in FIGS. 31A and 31B, of one end along the main scanning direction, the portions other than the multiple reflector supports 320 respectively include multiple planar ends 364 continuous with the planar member. Because of the bent planar ends 364, the strength of the light source device (reflector support structure) according to Embodiment 3 is raised, and bowing or sagging is less likely.

In addition, by making the length of the planar ends 364 in the main scanning direction longer than the length of the reflector supports 320 in the main scanning direction, it is possible to increase the formation surface area for screw holes (screw holes having the same function as the screw holes 352) that act as connection interface members with the carriage of the image scanning device (or the image scanning device). Furthermore, it is also possible to raise the strength of the planar ends 364 that act as connection interface members. The strength of the light source device (reflector support structure) according to Embodiment 3 may also be raised. Note that the planar ends 364 may also be referred to as members that include a portion curved with respect to the sub scanning direction.

As illustrated in FIG. 31B, the light guide holder fixture 353 is a plural member that is disposed along the main scanning direction with a designated interval spaced therebetween, and affixes the light guide holder 309. The light guide holder fixture 353 may also be singular.

In addition, the multiple light guide holder fixtures 353 are formed by respectively bending the other end along the main scanning direction of the housing 301 (planar member 363) in two locations. In other words, the multiple light guide holder fixtures 353 are bends in the planar member 363. For this reason, similarly to the reflector supports 320, the light guide holder fixtures 353 are integral with the housing 301 (planar member 363), and may be referred to as members that stand off the planar member 363 at a designated angle with respect to the sub scanning direction.

Furthermore, the light guide holder fixtures 353 may be referred to as members that include a portion curved with respect to the sub scanning direction.

In the housing 301 (planar member 363) illustrated in FIGS. 31A and 31B, of the other end along the main scanning direction, the portions other than the multiple light guide holder fixtures 353 respectively include multiple planar ends 365 continuous with the planar member. Because of the bent planar ends 365, the strength of the light source device (reflector support structure) according to Embodiment 3 is raised, and bowing or sagging is less likely.

In addition, by making the length of the planar ends 365 in the main scanning direction longer than the length of the light guide holder fixtures 353 in the main scanning direction, it is possible to increase the formation surface area for screw holes (screw holes having the same function as the screw holes 352) that act as connection interface members with the carriage of the image scanning device (or the image scanning device), similarly to the planar ends 364 on the side of the reflector 302. Furthermore, it is also possible to raise the strength of the planar ends 365 that act as connection interface members. The strength of the light source device (reflector support structure) according to Embodiment 3 may also be raised. Note that the planar ends 365 may also be referred to as members that include a portion curved with respect to the sub scanning direction versus the main scanning direction.

Figure 32:
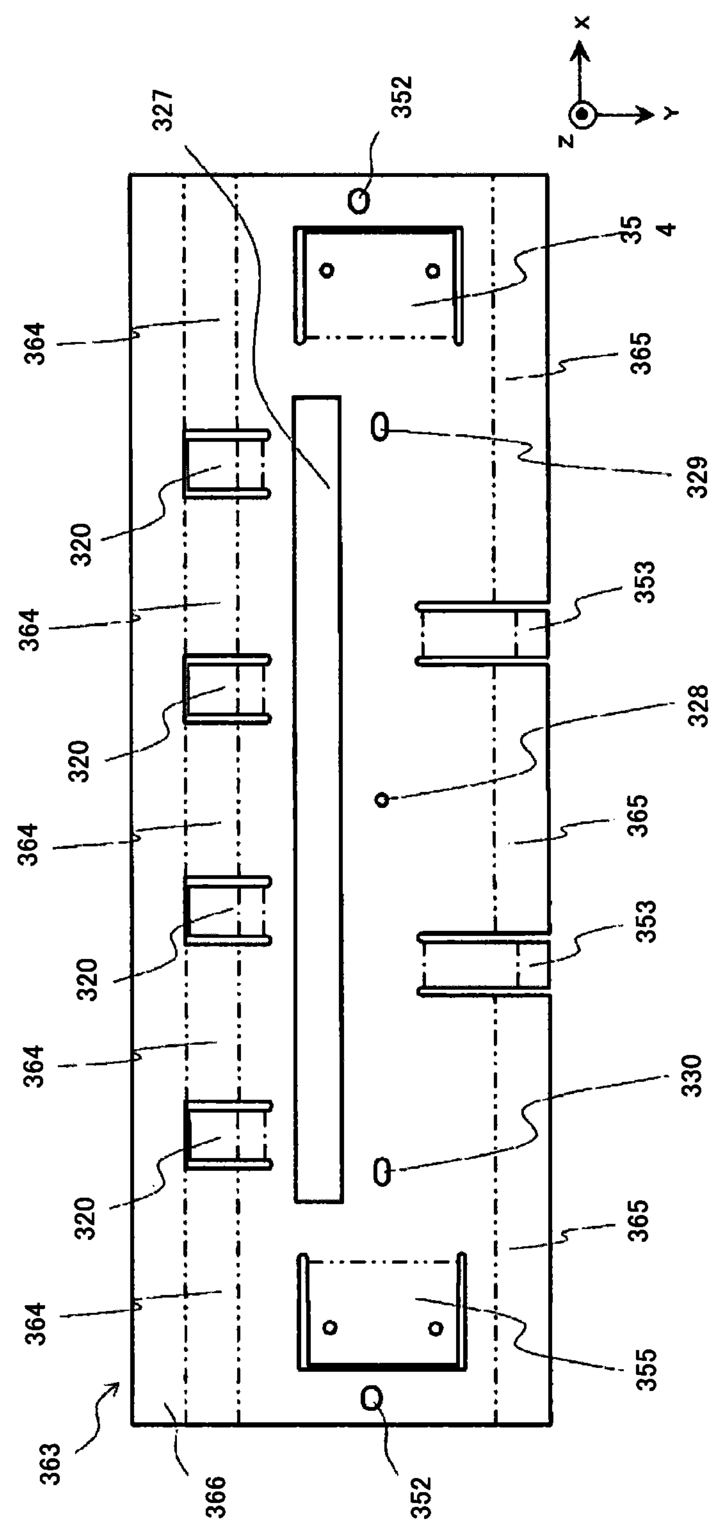
FIG. 32 is a plan view (pre-bending) of a planar member that forms the housing of a light source device according to Embodiment 3 of the present invention.
Figure 33A:
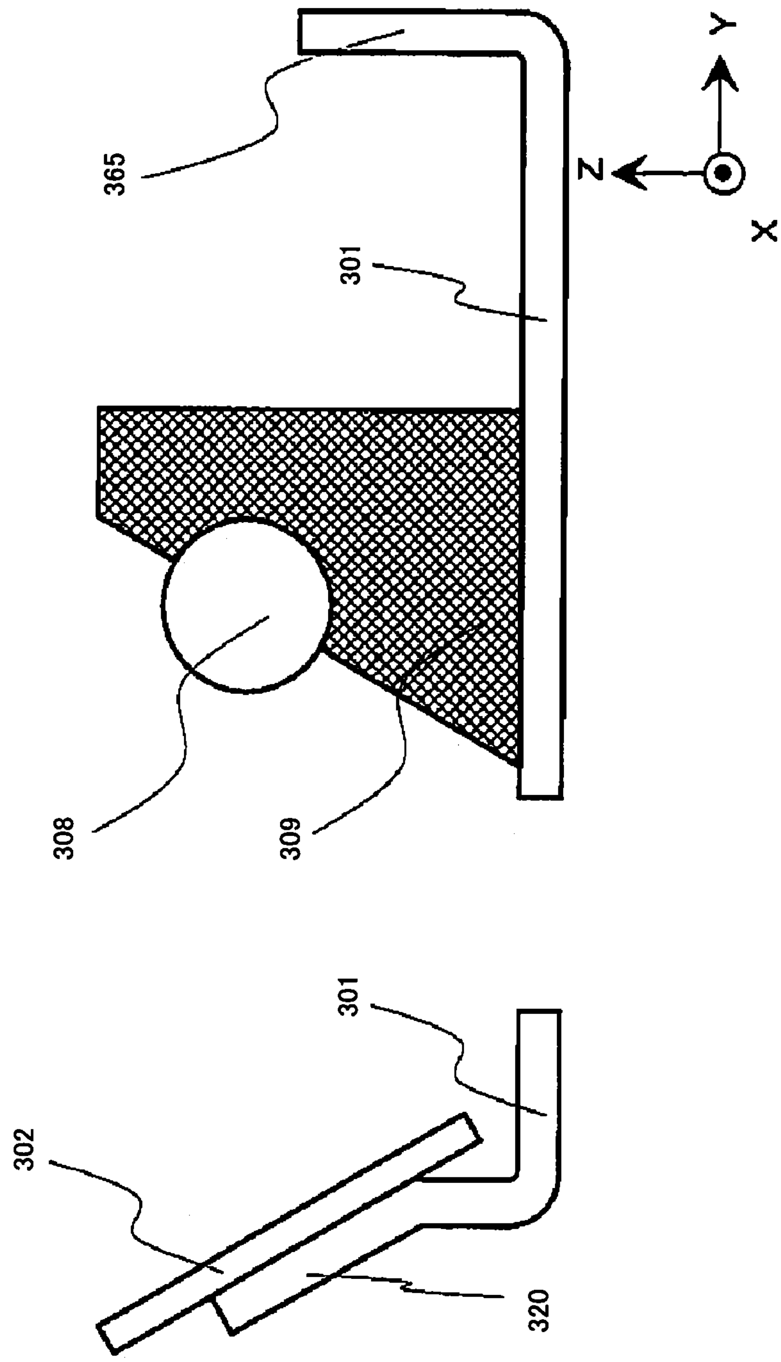
FIG. 33A is a cross-section view in the widthwise direction of a light source device according to Embodiment 3 of the present invention.
Figure 33B:
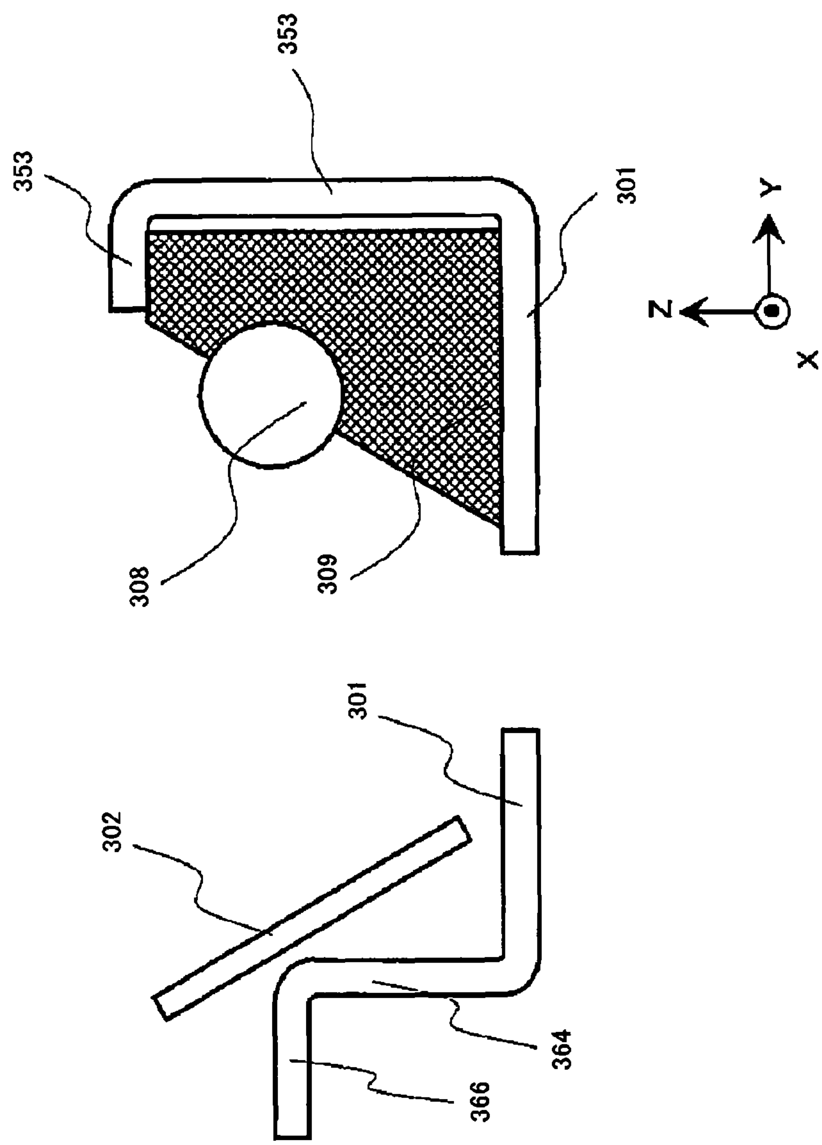
FIG. 33B is a cross-section view in the widthwise direction of a light source device according to Embodiment 3 of the present invention.

The housing 301 (planar member 363) illustrated in FIG. 32 and FIGS. 33A and 33B is an exemplary modification of a housing 301 (planar member 363) according to Embodiment 3. In the housing 301 (planar member 363) illustrated in FIG. 32 and FIGS. 33A and 33B, the tips of the multiple planar ends 364 along the sub scanning direction from the side of the base ends that are continuous with the multiple reflector supports 320 are respectively connected to form an integral end 366 that is integrated. Because of the integral end 366, the strength of the multiple planar ends 364 may be raised. In addition, screw holes (screw holes having the same function as the screw holes 352) that act as connection interface members with the carriage of the image scanning device (or the image scanning device) may be formed on the integral end 366.

The light source device (reflector support structure) illustrated in FIGS. 34A and 34B is an exemplary modification of the reflector supports 320 in a light source device (reflector support structure) according to Embodiment 3. The reflector supports 320 illustrated in FIG. 34A include extended reflector supports **320*e* with an extended tip portion with respect to the base end portion having an angle with respect to the housing 301 (planar member 363). Since there is a curve between the reflector supports 320 and the extended reflector supports 320*e*, the strength of the reflector supports 320** rises.

In addition, it is possible to give to the extended reflector supports **320*e* the excess portion produced in the housing 301 (planar member 363) from the difference in dimensions between the housing 301 (planar member 363) and the reflector 302**.

The planar ends 364 illustrated in FIG. 34B include extended planar ends 364*e* with an extended tip portion with respect to the base end portion having an angle with respect to the housing 301 (planar member 363). Since there is a curve between the planar ends 364 and the extended planar ends 364*e*, the strength of the planar ends 364 rises.

Note that screw holes (screw holes having the same function as the screw holes 352) that act as connection interface members with the carriage of the image scanning device (or the image scanning device) may be formed on one or both of the extended reflector supports 320*e* and the extended planar ends 364*e*.

The light source device (reflector support structure) illustrated in FIGS. 35A to 35C is an exemplary modification of the reflector supports 320, the light guide holder fixtures 353, the planar ends 364, and the planar ends 365 in a light source device (reflector support structure) according to Embodiment 3. The light source device (reflector support structure) illustrated in FIGS. 35A to 35C is a configuration in which extended light guide holder fixtures 353*e* and extended planar ends 365*e* have been added to the light source device (reflector support structure) illustrated in FIGS. 34A and 34B. The extended light guide holder fixtures 353*e* and the extended planar ends 365*e* will now be described. The description of the extended reflector supports 320*e* and the extended planar ends 364*e* is as discussed earlier.

The planar ends 365 illustrated in FIG. 35A include extended planar ends 365*e* with an extended tip portion with respect to the base end portion having an angle with respect to the housing 301 (planar member 363). Since there is a curve between the planar ends 365 and the extended planar ends 365*e*, the strength of the planar ends 365 rises.

The light guide holder fixtures 353 illustrated in FIG. 35B include extended light guide holder fixtures 353*e* with an extended tip portion that is additionally curved with respect to the base end portion having an angle with respect to the housing 301 (planar member 363). Since there is a curve away from the light guide holder 309 between the light guide holder fixtures 353 and the extended light guide holder fixtures 353*e*, the strength of the light guide holder fixtures 353 rises.

The light guide holder fixtures 353 illustrated in FIG. 35C include extended light guide holder fixtures 353*e* with an extended tip portion that is additionally curved with respect to the base end portion having an angle with respect to the housing 301 (planar member 363). Since there is a curve toward the light guide holder 309 between the light guide holder fixtures 353 and the extended light guide holder fixtures 353*e*, not only does the strength of the light guide holder fixtures 353 rise, but the light guide holder 309 may also be affixed more securely.

The difference between FIG. 35B and FIG. 35C is the difference in the curve direction of the extended light guide holder fixtures 353*e* with respect to the light guide holder fixtures 353. It is possible to give to the extended light guide holder fixtures 353*e* illustrated in FIGS. 35B and 35C the excess portion produced in the housing 301 (planar member 363) from the difference in dimensions between the housing 301 (planar member 363) and the light guide holder 309.

Note that, similarly to the extended reflector supports 320*e* and the extended planar ends 364*e*, screw holes (screw holes having the same function as the screw holes 352) that act as connection interface members with the carriage of the image scanning device (or the image scanning device) may be formed on the extended planar ends 365*e*. Also, the cross-section of the reflector support 320 portion becomes that illustrated in FIG. 35A for either of the light source devices respectively illustrated in FIGS. 35B and 35C.

The light source device (reflector support structure) illustrated in FIGS. 36A and 36B is an exemplary modification of the reflector supports 320 in a light source device (reflector support structure) according to Embodiment 3. The reflector supports 320 illustrated in FIGS. 31A and 31B, FIGS. 33A and 33B, FIGS. 34A and 34B, and FIGS. 35A to 35C include a portion curved in two locations with respect to the sub scanning direction. Specifically, the reflector supports 320 are curved in mutually different directions.

Note that with the light source device (reflector support structure) illustrated in FIGS. 34A and 34B as well as FIGS. 35A to 35C, there is an additional curve between the extended reflector supports 320*e* and the reflector supports 320. On the other hand, the reflector support 320*b* illustrated in FIG. 36A includes a portion curved in one location with respect to the sub scanning direction. Since a curve exists in only one location on the reflector support 320*b*, it is possible to decrease the steps to process the planar member 363 in order to form the housing 301. Also, the angles for supporting the reflector 302 may be adjusted all at once.

As illustrated in FIGS. 32 to 35, at least one of the integral end 366, the extended reflector supports 320*e*, the extended light guide holder fixtures 353*e*, the extended planar ends 364*e*, and the extended planar ends 365*e* may be added to the light source device (reflector support structure) illustrated in FIGS. 36A and 36B.

According to a light source device according to Embodiment 3, end deviation in the light guide 308, the light guide holder 309, the holders 314 and 315, the substrates 312 and 313, and the reflector 302 may be reduced, and in addition, good illumination efficiency may be obtained. According to a reflector support structure according to Embodiment 3, end deviation of the reflector 302 may be reduced.

In addition, although in the foregoing (FIGS. 21 to 36) the reflector support structure according to Embodiment 3 is described as an element built into a light source device, the possibility of carrying out the reflector support structure only will also be described.

FIG. 37 illustrates a reflector support structure according to Embodiment 3. FIG. 37A illustrates a pre-bending planar member 363*b* that will become a housing of a reflector support structure. The differences between the planar member 363*b* and the planar member 363 are that the planar member 363*b* has no mechanism to support the light guide holder 309 and the holders 314 and 315, and also has no aperture 327.

However, the aperture 327 may be formed or not formed in the case of using the reflector support structure illustrated in FIG. 37 in the same application as a light source device according to Embodiment 3. In other words, this means that the reflector support structure according to Embodiment 3 may be applied to a structure that supports a reflector (reflecting mirror, concave mirror, convex mirror) in an image-forming optical system of an image scanning device. Note that in this case, the screw holes 352 may also be used to connect to members other than the carriage of an image scanning device.

FIGS. 37B and 37C illustrate cross-section views of a reflector support structure. Multiple reflector supports 320 are placed on the side of the reverse face of the reflector 302, and are integral with the housing 301 (planar member 363) that supports the multiple reflector supports 320. In addition, the multiple reflector supports 320 are sites that stand off from the housing 301 (planar member 363) at a designated angle with respect to the sub scanning direction, and each is formed by respectively bending one end of the planar member 363 along the main scanning direction.

The reflector support structure illustrated in FIGS. 37A to 37C may be referred to as only the reflector 302 side of the reflector support structure (light source device) illustrated in FIGS. 24 to 28, FIG. 30, and FIGS. 31A and 31B. Accordingly, similarly to the reflector support structure (light source device) illustrated in FIGS. 24 to 28, FIG. 30, and FIGS. 31A and 31B, at least one of the integral end 366, the extended reflector supports 320*e*, and the extended planar ends 364*e* may be added to the reflector support structure illustrated in FIGS. 37A to 37C. Also, the reflector supports 320 may be substituted with the reflector supports 320*b*. Furthermore, after substitution, at least one of the integral end 366, the extended reflector supports 320*e*, and the extended planar ends 364*e* may be added.

Because of this structure, a light source device (reflector support structure) according to Embodiment 3 may also be carried out as only a reflector support structure for a reflector (such as the first connection interface member and the second connection interface member) within an image-forming optical system of an image scanning device. In this case, the directions indicated by the arrows X, Y, and Z in FIG. 37 are reference information.

In addition, implementation is also possible as only a support structure for a reflector that reflects the secondary light discussed earlier. Accordingly, in the case of using the reflector support structure as a configuration of a light source device (a light source device used in an image scanning device), the source of light reflected by the reflector 302 may also be a rod-shaped light source or an array light source disposed opposite the reflector 302 and extending in the main scanning direction. A rod-shaped light source includes one that comprises the light emitters 356 and 357 as well as the columnar light guide 308 that guides light from the light emitters 356 and 357 input from the end faces 358 in the lengthwise direction, and outputs the light from the side faces (light outputters) 321 and 322.

Furthermore, a rod-shaped light source in a light source device according to Embodiment 3 may also be an electric discharge lamp. The electric discharge lamp may be a typical one, such as an electric discharge lamp based on glow discharge such as a neon tube, or an electric discharge lamp based on arc discharge such as a fluorescent lamp or a xenon lamp (Xe lamp).

An array light source in a light source device according to Embodiment 3 may be a light source in which the light emitters 356 and 357 (light-emitting elements 310 and 311) are multiply arranged in the main scanning direction, and which emits light (secondary light) in the sub scanning direction. The light emitters 356 and 357 (light-emitting elements 310 and 311) may also be multiply arranged in the main scanning direction, with light (secondary light) being emitted in the sub scanning direction due to a light guide member or reflecting member.

Also, an array light source may emit primary light rather than secondary light, or emit both secondary light and primary light.

Furthermore, in order to obtain both primary light and secondary light, an array light source arranged to form different columns may also be adopted. In other words, an array light source arranged for primary light and an array light source arranged for secondary light may also be arranged in two columns along the main scanning direction. Herein, being arranged in two columns includes being disposed in a staggered layout in which the respective columns are disposed at half-pitch to each other.

A detailed configuration and exemplary modifications of the light guide holder 309 and holders 314 and 315 of a light source device according to Embodiment 3 will now be described with FIGS. 38 to 41.

Specifically, small end deviation of the light guide 308 and the like, irrespective of the temperature characteristics of the light guide 308 constituting a light source device according to Embodiment 3, will be described. Note that the light guide 308, the light guide holder 309, and the holders 314 and 315 are disposed while accounting for expansion and contraction in the thickness direction of the light guide 308 and the light guide holder 309 of a light source device according to Embodiment 3. For example, it is anticipated to set the dimensions of the light guide holder 309 as well as the holders 314 and 315 so that when expansion is at maximum, the light guide holder 309 does not damage the holders 314 and 315. However, since the influence is extremely small compared to expansion and contraction in the lengthwise direction of the light guide 308 and the light guide holder 309, detailed description will be omitted.

Figure 38A:
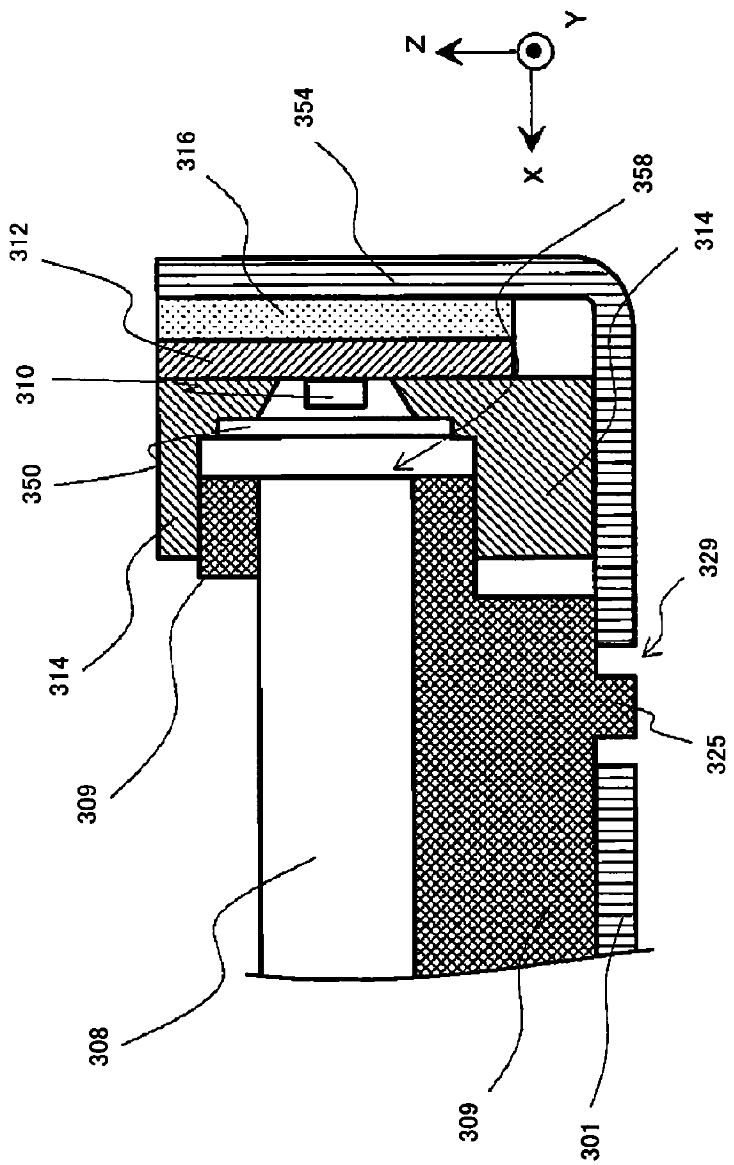
FIG. 38A is a cross-section view in the lengthwise direction near a light emitter of a light source device according to Embodiment 3 of the present invention.
Figure 38B:
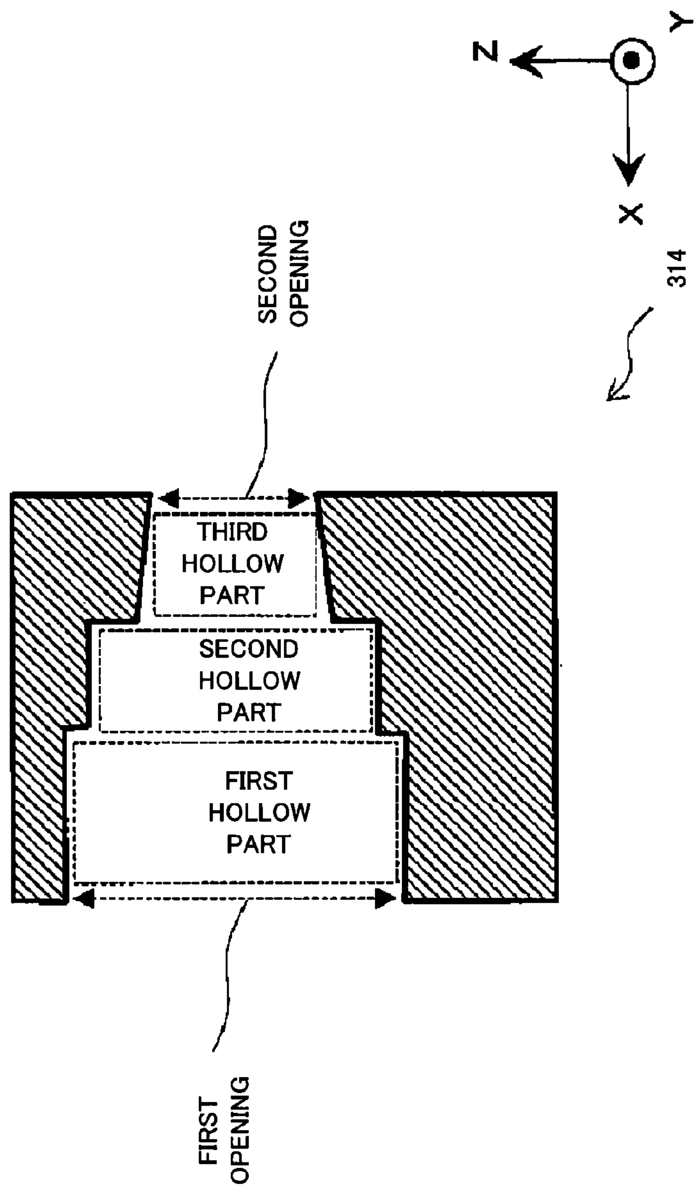
FIG. 38B is a cross-section view in the lengthwise direction near a light emitter of a light source device according to Embodiment 3 of the present invention.

FIG. 38A is a cross-section view near a light emitter of a light source device along the one-dot chain line EF in FIG. 25. FIG. 38B is a cross-sectional representation of only the portion of the holders 314 and 315 in FIG. 38A.

Figure 39A:
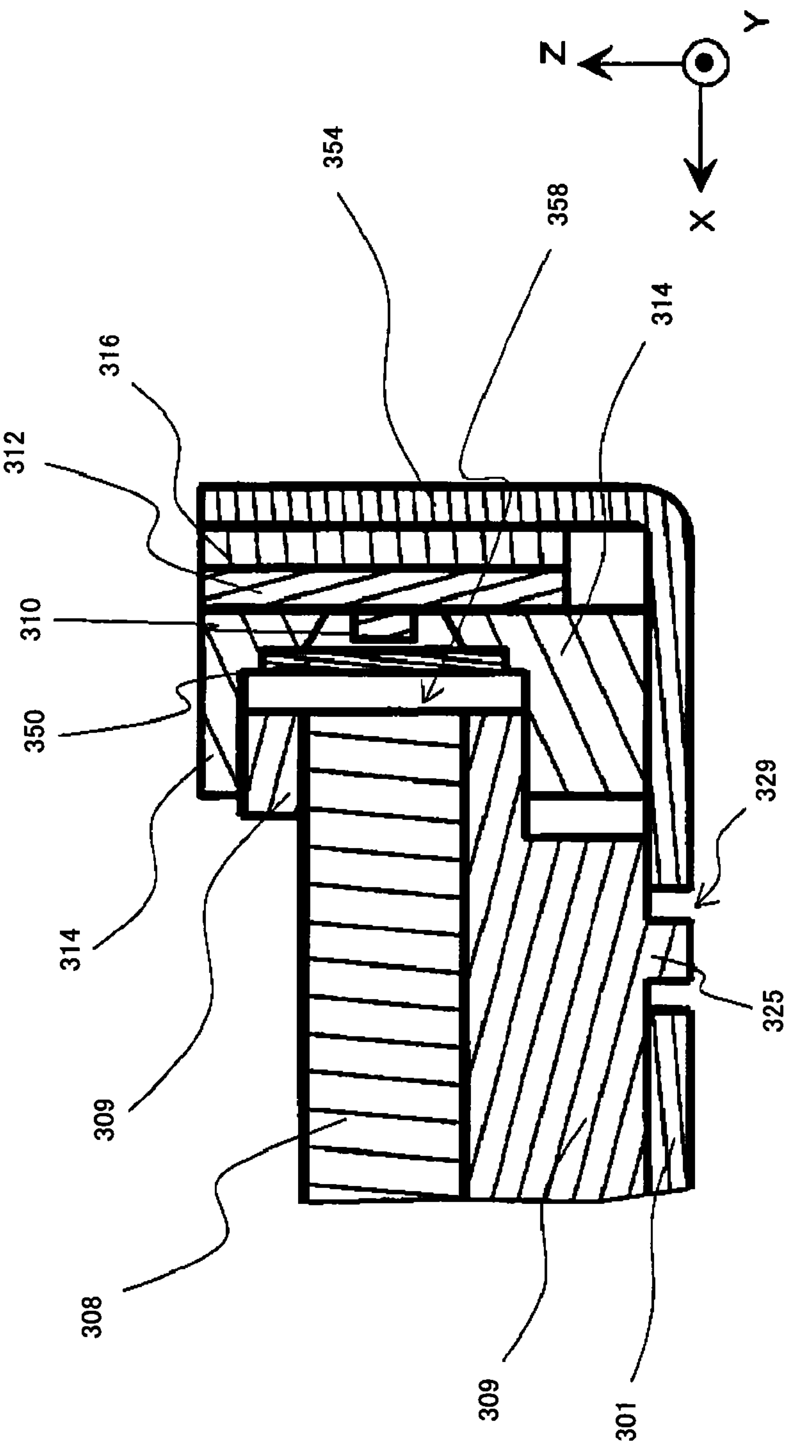
FIG. 39A is a cross-section view in the lengthwise direction near a light emitter of a light source device according to Embodiment 3 of the present invention.
Figure 39B:
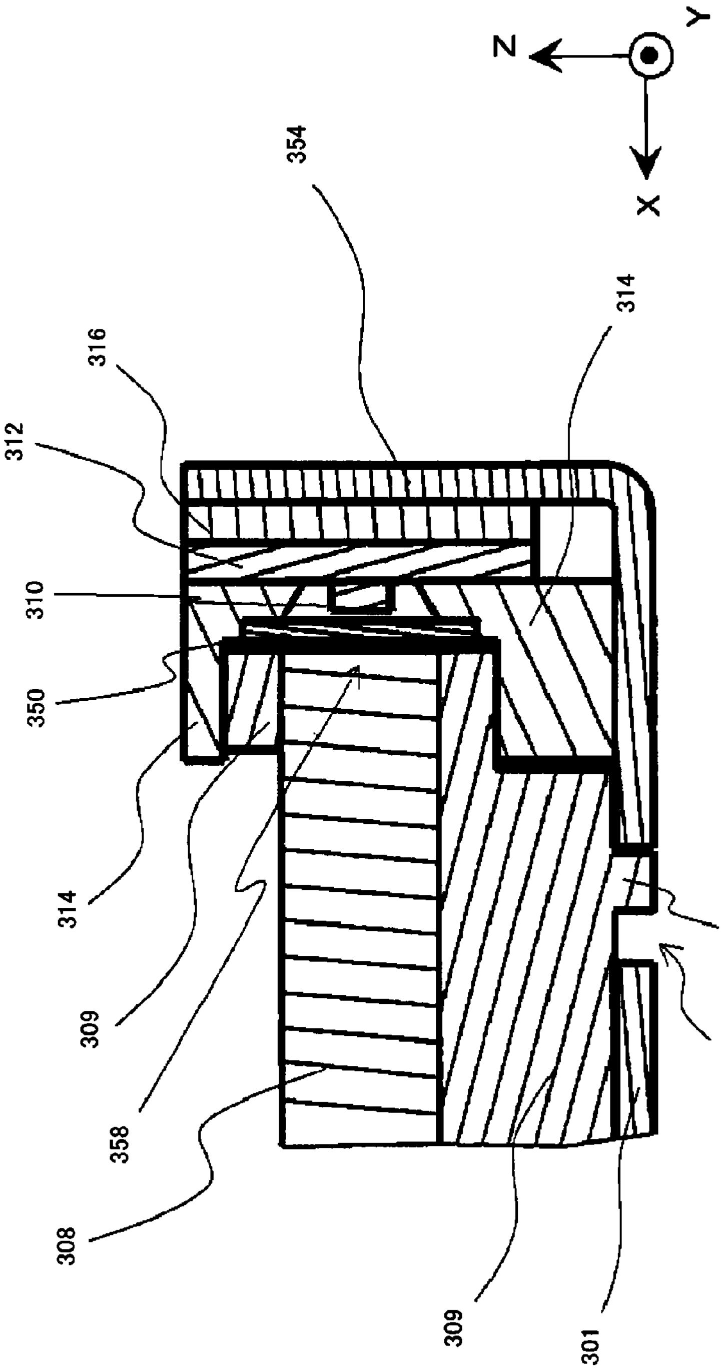
FIG. 39B is a cross-section view in the lengthwise direction near a light emitter of a light source device according to Embodiment 3 of the present invention.
Figure 39C:
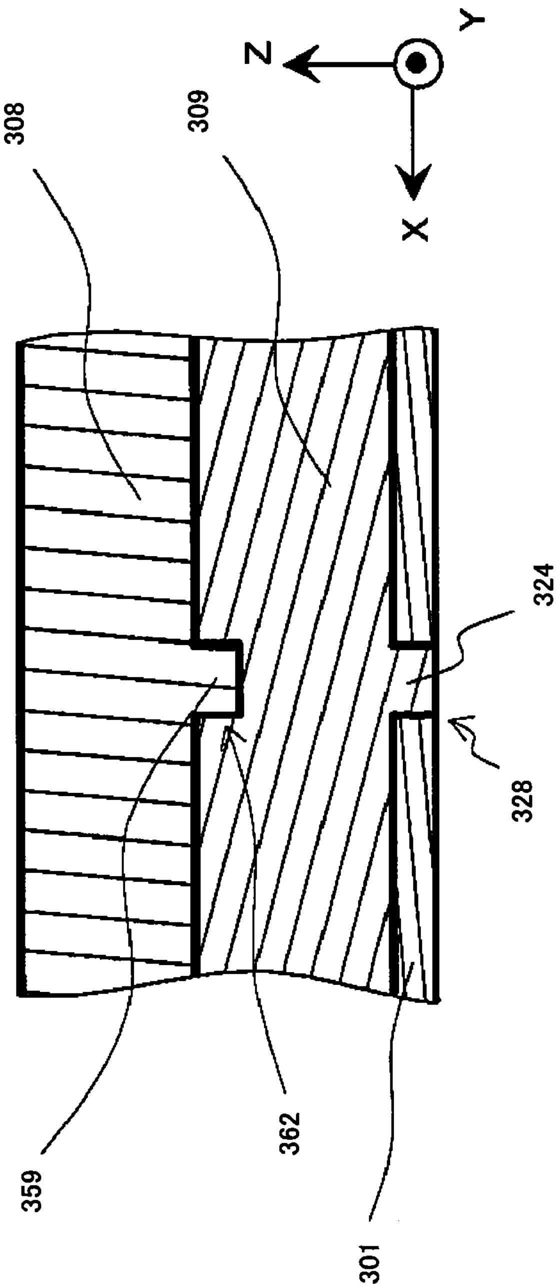
FIG. 39C is a cross-section view in the lengthwise direction near the center of a light guide of a light source device according to Embodiment 3 of the present invention.

FIG. 39A is a cross-section view near a light emitter of a light source device along the one-dot chain line EF in FIG. 25. FIG. 39B is a cross-section view near a light emitter of a light source device along the one-dot chain line EF in FIG. 25. FIG. 39C is a cross-section view near the center of a light guide of a light source device along the one-dot chain line EF in FIG. 25.

Figure 40A:
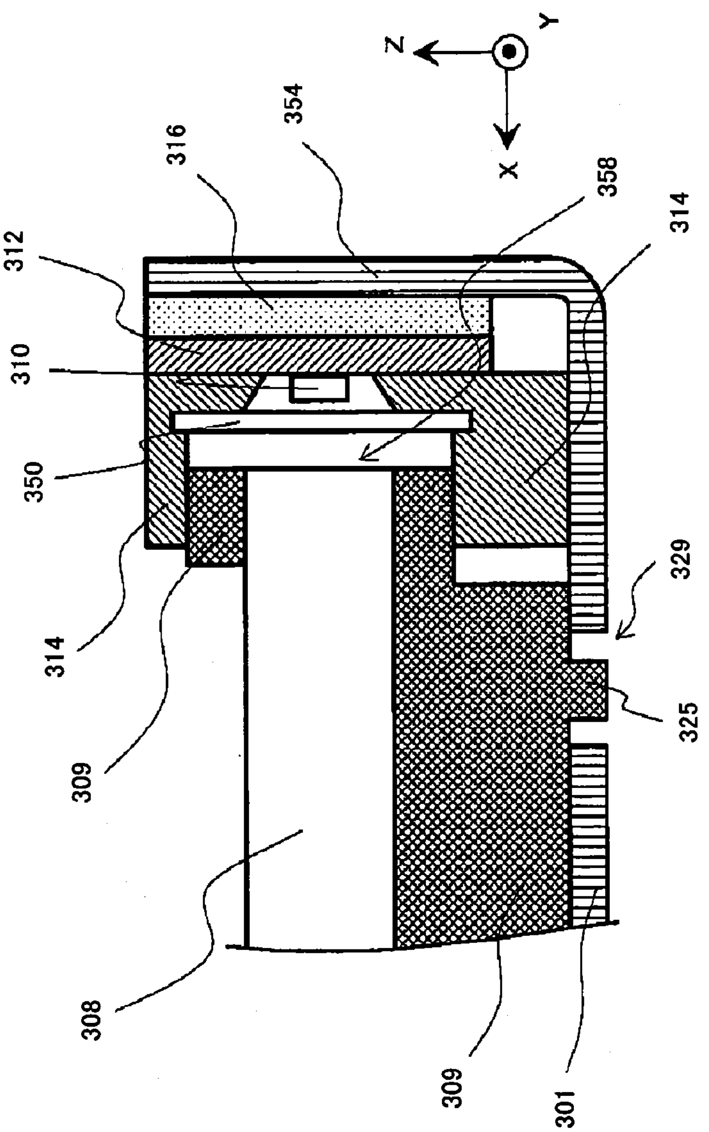
FIG. 40A is a cross-section view in the lengthwise direction near a light emitter of a light source device according to Embodiment 3 of the present invention.
Figure 40B:
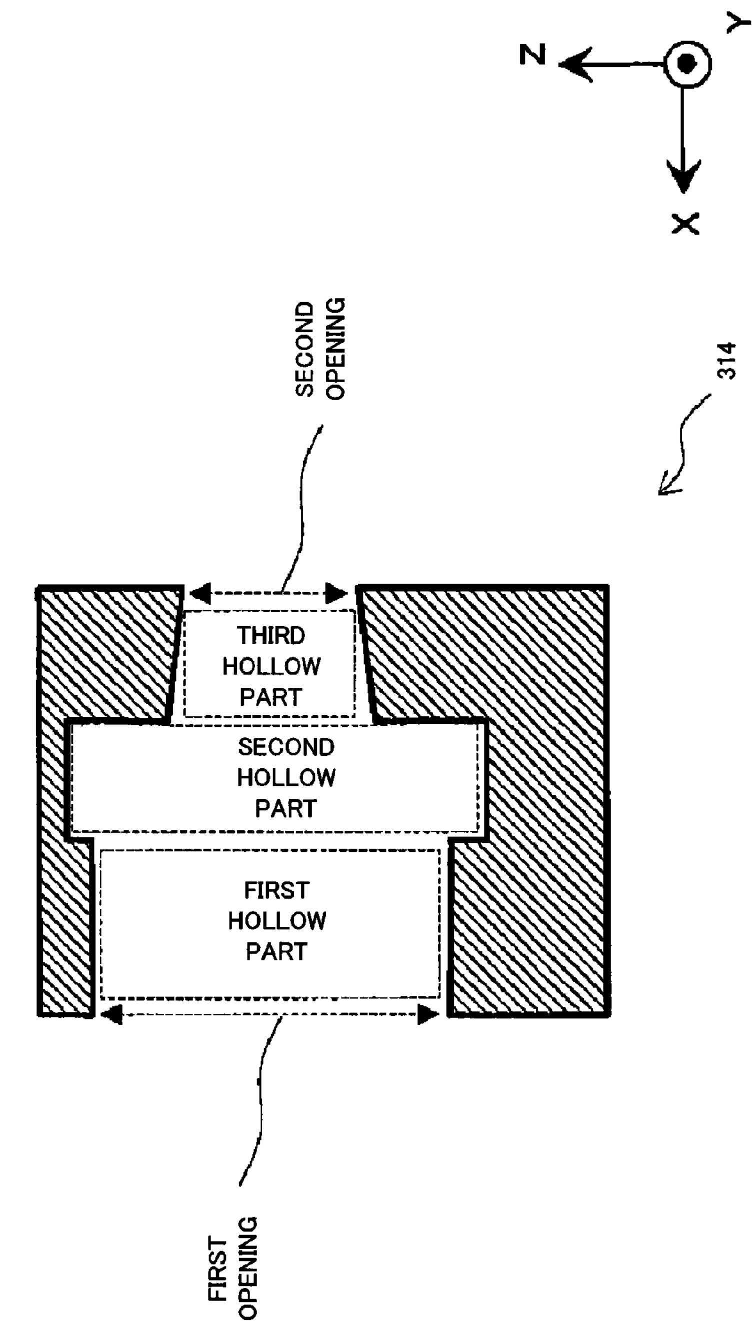
FIG. 40B is a cross-section view in the lengthwise direction near a light emitter of a light source device according to Embodiment 3 of the present invention.

FIG. 40A is a diagram that corresponds to a cross-section near a light emitter of a light source device along the one-dot chain line EF in FIG. 25. FIG. 40B is a cross-sectional representation of only the portion of the holders 314 and 315 in FIG. 40A.

Figure 41A:
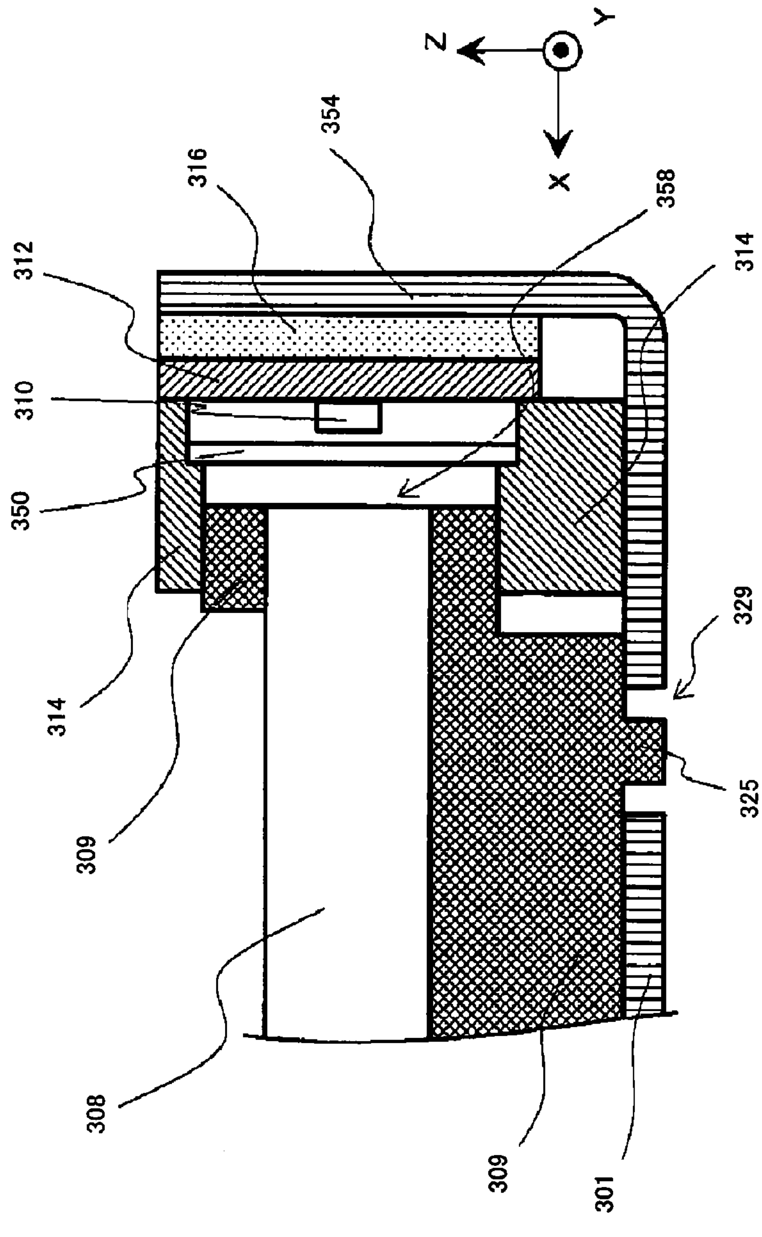
FIG. 41A is a cross-section view in the lengthwise direction near a light emitter of a light source device according to Embodiment 3 of the present invention.
Figure 41B:
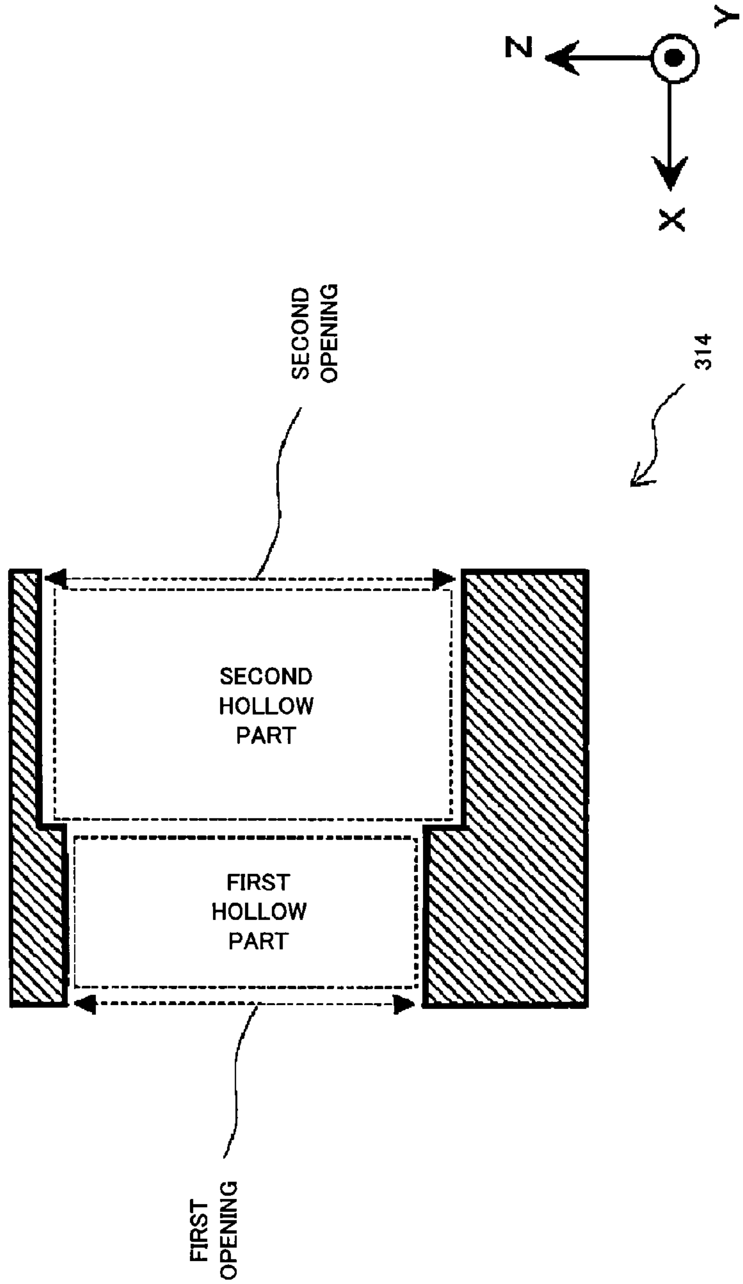
FIG. 41B is a cross-section view in the lengthwise direction near a light emitter of a light source device according to Embodiment 3 of the present invention.

FIG. 41A is a diagram that corresponds to a cross-section near a light emitter of a light source device along the one-dot chain line EF in FIG. 25. FIG. 41B is a cross-sectional representation of only the portion of the holders 314 and 315 in FIG. 41A. In the drawings, the same signs denote the same or corresponding portions, and detailed description thereof will be reduced or omitted.

As illustrated in FIGS. 38A and 38B as well as FIGS. 39A to 39C, the holders 314 and 315 include a communicating first opening (the portion indicated by the dotted arrow in FIG. 38B) and a second opening (the portion indicated by the dotted arrow in FIG. 38B). The holders 314 and 315 hold an end of the light guide holder 309 on the side of the first opening so as to allow sliding in the lengthwise direction. Meanwhile, the light emitters 356 and 357 are disposed in the second opening of the holders 314 and 315. Furthermore, the holders 314 and 315 support the optical filters 350 and 351 between the first opening and the second opening while maintaining a designated interval with the light emitters 356 and 357.

The optical filters 350 and 351 are supported by the holders 314 and 315 outside of the range over which the end faces of the light guide move due to sliding of the ends of the light guide holder 309.

Note that in FIGS. 38A and 38B as well as FIGS. 39A to 39C, although the light emitters 356 and 357, and particularly the light-emitting elements 310 and 311, are disposed in the second opening of the holders 314 and 315, it is not necessary to limit the configuration to this placement. It is sufficient for the light emitters 356 and 357 to be disposed so that light emitted from the light-emitting elements 310 and 311 (light emitters 356 and 357) is input into the light guide 308 via the second opening and the first opening of the holders 314 and 315.

Note that the light guide holder 309 is formed with a white resin or highly reflective metal or the like, includes a groove configured as a long groove in the lengthwise direction, and holds the light guide 308 in the lengthwise direction as a result of the light guide 308 being placed into this groove. The open side of this groove forms output parts (light outputters) 321 and 322 that output light from the light guide 308. The light guide holder 309 holds the light guide 308 at a suitable position with respect to the reflector 302 and the housing 301, reflects bleeding light from the side faces or rear faces of light scattering parts 318 and 319 back inside the light guide 308, and suppresses the output of unintentional light from other than the light outputters 321 and 322.

Next, FIG. 39 will be used to describe how a light source device according to Embodiment 3 supports the optical filters 350 and 351 between the first opening and the second opening of the holders 314 and 315 while maintaining a designated interval with the light emitters 356 and 357, or in other words, how the end faces 358 (light inputter 4*a*) of the light guide 308 and the light emitters 356 and 357 (optical filters 350 and 351) do not contact.

FIG. 39A illustrates the case of the shortest length of the light guide 308 in the lengthwise direction. FIG. 39B illustrates the case of the longest length of the light guide 308 in the lengthwise direction.

The holders 314 and 315 illustrated in FIGS. 39A and 39B (the positional relationship is clarified in FIG. 38B) internally include a first hollow part, a second hollow part, and a third hollow part whose diameters successively decrease proceeding from the side of the first opening to the side of the second opening, and support the optical filters 350 and 351 inside the second hollow part.

Specifically, the optical filters 350 and 351 are formed in the step portion produced between the second hollow part and the third hollow part. Note that the thickness of the step portion is taken to be equal to or greater than the thickness of the optical filters 350 and 351.

FIG. 39C illustrates how the pin 324 and the interlocking hole 362 of the light guide holder 309 are provided so as to be disposed in the same cross-section in the sub scanning direction (widthwise direction). At the least, the inner wall shape of the first hollow part is formed such that either the portion of the light guide holder 309 that is inserted into the holders 314 and 315 contacts the holders 314 and 315 and allows the light guide holder 309 to slide, or the portion of the light guide holder 309 that is inserted into the holders 314 and 315 does not contact the holders 314 and 315 and allows the light guide holder 309 to stretch. A description of the latter will be given later.

As illustrated in FIG. 39B, in the case of maximum expansion of the light guide 308 (light guide holder 309), the light guide holder 309 and the holders 314 and 315 are disposed such that the end faces 358 of the light guide 308 and the end faces of the light guide holder 309 are contacting or about to contact at the step portion produced between the first hollow part and the second hollow part. As a result, the end faces (light inputters) 358 of the light guide 308 and the light emitters 356 and 357 (optical filters 350 and 351) may be made to not contact. This relationship applies in the same way to the pins 325 and 326 and the long holes 329 and 330.

Also, as illustrated in FIGS. 39A and 39B, the light guide holder 309 may include a pushing face part that faces opposite the edges of the first opening, and this pushing face part may be provided so as to restrict the sliding range (movement range) of the light guide holder 309.

Note that the pushing face part may also be made to be about to contact the edges of the first opening when the expansion of the light guide 308 is at maximum. In this case, the pushing face part becomes an opposing face part rather than a pushing face part.

The holders 314 and 315 may be referred to as members that hold the substrates 312 and 313, the light guide holder 309, and the optical filters 350 and 351, and suppress unintentional light from the light emitters 356 and 357. In a light source device according to Embodiment 3, an end that includes the end face on one side of the light guide holder 309 is inserted into the first opening at the end face on one side of the holders 314 and 315. The substrates 312 and 313 affixed with the light emitters 356 and 357 are placed in the second opening at the end face on the opposite side of the holders 314 and 315 so that the light emitters 356 and 357 and the light guide 308 face opposite each other.

Also, as discussed earlier, the distance between the end faces 358 of the ends of the light guide holder 309 inserted into the first opening and the optical filters 350 and 351 varies according to the expansion or contraction of the light guide 308 (light guide holder 309). However, the holders 314 and 315 include a face that holds the optical filters 350 and 351 and a face that affixes the substrates 312 and 313 to the face on the opposite side (the second opening). For this reason, the distance between the optical filters 350 and 351 and the substrates 312 and 313 is kept fixed, without being affected by stretching (expansion or contraction) of the light guide 308 (light guide holder 309). Consequently, the light-modulating characteristics of the optical filters 350 and 351 stabilize.

In other words, in a light source device according to Embodiment 3, the degree of interlocking (degree of insertion) between the light guide 308 and the holders 314 and 315 as well as the relative positions of the light guide holder 309 and the holders 314 and 315 vary. On the other hand, by providing the long holes 329 and 330 of the housing 301 with a gap (clearance) corresponding to the amount of the temperature-related stretching of the light guide holder 309 with respect to the lengthwise direction, the light guide holder 309 is able to stretch in the lengthwise direction. Accordingly, a light source device according to Embodiment 3 obtains a configuration that does not vary the positions of the light guide 308 and the light guide holder 309 in the height direction and the widthwise direction, or in other words, does not change the illumination characteristics.

In addition, the holders 314 and 315 are affixed in the lengthwise direction to the fasteners 354 and 355 on the housing 301 (planar member 363) by the screws 340 to 343. For this reason, the heat dissipation effects also do not change.

Furthermore, at both normal temperature and high temperature, the distances of the housing 301, the heat transfer bodies 316 and 317, the substrates 312 and 313, the light-emitting elements 310 and 311, the holders 314 and 315, and the optical filters 350 and 351 are fixed, and the distance between the light guide 308 and the light guide holder 309 is fixed (in the case of close expansion ratios).

In other words, in a light source device according to Embodiment 3, the portion of light blocked by the light guide holder 309 is fixed, and the effect of suppressing unwanted stray light produced at the ends of the light guide 308 is kept constant. Meanwhile, since the relative distances of the light emitters 356 and 357 and the optical filters 350 and 351 are kept constant, the function of converting light from the light emitters 356 and 357 by optical filters 350 and 351 is kept constant. As a result of this structure, change does not occur in the illumination characteristics and heat dissipation characteristics due to stretching of the light guide 308 due to temperature changes.

Also, in a light source device according to Embodiment 3, although omitted from illustration in the drawings, the holders 314 and 315 may also be provided such that the ends of the light guide holder 309 and the holders 314 and 315 do not contact, and the ends of the light guide holder 309 stretch in the lengthwise direction inside the first opening or above the first opening. Additionally, the holders 314 and 315 may also be provided so as to support the optical filters 350 and 351 outside the range over which the end faces 358 of the light guide 308 move due to stretching of the ends of the light guide holder 309. Stated differently, in a light source device according to Embodiment 3, it may be said that the holders 314 and 315 slidably hold the ends of the light guide holder 309 inside the first hollow part, or alternatively, the ends of the light guide holder 309 stretch in the lengthwise direction inside the first hollow part. The light source devices illustrated in the following FIGS. 40A and 40B and FIGS. 41A and 41B are also similar.

In the light source devices illustrated in FIGS. 40A and 40B and FIGS. 41A and 41B, the holders 314 and 315 internally include a first hollow part and a second hollow part whose diameters successively increase proceeding from the side of the first opening to the side of the second opening, and support the optical filters 350 and 351 inside the second hollow part.

Specifically, in FIGS. 40A and 40B, the optical filters 350 and 351 are formed in the step portion produced between the first hollow part and the second hollow part, or alternatively, in the step portion produced between the second hollow part and the third hollow part. In FIGS. 41A and 41B, the optical filters 350 and 351 are formed in the step portion produced between the first hollow part and the second hollow part.

In the light source devices illustrated in FIGS. 40A and 40B and FIGS. 41A and 41B, in the case of maximum expansion of the light guide 308 (light guide holder 309), the light guide holder 309 and the holders 314 and 315 cannot be disposed like in the light source devices illustrated in FIGS. 38A and 38B and FIGS. 39A to 39C, such that the end faces 358 of the light guide 308 and the end faces of the light guide holder 309 are contacting or about to contact at the step portion produced between the first hollow part and the second hollow part.

In the light source device illustrated in FIGS. 40A and 40B, the light guide holder 309 and the holders 314 and 315 are disposed such that, at the time of maximum expansion, the end faces 358 of the light guide 308 and the end faces of the light guide holder 309 do not enter the second hollow part.

Note that in the case of the light source device illustrated in FIGS. 41A and 41B, it is necessary to make it so that the end faces 358 of the light guide 308 and the end faces of the light guide holder 309 may enter the second hollow part, but not contact the optical filters 350 and 351.

The light source devices according to Embodiment 3 and the reflector support structures according to Embodiment 3 described using FIGS. 21 to 41 may be carried out by suitably substituting the respective configurations. This substitution even holds true between a light source device (reflector support structure) according to Embodiment 4 discussed later and a light source device (reflector support structure) according to Embodiment 3, and for a light source device according to Embodiment 3 and a reflector support structure according to Embodiment 3. This even holds true between a light source device (reflector support structure) according to Embodiment 4 discussed later and a light source device (reflector support structure) according to Embodiment 3 discussed later.

Embodiment 3 is described using diagrams illustrating the holders 314 and 315 slidably holding the ends of the light guide holder 309 inside the first hollow part. However, the light guide holder 309 is placed in the housing 301 and stands free without the holders 314 and 315. For this reason, rather than having the holders 314 and 315 and the light guide holder 309 contact, the ends of the light guide holder 309 may stretch in the lengthwise direction inside the first hollow part of the holders 314 and 315 or above the first hollow part of the holders 314 and 315.

Herein, a housing 301 (planar member 363) of a light source device according to Embodiment 3 will be described.

The housing 301 (planar member 363) is equipped with two long holes 329 and 330 formed in the center part of the widthwise direction of a floor (bottom face) having a rectangular shape, an interlocking hole 328 formed between the long holes 329 and 330, an aperture 327 formed in the bottom face along the lengthwise direction, screw holes 352, light guide holder fixtures 353, reflector supports 320, a fastener 354, and a fastener 355. Consequently, the light guide holder 309 and the reflector 302 are affixed in the lengthwise direction, the widthwise direction, and the height direction, while the holders 314 and 315 and the heat transfer bodies 316 and 317 are affixed in the lengthwise direction, the widthwise direction, and the height direction.

The long holes 329 and 330 are long holes elongated in the lengthwise direction in the bottom face of the housing 301, positioned at either end in the lengthwise direction, between the aperture 327 and the fasteners 354 and 355 in the widthwise direction, and in the widthwise center of the bottom face of the light guide holder 309. The pins 325 and 326 of the light guide holder 309 are inserted into the long holes 329 and 330, thereby affixing the position of the light guide holder 309 in the widthwise direction.

The interlocking hole 328 is a hole provided in the bottom face of the housing 301. The interlocking hole 328 is positioned at the end on the opposite side of the side with the long holes 329 and 330 in the lengthwise direction. The interlocking hole 328 is positioned between the aperture 327 and the fasteners 354 and 355 and also in the center of the bottom face of the light guide holder 309 in the widthwise direction. The pin 324 of the light guide holder 309 is inserted into the interlocking hole 328, thereby affixing the position in the widthwise direction and the position in the lengthwise direction of the light guide holder 309 (see FIGS. 28A and 28B).

The aperture 327 is a hole formed along the lengthwise direction in the bottom face of the housing 301. The aperture 327 conveys image information about the object to be scanned (light among the radiated light that was scattered and reflected by the object to be scanned) to the imager (an image-forming optical system such as a lens and a light-sensing part such as an image sensor) (FIG. 30), and suppresses all other unwanted light.

The light guide holder fixtures 353 extend along the side face on the side of the housing 301, are positioned on the side opposite the reflector 302 with respect to the aperture 327, and affix the light guide holder 309 in the height direction.

The reflector supports 320 are multiply provided in the lengthwise direction, positioned farther outward than the aperture 327 in the widthwise direction, and hold the reflector 302 with good precision.

The fasteners 354 and 355 are positioned on the outward side of the housing in the lengthwise direction with respect to the aperture 327, and by respectively tightening the screws 340 to 343 thereinto, the substrates 312 and 313, the holders 314 and 315, and the heat transfer bodies 316 and 317 are affixed to the housing 301.

The reflector supports 320, the light guide holder fixtures 353, the planar ends 364, the planar ends 365, the fasteners 354 and 355, and the integral end 366 in the housing 301 also function as heatsinks. Particularly, the planar ends 364, the planar ends 365, the fasteners 354 and 355, and the integral end 366 may be continuous at the side wall portion of the short-edge walls (fasteners 354 and 355) of the housing 301.

In addition, portions extending from the short-edge walls (fasteners 354 and 355) and bent in the lengthwise direction may be formed, and these portions may extend in the lengthwise direction facing in the direction opposite the reflector supports 320 with respect to the long-edge wall (planar ends 364 and 365). Portions continuous with the long-edge wall and bent in the short-edge direction may be formed, and these portions may extend in the direction facing the bottom face of the housing 301 (and may also be bent).

Embodiment 4

Embodiment 4 of the present invention will be described using FIGS. 42 to 60. Embodiment 4 describes a configuration in which the ends of the light guide 408 are curved. Particularly, a configuration is described in which the ends of the light guide 408 are curved towards a housing 401 (planar member 463), the light emitters 456 and 457 are fastened to the housing 401 (planar member 463) directly or via the heat transfer bodies 316 and 317, and the light emitters 456 and 457 are attached via holes (light emitter holes 467 or light emitter cut-outs discussed later) formed in the housing 401 (planar member 463).

In Embodiment 4, the portions that differ from Embodiment 3 primarily will be described. The light guide 408, the light guide holder 409, and the holders 414 and 415 are disposed while accounting for expansion and contraction in the thickness direction of the light guide 408 and the light guide holder 409 of a light source device according to Embodiment 4.

For example, it is anticipated to set the dimensions of the light guide holder 409 (light guide 408) as well as the holders 414 and 415 so that when expansion is at maximum, the light guide holder 409 (light guide 408) does not damage the holders 414 and 415. However, since the influence is extremely small compared to expansion and contraction in the lengthwise direction of the light guide 408 and the light guide holder 409, detailed description will be omitted.

Figure 43A:
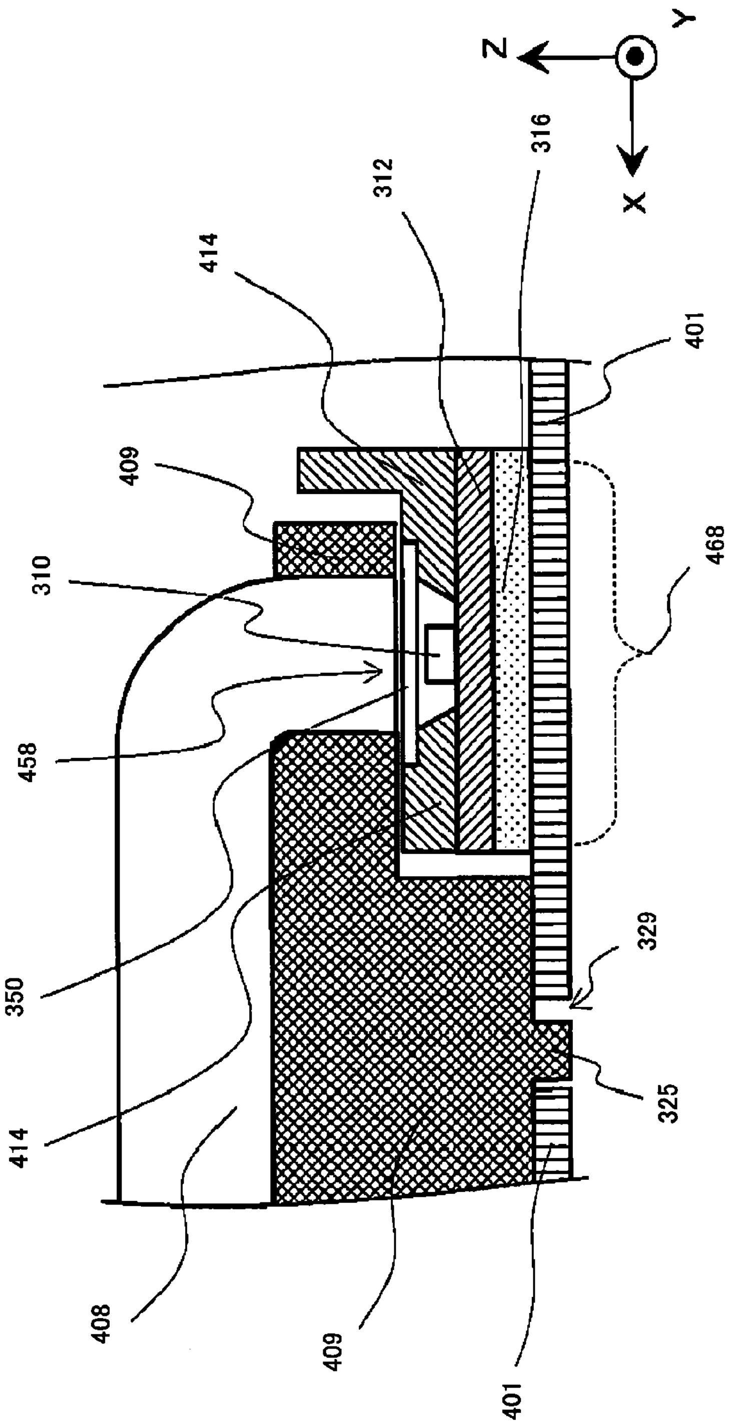
FIG. 43A is a cross-section view in the lengthwise direction near a light emitter of a light source device according to Embodiment 4 of the present invention.
Figure 43B:
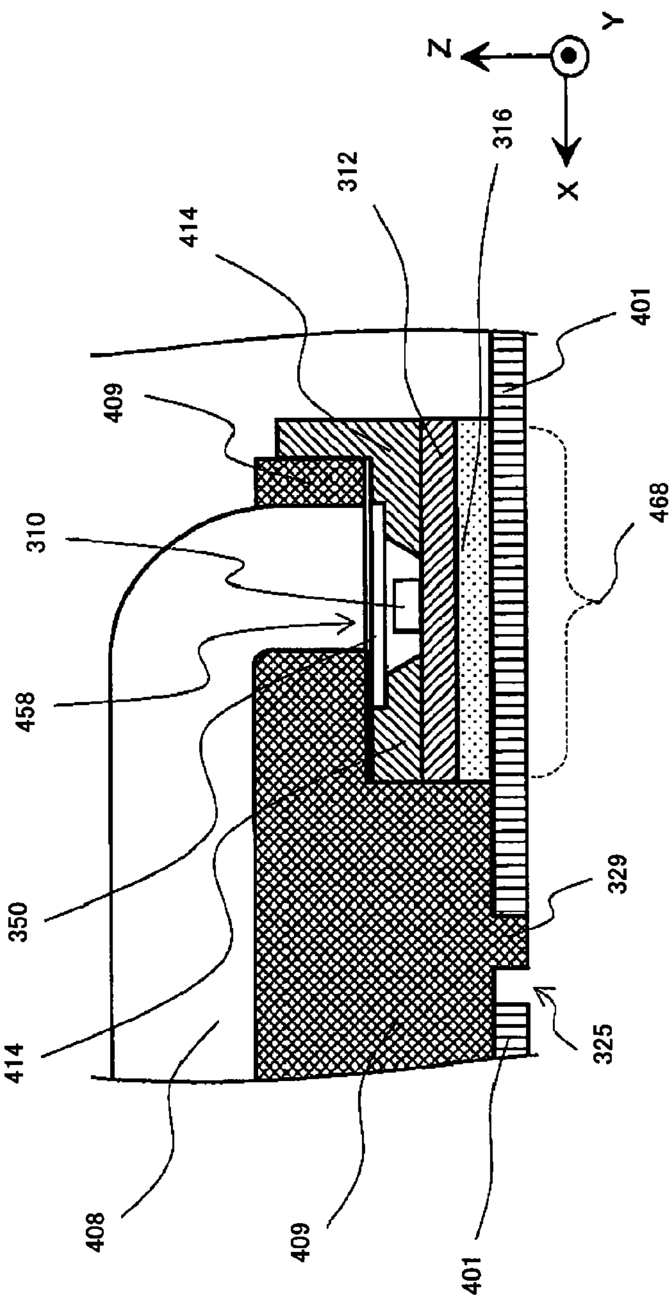
FIG. 43B is a cross-section view in the lengthwise direction near a light emitter of a light source device according to Embodiment 4 of the present invention.
Figure 43C:
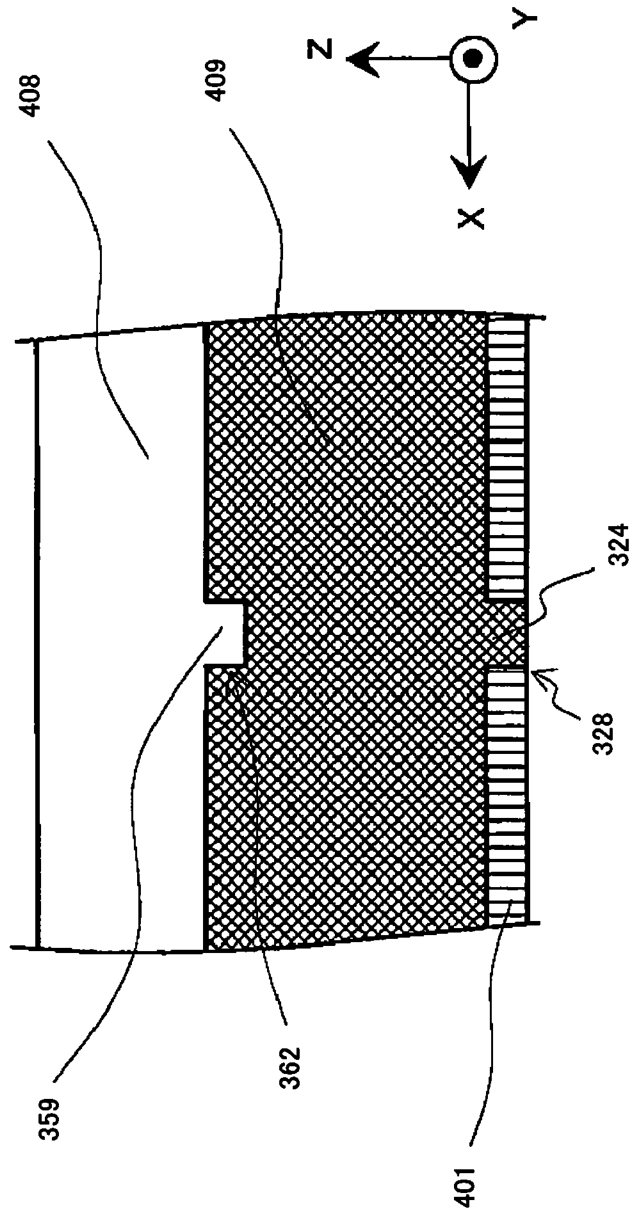
FIG. 43C is a cross-section view in the lengthwise direction near the center of a light guide of a light source device according to Embodiment 4 of the present invention.

FIGS. 43A and 43B are diagrams that correspond to a cross-section near a light emitter of a light source device along the one-dot chain line EF in FIG. 25. FIG. 43C is a diagram that corresponds to a cross-section near the center of a light guide of a light source device along the one-dot chain line EF in FIG. 25.

Figure 45A:
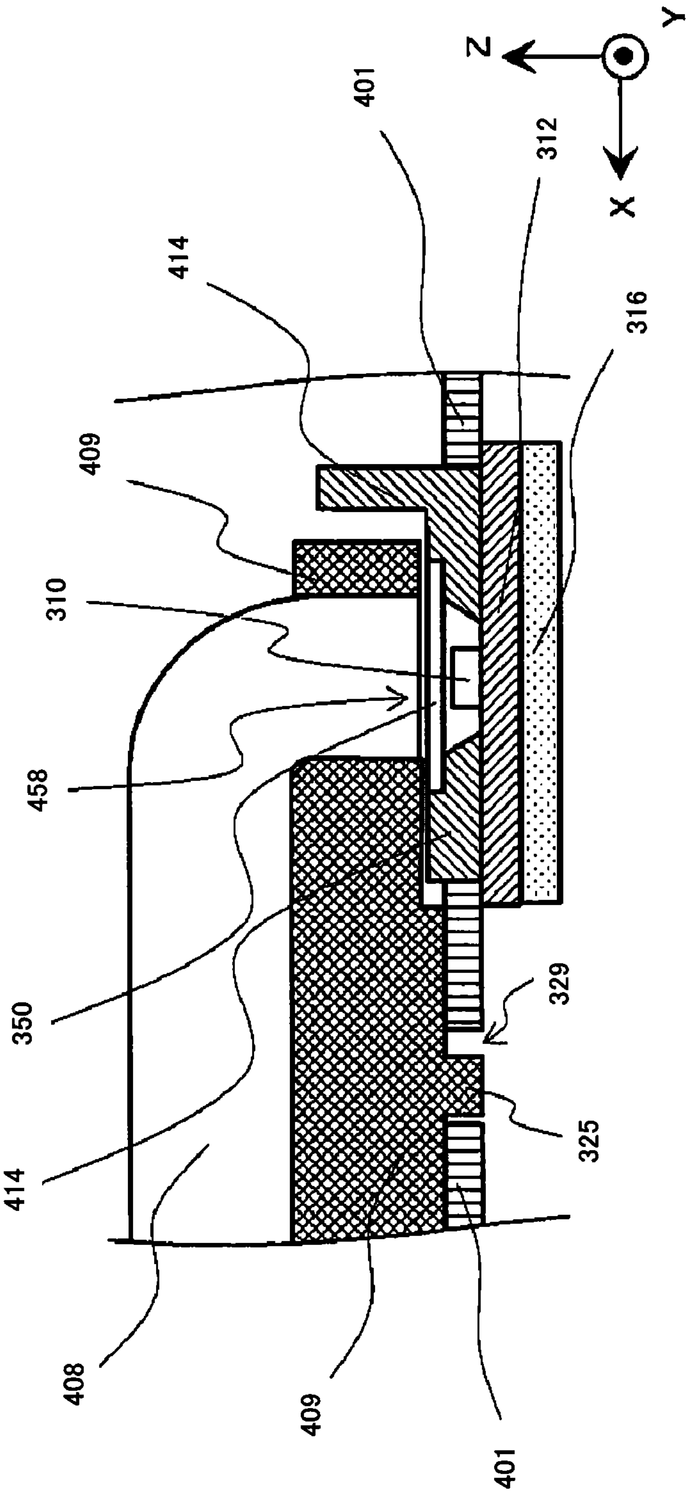
FIG. 45A is a cross-section view in the lengthwise direction near a light emitter of a light source device according to Embodiment 4 of the present invention.
Figure 45B:
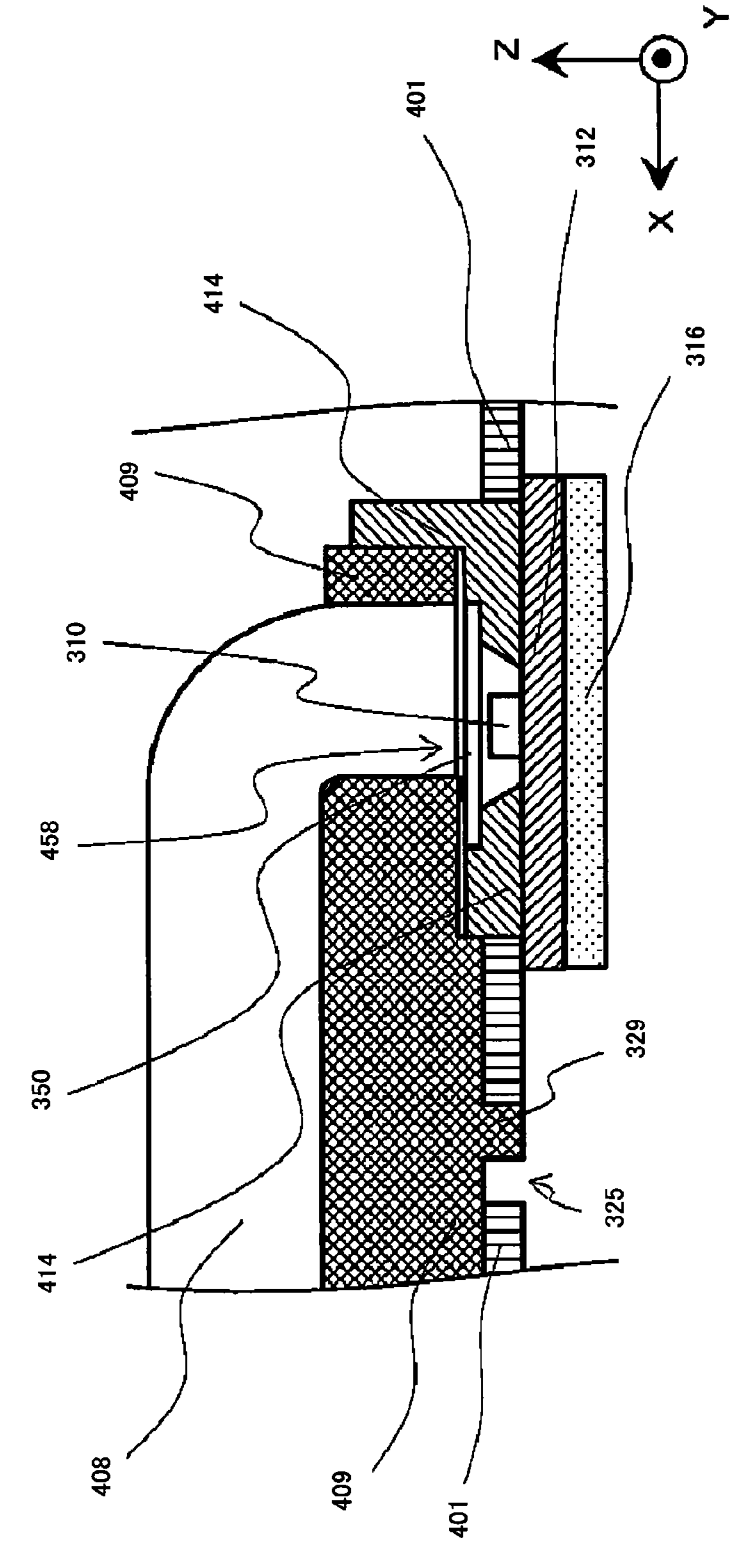
FIG. 45B is a cross-section view in the lengthwise direction near a light emitter of a light source device according to Embodiment 4 of the present invention.
Figure 45C:
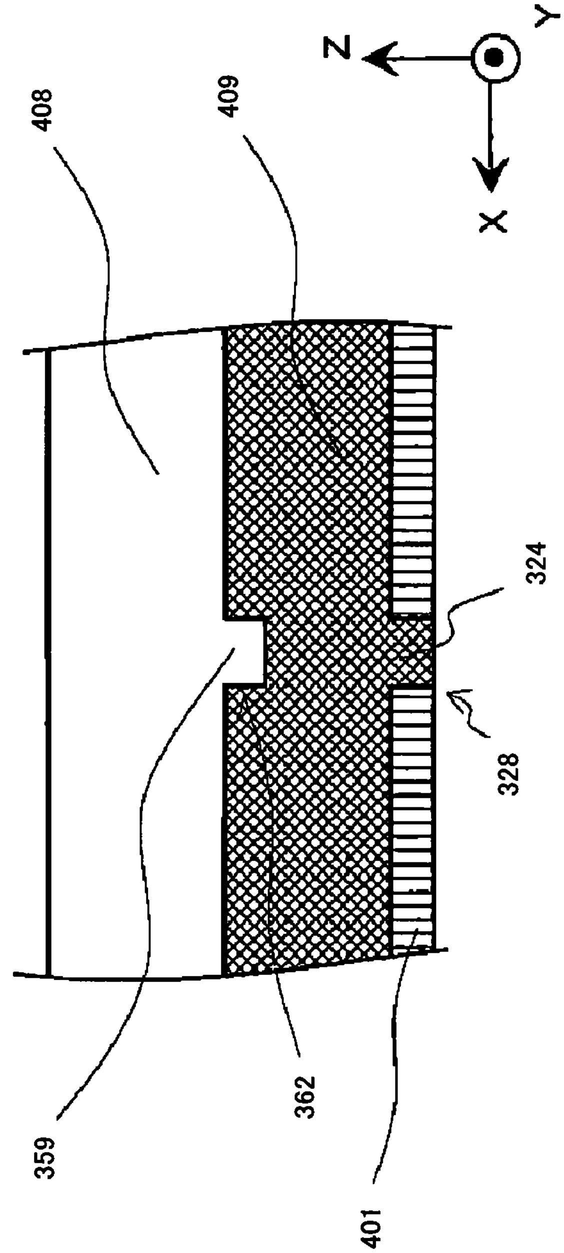
FIG. 45C is a cross-section view in the lengthwise direction near the center of a light guide of a light source device according to Embodiment 4 of the present invention.

FIGS. 45A and 45B are diagrams that correspond to a cross-section near a light emitter of a light source device along the one-dot chain line EF in FIG. 25. FIG. 45C is a diagram that corresponds to a cross-section near the center of a light guide of a light source device along the one-dot chain line EF in FIG. 25.

Figure 47A:
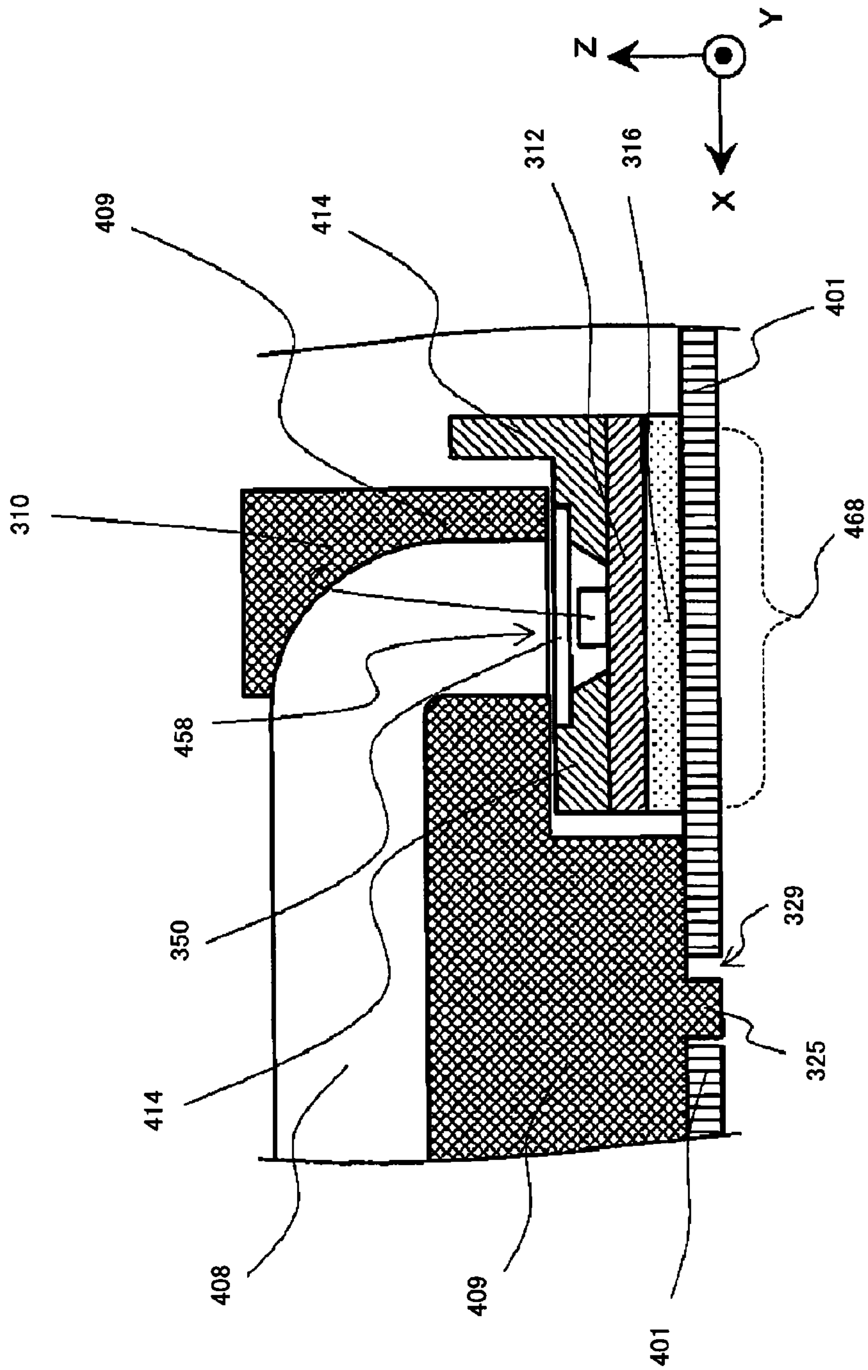
FIG. 47A is a cross-section view in the lengthwise direction near a light emitter of a light source device according to Embodiment 4 of the present invention.
Figure 47B:
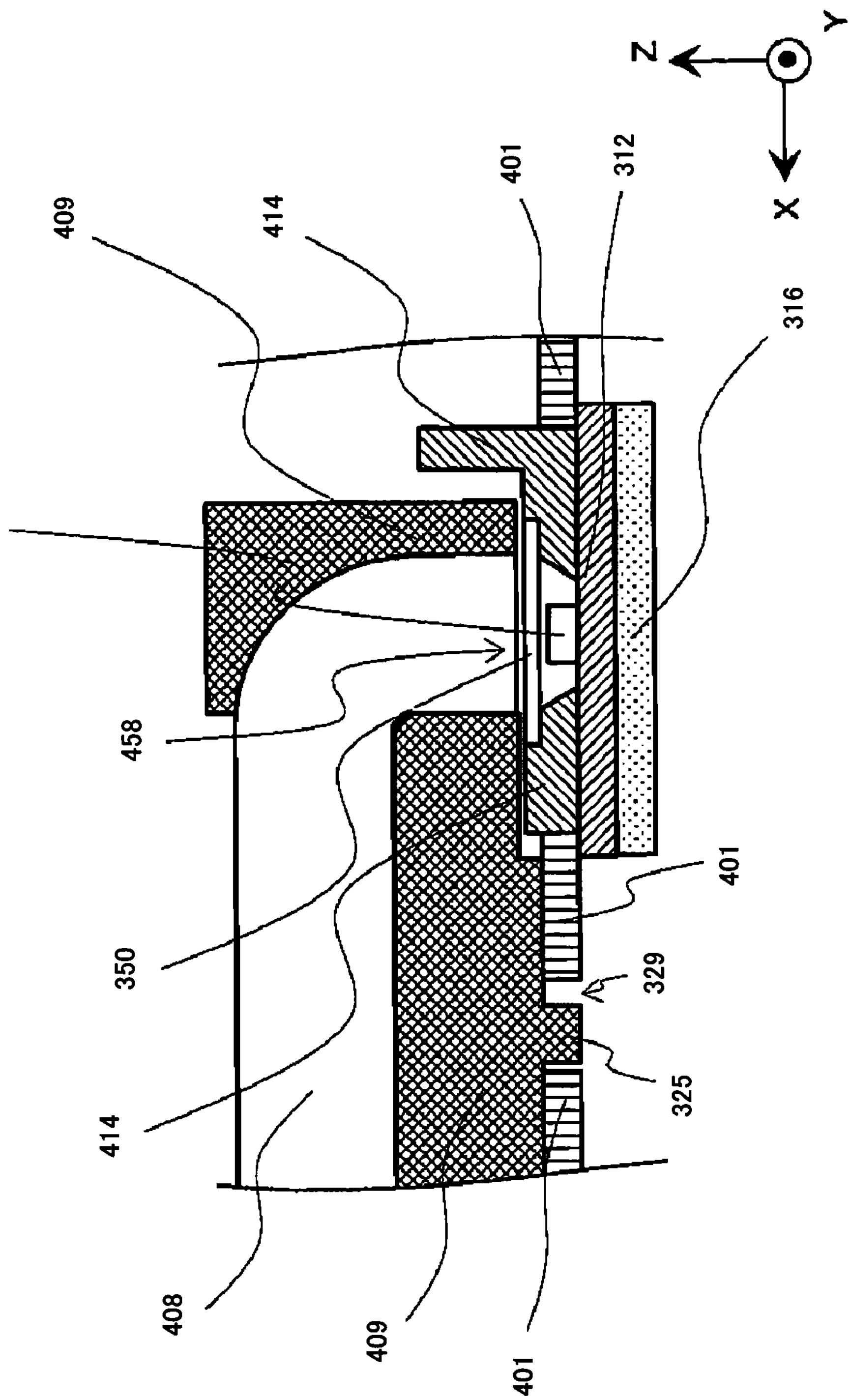
FIG. 47B is a cross-section view in the lengthwise direction near a light emitter of a light source device according to Embodiment 4 of the present invention.

FIGS. 47A and 47B are diagrams that correspond to a cross-section near a light emitter of a light source device along the one-dot chain line EF in FIG. 25.

Figure 49A:
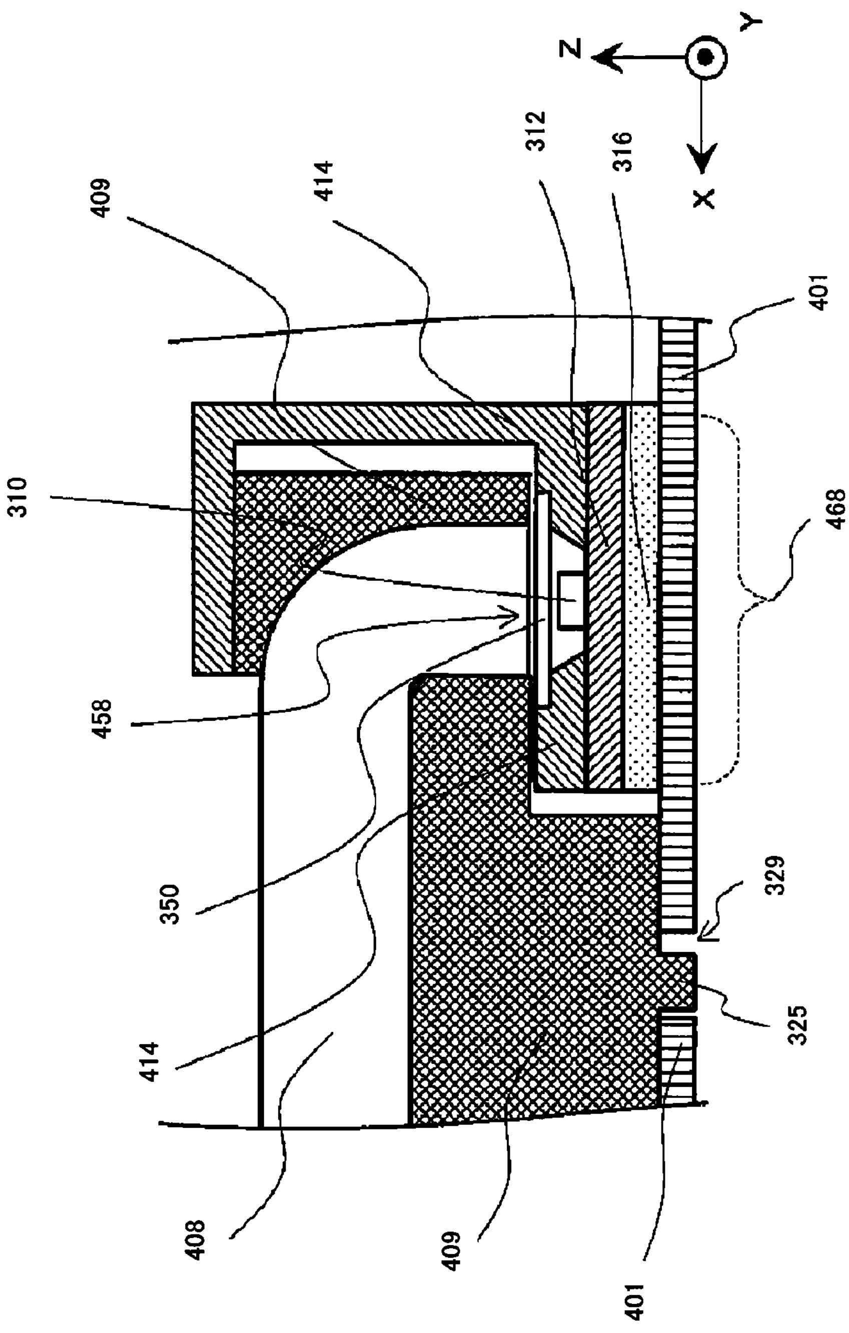
FIG. 49A is a cross-section view in the lengthwise direction near a light emitter of a light source device according to Embodiment 4 of the present invention.
Figure 49B:
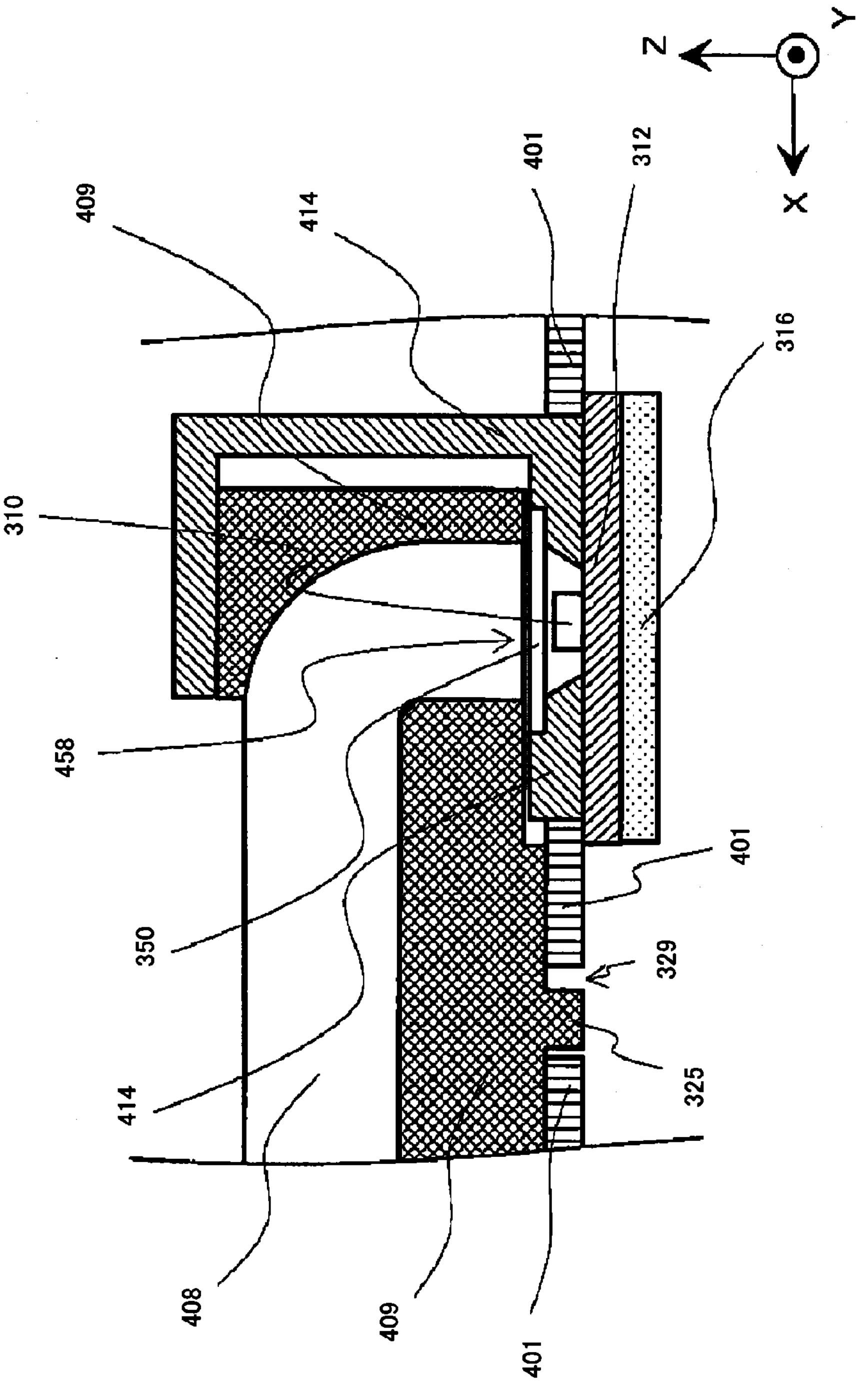
FIG. 49B is a cross-section view in the lengthwise direction near a light emitter of a light source device according to Embodiment 4 of the present invention.

FIGS. 49A and 49B are diagrams that correspond to a cross-section near a light emitter of a light source device along the one-dot chain line EF in FIG. 25.

FIGS. 50A to 50D are cross-sectional representational diagrams of only the holder 414 portion, corresponding to a cross-section near a light emitter of a light source device along the one-dot chain line EF in FIG. 25.

FIGS. 51A to 51D are cross-sectional representational diagrams of only the holder 414 portion, corresponding to a cross-section near a light emitter of a light source device along the one-dot chain line EF in FIG. 25.

Figure 52A:
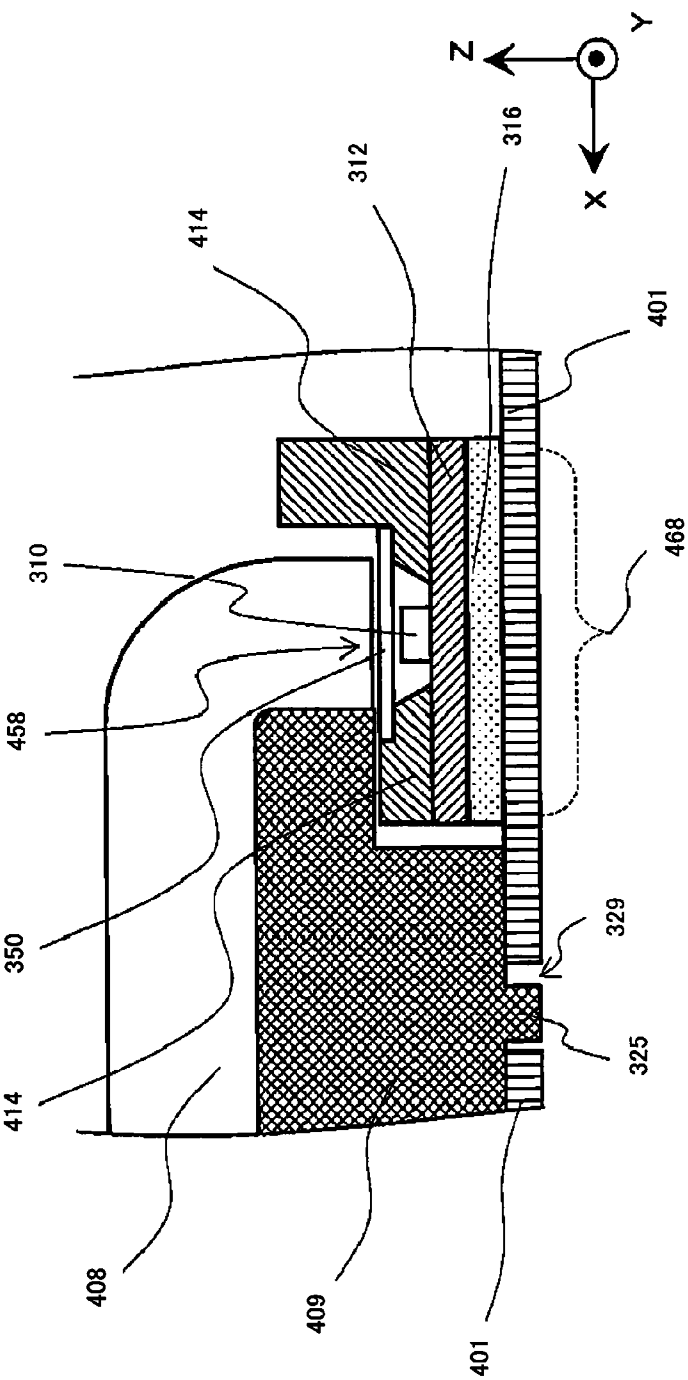
FIG. 52A is a cross-section view in the lengthwise direction near a light emitter of a light source device according to Embodiment 4 of the present invention.
Figure 52B:
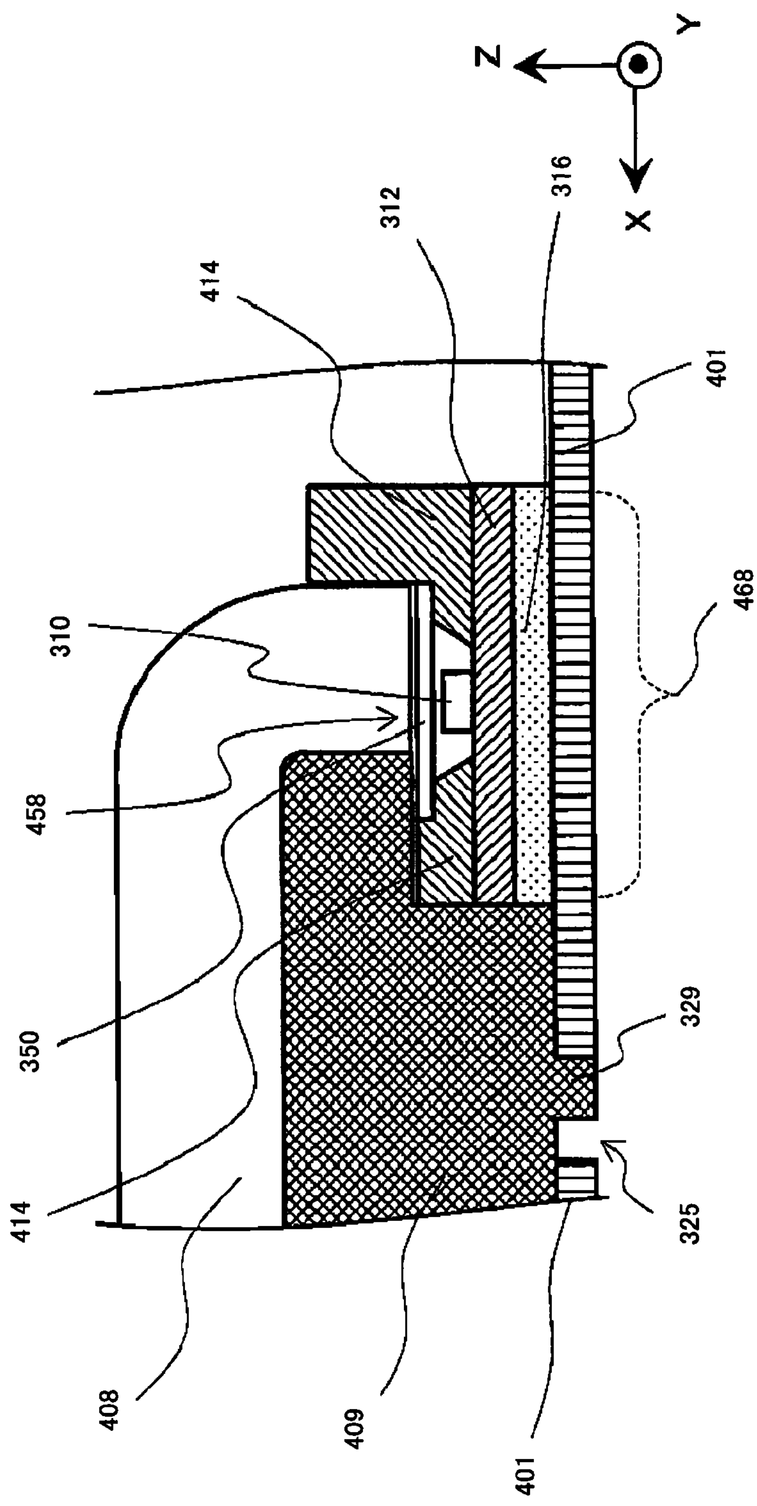
FIG. 52B is a cross-section view in the lengthwise direction near a light emitter of a light source device according to Embodiment 4 of the present invention.
Figure 52C:
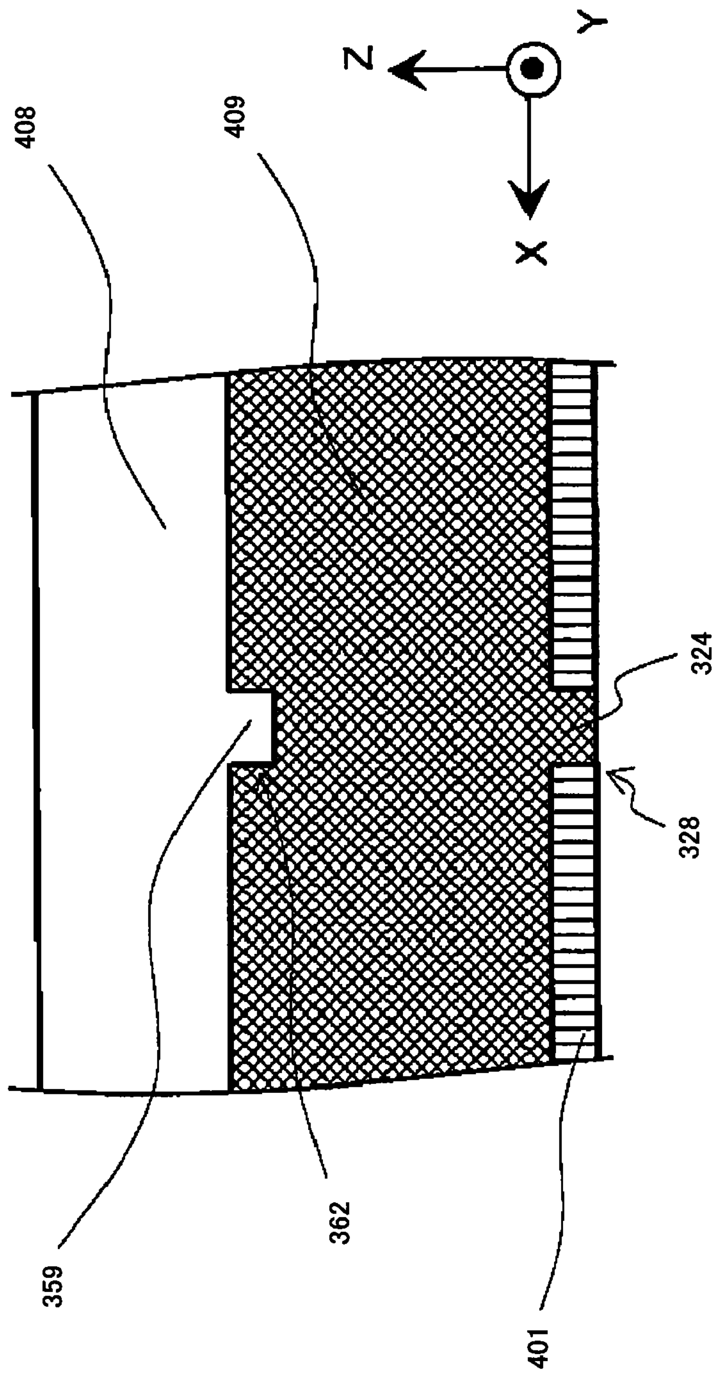
FIG. 52C is a cross-section view in the lengthwise direction near the center of a light guide of a light source device according to Embodiment 4 of the present invention.

FIGS. 52A and 52B are diagrams that correspond to a cross-section near a light emitter of a light source device along the one-dot chain line EF in FIG. 25. FIG. 52C is a diagram that corresponds to a cross-section near the center of a light guide of a light source device along the one-dot chain line EF in FIG. 25.

Figure 53A:
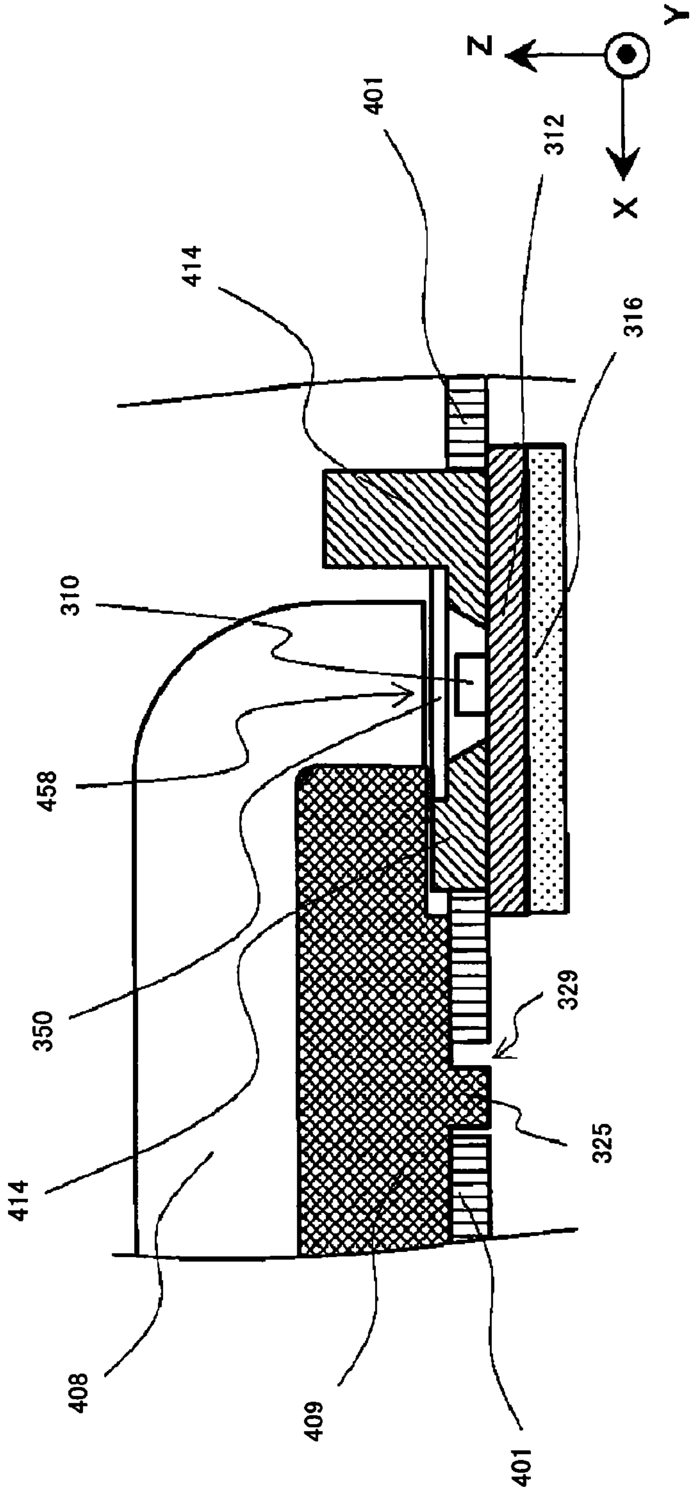
FIG. 53A is a cross-section view in the lengthwise direction near a light emitter of a light source device according to Embodiment 4 of the present invention.
Figure 53B:
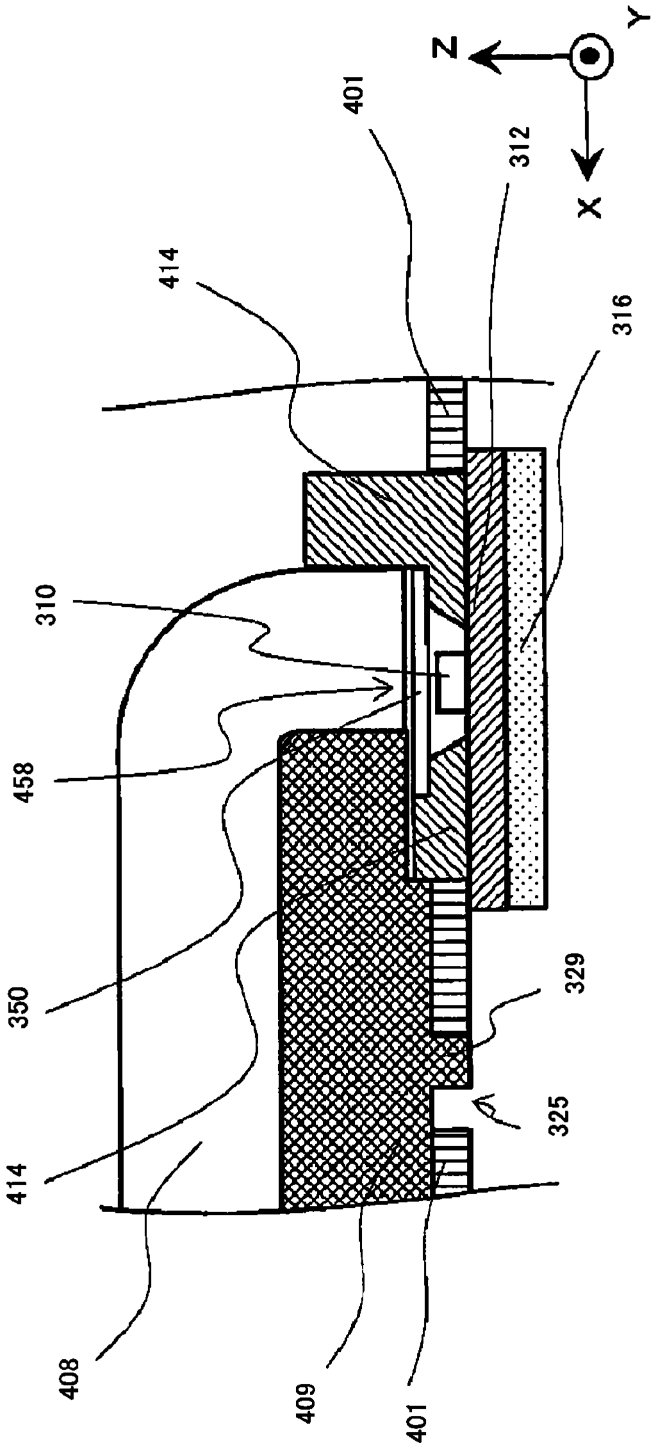
FIG. 53B is a cross-section view in the lengthwise direction near a light emitter of a light source device according to Embodiment 4 of the present invention.
Figure 53C:
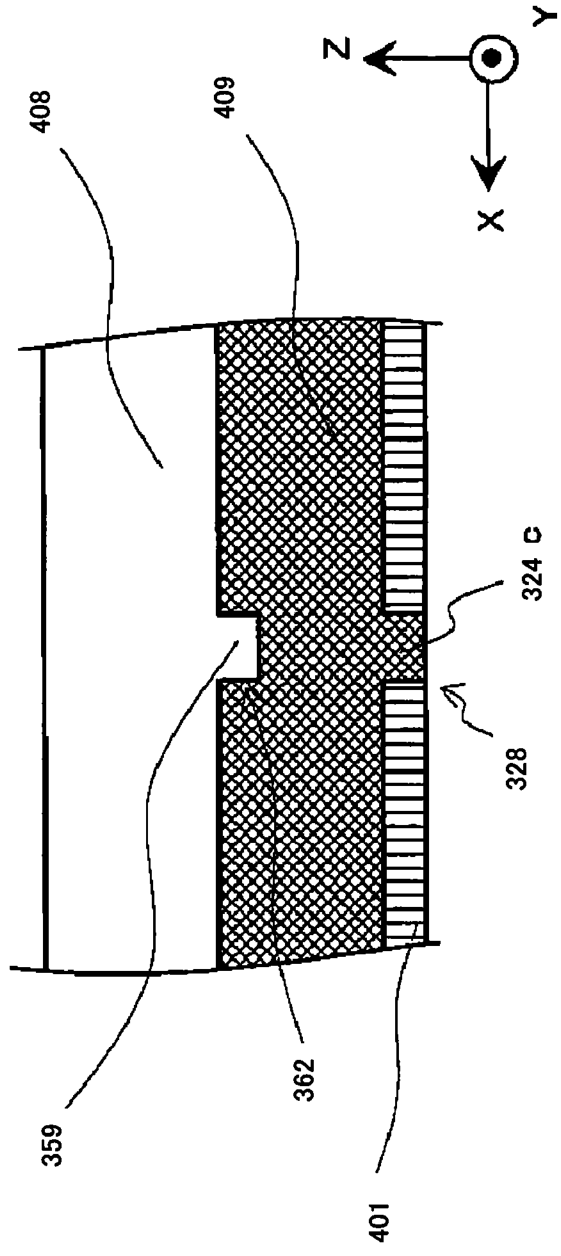
FIG. 53C is a cross-section view in the lengthwise direction near the center of a light guide of a light source device according to Embodiment 4 of the present invention.

FIGS. 53A and 53B are diagrams that correspond to a cross-section near a light emitter of a light source device along the one-dot chain line EF in FIG. 25. FIG. 53C is a diagram that corresponds to a cross-section near the center of a light guide of a light source device along the one-dot chain line EF in FIG. 25.

FIGS. 43A to 43C, FIGS. 45A to 45C, FIGS. 47A and 47B, FIGS. 49A and 49B, FIGS. 52A to 52C, and FIGS. 53A to 53C illustrate variations in the shape in which a light guide holder 409 is disposed on a first opening of the holder 414.

Figure 54A:
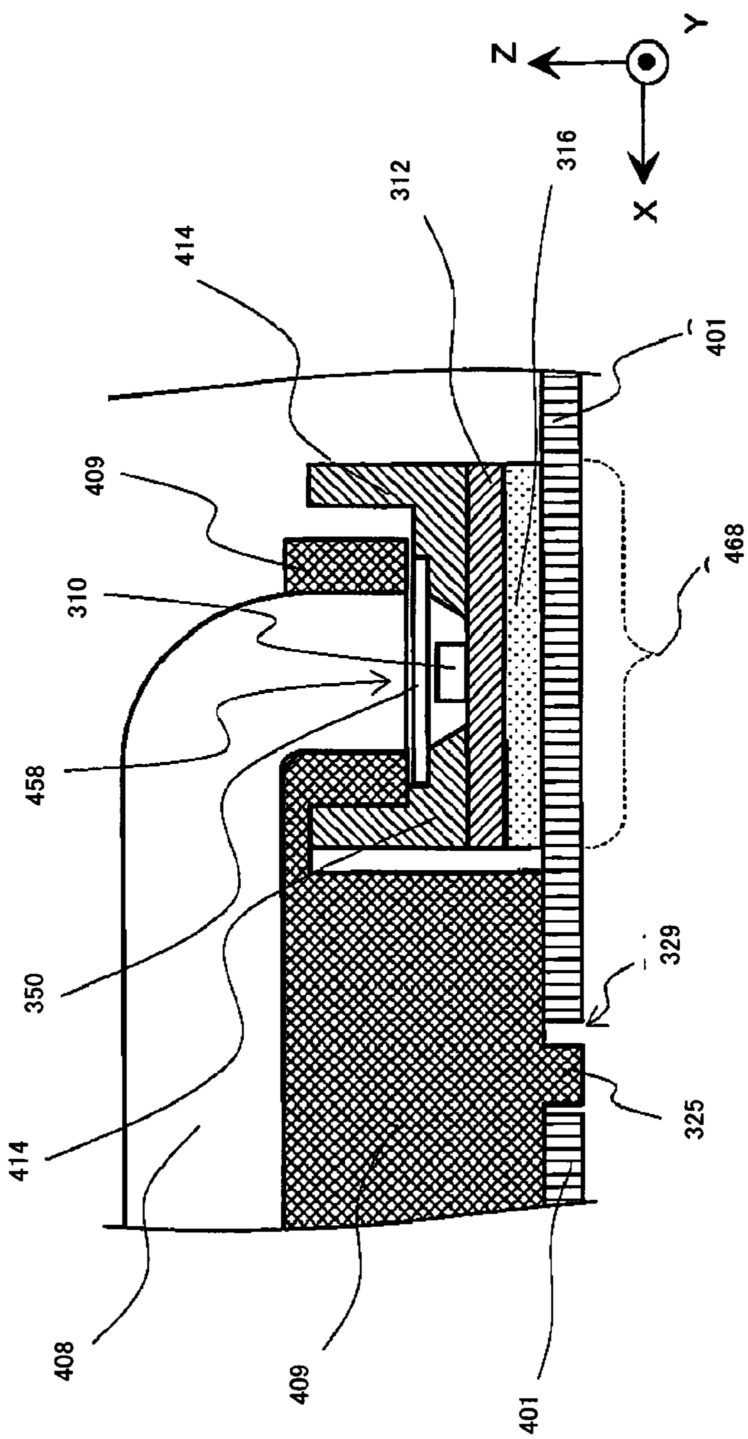
FIG. 54A is a cross-section view in the lengthwise direction near a light emitter of a light source device according to Embodiment 4 of the present invention.
Figure 54B:
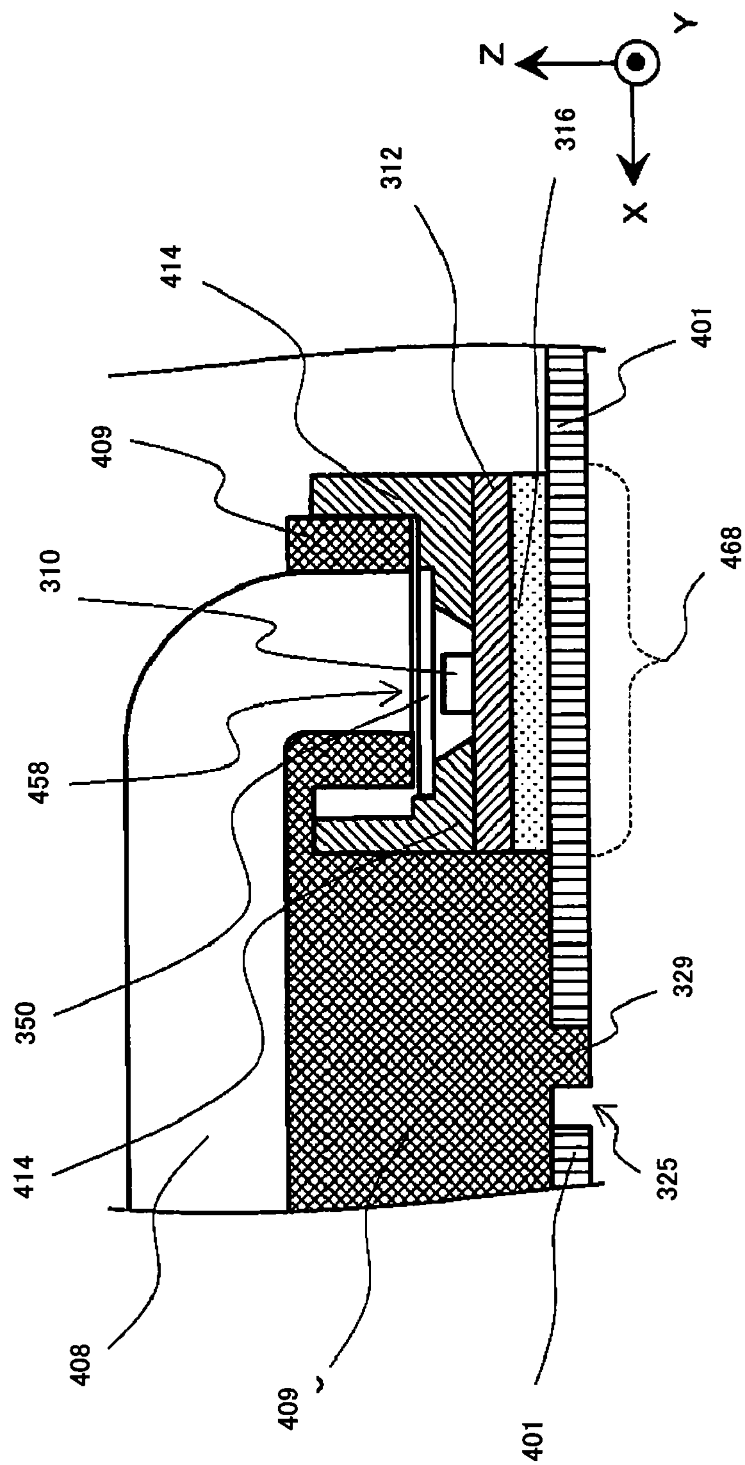
FIG. 54B is a cross-section view in the lengthwise direction near a light emitter of a light source device according to Embodiment 4 of the present invention.
Figure 54C:
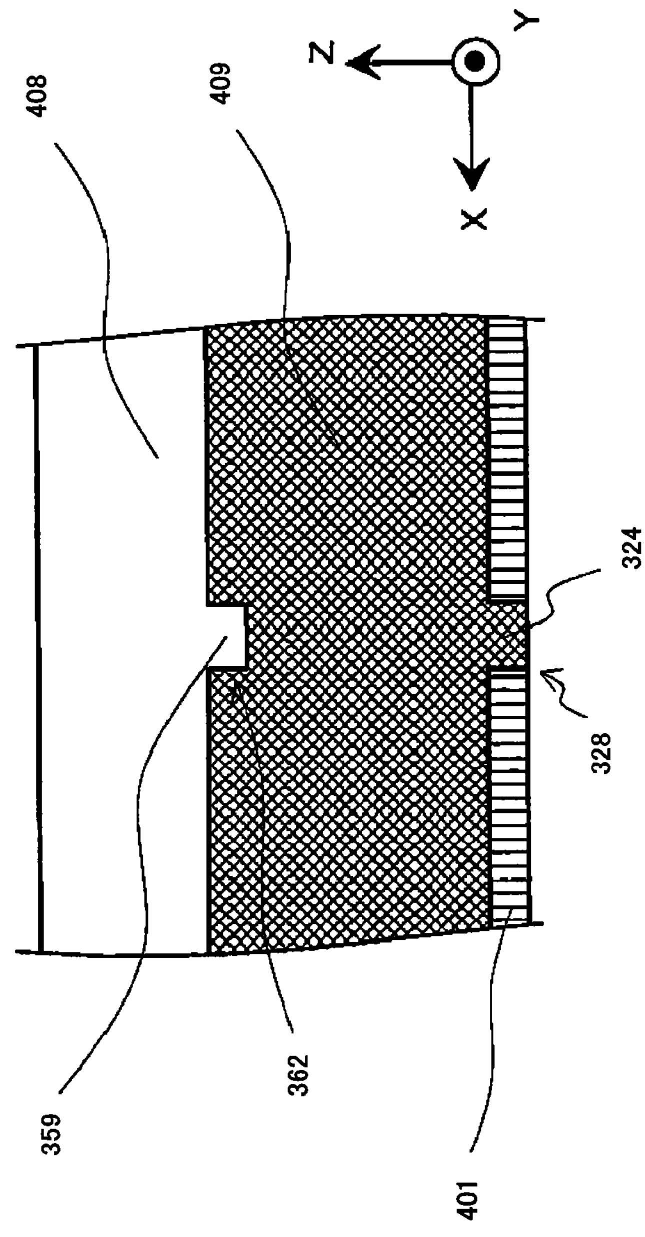
FIG. 54C is a cross-section view in the lengthwise direction near the center of a light guide of a light source device according to Embodiment 4 of the present invention.

FIGS. 54A and 54B are diagrams that correspond to a cross-section near a light emitter of a light source device along the one-dot chain line EF in FIG. 25. FIG. 54C is a diagram that corresponds to a cross-section near the center of a light guide of a light source device along the one-dot chain line EF in FIG. 25.

Figure 55A:
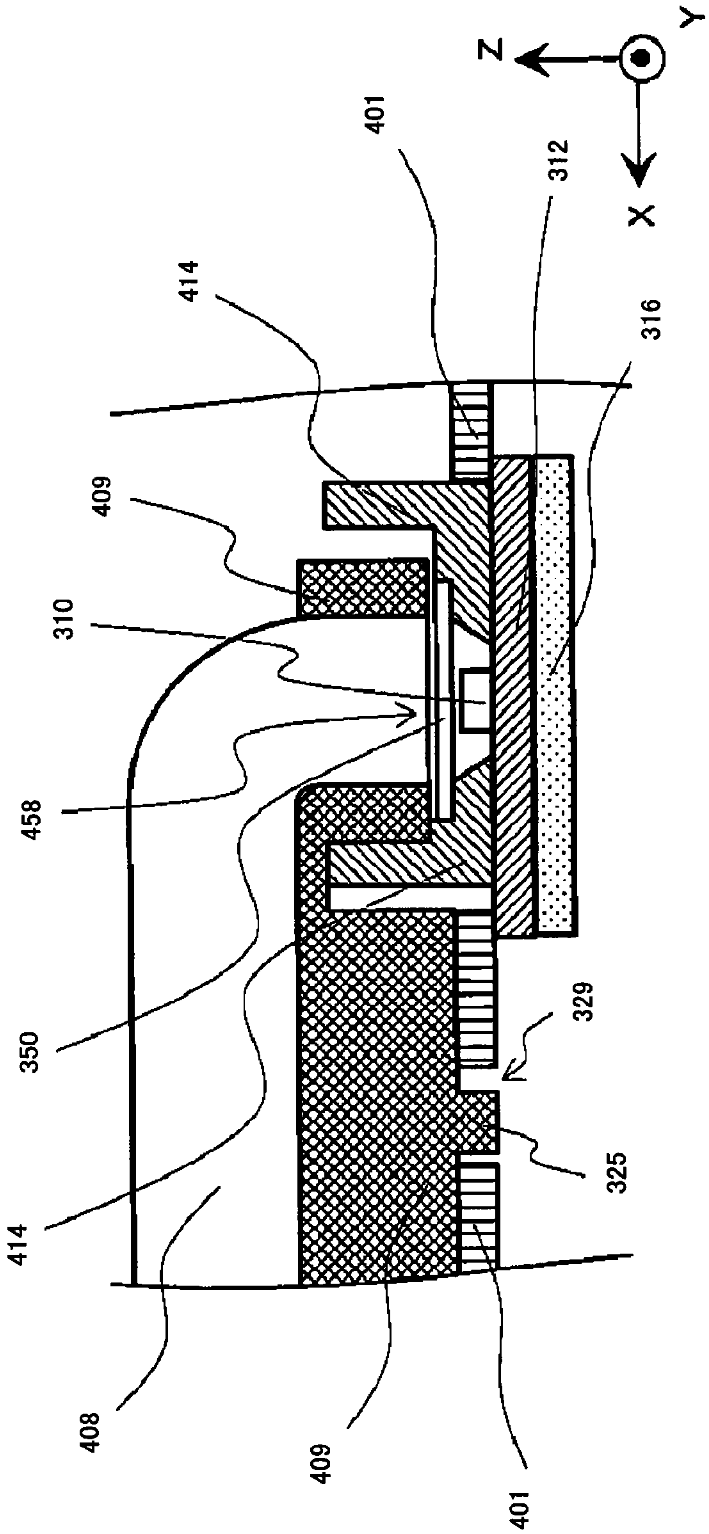
FIG. 55A is a cross-section view in the lengthwise direction near a light emitter of a light source device according to Embodiment 4 of the present invention.
Figure 55B:
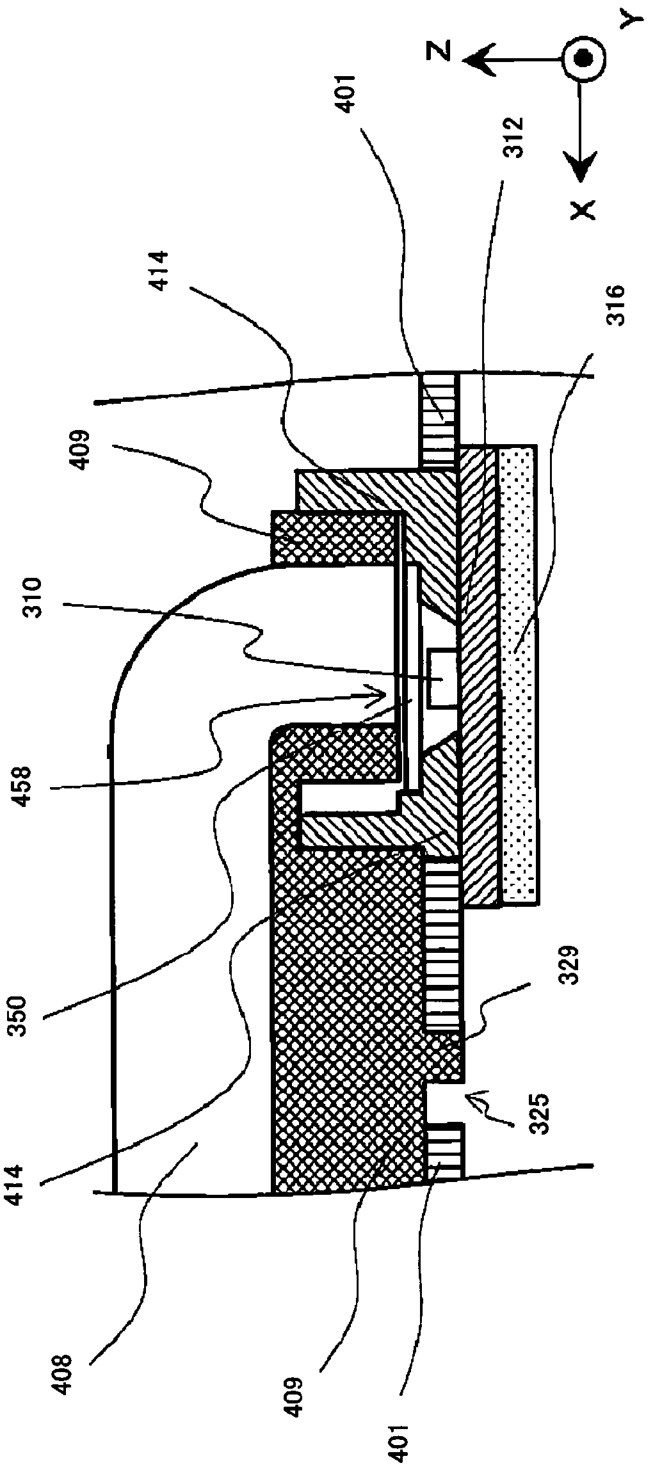
FIG. 55B is a cross-section view in the lengthwise direction near a light emitter of a light source device according to Embodiment 4 of the present invention.
Figure 55C:
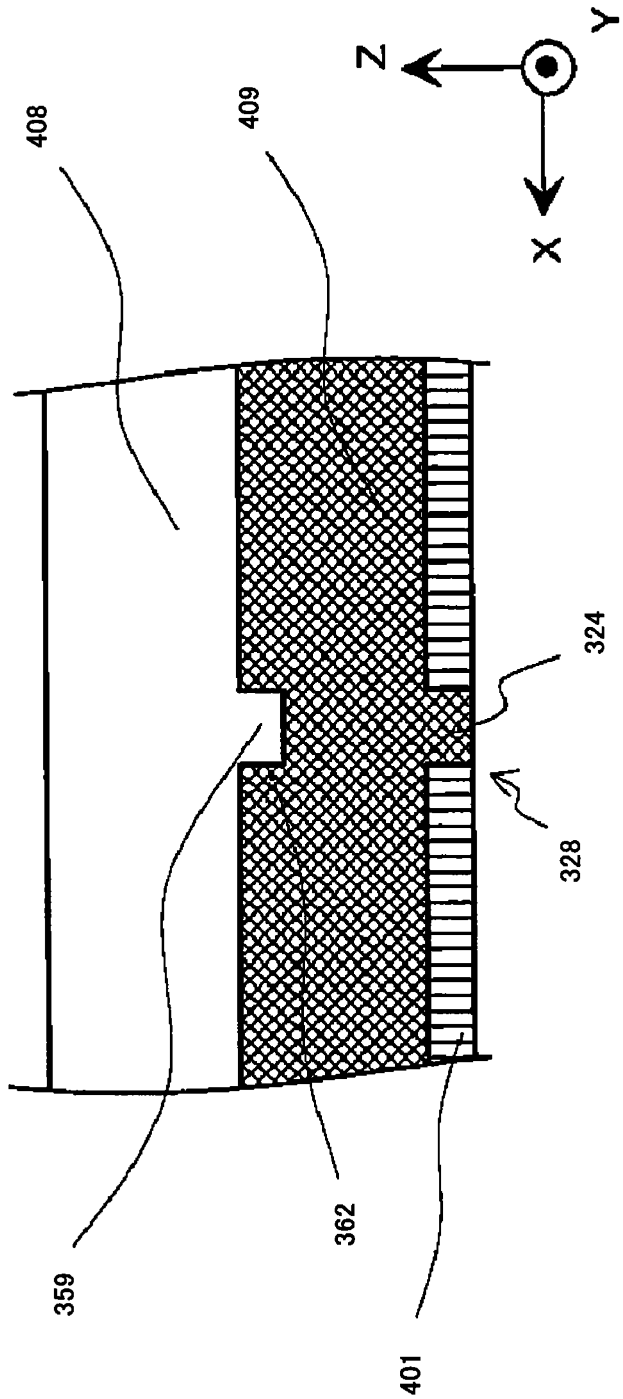
FIG. 55C is a cross-section view in the lengthwise direction near the center of a light guide of a light source device according to Embodiment 4 of the present invention.

FIGS. 55A and 55B are diagrams that correspond to a cross-section near a light emitter of a light source device along the one-dot chain line EF in FIG. 25. FIG. 55C is a diagram that corresponds to a cross-section near the center of a light guide of a light source device along the one-dot chain line EF in FIG. 25.

Figure 56A:
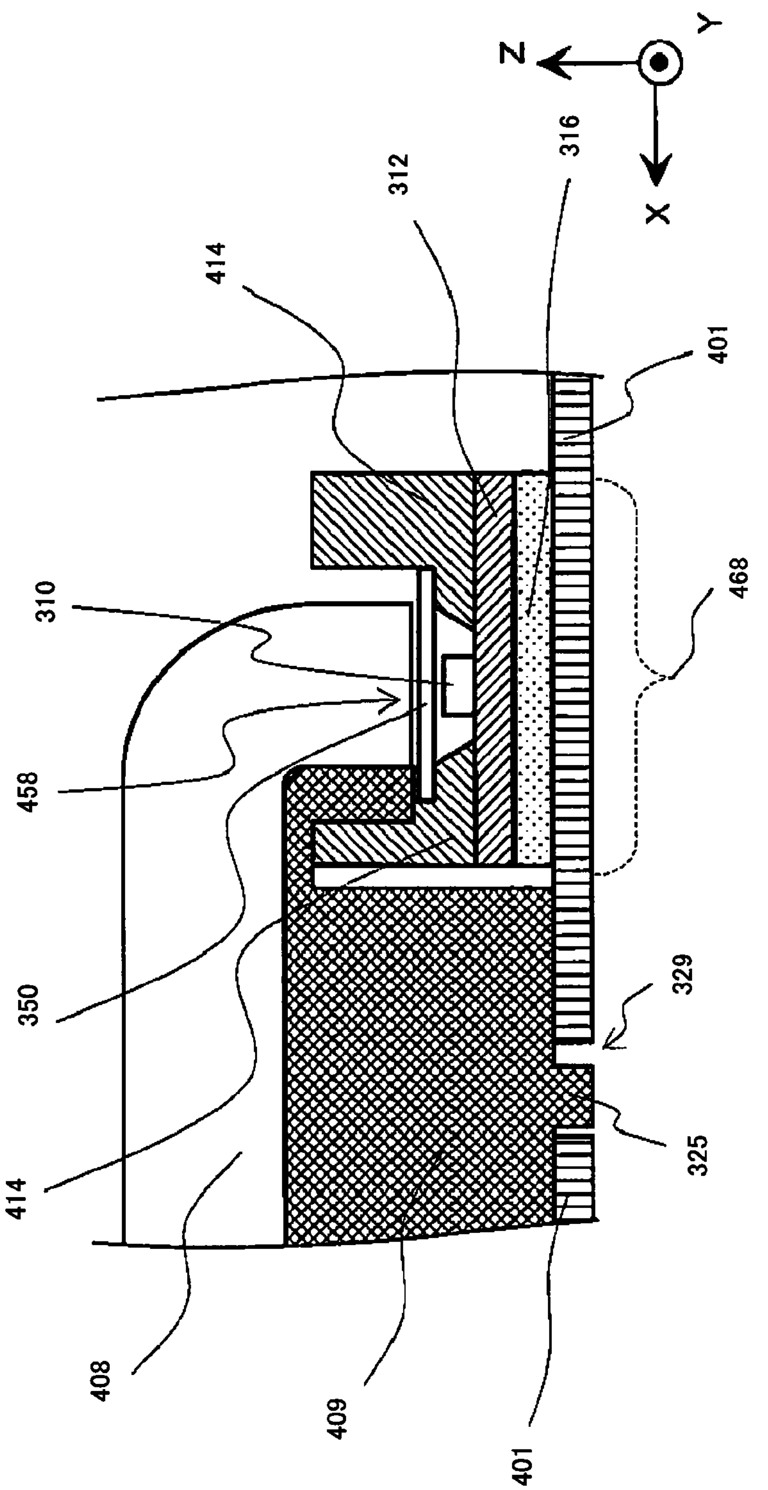
FIG. 56A is a cross-section view in the lengthwise direction near a light emitter of a light source device according to Embodiment 4 of the present invention.
Figure 56B:
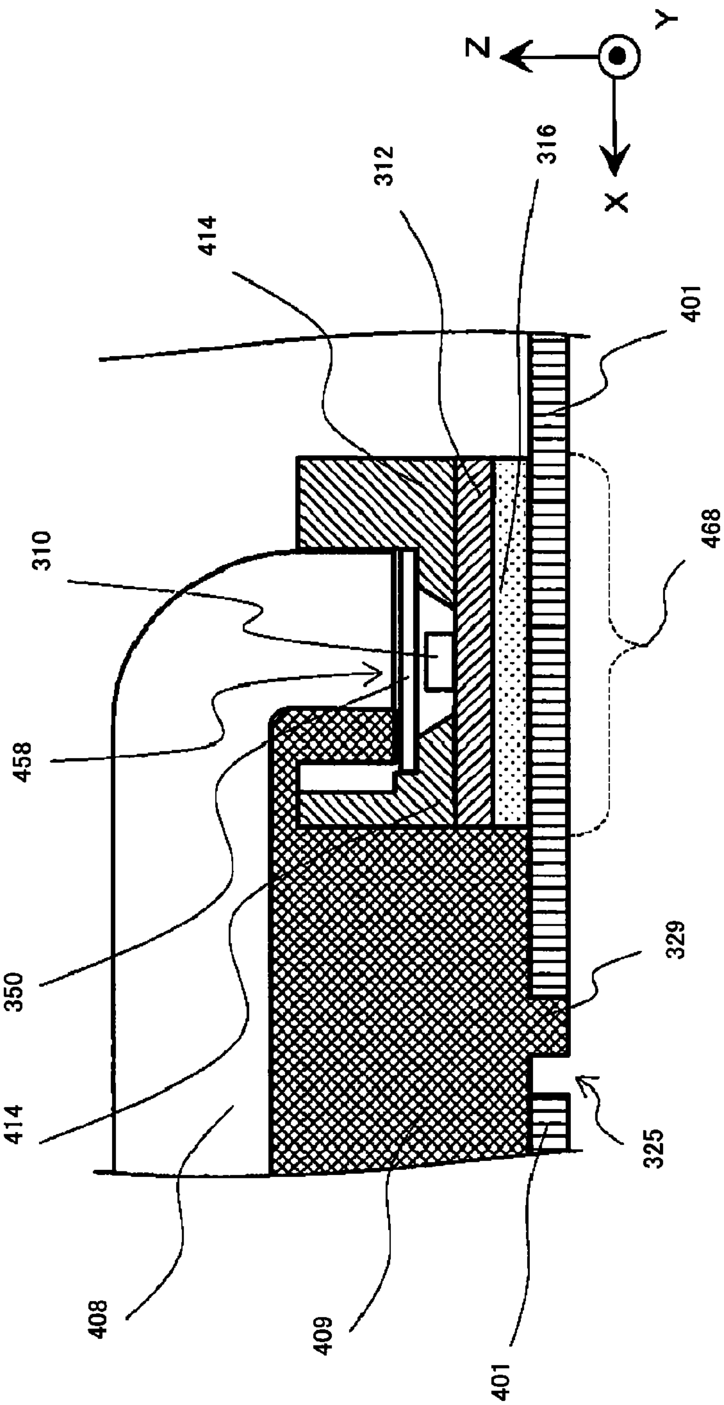
FIG. 56B is a cross-section view in the lengthwise direction near a light emitter of a light source device according to Embodiment 4 of the present invention.
Figure 56C:
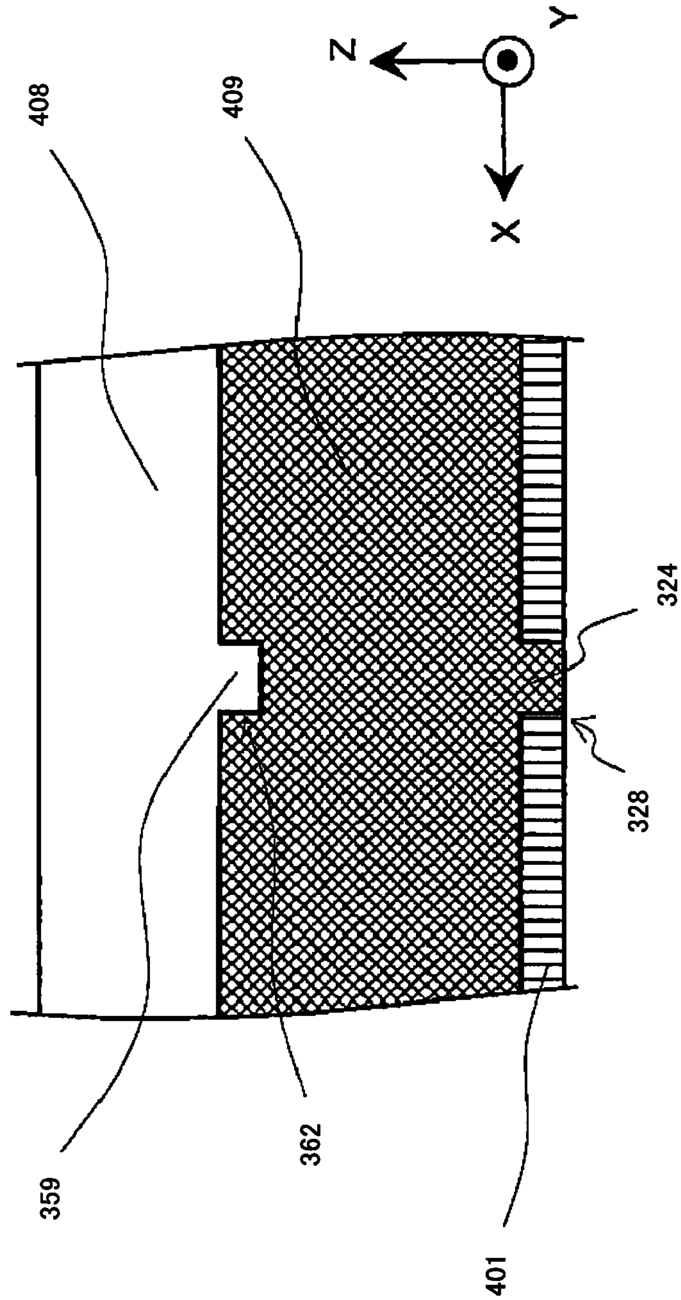
FIG. 56C is a cross-section view in the lengthwise direction near the center of a light guide of a light source device according to Embodiment 4 of the present invention.

FIGS. 56A and 56B are diagrams that correspond to a cross-section near a light emitter of a light source device along the one-dot chain line EF in FIG. 25. FIG. 56C is a diagram that corresponds to a cross-section near the center of a light guide of a light source device along the one-dot chain line EF in FIG. 25.

Figure 57A:
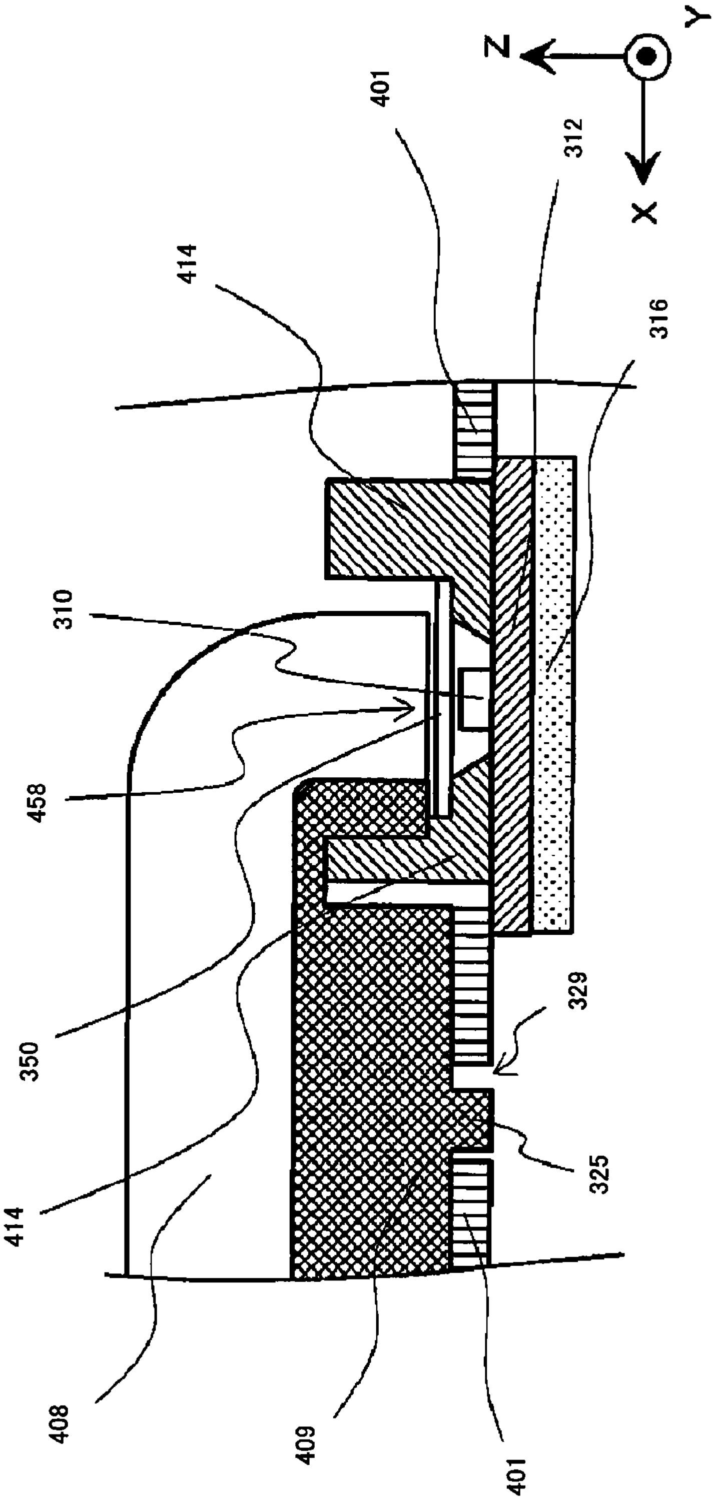
FIG. 57A is a cross-section view in the lengthwise direction near a light emitter of a light source device according to Embodiment 4 of the present invention.
Figure 57B:
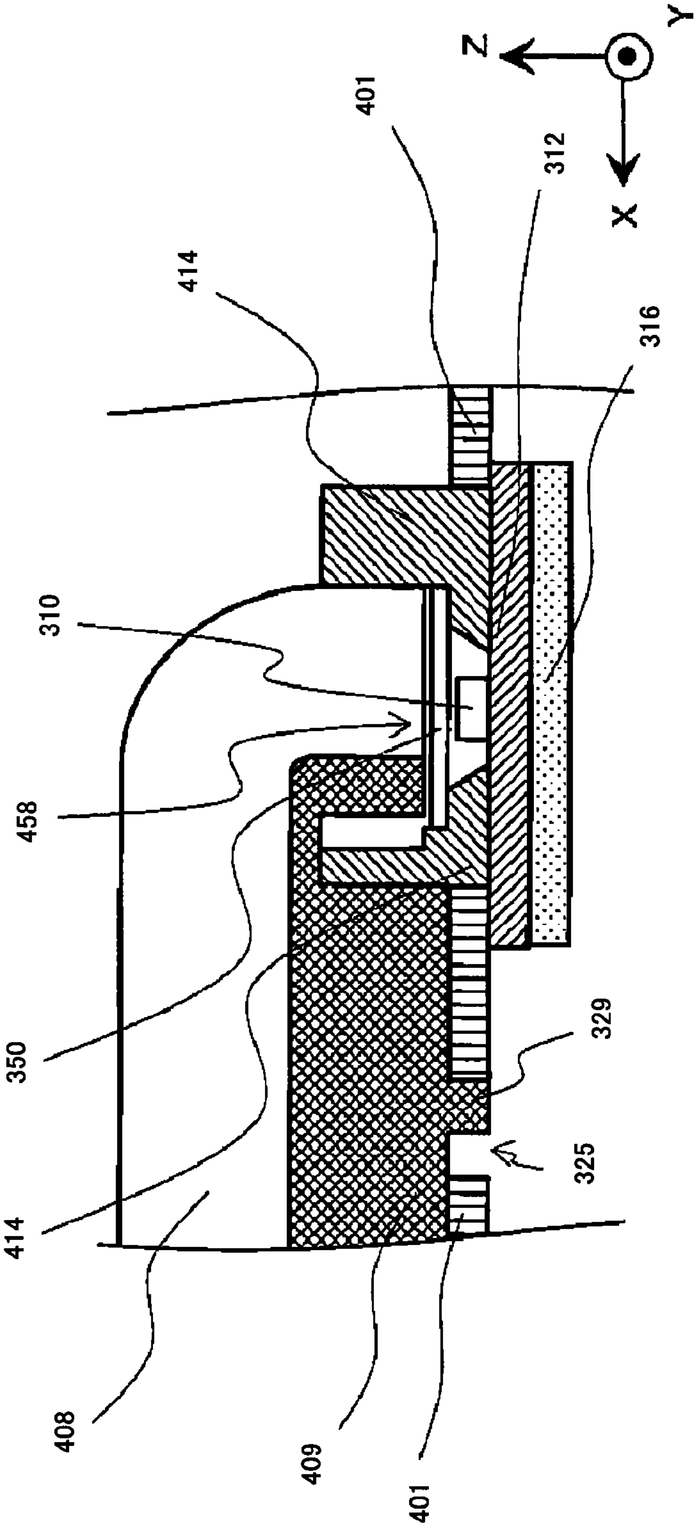
FIG. 57B is a cross-section view in the lengthwise direction near a light emitter of a light source device according to Embodiment 4 of the present invention.
Figure 57C:
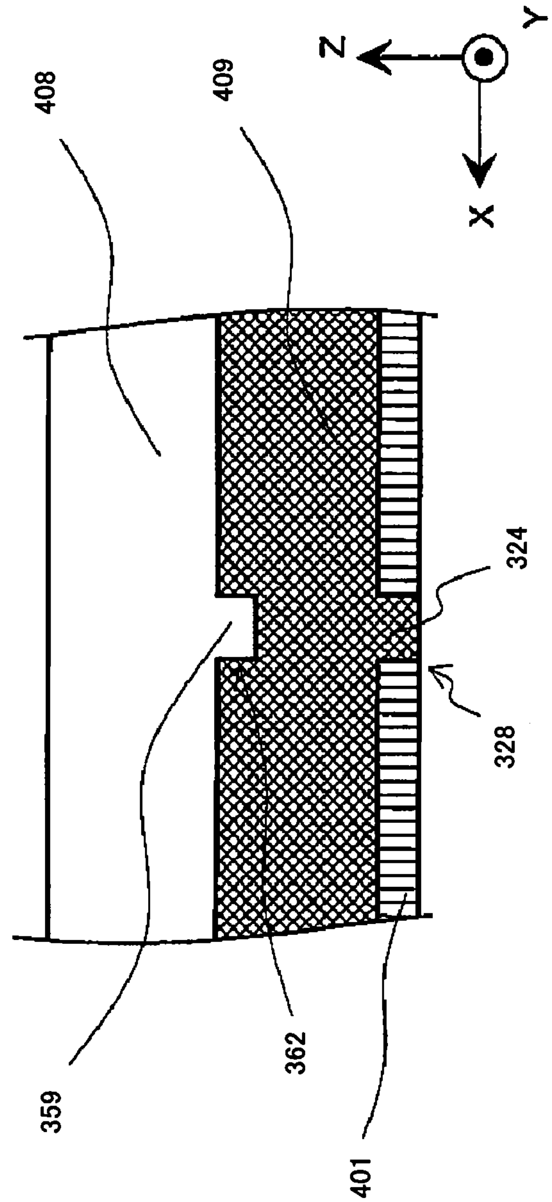
FIG. 57C is a cross-section view in the lengthwise direction near the center of a light guide of a light source device according to Embodiment 4 of the present invention.

FIGS. 57A and 57B are diagrams that correspond to a cross-section near a light emitter of a light source device along the one-dot chain line EF in FIG. 25. FIG. 57C is a diagram that corresponds to a cross-section near the center of a light guide of a light source device along the one-dot chain line EF in FIG. 25. FIGS. 54 to 57 illustrate variations in the shape in which the light guide holder 409 is inserted into the first opening of the holder 414.

Figure 58A:
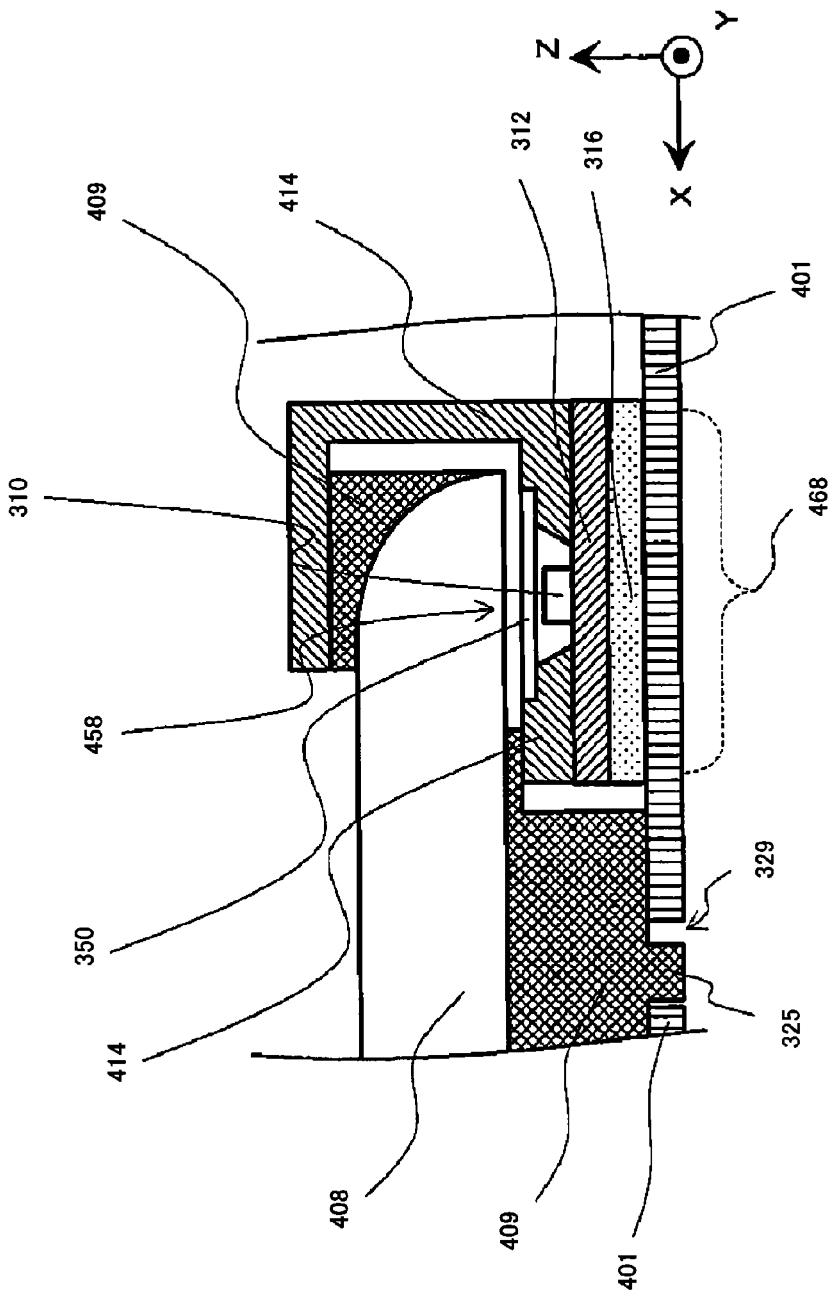
FIG. 58A is a cross-section view in the lengthwise direction near a light emitter of a light source device according to Embodiment 4 of the present invention.
Figure 58B:
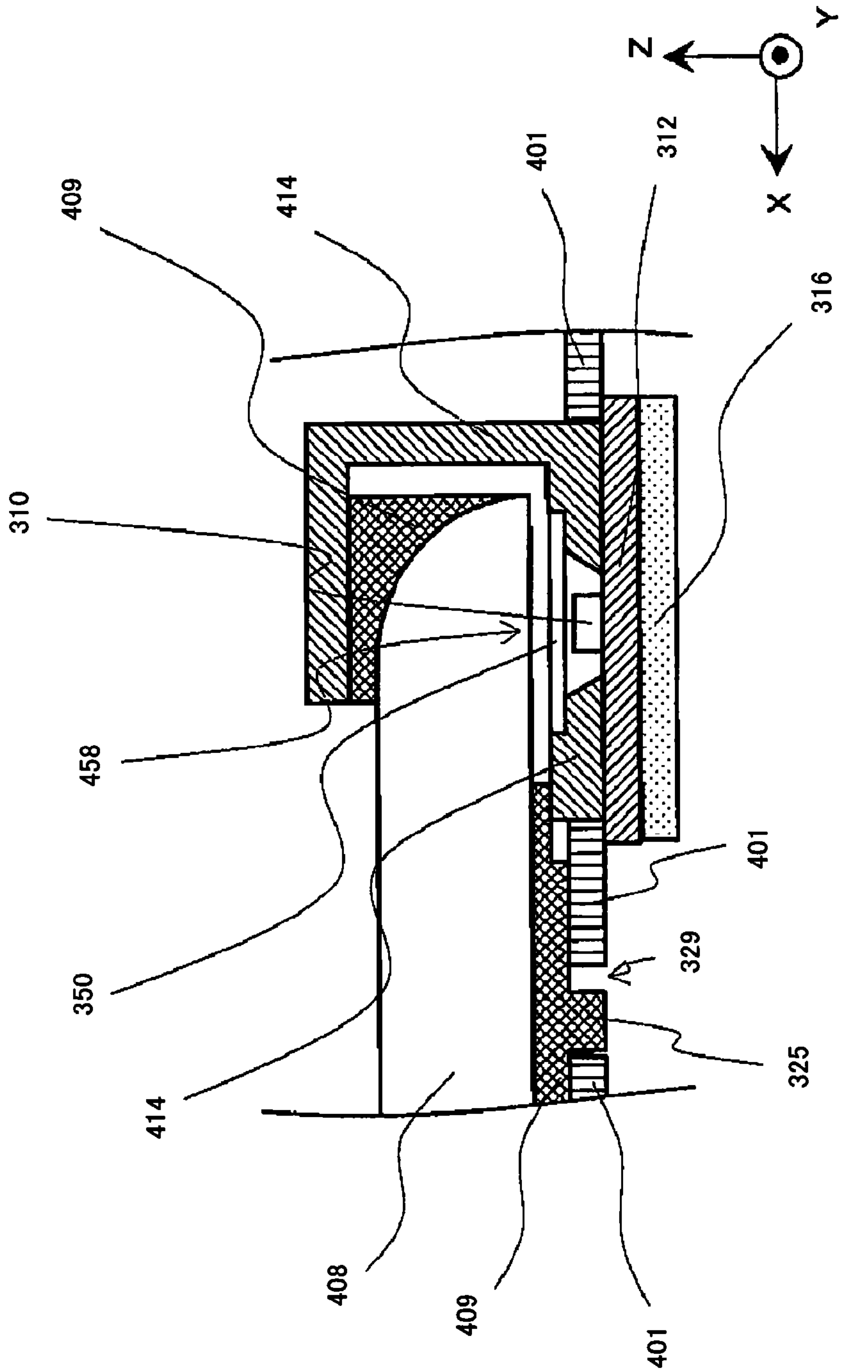
FIG. 58B is a cross-section view in the lengthwise direction near a light emitter of a light source device according to Embodiment 4 of the present invention.

FIGS. 58A and 58B are diagrams that correspond to a cross-section near a light emitter of a light source device along the one-dot chain line EF in FIG. 25.

Figure 59A:
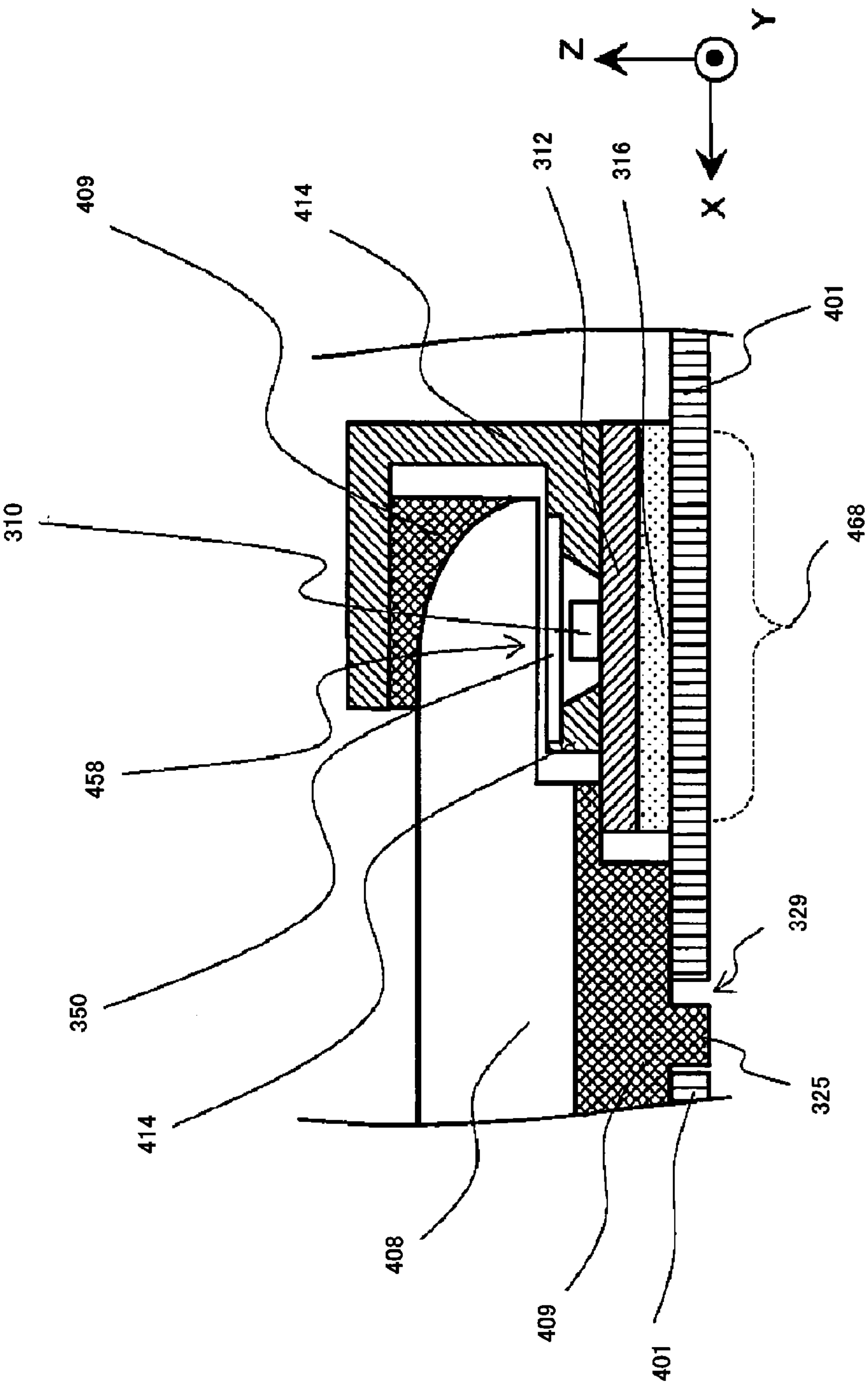
FIG. 59A is a cross-section view in the lengthwise direction near a light emitter of a light source device according to Embodiment 4 of the present invention.
Figure 59B:
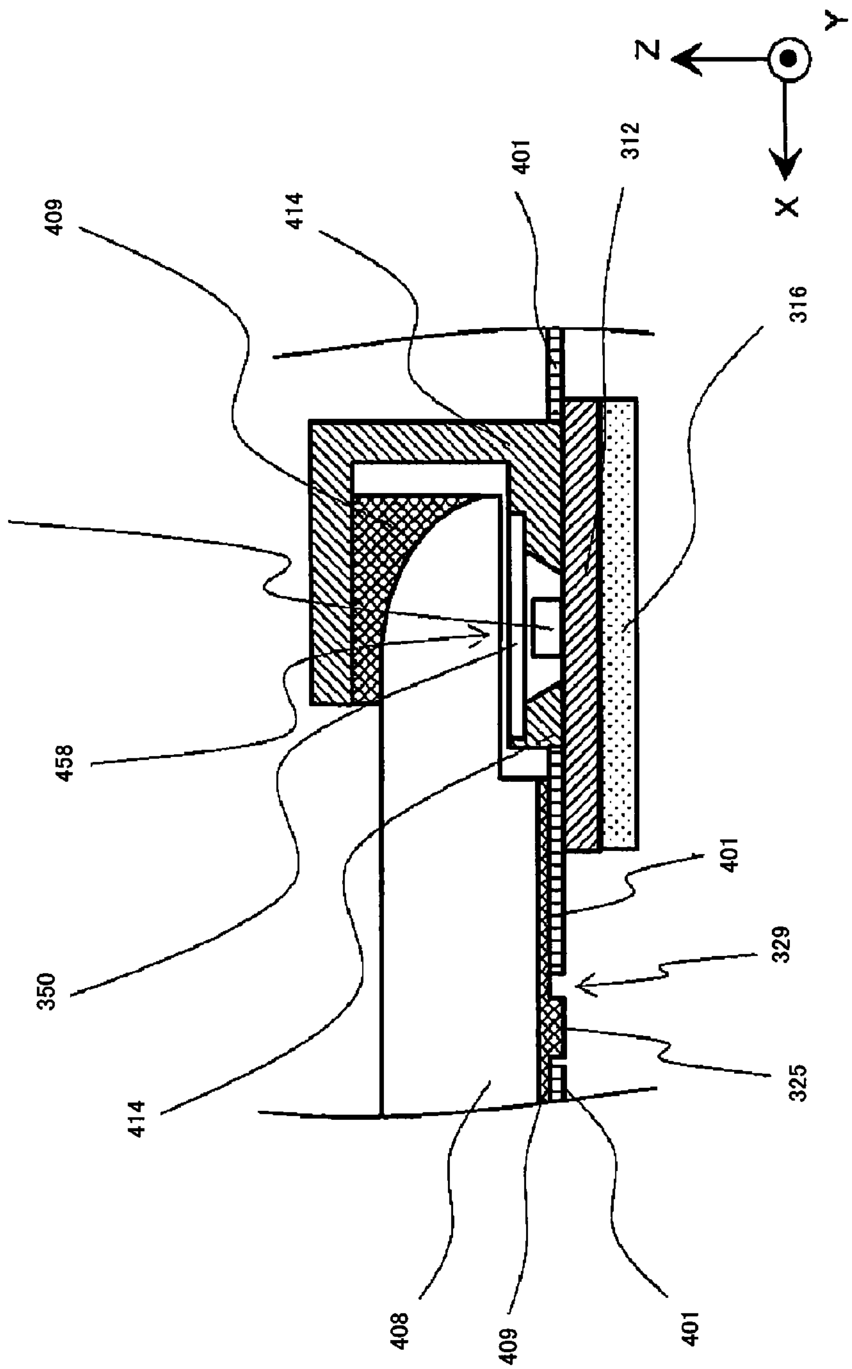
FIG. 59B is a cross-section view in the lengthwise direction near a light emitter of a light source device according to Embodiment 4 of the present invention.

FIGS. 59A and 59B are diagrams that correspond to a cross-section near a light emitter of a light source device along the one-dot chain line EF in FIG. 25.

Figure 60A:
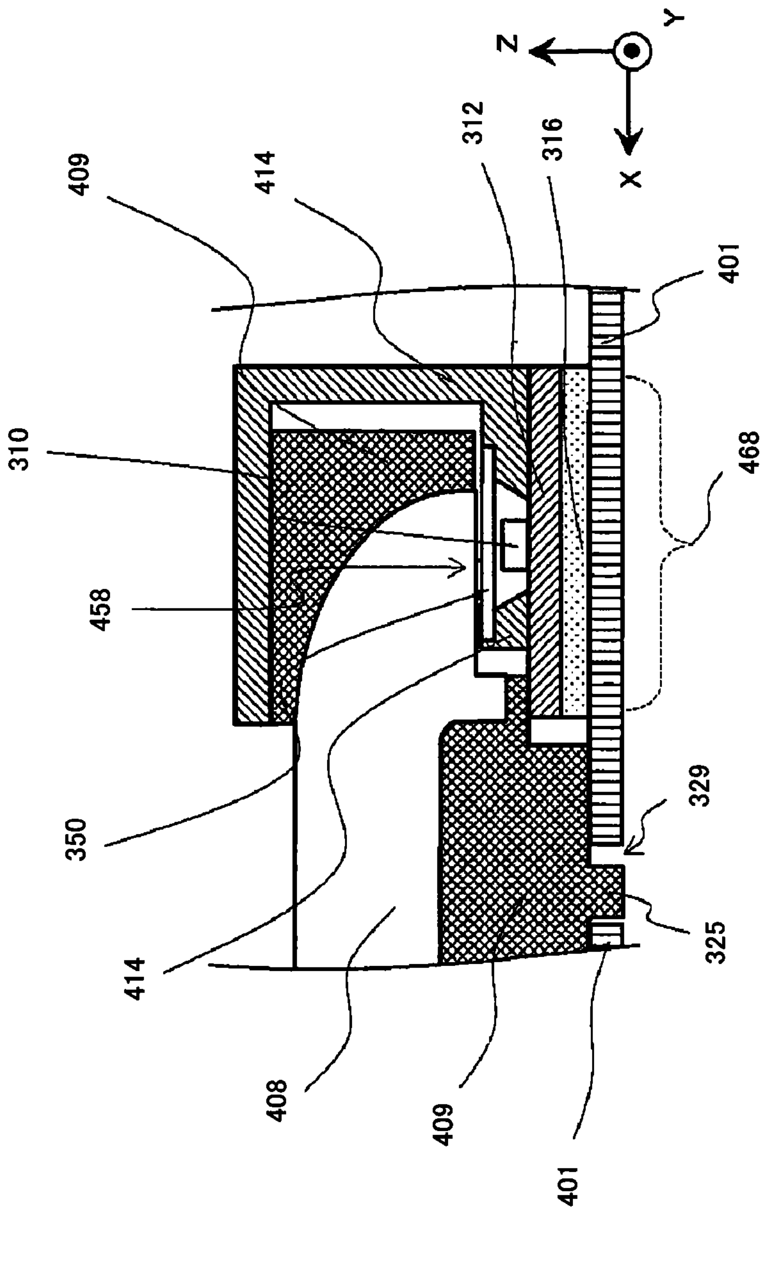
FIG. 60A is a cross-section view in the lengthwise direction near a light emitter of a light source device according to Embodiment 4 of the present invention.
Figure 60B:
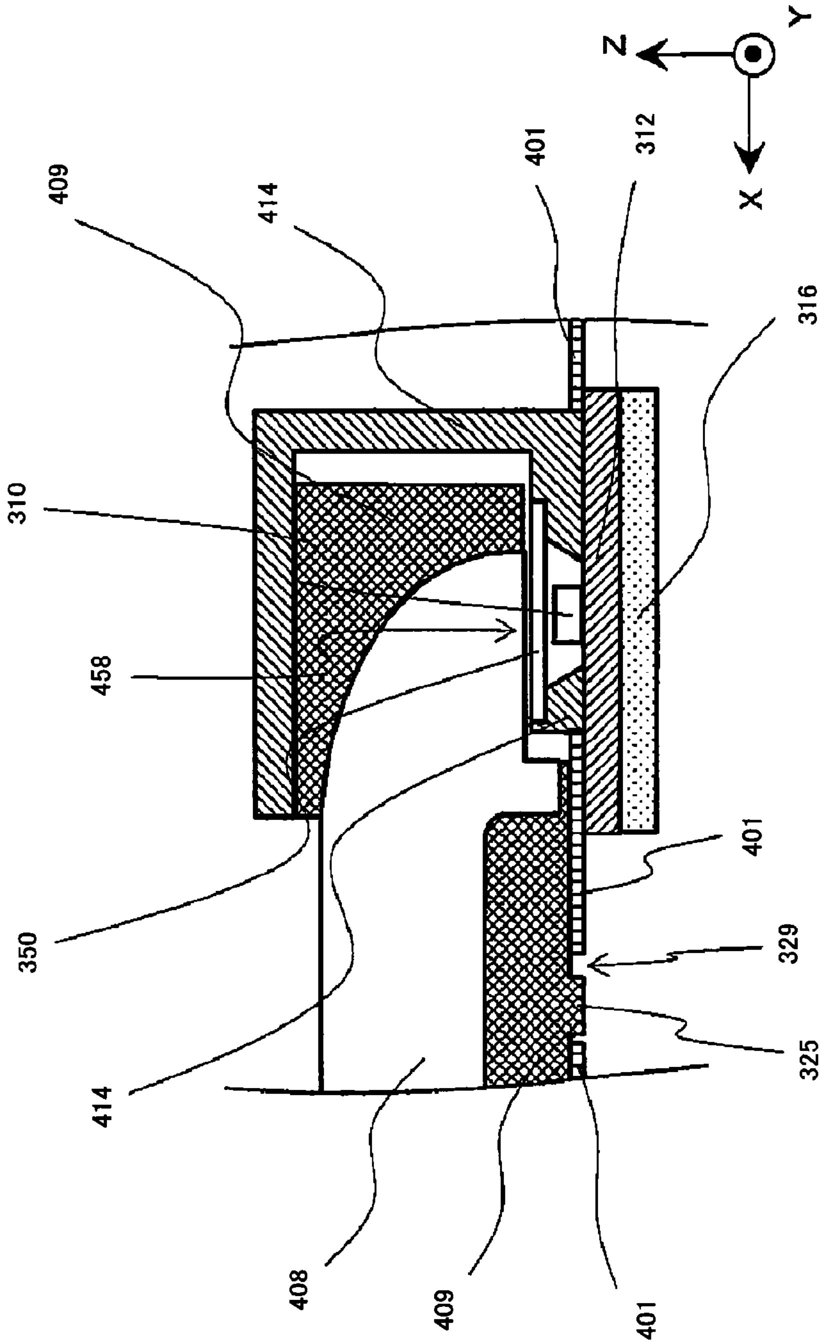
FIG. 60B is a cross-section view in the lengthwise direction near a light emitter of a light source device according to Embodiment 4 of the present invention.

FIGS. 60A and 60B are diagrams that correspond to a cross-section near a light emitter of a light source device along the one-dot chain line EF in FIG. 25. FIGS. 58A and 58B, FIGS. 59A and 59B, and FIGS. 60A and 60B illustrate variations in the shape of the end faces 458 of the light guide 408.

FIGS. 42 to 60 will be referenced. Fasteners 468 are sites on the housing 401 (planar member 463) to which the light emitters 456 and 457 (substrates 312 and 313) are fastened directly or via the heat transfer bodies 316 and 317. Light emitter holes 467 are holes formed in the housing 401 (planar member 463). The light emitters 356 and 357 (substrates 312 and 313) are attached to the housing 401 (planar member 463) via the light emitter holes 467.

Note that the light emitter holes 467 are not required to be complete holes in which the periphery of the light emitter holes 467 is surrounded by the housing 401 (planar member 463), and may also be light emitter cut-outs that are inwardly cut out from the outer shape of the housing 401 (planar member 463). In this specification, the light emitter holes 467 are described as including light emitter cut-outs. Illustration of light emitter cut-outs is omitted from the drawings. In the drawings, the same signs denote the same or corresponding portions, and detailed description thereof will be reduced or omitted.

Figure 42:
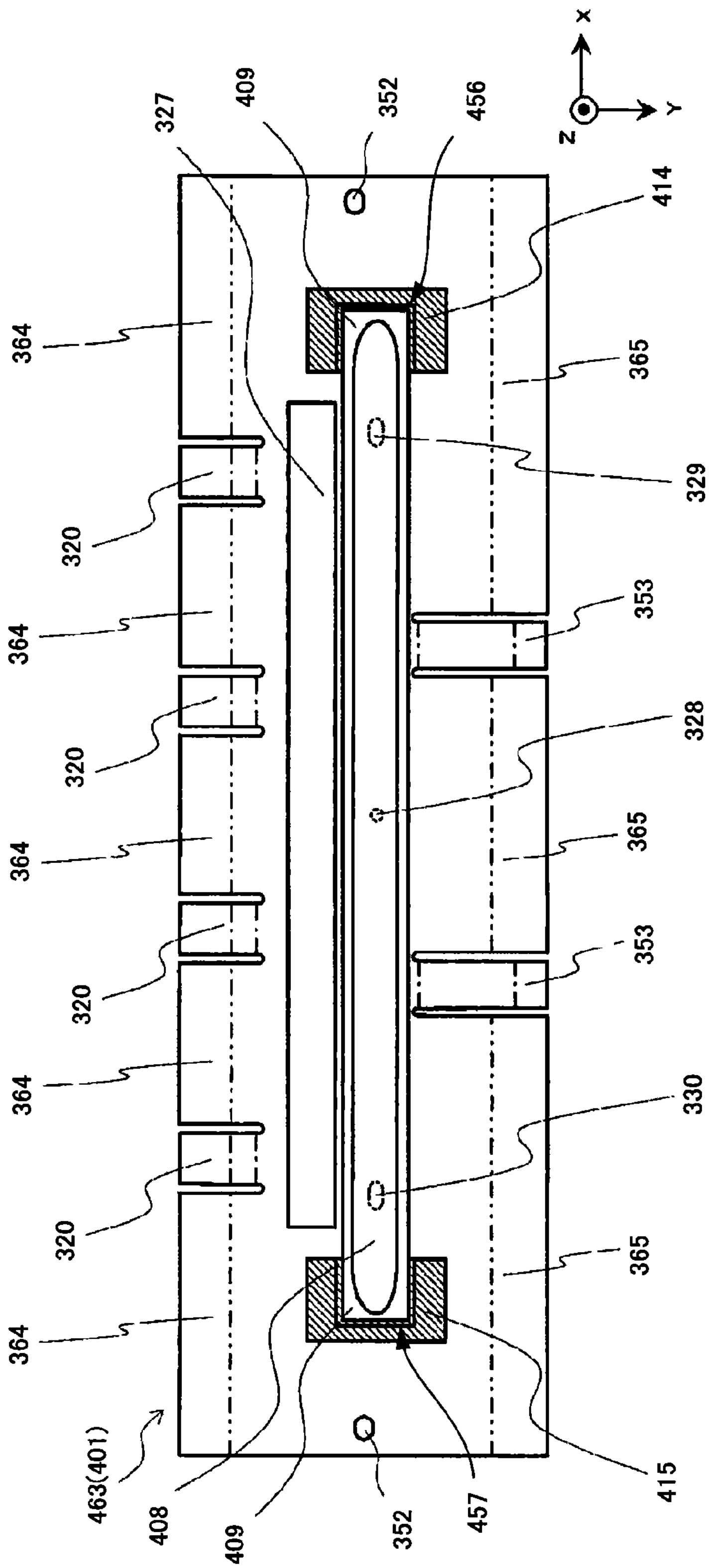
FIG. 42 is a plan view (pre-bending) of a planar member that forms the housing of a light source device according to Embodiment 4 of the present invention, and virtually illustrates a state of placing a light guide, a light guide holder, and a holder.

FIG. 42 illustrates a housing 401 (planar member 463) of a light source device according to Embodiment 4. FIG. 42 illustrates a representation of the case of virtually placing the light guide 408, the light guide holder 409, and the holders 414 and 415 onto the planar member 463 that will become the housing 401 after bending.

As illustrated in FIGS. 43A to 43C, in a light source device according to Embodiment 4, the ends of the light guide 408 are curved towards the housing 401. Light exiting the light emitters 456 and 457 (light-emitting elements 310 and 311) formed (fastened) on the housing 401 (planar member 463) is input from the end faces (light inputters) 458 of the light guide 408, whose ends are curved towards the bottom face (fastener 468) of the housing 401. Subsequent basic operation is similar to a light source device according to Embodiment 3.

Next, FIGS. 43A to 43C will be used to describe how a light source device according to Embodiment 4 supports the optical filter 350 between the first opening and the second opening of the holder 414 while maintaining a designated interval with the light emitter 456, and furthermore how the end face 458 (light inputter) of the light guide 408 and the light emitter 456 (optical filter 350) do not contact. Note that the relationship of the optical filter 351, the light emitter 457, and the end face 458 of the light guide 408 in the holder 415 is also similar.

FIG. 43A illustrates the case of the shortest length of the light guide 408 in the lengthwise direction. FIG. 43B illustrates the case of the longest length of the light guide 408 in the lengthwise direction. The holder 414 illustrated in FIGS. 43A and 43B internally includes a first hollow part and a second hollow part whose diameters successively decrease proceeding from the side of the first opening to the side of the second opening, and supports the optical filter 350 inside the first hollow part. Specifically, the optical filter 350 is formed in the step portion produced between the first hollow part and the second hollow part. Note that the thickness of the step portion is taken to be equal to or greater than the thickness of the optical filter 350. FIG. 43C illustrates how the pin (second projection) 324 and the interlocking hole 362 of the light guide holder 409 are provided so as to be disposed in the same cross-section in the sub scanning direction (widthwise direction).

As illustrated in FIG. 43B, in the case of maximum expansion of the light guide 408 (light guide holder 409), the light guide holder 409 and the holder 414 are disposed such that the end face 458 of the light guide 408 and the end face of the light guide holder 409 are contacting or about to contact at the first opening. As a result, an end face (light inputter) 458 of the light guide 408 and the light emitter 456 (optical filter 350) may be made to not contact.

In addition, as illustrated in FIGS. 43A and 43B, the light guide holder 409 respectively includes pushing face parts that face the edges of the first opening and the holder 414. These pushing face parts may also restrict the sliding range (movement range) of the light guide holder 409 (see FIG. 43B).

Note that the pushing face parts may also be provided so as to be about to contact the edges of the first opening when the expansion of the light guide 408 is at maximum. In this case, the pushing face part becomes an opposing face part rather than a pushing face part.

Figure 44:
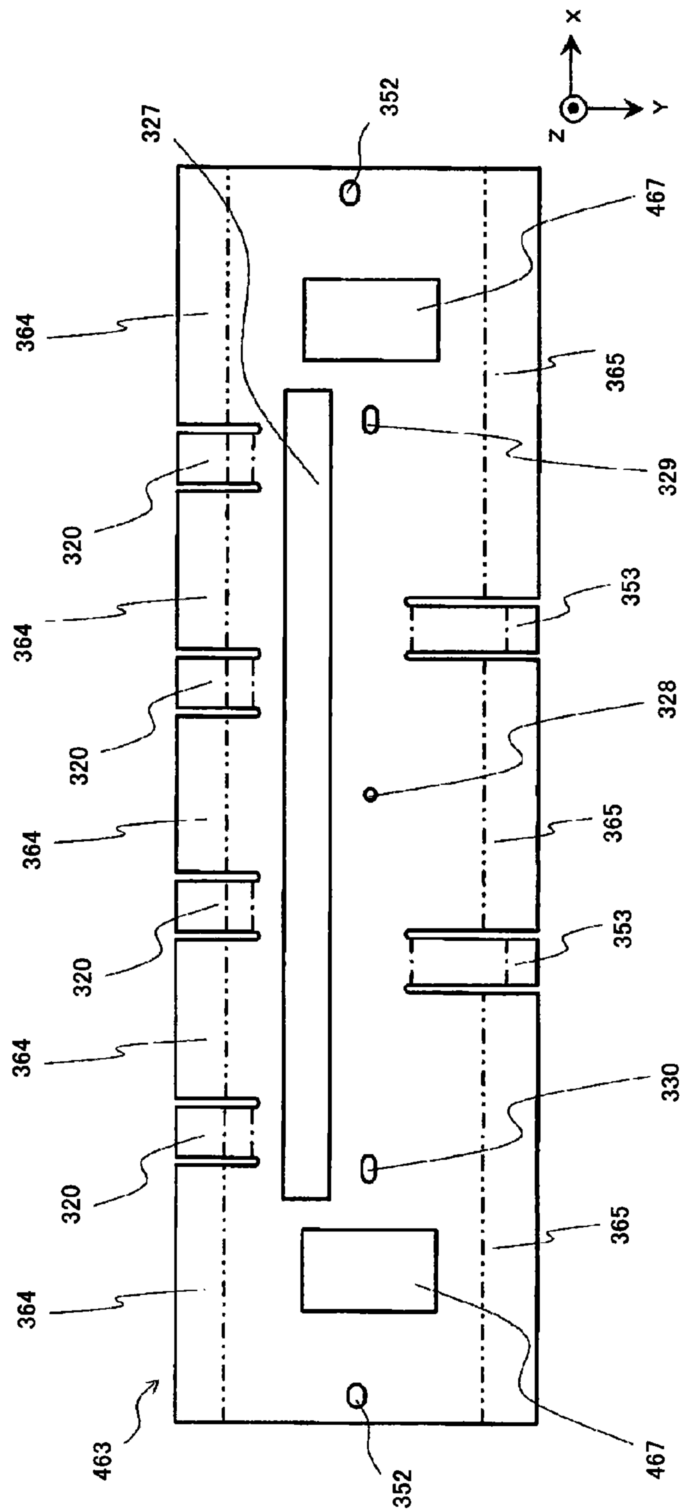
FIG. 44 is a plan view (pre-bending) of a planar member that forms the housing of a light source device according to Embodiment 4 of the present invention.

FIG. 44 illustrates a planar member 463 that forms the housing 401 of a light source device according to Embodiment 4. Light emitter holes 467 (light emitter cut-outs) are formed in the planar member 463 of FIG. 44.

As illustrated in FIGS. 45A to 45C, in a light source device according to Embodiment 4, the ends of the light guide 408 are curved towards the planar member 463 (light emitter holes 467). Light exiting the light emitter 456 (light-emitting element 310) via a light emitter hole 467 (planar member 463) is input from an end face (light inputter) 458 of the light guide 408, whose end is curved towards the planar member 463 (light emitter hole 467). Note that light exiting the light emitter 457 (light-emitting element 311) is also similar. Additionally, subsequent basic operation is similar to a light source device according to Embodiment 3.

The primary portion of the curve in the light guide 408 exists on the XZ plane in Embodiment 4. Likewise in the light guide 408 of a light source device according to Embodiment 4, it is sufficient for the light scattering parts 318 and 319 to be at least formed in a portion that at least corresponds to an effective scanning area in the main scanning direction of the image scanning device. Also, the brightness or the like at the ends of the effective scanning area (near the holders 414 and 415) may also be adjusted by causing more or less light to be output from the curved portion of the light guide 408 compared to other portions.

The light source device according to Embodiment 4 in FIG. 44 and FIGS. 45A to 45C supports the optical filter 351 between the first opening and the second opening of the holder 414 while maintaining a designated interval with the light emitter 456. Furthermore, the end face (light inputter) 458 of the light guide 408 and the light emitter 456 (optical filter 350) do not contact. Since this description is basically the same as that described using FIG. 43, detailed description is omitted.

FIGS. 45A to 45C respectively correspond to FIGS. 43A to 43C. The differences are that the light emitter 456 illustrated in FIGS. 43A to 43C is formed on the fastener 468, and the light emitter 456 (light-emitting element 310) illustrated in FIG. 45 is inserted into a light emitter hole 467. Note that the light emitter 457 may be similarly provided inserted into a light emitter hole 467.

The heat transfer body 316 is illustrated as not contacting the planar member 463 (light emitter hole 467) that acts as the housing in order to simplify the comparison between FIG. 45 and FIG. 43, but in actual practice, the heat transfer body 316 and the planar member 463 may be contacting directly or indirectly to conduct heat, or the heat transfer body 316 may not be provided.

Figure 46:
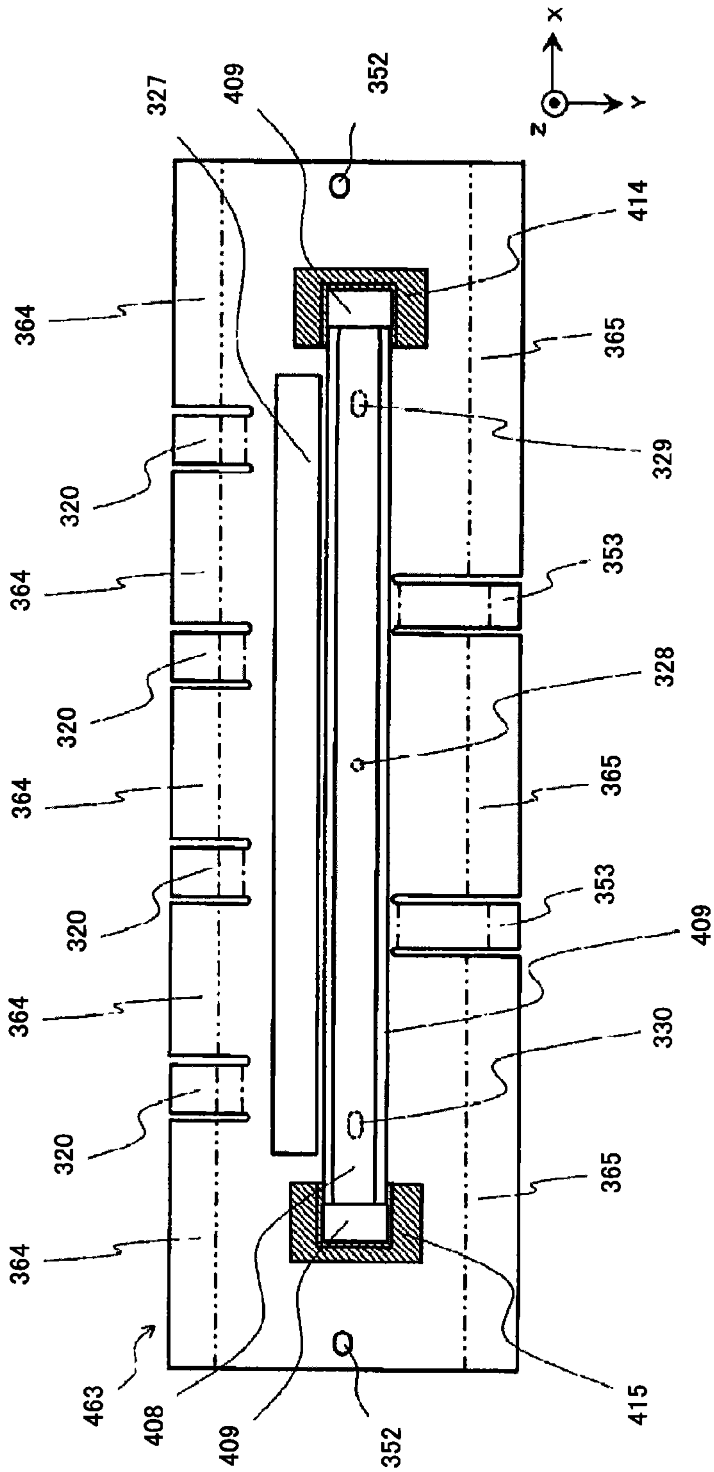
FIG. 46 is a plan view (pre-bending) of a planar member that forms the housing of a light source device according to Embodiment 4 of the present invention, and virtually illustrates a state of placing a light guide, a light guide holder, and a holder.

FIG. 46 illustrates a planar member 463 that forms the housing 401 of a light source device according to Embodiment 4. FIG. 46 illustrates a representation of the case of virtually placing the light guide 408, the light guide holder 409, and the holders 414 and 415 onto the planar member 463 after bending the planar member 463. As illustrated in FIGS. 47A and 47B, in a light source device according to Embodiment 4, the ends of the light guide 408 are curved towards the planar member 463 (fastener 468 or light emitter hole 467).

FIGS. 46 and FIGS. 47A and 47B respectively correspond to FIG. 42 and FIGS. 43A and 43B, and to FIG. 44 and FIGS. 45A and 45B, and illustrate the case in which the curved portion of the light guide 408 on the side opposite the holder 414 is also covered by the light guide holder 409. Note that the curved portion of the light guide 408 on the side opposite the holder 415 may also be similarly covered by the light guide holder 409.

FIG. 47A illustrates an example in which the planar member 463 includes the area of the fastener 468 (corresponds to FIG. 44 and FIGS. 45A and 45B). FIG. 47B illustrates an example in which the planar member 463 includes the light emitter hole 467 (corresponds to FIG. 42 and FIGS. 43A and 43B).

Figure 48:
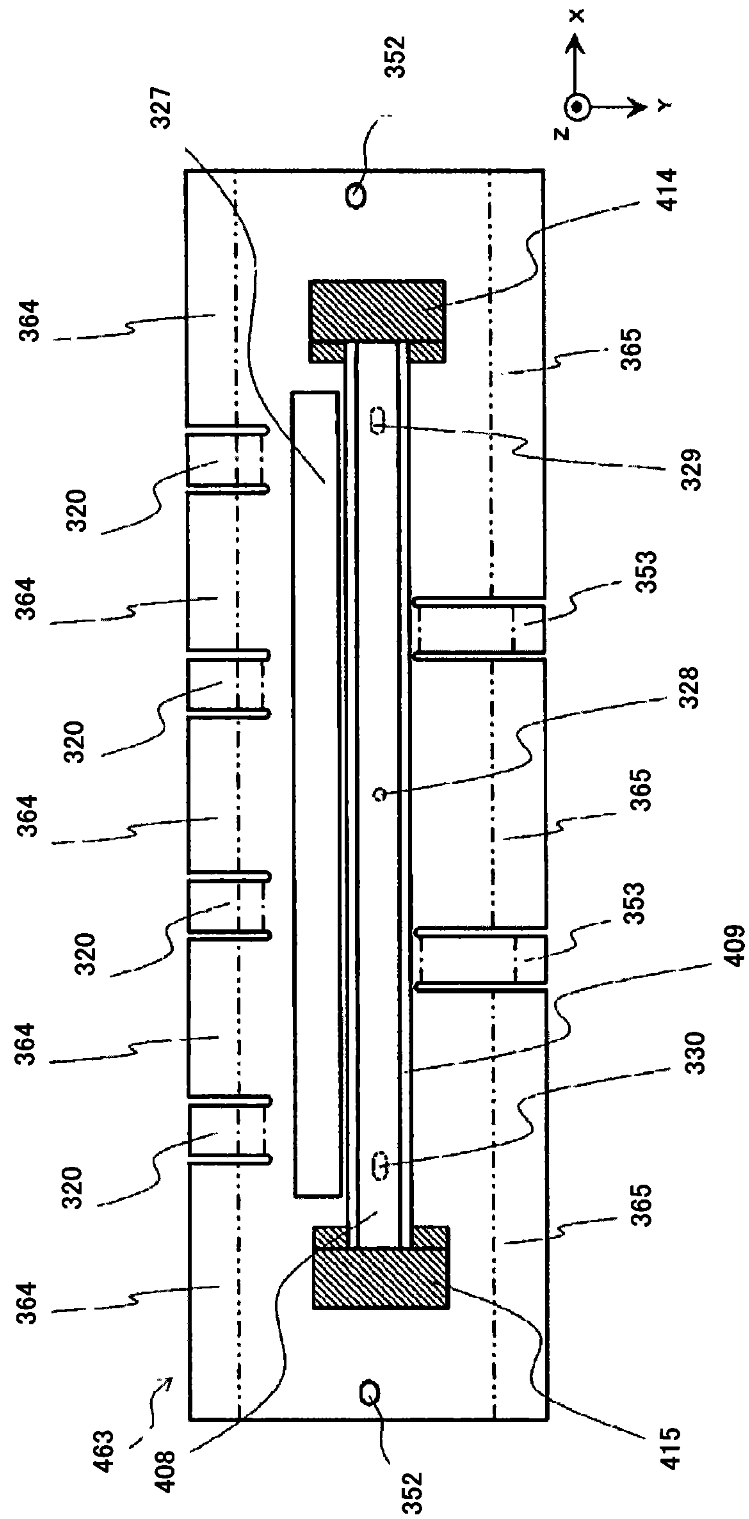
FIG. 48 is a plan view (pre-bending) of a planar member that forms the housing of a light source device according to Embodiment 4 of the present invention, and virtually illustrates a state of placing a light guide, a light guide holder, and a holder.

FIG. 48 illustrates a planar member 463 that forms the housing 401 of a light source device according to Embodiment 4. FIG. 48 illustrates a representation of the case of virtually placing the light guide 408, the light guide holder 409, and the holders 414 and 415 onto the planar member 463 after bending the planar member 463.

As illustrated in FIGS. 49A and 49B, in a light source device according to Embodiment 4, the ends of the light guide 408 are curved towards the planar member 463 (fastener 468 or light emitter hole 467).

FIG. 48 and FIGS. 49A and 49B correspond to FIG. 46 and FIGS. 47A and 47B, and illustrate an example in which the curved portion of the light guide 408 on the side opposite the holder 414 is also covered by the light guide holder 409, and in addition, that portion of the light guide holder 409 is covered by, in proximity to, or slidably contacting the holder 414.

Stated differently, FIG. 48 and FIGS. 49A and 49B illustrate an example in which the end of the light guide holder 409 (light guide 408) is inserted into the first hollow part of the holder 414, and the light guide holder 409 (light guide 408) slidably (stretchably) contacts the holder 414. Note that, similarly, the curved portion of the light guide 408 on the side opposite the holder 415 may also be covered by the light guide holder 409, and in addition, that portion of the light guide holder 409 may be covered by, in proximity to, or slidably contacting the holder 415.

FIG. 49A is the case in which the planar member 463 includes the area of the fastener 468 (corresponds to FIG. 47A). FIG. 49B is the case in which the planar member 463 includes the light emitter hole 467 (corresponds to FIG. 47B).

FIGS. 50A to 50D and FIGS. 51A to 51D will be used to describe the holder 414 illustrated in FIGS. 22 to 29B and exemplary modifications thereof. Note that the holder 415 may be configured similarly to the holder 414.

Figure 50A:
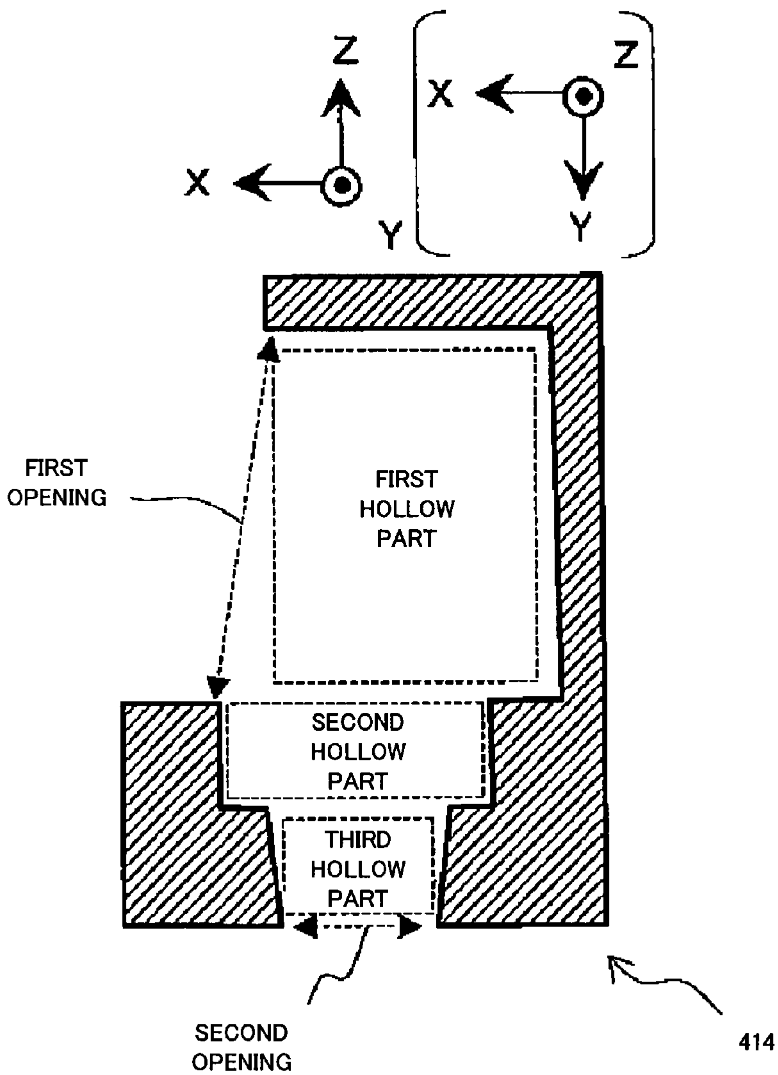
FIG. 50A is a cross-section view in the lengthwise direction of a holder of a light source device according to Embodiment 4 of the present invention.
Figure 50B:
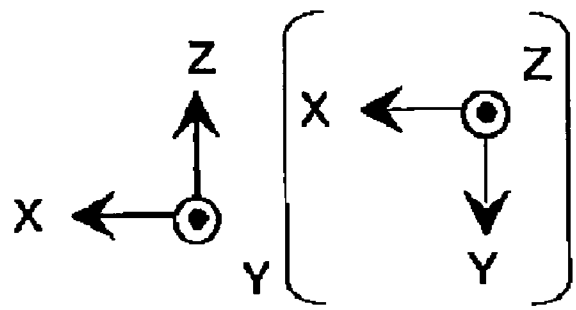
FIG. 50B is a cross-section view in the lengthwise direction of a holder of a light source device according to Embodiment 4 of the present invention.
Figure 50B:
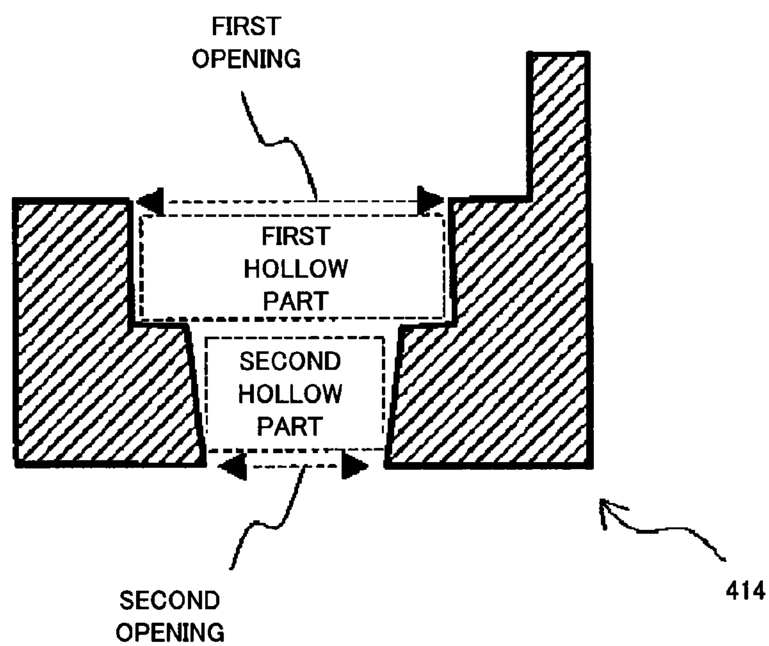

FIGS. 50A to 50B illustrate the holder 414 illustrated in FIGS. 22 to 29.

The holder 414 illustrated in FIG. 50A internally includes a first hollow part, a second hollow part, and a third hollow part whose diameters successively decrease proceeding from the side of the first opening to the side of the second opening, and supports the optical filter 350 inside the second hollow part. Specifically, the optical filter 350 is formed in the step portion produced between the second hollow part and the third hollow part.

Note that the first hollow part and the second hollow part are disposed at positions such that the central axes of the respective diameters intersect. The thickness of the step portion is taken to be equal to or greater than the thickness of the optical filter 350.

The holder 414 illustrated in FIG. 50B internally includes a first hollow part and a second hollow part whose diameters successively decrease proceeding from the side of the first opening to the side of the second opening, and supports the optical filter 350 inside the first hollow part. Specifically, the optical filter 350 is formed in the step portion produced between the first hollow part and the second hollow part. Note that the thickness of the step portion is taken to be equal to or greater than the thickness of the optical filter 350.

Figure 50C:
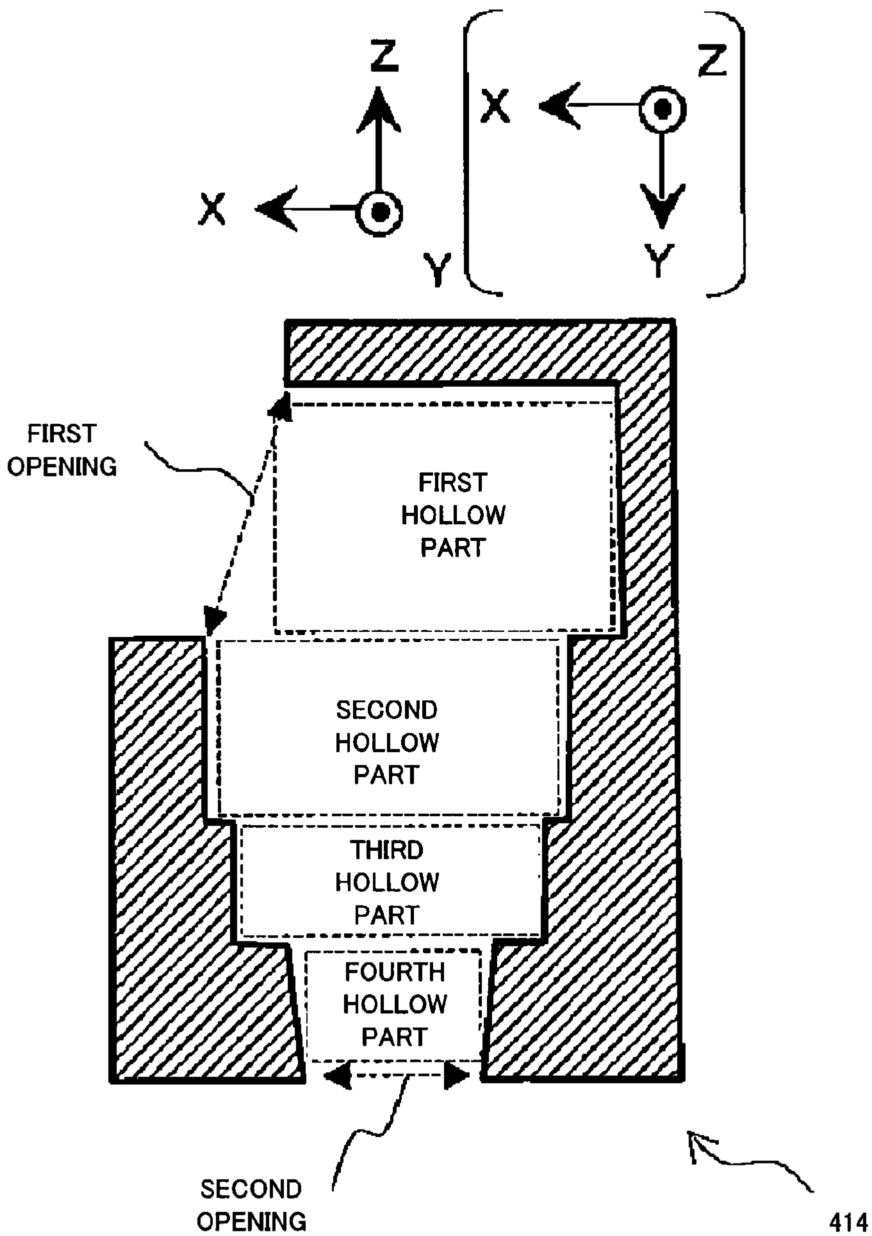
FIG. 50C is a cross-section view in the lengthwise direction of a holder of a light source device according to Embodiment 4 of the present invention.
Figure 50D:
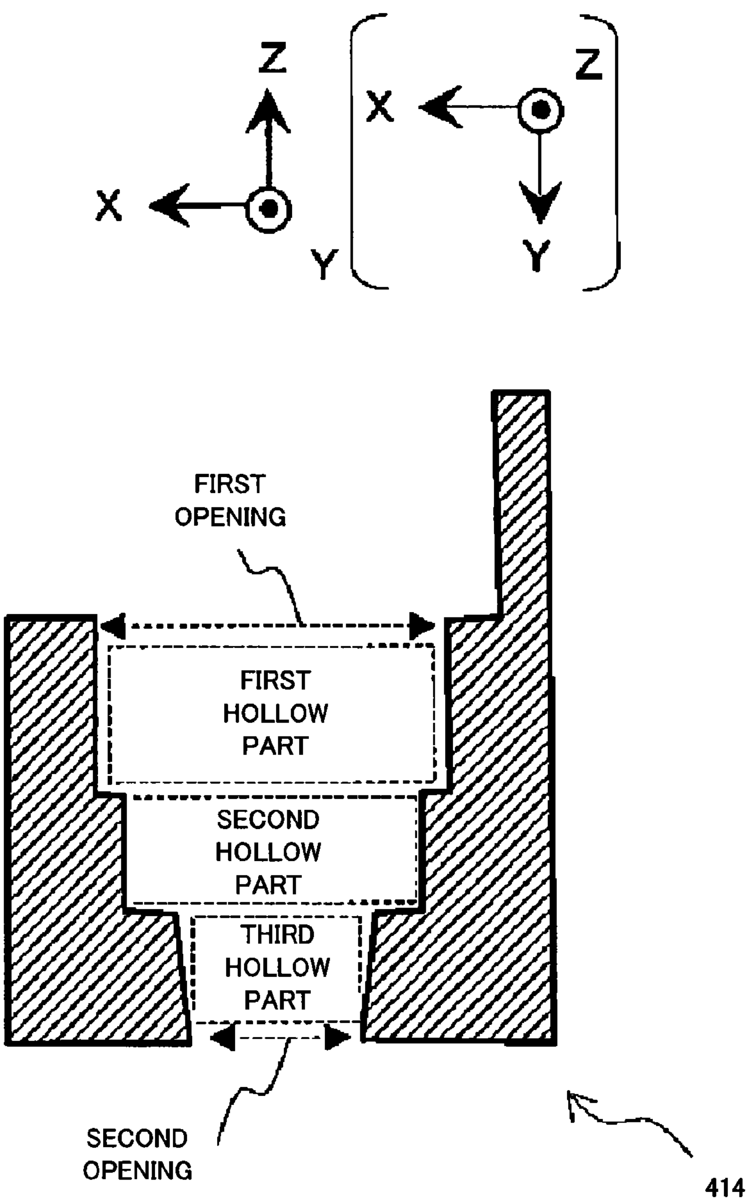
FIG. 50D is a cross-section view in the lengthwise direction of a holder of a light source device according to Embodiment 4 of the present invention.

The holders 414 illustrated in FIGS. 50C and 50D are exemplary modifications of the holders 414 illustrated in FIGS. 50A and 50B, respectively.

The holder 414 illustrated in FIG. 50C internally includes a first hollow part, a second hollow part, a third hollow part, and a fourth hollow part whose diameters successively decrease proceeding from the side of the first opening to the side of the second opening, and supports the optical filter 350 inside the second hollow part or the third hollow part. Specifically, the optical filter 350 is formed in the step portion produced between the second hollow part and the third hollow part, or alternatively, in the step portion produced between the third hollow part and the fourth hollow part.

Note that the first hollow part and the second hollow part are disposed at positions such that the central axes of the respective diameters intersect. The thickness of the step portion is taken to be equal to or greater than the thickness of the optical filter 350.

The holder 414 illustrated in FIG. 50D internally includes a first hollow part, a second hollow part, and a third hollow part, whose diameters successively decrease proceeding from the side of the first opening to the side of the second opening, and supports the optical filter 350 inside the first hollow part or the second hollow part. Specifically, the optical filter 350 is formed in the step portion produced between the first hollow part and the second hollow part, or alternatively, in the step portion produced between the second hollow part and the third hollow part.

Note that, at the least, the thickness of the step portion produced between the first hollow part and the second hollow part is taken to be equal to or greater than the thickness of the optical filter 350.

Note that the inner wall of the first hollow part illustrated in FIGS. 50A to 50C has a shape such that either the portion of the light guide holder 409 that is inserted into the holder 414 contacts the holder 414 and allows the light guide holder 409 to slide, or the portion of the light guide holder 409 that is inserted into the holder 414 does not contact the holder 414 and allows the light guide holder 409 to stretch.

The holders 414 illustrated in FIGS. 51A and 51B and FIGS. 51C and 51D are exemplary modifications of the holders 414 illustrated in FIGS. 50A and 50B, respectively.

Figure 51A:
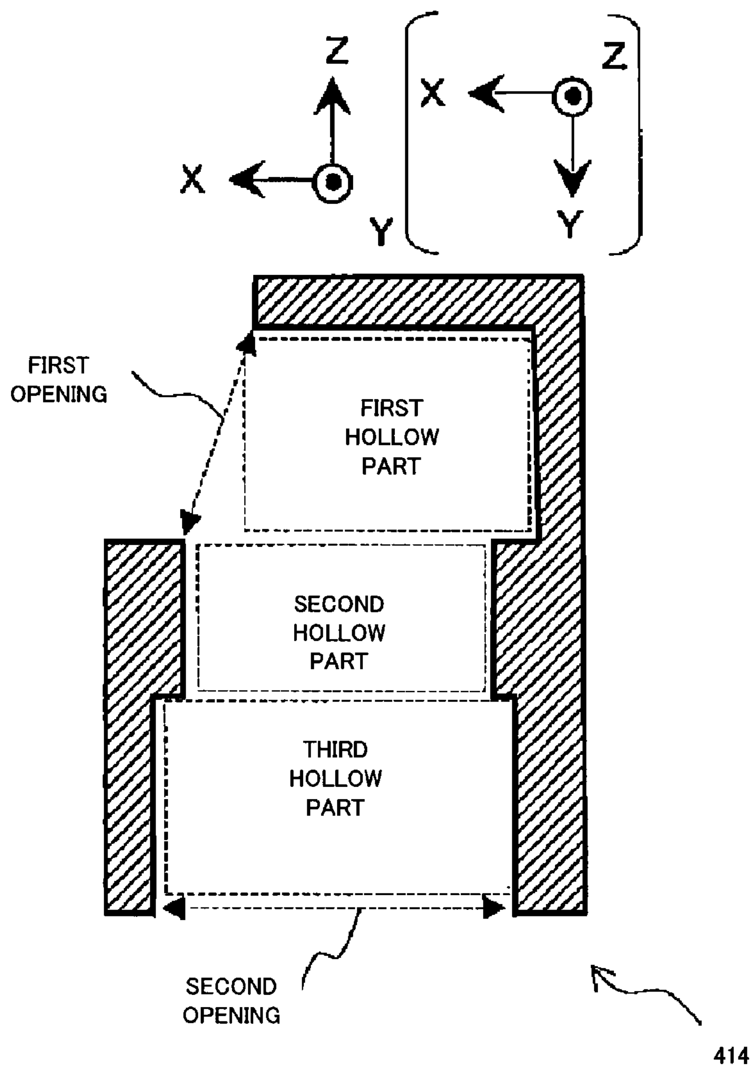
FIG. 51A is a cross-section view in the lengthwise direction of a holder of a light source device according to Embodiment 4 of the present invention.

The holder 414 illustrated in FIG. 51A internally includes a first hollow part, a second hollow part, and a third hollow part whose diameters successively increase proceeding from the side of the first opening to the side of the second opening, and supports the optical filter 350 inside the third hollow part. Specifically, in FIG. 51A, the optical filter 350 is formed in the step portion produced between the second hollow part and the third hollow part.

Note that the first hollow part and the second hollow part are disposed at positions such that the central axes of the respective diameters intersect.

Figure 51B:
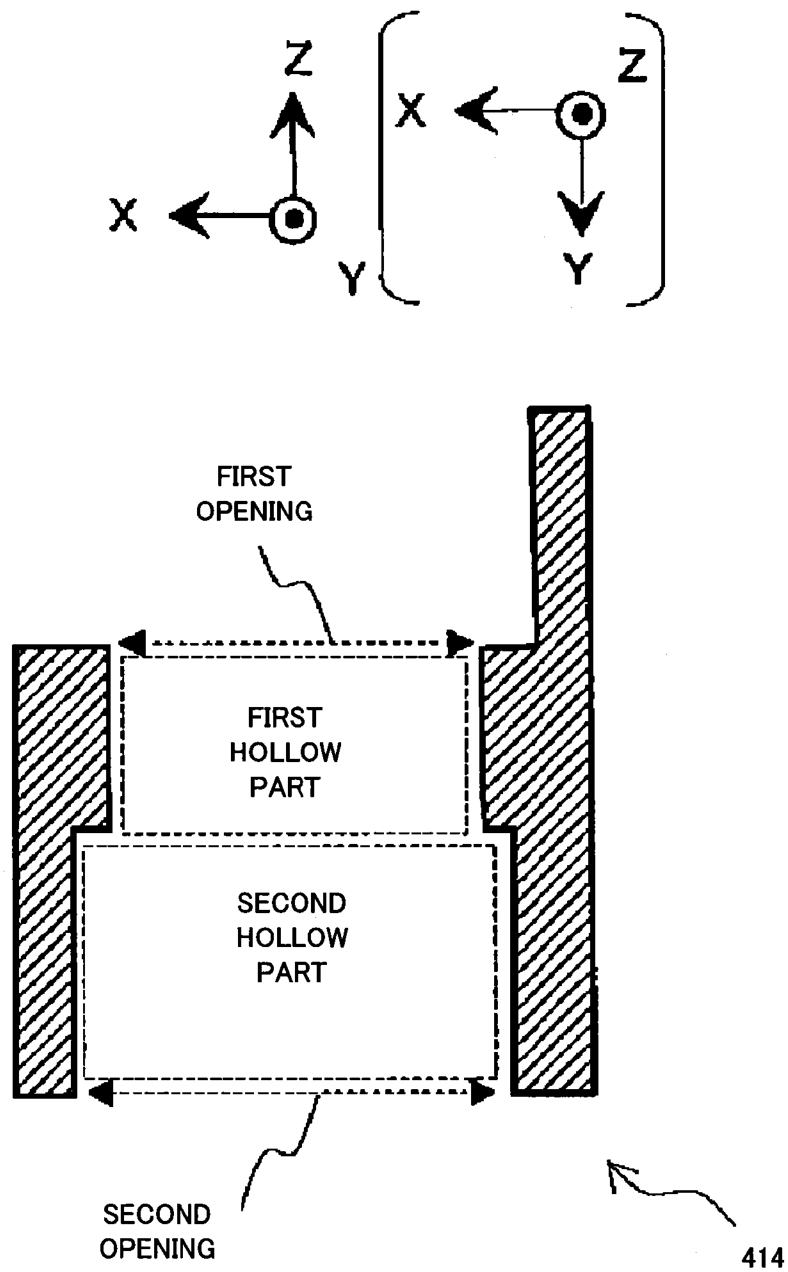
FIG. 51B is a cross-section view in the lengthwise direction of a holder of a light source device according to Embodiment 4 of the present invention.
Figure 51C:
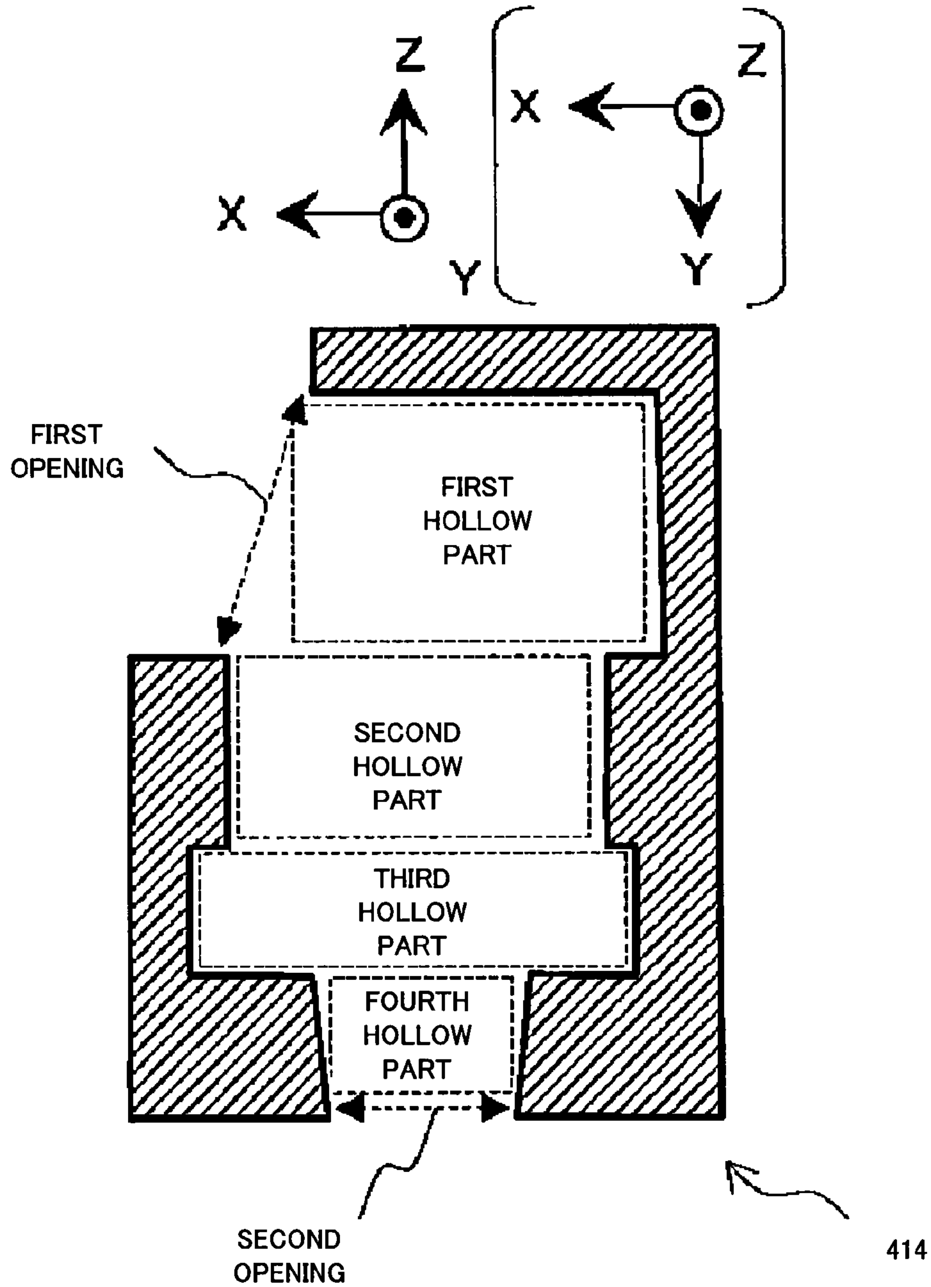
FIG. 51C is a cross-section view in the lengthwise direction of a holder of a light source device according to Embodiment 4 of the present invention.

Note that the inner wall of the first hollow part illustrated in FIGS. 51A to 51C has a shape such that either the portion of the light guide holder 409 that is inserted into the holder 414 contacts the holder 414 and allows the light guide holder 409 to slide, or the portion of the light guide holder 409 that is inserted into the holder 414 does not contact the holder 414 and allows the light guide holder 409 to stretch.

The holder 414 illustrated in FIG. 51B internally includes a first hollow part and a second hollow part whose diameters successively increase proceeding from the side of the first opening to the side of the second opening, and supports the optical filter 350 inside the second hollow part. Specifically, in FIG. 51A, the optical filter 350 is formed in the step portion produced between the first hollow part and the second hollow part.

The holder 414 illustrated in FIG. 51C internally includes a first hollow part, a second hollow part, and a third hollow part whose diameters successively increase proceeding from the side of the first opening to the side of the second opening, and a fourth hollow part of smaller diameter than the third hollow part that communicates with the third hollow part. The holder 414 illustrated in the same drawing supports the optical filter 350 inside the third hollow part. Specifically, in FIG. 51C, the optical filter 350 is formed in the step portion produced between the second hollow part and the third hollow part, or alternatively, in the step portion produced between the third hollow part and the fourth hollow part.

Note that the first hollow part and the second hollow part are disposed at positions such that the central axes of the respective diameters intersect.

Figure 51D:
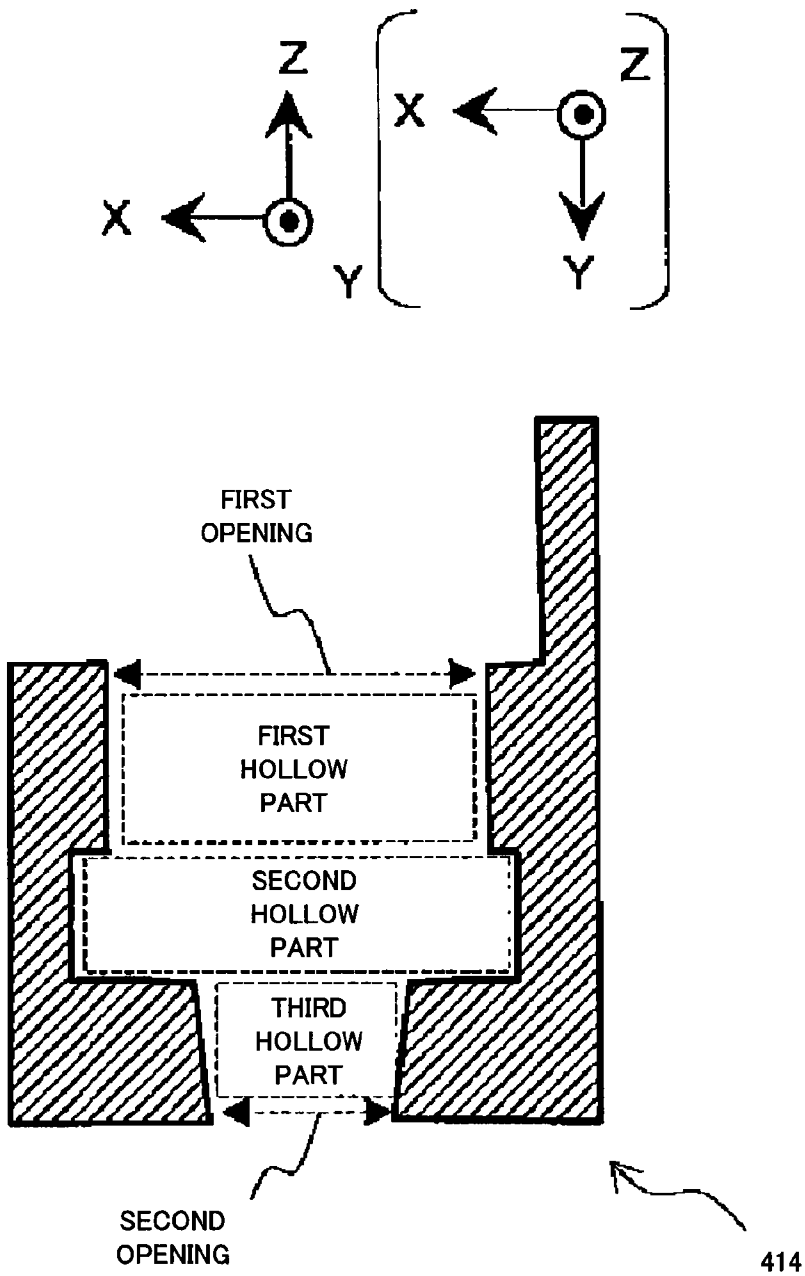
FIG. 51D is a cross-section view in the lengthwise direction of a holder of a light source device according to Embodiment 4 of the present invention.

The holder 414 illustrated in FIG. 51D internally includes a first hollow part and a second hollow part whose diameters successively increase proceeding from the side of the first opening to the side of the second opening, and a third hollow part of smaller diameter than the second hollow part that communicates with the second hollow part. The holder 414 illustrated in the same drawing supports the optical filter 350 inside the second hollow part. Specifically, in FIG. 51D, the optical filter 350 is formed in the step portion produced between the first hollow part and the second hollow part, or alternatively, in the step portion produced between the second hollow part and the third hollow part.

Note that the inner wall shape of the hollow parts (second hollow part, third hollow part, and fourth hollow part) other than the first hollow part illustrated in FIGS. 50A to 50C and FIGS. 51A to 51C is not particularly limited insofar as the shape is tubular and does not block light from the light emitter 356, 357.

FIGS. 52A to 52C and FIGS. 53A to 53C will be used to describe an example of exposing the area from the curved portion of the light guide 408 on the side opposite the holder 414 up to the end face (light inputter) 458 of the light guide 408. Since FIGS. 52A to 52C respectively correspond to FIGS. 43A to 43C, and since FIGS. 53A to 53C respectively correspond to FIGS. 45A to 45C, detailed description of the common portions is omitted. Note that the holder 415 may be configured similarly to the holder 414.

The light source device illustrated in FIGS. 52A to 52C and FIGS. 53A to 53C exposes the area from the curved portion of the light guide 408 on the side opposite the holder 414 up to the end face (light inputter) 458 of the light guide 408. For this reason, as illustrated in FIG. 52B and FIG. 53B, when the expansion of the light guide 408 is at maximum, the side face of the light guide 408 is in proximity to or contacts the holder 414. Consequently, this portion of the light guide 408 may also be treated as an opposing face part or a pushing face part.

FIGS. 54A to 54C and FIGS. 55A to 55C will be used to describe an example in which the area from the curved portion of the light guide 408 on the side of the holder 414 up to the end face (light inputter) 458 of the light guide 408 is covered by the light guide holder 409 and inserted into the first hollow part. Note that the holder 415 may be configured similarly to the holder 414.

Since FIGS. 54A to 54C respectively correspond to FIGS. 43A to 43C, and since FIGS. 55A to 55C respectively correspond to FIGS. 45A to 45C, detailed description of the common portions is omitted.

In the light source devices illustrated in FIGS. 54A to 54C and FIGS. 55A to 55C, a light guide holder 409 that is thinner than that illustrated in FIG. 43 and FIG. 45 covers the light guide 408 along the holder 414 side of the curved portion of the light guide 408. For this reason, the shape of the holder 414 may be the same as that according to Embodiment 3.

FIGS. 56A to 56C and FIGS. 57A to 57C will be used to describe an example in which the area from the curved portion of the light guide 408 on the side opposite the holder 414 up to the end face (light inputter) 458 of the light guide 408 is exposed, while the area from the curved portion of the light guide 408 on the side of the holder 414 up to the end face (light inputter) 458 of the light guide 408 is covered by the light guide holder 409 and inserted into the first hollow part.

Since FIGS. 56A to 56C respectively correspond to FIGS. 43A to 43C, and since FIGS. 57A to 57C respectively correspond to FIGS. 45A to 45C, detailed description of the common portions is omitted. In addition, the light source device illustrated in FIGS. 56A to 56C is a combination of the light source device illustrated in FIGS. 52A to 52C and the light source device illustrated in FIG. 54. The light source device illustrated in FIGS. 57A to 57C is a combination of the light source device illustrated in FIGS. 53A to 53C and the light source device illustrated in FIGS. 55A to 55C.

Accordingly, in the light source devices illustrated in FIGS. 56A to 56C and FIGS. 57A to 57C, when the expansion of the light guide 408 is at maximum, the side face of the light guide 408 is in proximity to or contacts the holder 414. Consequently, this portion of the light guide 408 may also be treated as an opposing face part or a pushing face part.

Also, a light guide holder 409 that is thinner than that illustrated in FIGS. 43A to 43C and FIGS. 45A to 45C covers the light guide 408 along the holder 414 side of the curved portion of the light guide 408. For this reason, the shape of the holder 414 may be the same as that according to Embodiment 3.

FIGS. 58A and 58B, FIGS. 59A and 59B, and FIGS. 60A and 60B will be used to describe variations in the shape of the light guide 408 of a light source device according to Embodiment 4.

All other than the shape of the light guide 408 in FIGS. 58A and 58B, FIGS. 59A and 59B, and FIGS. 60A and 60B will be described using a structure common to that respectively illustrated in FIGS. 49A and 49B. Detailed description of the common portion will be reduced or omitted.

In the light guide 408 illustrated in FIGS. 58A and 58B, the position in which an end face (light inputter) 458 extends is provided at approximately the same height as the position of the bottom face of the portion of the light guide 408 that extends in the lengthwise direction. By using such a light guide 408 in a light source device according to Embodiment 4, it is possible to lower one or both of the light guide 408 and the light guide holder 409 in the thickness direction (height direction). Also, it is possible to simplify the shape of the light guide holder 409 and the holder 414 (415).

In the light guide 408 illustrated in FIGS. 59A and 59B, the position in which an end face (light inputter) 458 extends is provided at a higher position than the position of the bottom face of the portion of the light guide 408 that extends in the lengthwise direction. By using such a light guide 408 in a light source device according to Embodiment 4, it is possible make one or both of the light guide 408 and the light guide holder 409 lower in the thickness direction (height direction) than the light guide 408 illustrated in FIGS. 58A and 58B. Also, it is possible to further simplify the shape of the light guide holder 409 and the holder 414 (415).

The light guide 408 illustrated in FIGS. 59A and 59B includes a projection that projects out from one part of the end face (light inputter) 458, and that projection contacts the light guide holder 409. Accordingly, it is possible to lower one or both the light guide 408 and the light guide holder 409 in the thickness direction (height direction), while also making the interlock between the light guide 408 and the light guide holder 309 more secure.

The light source devices according to Embodiment 4 described using FIGS. 42 to 60 may be carried out by suitably substituting the respective configurations. Such substitution even holds true between a light source device (reflector support structure) according to Embodiment 5 discussed later and a light source device (reflector support structure) according to Embodiment 3 discussed earlier.

Embodiment 5

Embodiment 5 of the present invention will be described using FIGS. 61 to 67. Embodiment 5 describes an example in which the ends of the light guide 508 are curved. Particularly, an example will be described in which the ends of the light guide 508 are curved towards the housing 501 (planar member 563), and the light emitters 556 and 557 are fastened to a portion (fasteners 568 discussed later) bent in a direction intersecting the lengthwise direction of the housing 501 (planar member 563), either directly or via the heat transfer bodies 316 and 317. In addition, an example will be described in which the light emitters 556 and 557 are attached via light emitter holes or light emitter cut-outs formed on the portion bent in a direction intersecting the lengthwise direction of the housing 501 (planar member 563).

In Embodiment 5, the portions that differ from Embodiments 3 and 4 primarily will be described. In addition, the light guide 508, the light guide holder 509, and the holders 514 and 515 are disposed while accounting for expansion and contraction in the thickness direction of the light guide 508 and the light guide holder 509 of a light source device according to Embodiment 5.

For example, it is anticipated to set the dimensions of the light guide holder 509 (light guide 508) as well as the holders 514 and 515 so that when expansion is at maximum, the light guide holder 509 (light guide 508) does not damage the holders 514 and 515. However, since the influence is extremely small compared to expansion and contraction in the lengthwise direction of the light guide 508 and the light guide holder 509, detailed description will be omitted.

Figure 61:
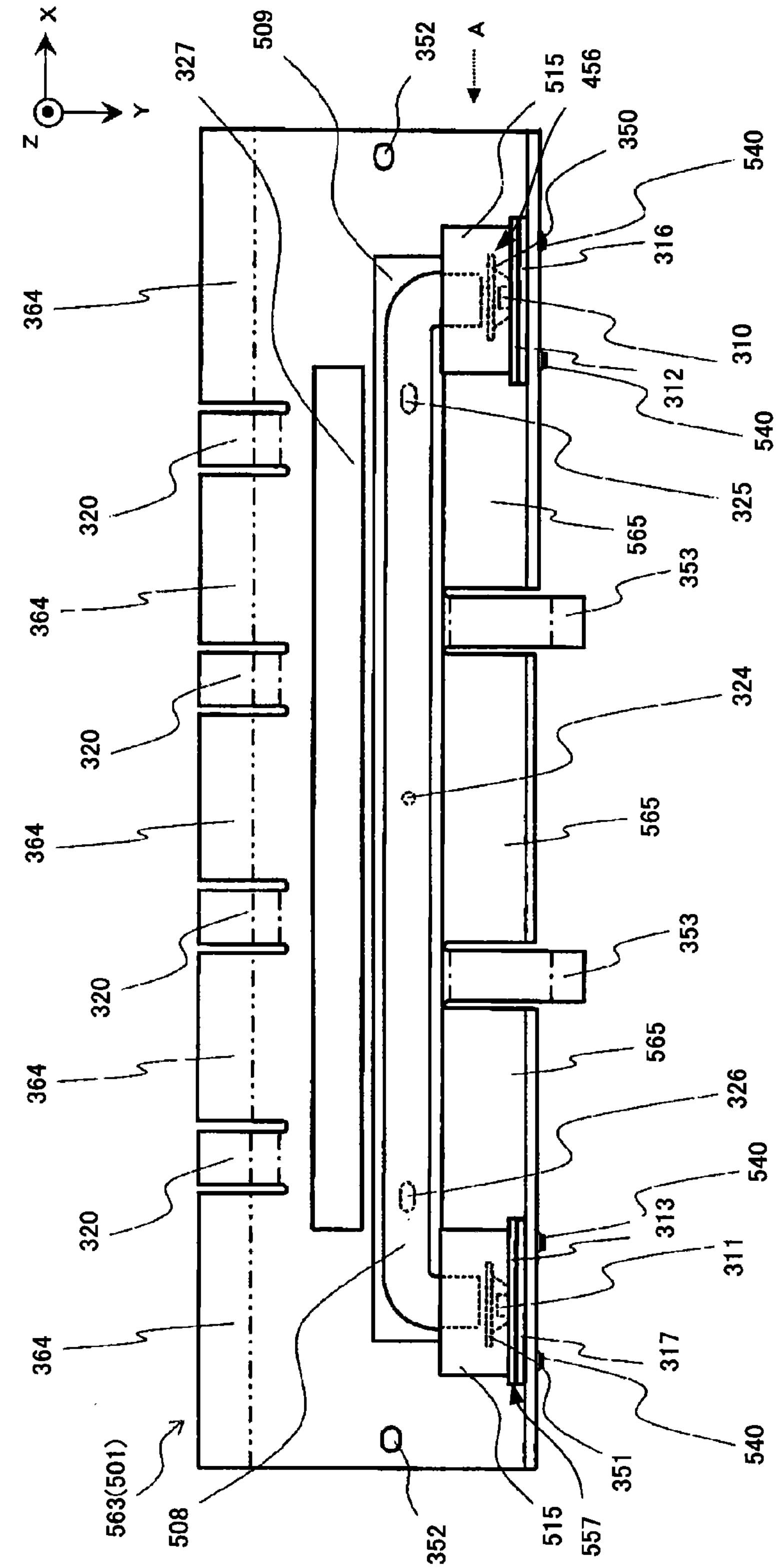
FIG. 61 is a plan view (pre-bending) of a planar member that forms the housing of a light source device according to Embodiment 5 of the present invention, and virtually illustrates a state of placing a light guide, a light guide holder, and a holder.
Figure 67:
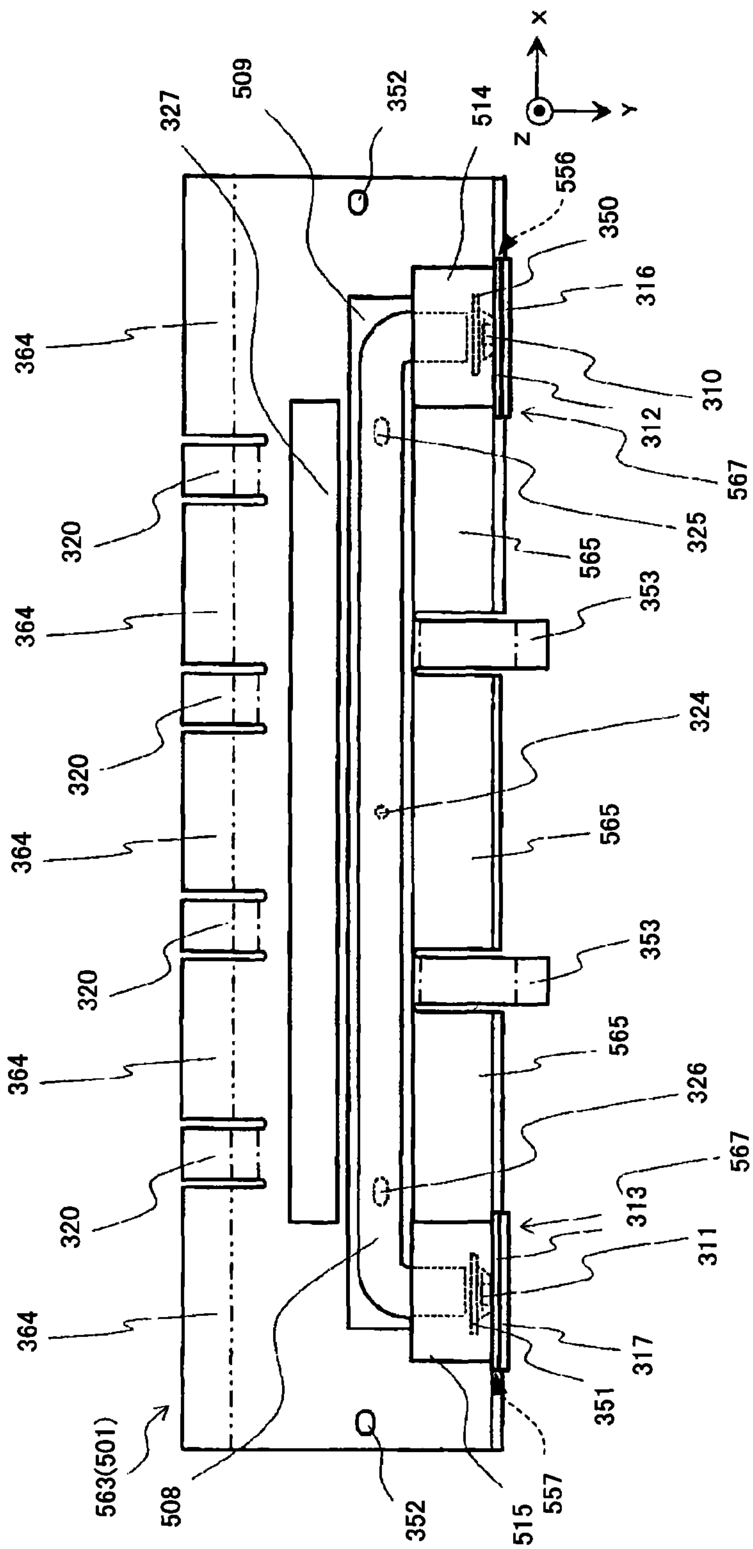

FIG. 61 and FIG. 67 illustrate a planar member 563 that forms the housing of a light source device according to Embodiment 5. FIG. 61 and FIG. 67 illustrate a representation of the case of virtually placing the light guide 508, the light guide holder 509, and the holders 514 and 515 onto the housing 501 after bending the planar member 563.

Note that FIG. 61 and FIG. 67 illustrate a see-through view of the state inside the holders 514 and 515, in which part of the light guide 508, the optical filters 350 and 351, and the light-emitting elements 310 and 311 are indicated by dotted lines.

Figure 62A:
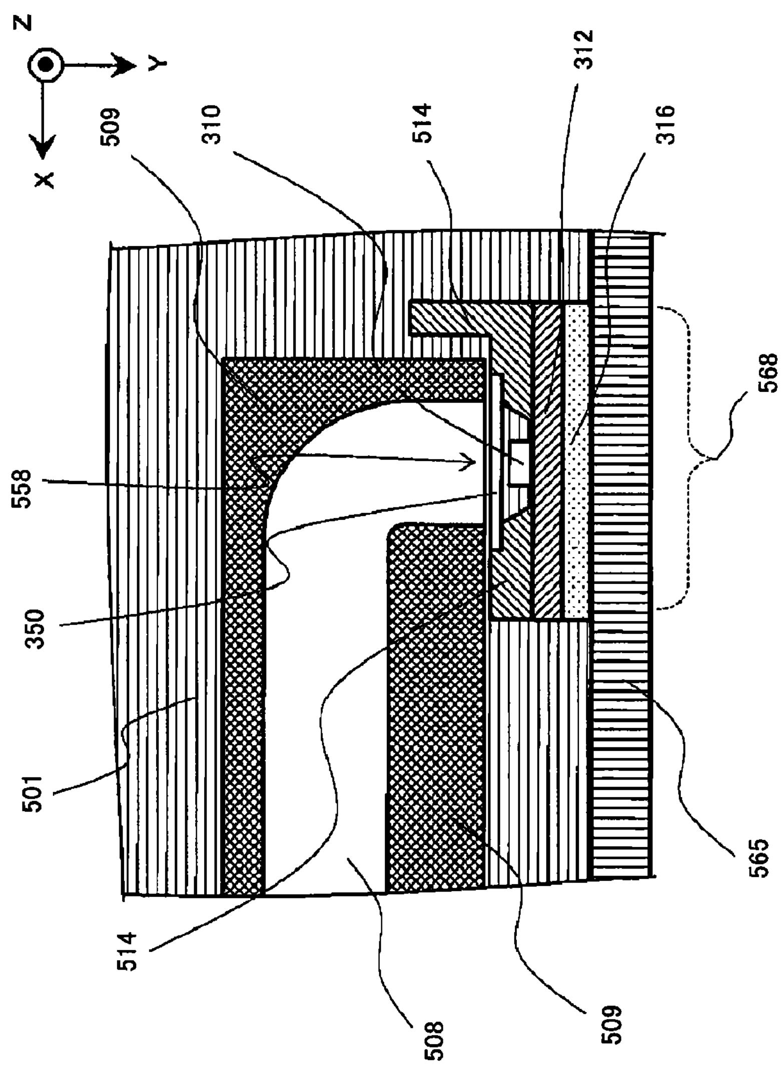
FIG. 62A is a cross-section view in the widthwise direction near a light emitter of a light source device according to Embodiment 5 of the present invention.
Figure 62B:
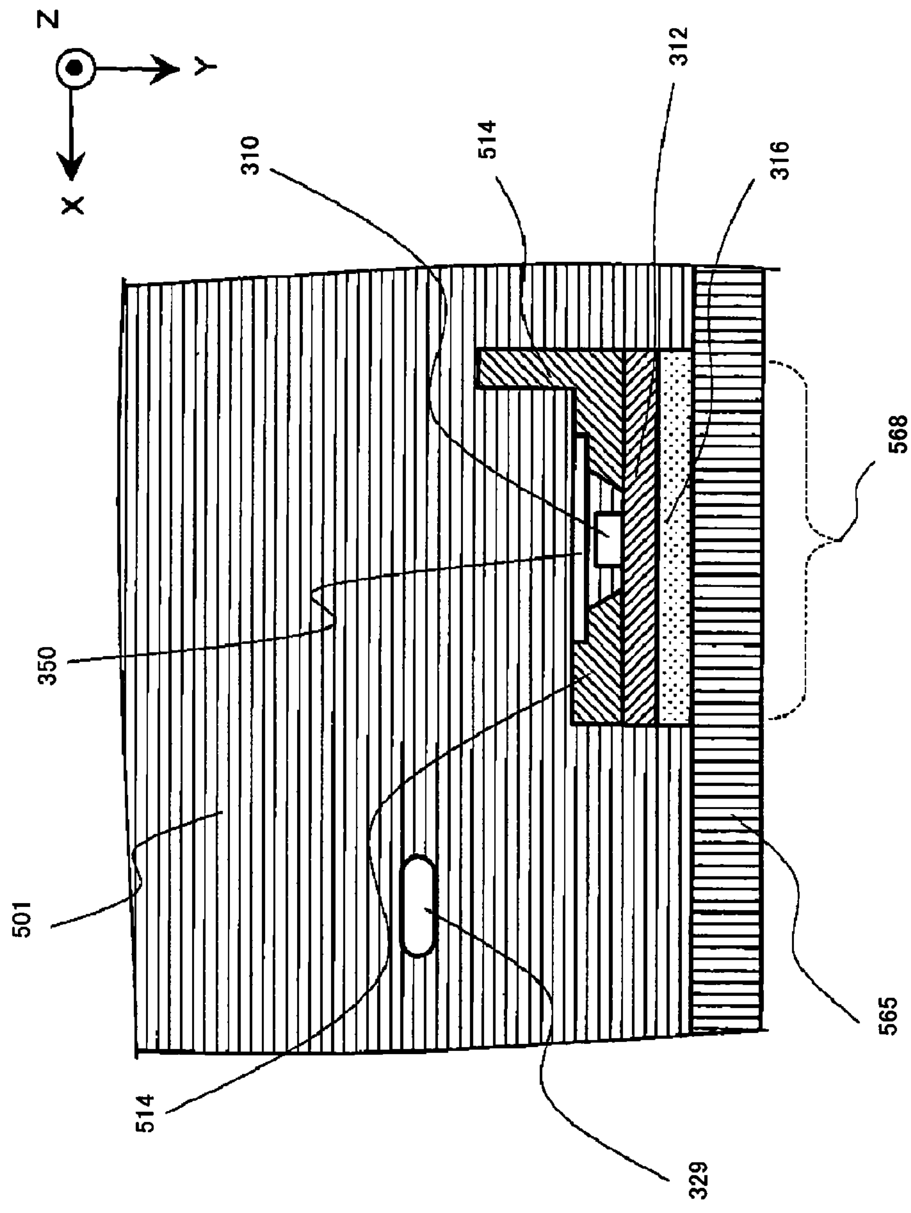
FIG. 62B is a cross-section view in the widthwise direction near a light emitter of a light source device according to Embodiment 5 of the present invention.

FIG. 62A is a cross-section view as seen on a plane parallel to the plane in which the planar member 563 illustrated in FIG. 61 extends. FIG. 62B is a virtual cross-section view in which the light guide 508 and the light guide holder 509 have been removed from FIG. 62A.

Figure 63:
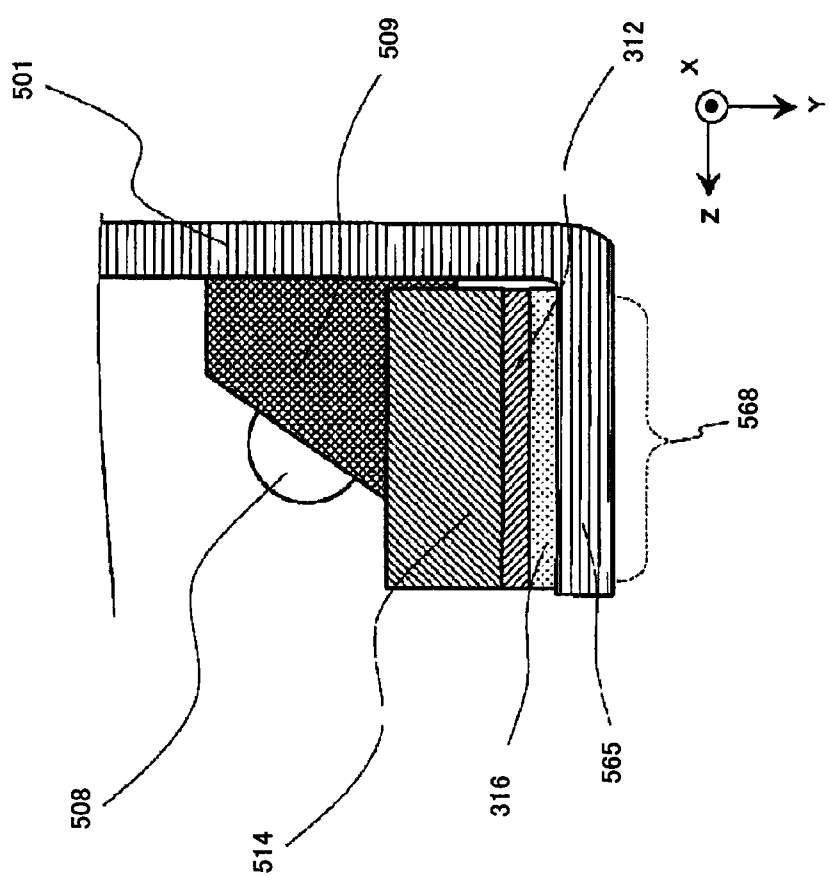
FIG. 63 is a side view near a holder of a light source device according to Embodiment 5 of the present invention.

FIG. 63 is a side view of a light source device as seen from the dotted arrow A illustrated in FIG. 61.

Figure 64A:
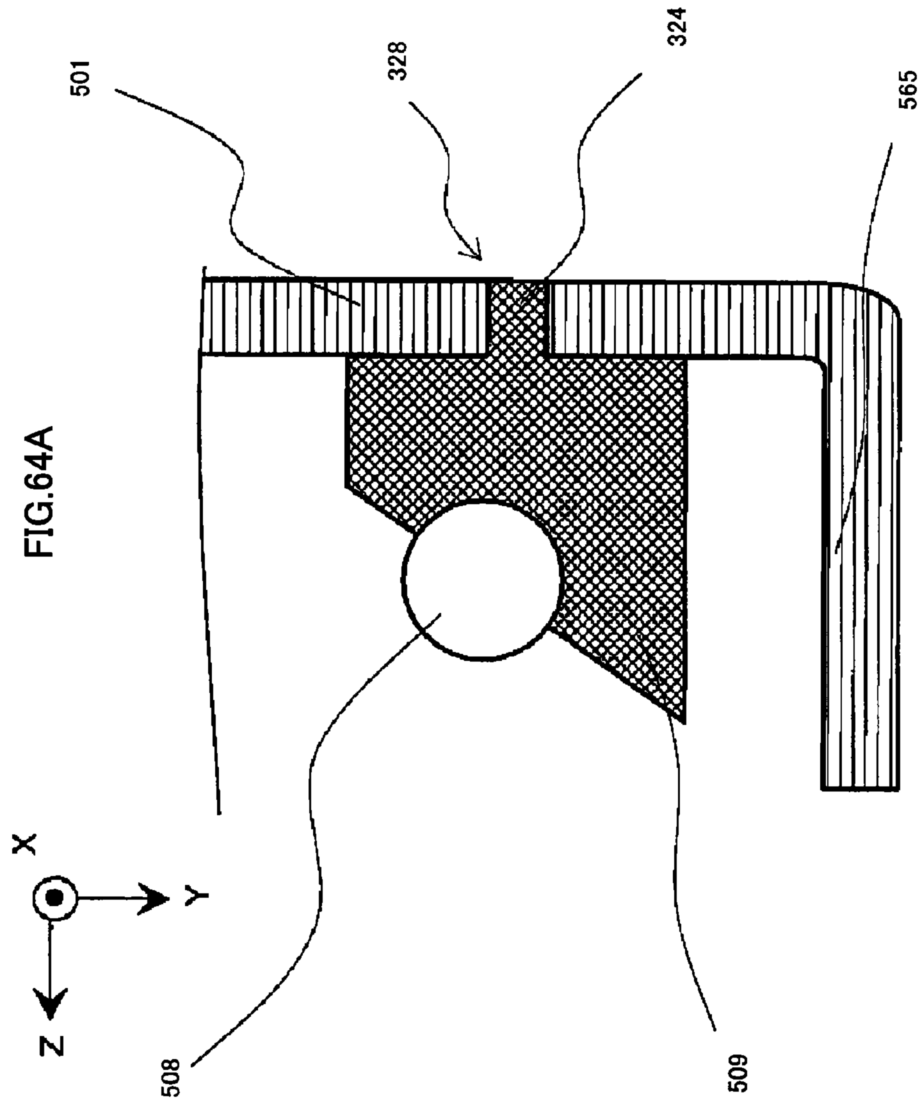
FIG. 64A is a side view near a holder of a light source device according to Embodiment 5 of the present invention.
Figure 64B:
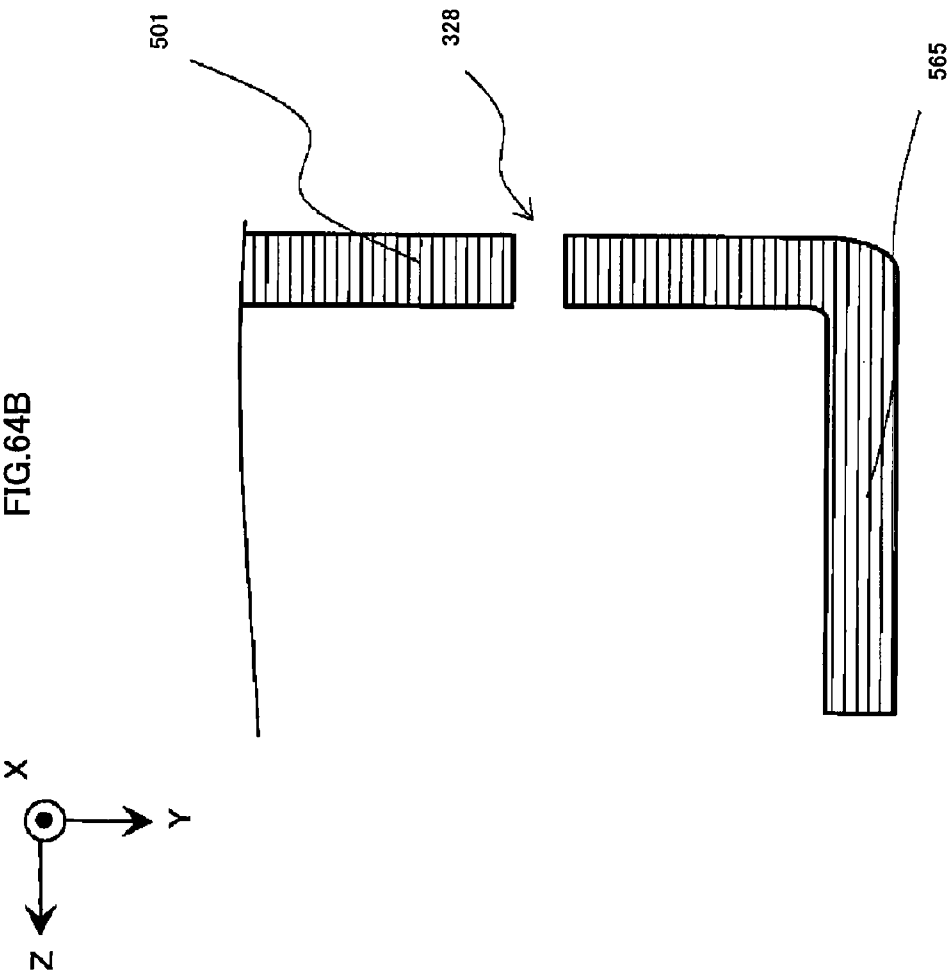
FIG. 64B is a side view near a holder of a light source device according to Embodiment 5 of the present invention.

FIG. 64A is a cross-section view as seen on a plane perpendicular to the plane in which the planar member 563 illustrated in FIG. 61 extends. FIG. 64B is a virtual cross-section view in which the light guide 508 and the light guide holder 509 have been removed from FIG. 64A.

Figure 65A:
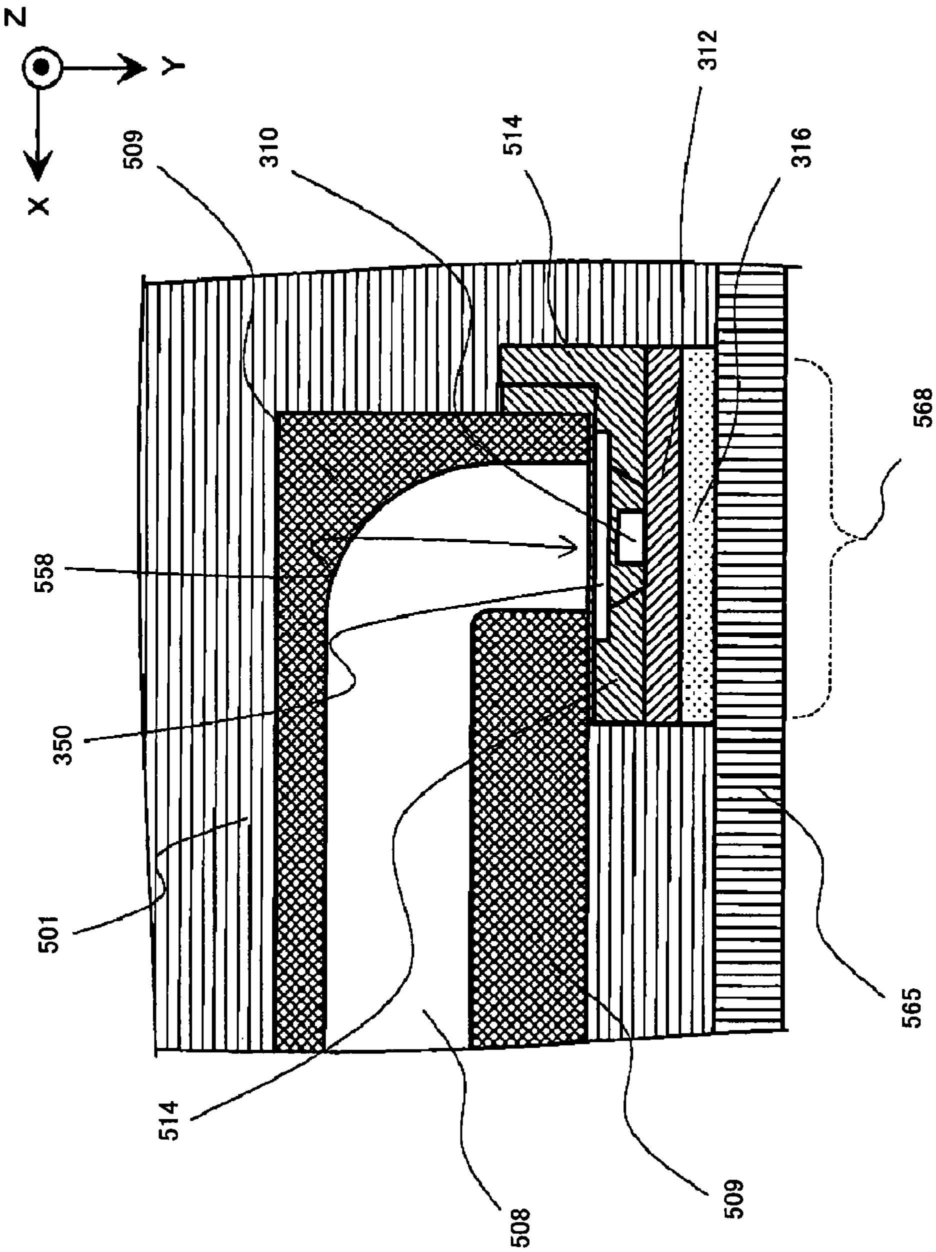
FIG. 65A is a cross-section view in the widthwise direction near a light emitter of a light source device according to Embodiment 5 of the present invention.
Figure 65B:
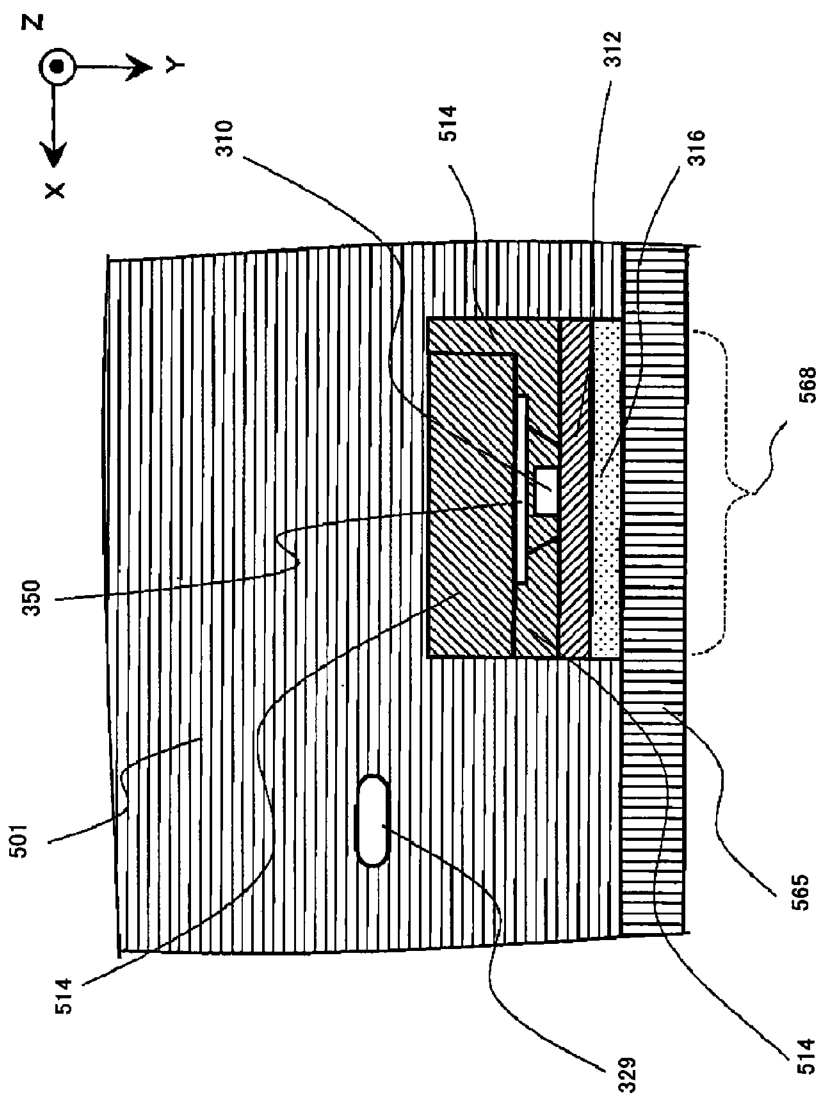
FIG. 65B is a cross-section view in the widthwise direction near a light emitter of a light source device according to Embodiment 5 of the present invention.

FIG. 65A is a cross-section view as seen on a plane parallel to the plane in which the planar member 563 illustrated in FIG. 61 extends. FIG. 65B is a virtual cross-section view in which the light guide 508 and the light guide holder 509 have been removed from FIG. 65A.

Figure 66:
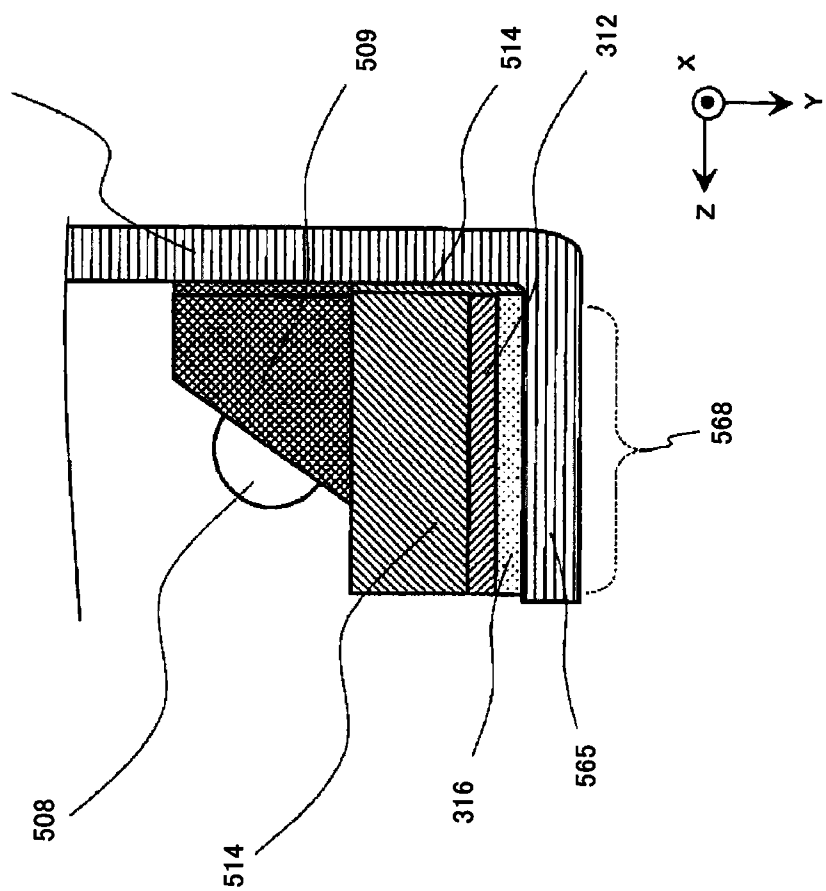

FIG. 66 is a side view of a light source device as seen from the dotted arrow A illustrated in FIG. 61.

In FIGS. 61 to 67, the fastener 568 includes a screw hole allowing passage of a screw 540, and is formed on the housing 501 in the area of a planar end 565 (on the light guide holder 509 side). The light guide holder 509, the light emitters 556 and 557, and the heat transfer bodies 316 and 317 are fastened by the screws 540.

Light emitter holes 567 are holes formed in the planar ends 565 (planar member 563). The light emitters 556 and 557 (substrates 312 and 313) are attached to the housing 501 (planar ends 565) via the light emitter holes 567. In the drawings, the same signs denote the same or corresponding portions, and detailed description thereof will be reduced or omitted.

Note that the light emitter holes 567 are not required to be complete holes in which the periphery of the light emitter holes 567 is surrounded by the planar ends 565 (housing 501), and may also be light emitter cut-outs 567 that are inwardly cut out from the outer shape of the planar end 565 (housing 501).

In this specification, the light emitter cut-outs 567 are described as including light emitter holes 567. Illustration of light emitter holes 567 is omitted from the drawings. Note that the light emitter cut-outs 567 (light emitter holes 567) are respectively formed in the two planar ends 565 at positions with the light guide holder fixture 802 therebetween, from among "a plurality of planar ends 565 in which the portions other than the light guide holder fixture 353 on one end along the main scanning direction (lengthwise direction) of the housing 501 are respectively continuous with the housing 501". In the drawings, the same signs denote the same or corresponding portions, and detailed description thereof will be reduced or omitted.

The differences between FIGS. 62A and 62B and FIG. 63 versus FIGS. 65A and 65B and FIG. 66 are that, as FIG. 62B and FIG. 65B particularly demonstrate, in the light source device illustrated in FIGS. 62A and 62B and FIG. 63, there is no holder 514 between the light guide holder 509 and the housing 501, whereas in the light source device illustrated in FIGS. 65A and 65B and FIG. 66, there is a holder 514 between the light guide holder 509 and the housing 501. Note that the holder 515 may be provided similarly to the holder 514.

Specifically, with the holder 514 illustrated in FIGS. 62A and 62B and FIG. 63, above the first hollow part (in which the optical filter 350 is formed), the holder 514 (the wall face extending from the edges of the first hollow part), the light guide holder 509, and the housing 501 are successively disposed in the thickness direction of the light source device according to Embodiment 5.

On the other hand, with the holder 514 illustrated in FIGS. 65A and 65B and FIG. 66, above the first hollow part (in which the optical filter 350 is formed), the holder 514 (the wall face extending from the edges of the first hollow part), the light guide holder 509, the holder 514 (the wall face extending from the edges of the first hollow part), and the housing 501 are successively disposed in the thickness direction of the light source device according to Embodiment 5.

In other words, the holder 514 illustrated in FIGS. 65A and 65B and FIG. 66 is similar to the holder 514 illustrated in FIG. 50B in Embodiment 4. Herein, the placement of the holder 514 is indicated in parenthesis in FIG. 50B.

Accordingly, the holder 514 illustrated in FIGS. 50A and 50D and FIGS. 51A to 51D may also take a similar configuration as the holder 514 illustrated in FIGS. 62A and 62B and FIG. 63, and the holder 514 (whose wall face extends from the edges of the first hollow part), the light guide holder 509, and the housing 501 may be successively disposed in the thickness direction of the light source device. FIGS. 64A and 64B are cross-section views illustrating the structure common to both.

In the light source device according to Embodiment 5, as illustrated in FIG. 62A and FIG. 63 (FIG. 65A and FIG. 66 are also the same), the light guide holder 509 of the light source device includes a pushing face part that faces opposite the edges of the first opening of the holder 514. Specifically, the pushing face part corresponds to the portion of the light guide holder 509 that covers the outer circumference of the curved portion of the light guide 508. This pushing face part may also restrict the sliding range (movement range) of the light guide holder 509.

Note that the pushing face part may also be made to be about to contact the edges of the first opening when the expansion of the light guide 508 is at maximum. In this case, the pushing face part becomes an opposing face part rather than a pushing face part.

The ends of the light guide holder 509 illustrated in FIGS. 62A and 62B and FIG. 63 are slidably held by the holder 514 (holding the ends of the light guide holder 509), or alternatively, stretch in the lengthwise direction above of the first hollow part. Similarly, the ends of the light guide holder 509 illustrated in FIGS. 65A and 65B and FIG. 66 are slidably held by the holder 514 (holding the ends of the light guide holder 509), or alternatively, stretch in the lengthwise direction above the first hollow part.

However, the sites that potentially contact the holder 514 differ between the light guide holder 509 illustrated in FIGS. 62A and 62B and FIG. 63 versus the light guide holder 509 illustrated in FIGS. 65A and 65B and FIG. 66. Specifically, part of the ends of the light guide holder 509 illustrated in FIGS. 62A and 62B and FIG. 63 contacts the housing 501 and slides, or alternatively, stretches in the lengthwise direction above the housing 501.

In the light source device according to Embodiment 5, the ends of the light guide 508 are curved towards the ends 565 (fasteners 568). Light exiting the light emitters 556 and 557 (light-emitting elements 310 and 311) fastened to the fasteners 568 is input from the end faces (light inputters) 358 of the light guide 508, whose ends are curved towards the planar ends 565 (fasteners 568). Subsequent basic operation is similar to a light source device according to Embodiments 3 and 4.

The primary portion of the curve in the light guide 508 exists on the XZ plane in Embodiment 4, but exists on the XY plane in Embodiment 5. Likewise in the light guide 508 of a light source device according to Embodiment 5, it is sufficient for the light scattering parts 318 and 319 to be at least formed in a portion that corresponds to an effective scanning area in the main scanning direction of the image scanning device. Also, the brightness or the like at the ends of the effective scanning area (near the holders 514 and 515) may also be adjusted by causing more or less light to be output from curved portion of the light guide 508 compared to other portions.

In the light source device illustrated in FIGS. 61 to 66, the light emitters 556 and 557 (substrates 312 and 313) are fastened to the fastener 568 by screws 540 (not illustrated), but in the light source device illustrated in FIG. 67, the light emitters 556 and 557 (substrates 312 and 313) are attached to the housing 501 via light emitter cut-outs 567. As discussed earlier, the light emitter cut-outs 567 may also be light emitter holes 567 that are completely surrounded by the planar ends 565.

In addition to FIG. 67, heatsinks may also be formed on the planar member 563 (housing 501) of the light source device according to Embodiment 5 in FIG. 61 by extending and bending the planar ends 565 that contact the light emitters 556 and 557 in the lengthwise direction (towards the space on the outer side of the screws 540 with respect to the light guide 508). Although not illustrated in the drawings, heatsinks may extend in the widthwise direction, or in the lengthwise direction and the widthwise direction. In addition, heatsinks may have an L-shape formed from two orthogonal faces, or a U-shape formed by two faces extending orthogonally from both ends of a single face.

Methods of bending in the lengthwise direction and the widthwise direction include those parallel to the planar ends 565 and those parallel to the planar ends 364. In order to be parallel with the planar ends 364, heatsinks are formed extending in the lengthwise direction facing the side opposite the long-edge wall with respect to the sloped face (reflector support) 320 (although not illustrated in the drawings, heatsinks are formed on the side of the reverse face of the reflecting face of the reflector 302). Heatsinks may also be formed extending towards the bottom face of the housing 501.

Likewise, with the planar member 563 (housing 501) of the light source device according to Embodiment 5 in FIG. 61 and FIG. 67, the extended light guide holder fixtures 353*e* or the extended planar ends 363*e* illustrated in FIGS. 54A to 54C and FIGS. 55A to 55C may also be provided as heatsinks. With respect to heatsinks, the housing 401 in the light source device according to Embodiment 4 is also similar.

The light source device according to Embodiment 5 is one that supports the optical filters 350 and 351 between the first opening and the second opening of the holders 514 and 515 while maintaining a designated interval with the light emitters 556 and 557. Furthermore, the end faces (light inputters) 358 of the light guide 508 and the light emitters 556 and 557 (optical filters 350 and 351) do not contact.

Note that although in FIG. 67 the side faces of the heat transfer bodies 316 and 317 are illustrated as partially contacting the planar ends 565 of the housing (light emitter cut-outs 567) in order to simplify the comparison between FIG. 61 and FIG. 67, but in actual practice, portions other than the side faces of the heat transfer bodies 316 and 317 and the planar ends 565 may be contacting directly or indirectly to conduct heat, or the heat transfer bodies 316 and 317 may not be provided.

The fasteners 568 and the light emitter cut-outs 567 (light emitter holes 567) in the light source device according to Embodiment 5 may also be formed in the planar ends 565 (on the reflector 302 side) rather than in the planar ends 565 (on the light guide holder 509 side). In this case, the curve direction of the light guide 508 is reversed (in FIG. 61 and FIG. 67, the curve direction is vertically reversed).

In addition, the fasteners 568 and the light emitter cut-outs 567 (light emitter holes 567) may be formed on other than the planar ends 565 or the planar ends 565. For example, the fasteners 568 and the light emitter cut-outs 567 (light emitter holes 567) may be formed in a portion of the housing 501 (planar member 563) bent in the widthwise direction in the same way as the fasteners 568 formed in a portion of the housing 501 (planar member 563) bent in the lengthwise direction.

This specification claims priority based on Japanese Patent Application No. 2012-024229 filed in the Japan Patent Office on Feb. 7, 2012, Japanese Patent Application No. 2012-140061 filed in the Japan Patent Office on Jun. 21, 2012, and Japanese Patent Application No. 2012-140062 filed in the Japan Patent Office on Jun. 21, 2012. The content disclosed in the specification, claims, drawings, and abstract included in the originating patent applications is hereby incorporated in entirety by reference.

REFERENCE SIGNS LIST

101, 201, 301, 401, 501: Housing, 102, 302: Reflector, 103, 203: Light source, 104, 105, 116, 117, 316, 317: Heat transfer body, 106, 107; heatsink fins, 108, 308, 408, 508: Light guide, 109, 209, 309, 409, 509: Light guide holder, 110, 111, 310, 311: Light-emitting element, 112, 113, 312, 313: Substrate, 114, 115, 214, 215, 314, 315, 414, 415, 514, 515: Holder, 118, 119, 318, 319: Light scattering part, 120, 220, 320, **320*b*: Reflector support; 121, 122, 321, 322: Light outputter, 123, 131, 252, 352: Screw hole, 124, 125, 126, 224, 225, 226, 324, 325, 326: Pin, 127, 227, 327: Aperture, 128, 228, 328, 362: Interlocking hole, 129, 130, 229, 230, 329, 330: Long hole, 132, 133: Wing, 134: Fins, 135, 136, 137, 138, 235, 236, 237, 238: Holder holding hole, 139, 140, 141, 142, 143, 340, 341, 342, 343, 540: Screw, 144, 145: Short-edge wall, 250, 251, 350, 351: Optical filter, 253, 353: Light guide holder fixture, 254, 255: Standing wall, 320*e*: Extended reflector support, 353*e*: Extended light guide holder fixture, 354, 355, 468: Fastener, 156, 157, 356, 357, 456, 457, 556, 557: Light emitter, 358, 458, 558: End face (light inputter), 359: Projection, 361: Light guide locker, 363, 463, 563, 363*b*: Planar member, 364, 365: Planar end, 364*e*, 365*e*: Extended planar end, 366: Integral end, 367, 467, 567: Light emitter hole (light emitter cut-out), 468, 568**: Fastener

The invention claimed is:

1. A light source device comprising:

a rod-shaped light source or an array light source extending in a main scanning direction;

a reflector that is placed opposite the rod-shaped light source or the array light source, extends in the main scanning direction, and reflects light output from a side face of the rod-shaped light source or the array light source; and a plurality of reflector supports that are arranged at an interval along the main scanning direction and support the reflector, wherein each of the plurality of reflector supports is provided at a designated angle with respect to a sub scanning direction on a planar member that supports the plurality of reflector supports, is integral with the planar member, and is formed by bending one end of the planar member along the main scanning direction, and the planar member includes a plurality of planar ends extending from each portion on one end and along the main scanning direction, other than the plurality of reflector supports.

2. The light source device according to claim 1, wherein the plurality of reflector supports are placed on the side of the reverse face of the face on the reflector that reflects light output from the side face of the rod-shaped light source or the array light source.

3. The light source device according to claim 1, wherein the length of the planar ends in the main scanning direction is longer than the length of the reflector supports in the main scanning direction.

4. The light source device according to claim 1, wherein the plurality of planar ends includes a connection interface member for attaching to a carriage of an image scanning device.

5. The light source device according to claim 1, wherein the tips of the plurality of planar ends along the sub scanning direction from the base end side that is continuous with the plurality of reflector supports are connected to form an integral body.

6. The light source device according to claim 1, wherein the planar member holds the rod-shaped light source or the array light source at the other end of the planar member along the main scanning direction.

7. The light source device according to claim 1, wherein the plurality of reflector supports includes a portion curved with respect to the sub scanning direction besides the base end portion continuous with the planar member at the designated angle with respect to the sub scanning direction.

8. The light source device according to claim 1, wherein the plurality of reflector supports includes a portion curved with respect to the sub scanning direction.

9. The light source device according to claim 1, wherein the rod-shaped light source is configured to include an electric discharge lamp, or is configured to include a light emitter, and a columnar light guide that accepts input of light emitted from the light emitter from an end face, guides the input light in the lengthwise direction, and outputs from a side face.

10. The light source device according to claim 1, wherein the array light source includes a plurality of light emitters, arranged in the main scanning direction, that emit light in the sub scanning direction, or light emitters, arranged in the main scanning direction, that emit light in the sub scanning direction via a light guide member or a reflecting member.

11. A reflector support structure comprising:

a reflector extending in a main scanning direction; and a plurality of reflector supports that are arranged at an interval along the main scanning direction and support the reflector, wherein each of the plurality of reflector supports is provided at a designated angle with respect to a sub scanning direction on a planar member that supports the plurality of reflector supports, is integral with the planar member, and is formed by bending one end of the planar member along the main scanning direction, and the planar member includes a plurality of planar ends extending from each portion on one end and along the main scanning direction, other than the plurality of reflector supports.

12. The reflector support structure according to claim 11, wherein each of the plurality of reflector supports are placed on the side of the reverse face of the face on the reflector that reflects light output from a side face of a rod-shaped light source or an array light source.

13. The reflector support structure according to claim 12, wherein the plurality of reflector supports includes a portion curved with respect to the sub scanning direction besides the base end portion connected with the planar member at the designated angle with respect to the sub scanning direction.

14. The reflector support structure according to claim 11, wherein the plurality of reflector supports includes a portion curved with respect to the sub scanning direction.

15. A light source device comprising:

a housing that includes a floor, standing walls bent inwards from the floor and standing off the floor, and a sloped face provided in a direction orthogonal to the standing walls, bent inwards at a designated angle from the floor, having a reflecting member laid thereon;

a light guide, placed on the inner side of the housing and extending in a direction orthogonal to the standing walls, that outputs primary light that is output towards an irradiated part, and secondary light that is output towards the sloped face, reflects off the sloped face, and irradiates the irradiated part; and light emitters provided opposite the ends of the light guide in a direction orthogonal to the standing walls, and placed in contact with the standing walls.

16. The light source device according to claim 15, wherein the floor has a rectangular shape, and the housing further includes a long-edge wall bent inwards from the floor along one of long edges of the floor, and short-edge walls bent inwards from the floor along short edges of the floor, the short-edge walls being the standing walls, the sloped face is bent inwards from the floor along the other long edge of the floor at a designated angle with respect to the short-edge direction of the floor, and the housing further includes heatsinks, continuous with the short-edge walls, bent in the long-edge direction, extending in the long-edge direction at an opposite side of the long-edge wall with respect to the sloped face, and facing the sloped face.

17. The light source device according to claim 15, wherein the floor has a rectangular shape, and the housing further includes a long-edge wall bent inwards from the floor along one of long edges of the floor, and short-edge walls bent inwards from the floor along short edges of the floor, the short-edge walls being the standing walls, the sloped face is bent inwards from the floor along the other long edge of the floor at a designated angle with respect to the short-edge direction of the floor, and the housing further includes heatsinks, continuous with the short-edge walls, bent in the long-edge direction, extending in the long-edge direction at an opposite side of the sloped face with respect to the long-edge wall, and facing the long-edge wall.

* * * * *